(12) United States Patent
Hedrick et al.

(10) Patent No.: US 9,754,443 B2
(45) Date of Patent: Sep. 5, 2017

(54) SYSTEM AND METHOD FOR REMOTE CONTROL GAMING SESSIONS USING A MOBILE DEVICE

(71) Applicant: Bally Gaming, Inc., Las Vegas, NV (US)

(72) Inventors: Joseph R. Hedrick, Reno, NV (US); Martin S. Lyons, Henderson, NV (US); Sean C. Martin, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 328 days.

(21) Appl. No.: 14/498,995

(22) Filed: Sep. 26, 2014

(65) Prior Publication Data

US 2015/0228153 A1 Aug. 13, 2015

Related U.S. Application Data

(60) Provisional application No. 61/939,347, filed on Feb. 13, 2014.

(51) Int. Cl.
*A63F 9/24* (2006.01)
*G07F 17/32* (2006.01)
*G06Q 20/32* (2012.01)

(52) U.S. Cl.
CPC ....... *G07F 17/3225* (2013.01); *G06Q 20/322* (2013.01); *G07F 17/3218* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 4,467,424 A | 8/1984 | Hedges et al. | |
| 4,592,546 A | 6/1986 | Fascenda et al. | |
| 5,999,808 A * | 12/1999 | LaDue | A63F 13/12 |
| | | | 235/380 |
| 6,001,016 A | 12/1999 | Walker et al. | |
| 6,244,957 B1 | 6/2001 | Walker et al. | |
| 6,270,410 B1 | 8/2001 | DeMar et al. | |
| 6,508,709 B1 | 1/2003 | Karmarkar | |
| 8,504,617 B2 * | 8/2013 | Amaitis | G07F 17/32 |
| | | | 342/450 |
| 9,153,095 B2 * | 10/2015 | Adiraju | G07F 17/3225 |
| 9,251,649 B2 * | 2/2016 | Saunders | G07F 17/323 |
| 9,396,471 B1 * | 7/2016 | Kerr | H04W 4/021 |
| 2003/0064805 A1 * | 4/2003 | Wells | G07F 17/32 |
| | | | 463/39 |

(Continued)

*Primary Examiner* — Lawrence Galka
(74) *Attorney, Agent, or Firm* — Seed IP Law Group LLP

(57) ABSTRACT

Various embodiments directed to systems and methods that enable remote play of a game hosted by a gaming machine using a mobile device are disclosed herein. In one embodiment, the system includes a network in communication with the gaming machine and the mobile device, and the network includes a first wireless access point located in a first area and a second wireless access point located in a second area of a venue. Also included is a remote gaming server in communication with the gaming machine and mobile device over the network. The remote gaming server enables remote play when the mobile device is connected to the second wireless access point and prevents remote play when the mobile device is connected to the first wireless access point.

20 Claims, 80 Drawing Sheets

(56) References Cited

U.S. PATENT DOCUMENTS

| | | | |
|---|---|---|---|
| 2008/0311971 A1* | 12/2008 | Dean | G07F 17/32 |
| | | | 463/20 |
| 2010/0240435 A1 | 9/2010 | Gagner et al. | |
| 2012/0149463 A1* | 6/2012 | Jabara | G07F 17/3218 |
| | | | 463/29 |
| 2012/0309524 A1 | 12/2012 | Rajaraman et al. | |
| 2013/0203489 A1 | 8/2013 | Lyons | |
| 2013/0273996 A1* | 10/2013 | Froy, Jr. | G07F 17/34 |
| | | | 463/20 |
| 2014/0162792 A1 | 6/2014 | Nguyen et al. | |
| 2015/0045122 A1* | 2/2015 | Acres | G07F 17/3218 |
| | | | 463/42 |

* cited by examiner

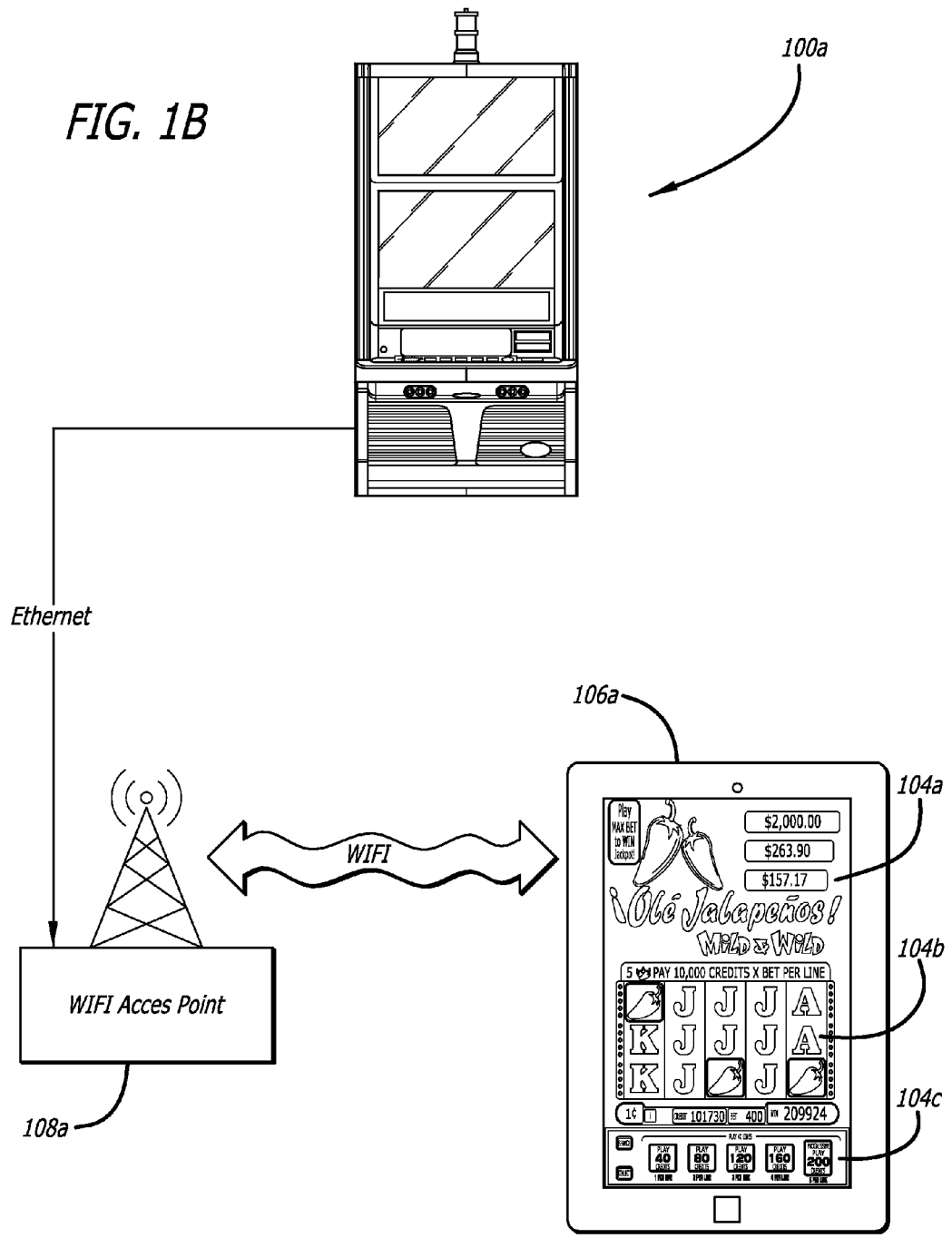

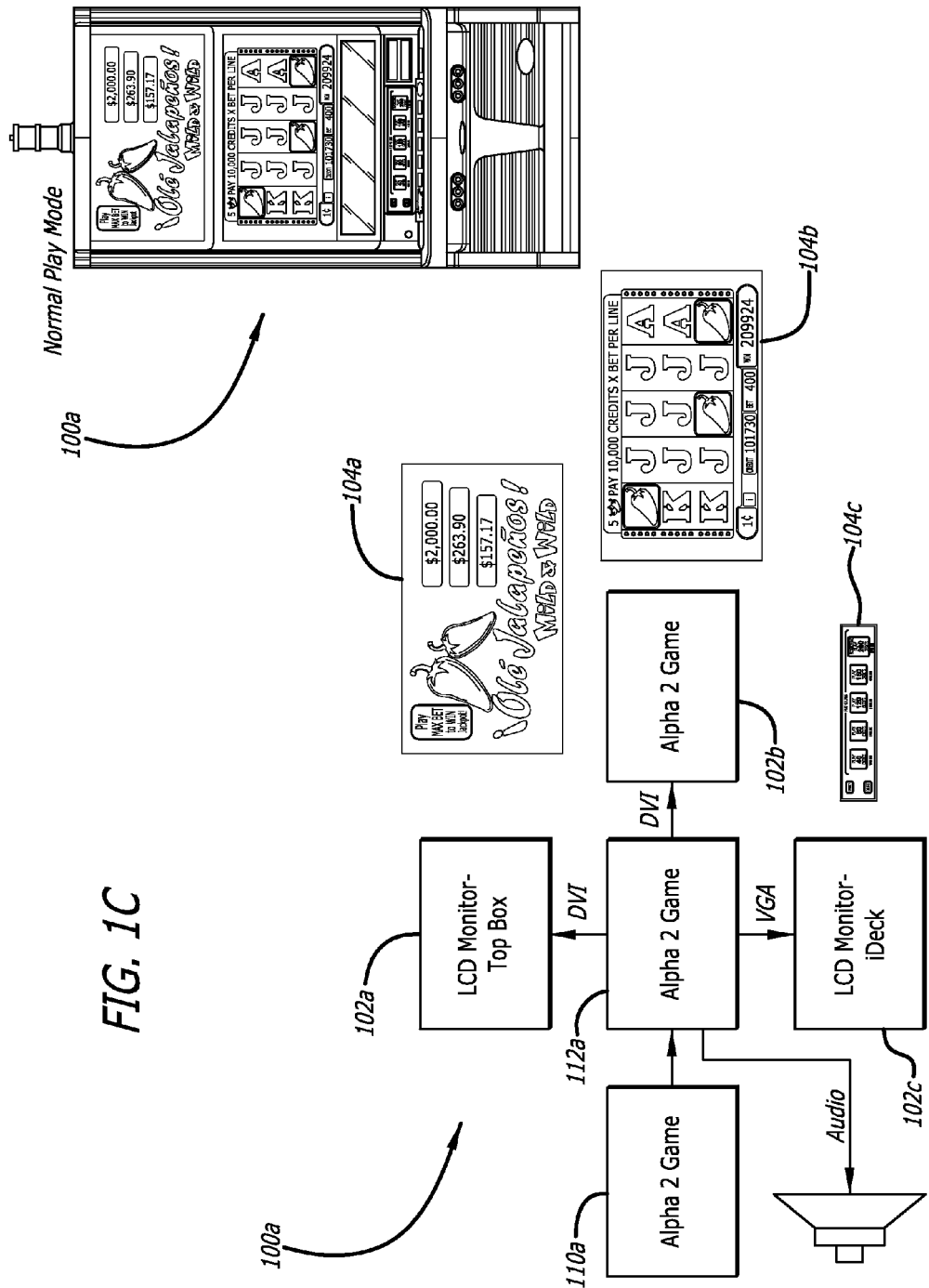

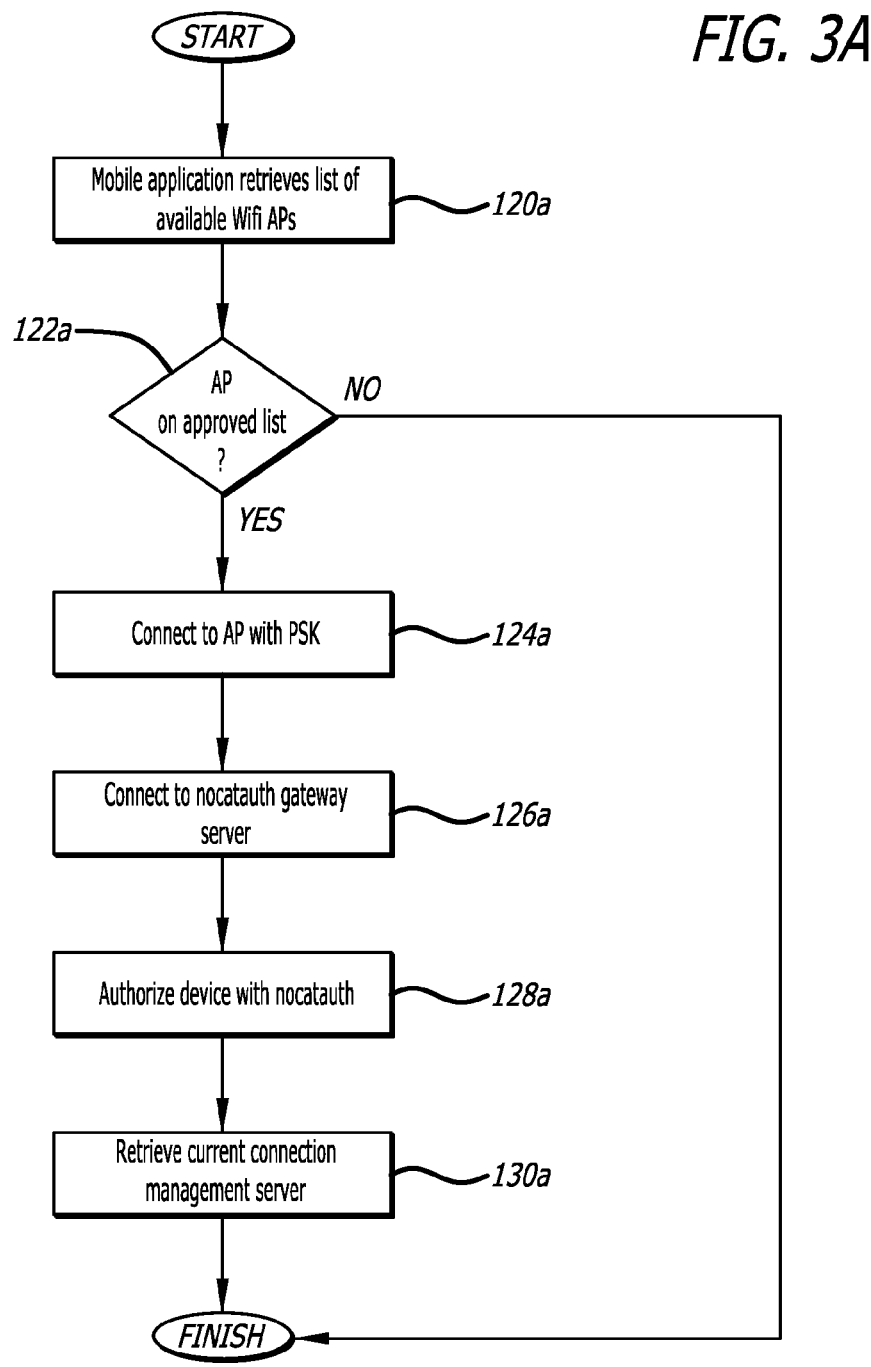

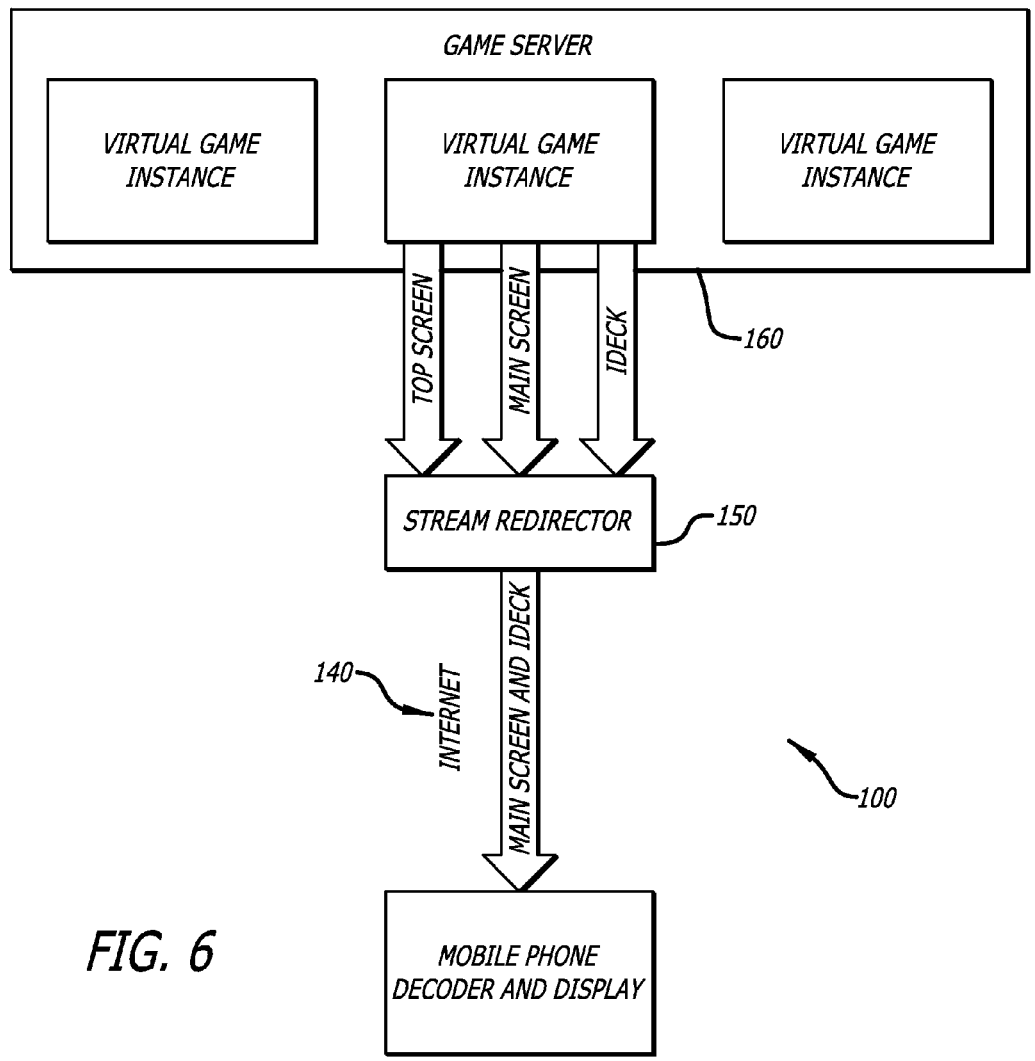
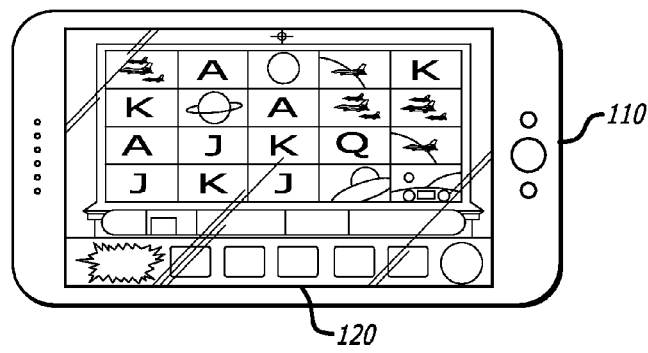
FIG. 6

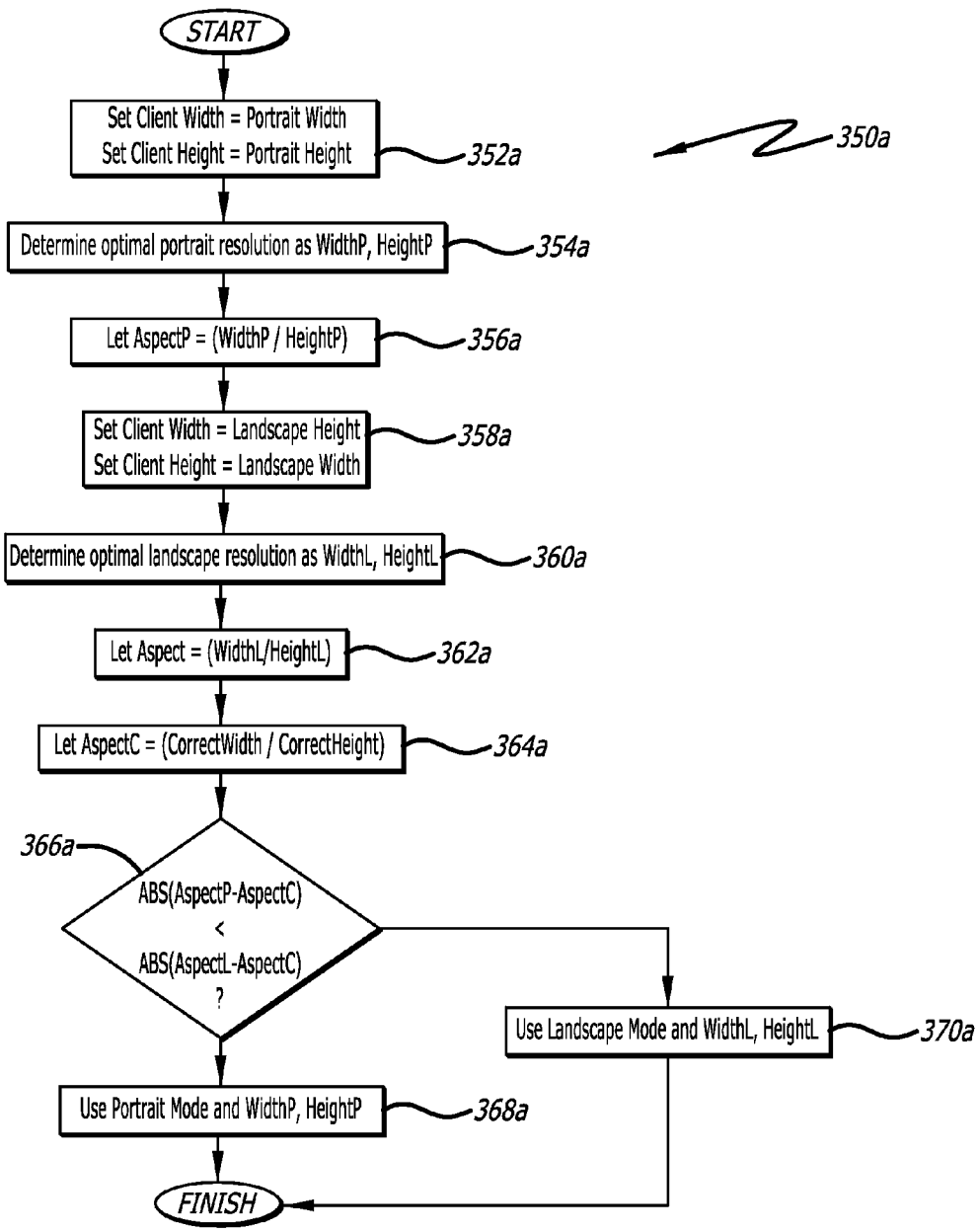

FIG. 37A
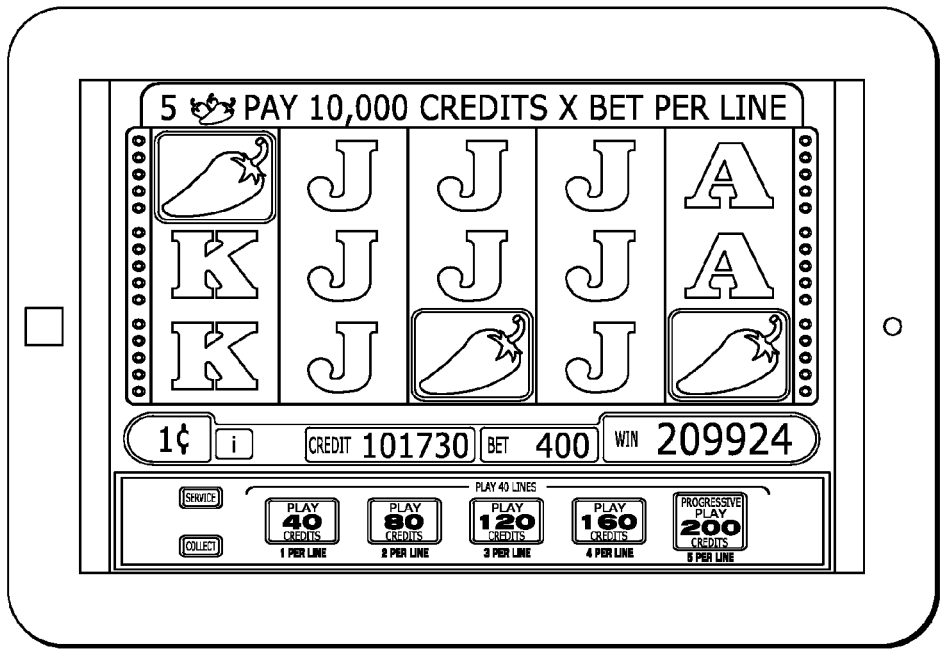
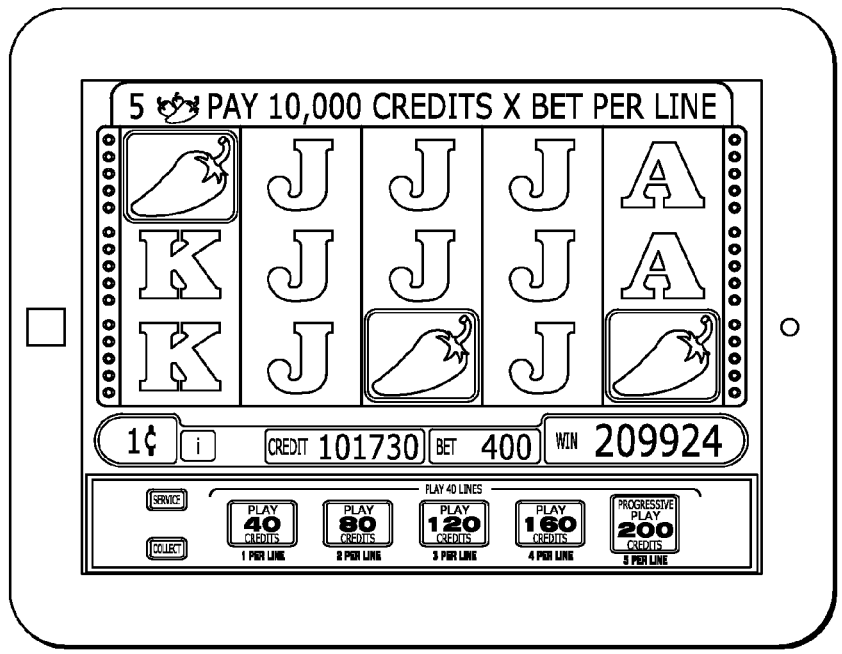
FIG. 37B

Remote Control Gaming

Welcome! Michael

English

Configuration
- User Management
- Mobile Device
- Session
- Reports
- Service

EGM Stat: Active | Filter

| Asset ID | QR Code | Status | Created By | Created Date | Updated By | Updated Date |
|---|---|---|---|---|---|---|
| EGM01 | QR-01 | Active | Michael | 06-12-2013 | System | 06-12-2013 |
| EGM02 | QR-01 | Active | Michael | 06-12-2013 | System | 06-12-2013 |
| EGM03 | QR-01 | Active | Michael | 06-12-2013 | System | 06-12-2013 |
| EGM04 | QR-01 | Active | Michael | 06-12-2013 | System | 06-12-2013 |

Footer Text

Automatic Funds Transfer

Credit Meter Balance Limits
- Minimum $
- Minimum $

Top-off
- $ Amount

Maximum Transfer per Session
- $ Amount

Automatic Transfer per Session
- Number

Session Length
- Hours
- Minutes

[Back] [Save] [Next]

FIG. 63E

Frequently Used Transfer Amounts

Amount to Add
- $

[Add]

Highlight Default Amount Below:

| $ | $ | $ |
| $ | $ | $ |
| ALL | Other | Last Cash Out |

[Back] [Save] [Next]

FIG. 63F

Authentication

PIN ☐
- Enter PIN
- Confirm PIN

Verbal Phrase ☐
- ○ Record

Test Phrase ☐
- Enter Phrase
- Confirm Phrase

Image ☐
- Select

[Back] [Save] [Finish]

SYSTEM AND METHOD FOR REMOTE CONTROL GAMING SESSIONS USING A MOBILE DEVICE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

The present application claims the priority and benefits of U.S. Provisional Application No. 61/939,347, filed on Feb. 13, 2014, which is incorporated by reference herein in its entirety.

TECHNICAL FIELD

The present disclosure is directed to wagering games, gaming machines, networked gaming systems and methods, and in particular to cross platform persistent gaming sessions using a mobile device.

BACKGROUND

In the past, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device. There is also the desire to incorporate mobile devices for game play; however, there are numerous obstacles to the use of mobile devices for game play, including the lack of ticket printers and bill acceptors.

Historically, there has been "Ticket-in-Ticket-Out" functionality in gaming machines. Briefly explained, when using "Ticket-in-Ticket-Out" functionality a player inserts cash into a gaming machine, but does not receive cash when pressing "cash out." Instead, he or she receives a paper ticket that may be further inserted into the present or any other gaming machine, or redeemed for cash by inserting into a kiosk.

While there is a desire to use mobile devices such as smart phones as gaming devices, there remains the problem that these mobile devices do not have access to traditional gaming peripherals such as ticket printers or bill acceptors. It would be desirable to allow mobile devices to participate in playing games with real money in a casino environment, leveraging existing infrastructure in a way that makes sense to a player. There is a continuing need in the art to address these and other issues. For example, some establishments ban or otherwise limit indoor smoking. At gaming establishments, gaming machines are typically operated indoors. In this regard, bans on smoking may directly impact revenue at gaming establishments since active or participating players may leave their gaming machines to smoke. One study suggests that smoking bans may lead to a reduction in revenue of around 30%. While gaming machines could be operated outdoors, regulations generally limit gaming establishments to a certain number of machines that may be operated or otherwise ready for play. In this regard, situating gaming machines outdoors (i.e., in smoking-friendly areas) affects the number of gaming machines that may be operated indoors, and also carries with it inclement weather concerns that may force gaming establishments to expend time and money moving gaming machines indoors. Therefore, there remains a need to enable a player to use a gaming machine vis-à-vis a second mobile computing device to address these and other issues.

SUMMARY

Briefly, and in general terms, various embodiments are directed to systems and methods that enable remote play on a mobile device of a game being hosted on a gaming machine.

In some embodiments, a system for remote gaming allows a player to remotely play a game hosted on a gaming machine in a first area. The gaming machine may include a display, a game processor under control of game software, and a player input interface such as a touch screen and/or button panel. The gaming machine may have other features as well. Also, the system includes a communication network and may include a network device coupled between said terminal and said communication network. The network device may be part of the game's processor(s) or may be a separate device interposed between the game's processor(s) and the network. The network device may be an after-market device adapted to be installed in existing gaming terminals. The system may also include an apparatus or a remote gaming server for the player to uniquely associate or synch or "bind" a mobile device such as a tablet, mini-tablet, smart phone, lap top computer or the like, with the gaming terminal processor. The apparatus may be included in the network device or may be a device incorporated into the gaming machine. Associating or "synching" the mobile device with the gaming machine may be facilitated by a short range high frequency wireless communication, such as a near field and/or Bluetooth or Broadband wireless communication links (collectively referred to herein as near field communications or simply "near field"), established between the gaming machine and mobile device. A near field transceiver may be included in the apparatus or may be a separate device. The synching between the mobile device and the gaming machine enables the processor of the gaming machine to receive input from and stream content to the mobile device through the network for remote play of the game. In one embodiment the apparatus or server disables the gaming machine and peripherals from local operation to prevent game play on the gaming machine by, for example, another player when remote play is in session.

Associating, synching, or binding the gaming machine with the mobile device also provides for certain meters to be replicated at the mobile device such as the credit, and bet meters. The player may then take their mobile device to another location and continue to play the same game, previously being played on the gaming machine, which is streamed through the network to the mobile device from or as enabled by the gaming machine. Prompts and input from the player on their mobile device are sent through the network to the game processor and the game processor renders outputs streamed to the mobile device also through the network. The prompts and selections from the mobile device appear to be prompts/selections from the terminal's player interface(s) to the processor of the gaming machine.

In another embodiment, the communication network includes classes of wireless communication with the mobile devices. In areas where remote gaming is not permitted, a first class of wireless communication (a first wireless access point) may simply broadcast to the mobile device that it is not in an area authorized for gaming. It may broadcast directions or a map to an area which is authorized. In a second class of wireless communication (a second wireless access point), in areas where remote gaming is authorized, live streaming of gaming content is provided. In this embodiment, remote gaming sessions may only occur in areas were remote gaming is permitted.

In yet another embodiment, the funding of gaming using the mobile device is provided. According to these various embodiments, a system is provided which includes a server in communication with the network and a data structure storing for each player an account including funds available for gaming activities. A transaction terminal such as a kiosk or a gaming machine itself, through a compatible application on the mobile device, enables the player to communicate with the network (near field or broadband) to add or release funding from their play. The player may establish funds at the transaction terminal by inserting cash, perhaps a TITO ticket or enables funding from a credit instrument including casino or bank issued credit/debit cards. The account may also be funded at a casino cage with a check, marker (debt instrument), credit card, cash, or a TITO ticket. To apply funding to the mobile device, the player associates or synchs their mobile device with the transaction terminal through the communication network. This may be done by configuring the application (App) on the mobile device to display a bar code or Quick Response (QR) which is read at the transaction terminal. The reading of the code identifies the mobile device to the transaction terminal which accesses the player's account fund. To prevent someone who is not the player from illicitly removing funds, the player may be required to enter a unique PIN or offer a biometric identified, e.g. fingerprint, palm print, facial scan, and retina scan. The player can then interact with the transaction terminal to release funds, in a desired amount, to the mobile device for play thereon. For example, a kiosk may be provided in a smoking area, or other remote gaming areas, so that players having transferred the game to their mobile device for remote play and moved to the smoking area can cash out and add funds for gaming without having to return to their gaming machine. Where the player has synched with a gaming machine for play of the terminal's game as described above, the added funding value may be recorded in the meters of the mobile device and gaming terminal.

A player may also fund a gaming machine from their mobile device. In this embodiment, the player associates or synchs their mobile device with the gaming machine. In this regard the gaming machine may display a numerical code, bar code, glyph or QR code which is captured by the camera on the mobile device and processed by the App to direct funds to be deposited from the mobile device (mobile eWallet) to the gaming machine (electronic gaming machine or "EGM"). Using a communication network such as a near field wireless network (WiFi) or broadband network the funds can be moved to, received by, and added to the credit meter of the gaming machine.

To redeem the value from their mobile eWallet on their mobile device the player may associate their device with the transaction terminal such as a kiosk and direct funds from the mobile device to their account or to a third party account such as their bank checking account.

The player may also convert physical TITO tickets into eWallet funds using the camera on their device and the appropriate App on their device. While in communication with a transaction terminal or casino network the player would photograph the bar/QR code on the ticket and/or the printed ticket alpha-numeric information including the unique ticket reference number. The network would verify the ticket; the funds would be applied to the mobile device and the ticket records in the network would show the details of the redemption including marking the ticket as redeemed.

In still a further embodiment the process of synching/associating of the mobile device to a gaming machine for the player to play the game remotely, includes a feature where the subject gaming machine may be identified to facilitate the player's return to that particular gaming terminal. The player enters a prompt to begin the location process whereupon a map may be displayed showing the location of the gaming machine. In another embodiment, the location process may include lighting lights on the gaming machine and/or emitting sounds to draw the player to the gaming machine. In one embodiment the player can select the sound to be emitted by the gaming machine and the selected sound also may be played on the mobile device so the player knows the exact sound to listen for in a venue to find the gaming machine.

In another embodiment, a system for enabling remote play of a game includes a gaming machine located in a first area of a venue. The gaming machine may include a game-display to display outcomes for a wagering game, and a processor to control the play of the wagering game. The system also includes a mobile device that may include a mobile video display, a mobile player interface, and a wireless transceiver. A communications network may be in communication with the gaming machine and the mobile device. In one embodiment, the communications network includes a first wireless access point located in the first area of the venue and a second wireless access point located in a second area of the venue. The system in this embodiment includes a remote gaming server in communication with the gaming machine and mobile device over the communications network. The remote gaming server is configured to associate (or synch) the gaming machine with the mobile device. Also, the remote gaming server enables the mobile device to receive a first class of content (non-gaming content) from the gaming machine when the mobile device is connected to the first wireless access point in the first area. The remote gaming server enables the mobile device to receive a second class of content, such as streaming game content of the game hosted on the gaming machine, when the mobile device is connected to the second wireless access point in the second area. Further, the remote gaming server enables the gaming machine to receive input from the mobile player interface of the mobile device. In a related embodiment, the remote gaming server enables the mobile device to receive a first class of content related to a game feature configured to appeal to a certain player demographic, such as age or gender, when the mobile device is in a first area. When in a second area, the remote gaming server enables the mobile device to receive a second class of content related to a game feature configured to appeal to a different player demographic, such as age or gender. For example, in an area expected to host a younger demographic, the game feature may include a different degree or method of player interaction than when the mobile device is in an area likely to host an older demographic.

In certain embodiments, the remote gaming server prevents the mobile device from streaming game content of the game hosted by the gaming machine when the mobile device is connected to the first wireless access point in the first area. Also, the remote gaming server may be configured to disable play of the game at the gaming machine during remote play of the game.

The system may further include a data base for storing information concerning the remote play of the game. The data base may also store information concerning an electronic wallet representing funds available to a player for gaming. The system may include an apparatus for crediting and debiting to electronic wallet data. Further, the system may include a kiosk in communication with the communication network and the kiosk configured to communicate with the mobile device and electronic wallet data for crediting or debiting from the electronic wallet data.

In certain other embodiments, the remote gaming server of the system may identify the location of the gaming machine and control either the gaming machine, mobile device, or both to signal the location of the gaming machine associated with the mobile device. This may be accomplished using the candle lights on top of the gaming machine and the speakers on the both the gaming machine and mobile device.

In one embodiment, a method enables remote gaming sessions in a system that includes a gaming machine that presents a game, and a mobile device distinct from the gaming machine. In this embodiment, both the gaming machine and mobile device are in communication with one another. The method includes associating (or syncing) the mobile device with the gaming machine over a network including a first wireless access point in a first area and a second wireless access point in a second area. The method further includes determining if the mobile device is connected to the first wireless access point or the second wireless access point. The mobile device is allowed to receive non-gaming content from the gaming machine if the mobile device is connected to the first wireless access point. In this method, the mobile device is allowed to participate in a remote gaming session and stream gaming content from the gaming machine if the mobile device is connected to the second wireless access point. Further, the method includes allowing the gaming machine to receive input signals from the mobile device when the mobile device is connected to the first wireless access point or the second wireless access point. The method may also include preventing the mobile device from receiving game content of the game presented by the gaming machine when the mobile device is connected to the first wireless access point. Play of the game at the gaming machine may be disabled during the remote gaming session.

Features and advantages will become apparent from the following detailed description, taken in conjunction with the accompanying drawings, which illustrate by way of example, the features of the various embodiments. Of course, the foregoing summary does not encompass the claimed invention in its entirety, nor are the embodiments intended to be limiting. Rather, the embodiments are provided as mere examples.

BRIEF DESCRIPTION OF THE DRAWINGS

FIG. 1B illustrates one embodiment of a gaming machine running the game "Ole Jalapenos" in a streamed play mode.

FIG. 1C illustrates one embodiment of a gaming machine running the game "Ole Jalapenos" in a normal play mode.

FIG. 3A illustrates one embodiment of a process that readies a mobile device for a remote gaming session.

FIG. 6 illustrates the game Total Blast as served by streaming server to a mobile device.

FIG. 36 illustrates one example of a process for determining optimum orientation according to one embodiment.

FIGS. 37A-B illustrate a mobile device display presenting reformatted content in a landscape orientation corresponding to the original content shown in FIGS. 31A and 31C according to one embodiment.

FIG. 43 illustrates an example screen shot showing the EGM configuration screen in the right-side pane selected under the configuration menu shown in the left-side pane.

DETAILED DESCRIPTION

Figure 1:
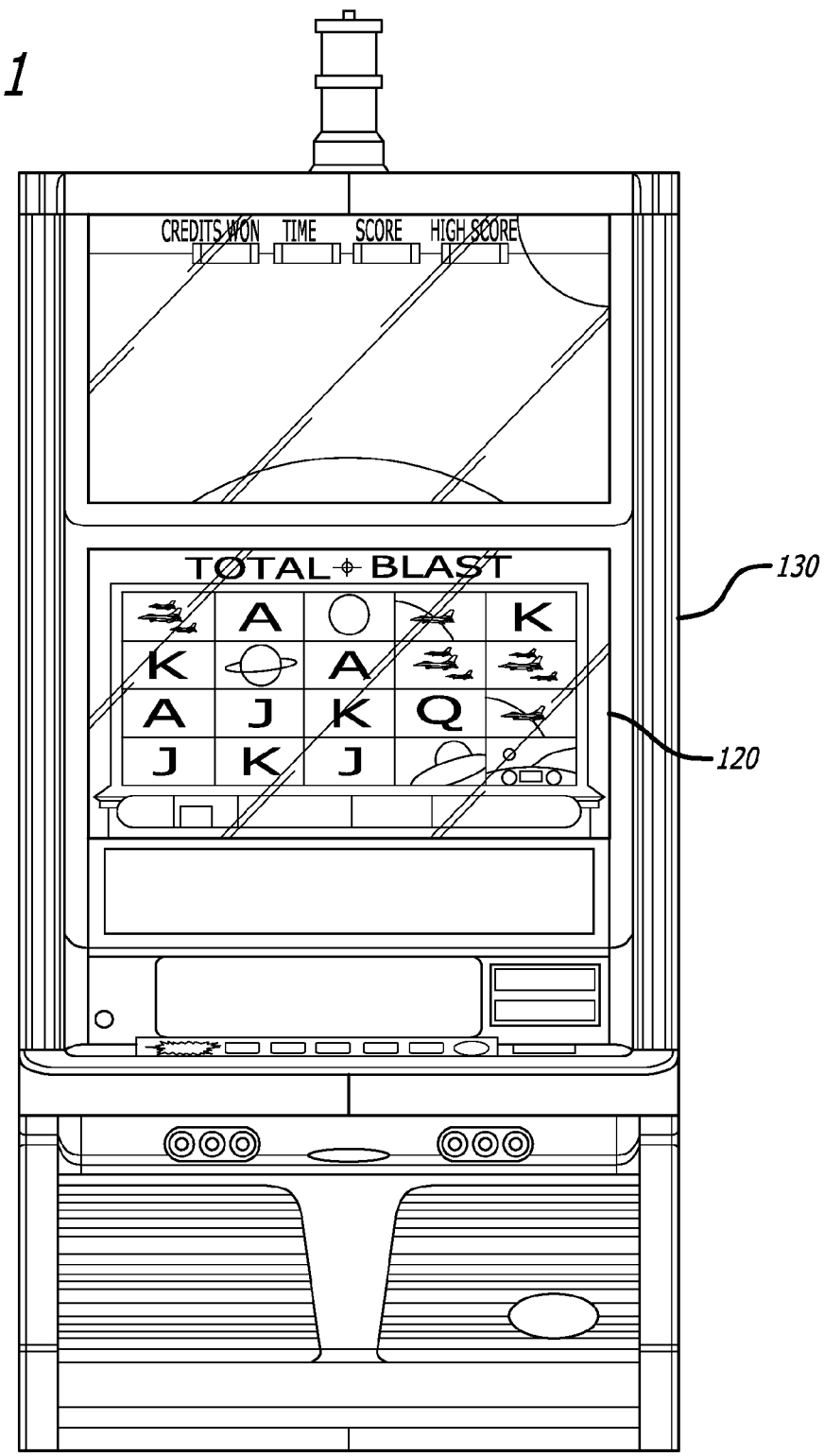
FIG. 1 illustrates an Alpha cabinet running the game "Total Blast."
Figure 68:
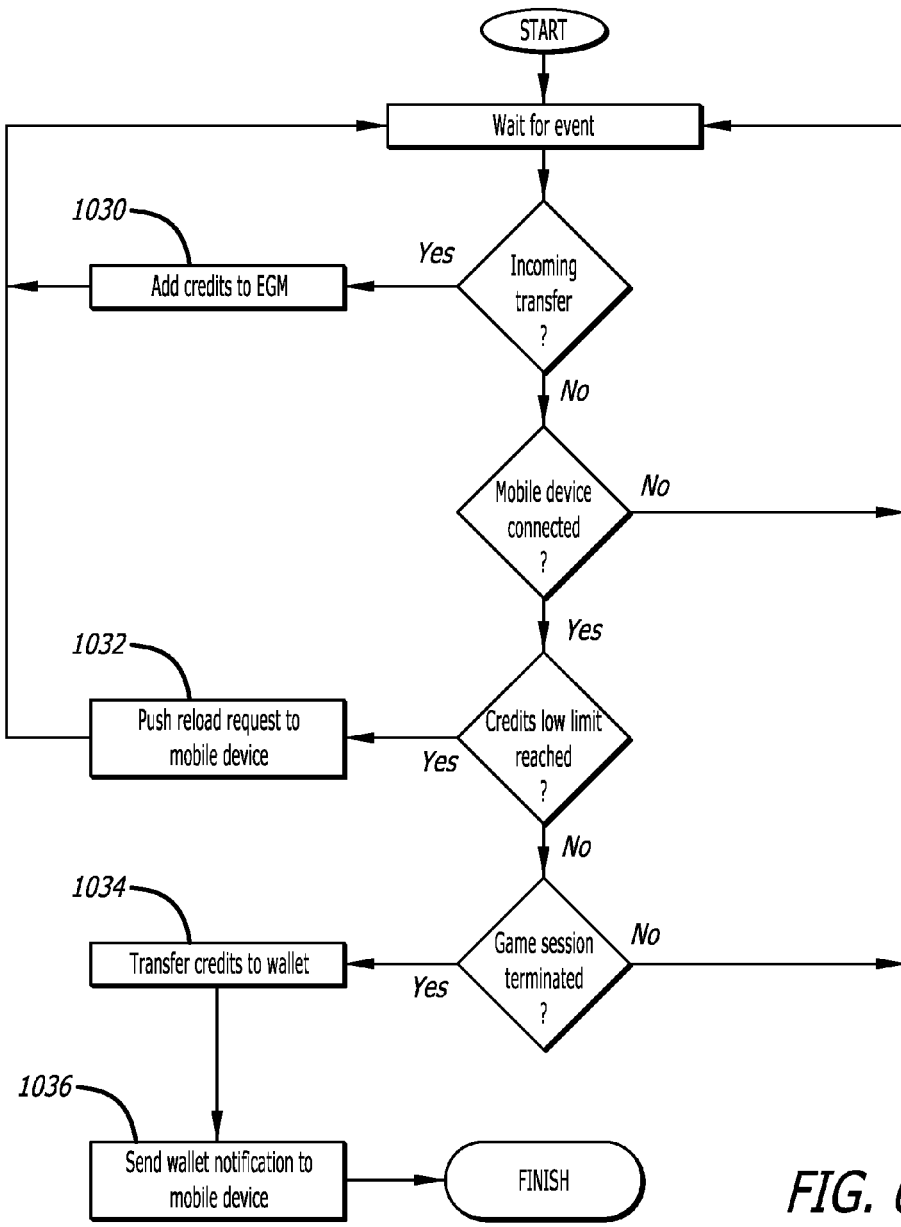
FIG. 68 illustrates a mobile payment process for completing ongoing transactions during gaming sessions.

Various embodiments are directed to a game, gaming machine, gaming systems and method for playing a game, wherein the gaming system includes cross platform persistent gaming sessions using a mobile device. The embodiments are illustrated and described herein, by way of example only, and not by way of limitation. Referring now to the drawings, and more particularly to FIGS. 1-68, there are shown illustrative examples of games, gaming machines, gaming systems and methods for playing a game in accordance with various aspects of the gaming system which includes cross platform persistent gaming sessions using a mobile device and remote play of a gaming sessions.

An example in accordance with one or more aspects of a disclosed embodiment is shown in FIGS. 1-9. A preferred embodiment of a gaming system 100 (shown in FIGS. 2, 6 and 9) includes cross platform persistent gaming sessions using a mobile device 110 (shown in FIGS. 4-6 and 9). One aspect of a preferred embodiment is directed towards leveraging mobile devices 110 to enable players to continue playing a game 120 (shown in FIG. 1) beyond when it is convenient for them to be located at an electronic gaming machine (EGM) 130 (shown in FIGS. 1 and 8). Otherwise stated, a player may use a mobile device 110 to continue playing a game 120 after the player has left the proximity of an EGM 130 by transferring (e.g., streaming from the EGM over a network to the mobile device, from a server over a network to the mobile device, or from another streaming source) the game from the EGM 130 to the mobile device 110 (i.e., a cross platform persistent gaming session). In some embodiments, the game 120 can also be transferred back from the mobile device 110 to the EGM 130.

In another aspect of a preferred embodiment, the mobile device-enhanced system 100 enables superior interaction with an EGM 130 via a player-held mobile device 110 such as a smartphone. A preferred embodiment of this mobile device-enhanced system 100 uses streaming video technology to deliver the game content 120; however, other embodiments of this system may also use conventional thick-client technology (i.e., all or most of the required content and processing are located and performed at the client instead of being transmitted from another source).

Figure 3:
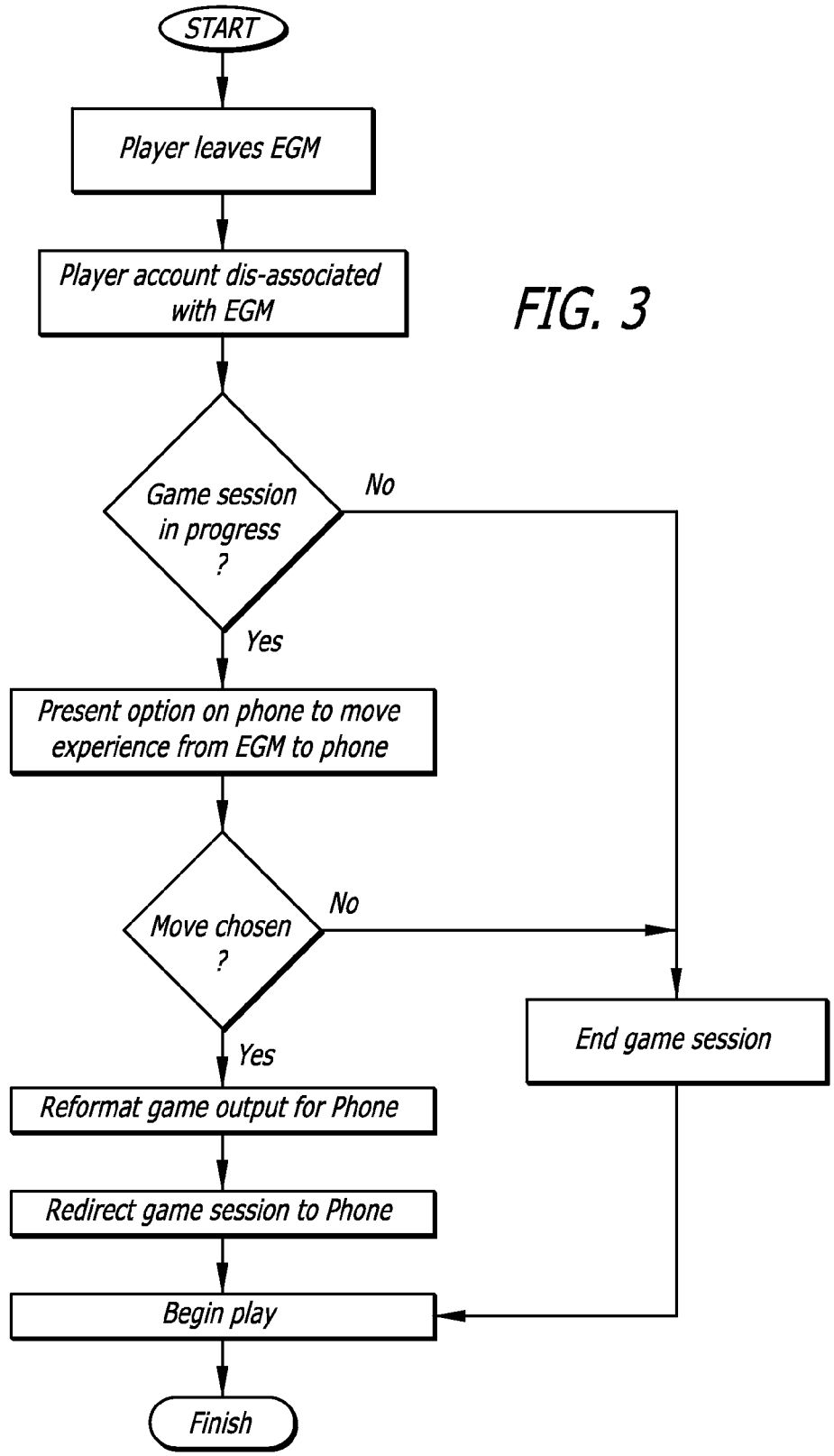
FIG. 3 illustrates a logic flow diagram of a process for a player leaving an electronic gaming machine.
Figure 7:
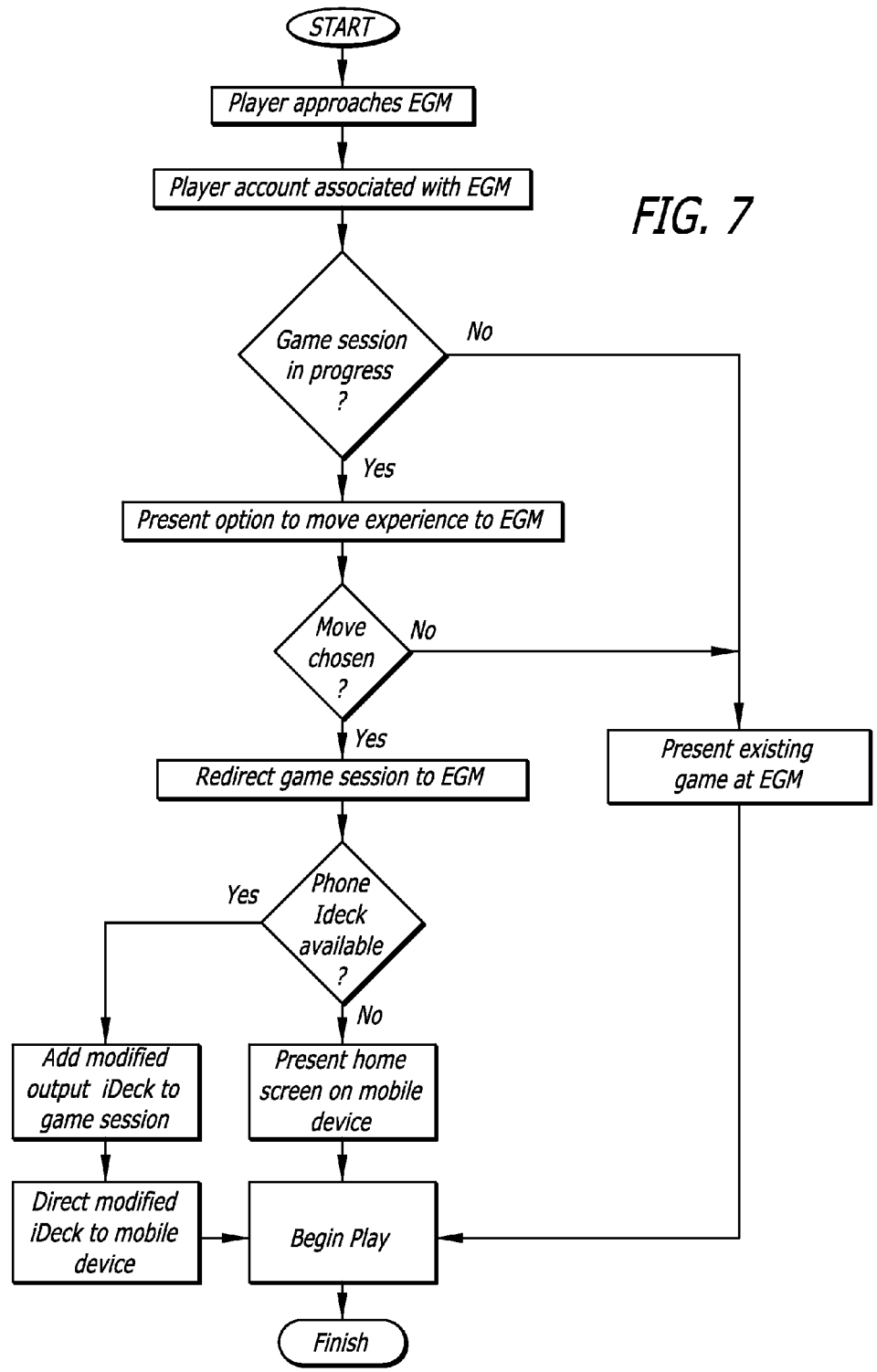
FIG. 7 illustrates a process for player with mobile game session approaching an electronic gaming machine.

A preferred embodiment of the mobile device-enhanced system 100 provides significant types of functionality that were not previously possible. As shown in FIGS. 3 and 7, the mobile device-enhanced system 100 enables a player may continue playing a game 120 after leaving an EGM 130 by transferring the game and relevant meters including any existing credits to the player's mobile device 110. Second, the mobile device-enhanced system 100 enables a player who is playing a game 120 on a mobile device 110 to seamlessly transfer their game 120 to an EGM 130 for an enhanced gaming experience. In this regard, the systems and methods disclosed herein enable the streaming of game content from EGMs 130 to secondary computing devices, such as computing devices (e.g., any computing device, such as a laptop, tablet computer, smartphone, or the like) controlled by or otherwise used by a player. The secondary computing devices may be removed from an EGM by a player (e.g., to outside a gaming establishment, near a bathroom, in a bathroom, at a bar, to a different EGM, or any other location away from the EGM within or outside a gaming establishment). In some embodiments, the EGM from which the player transfers his or her game enters a non-playable state (e.g., "reserved" or "remotely in use" state) rendering it inoperable by another player until, for example, the gaming session on the secondary computing device is ended. In another embodiment, the non-playable state terminates after a set period of inactivity.

FIG. 1 shows an example of an Alpha 2 EGM 130 executing the game "Total Blast," which was developed by Bally Gaming, Inc. This game drives three video displays: the main screen, the top screen, and an iDeck (or other virtual button deck). The EGM 130 also has a display driven by an iView (or other player tracking module) and associated peripherals, such as a player tracking card reader.

In one embodiment of the mobile device-enhanced system 100, a player inserts a player tracking card into the card reader before commencing wagering. This action of inserting the player tracking card associates the wagering session with their player account. In this embodiment of the mobile device-enhanced system 100, the player also has in their possession a mobile device 110, preferably a smartphone or tablet. This smartphone has an application loaded into it that is capable of receiving and displaying a video stream over a network 140 (shown in FIGS. 6 and 9) and passing player input back over the network in reaction to events displayed in the video stream. The application is also capable of communicating with a game server 160 (shown in FIGS. 2, 6 and 9) over a network 140 to establish game sessions. Moreover, in this embodiment of the mobile device-enhanced system 100, the EGM 130 is also running application software capable of receiving video streams and displaying the video streams, along with software to control passing player input back over the network 140 to a game server 160.

Figure 2:
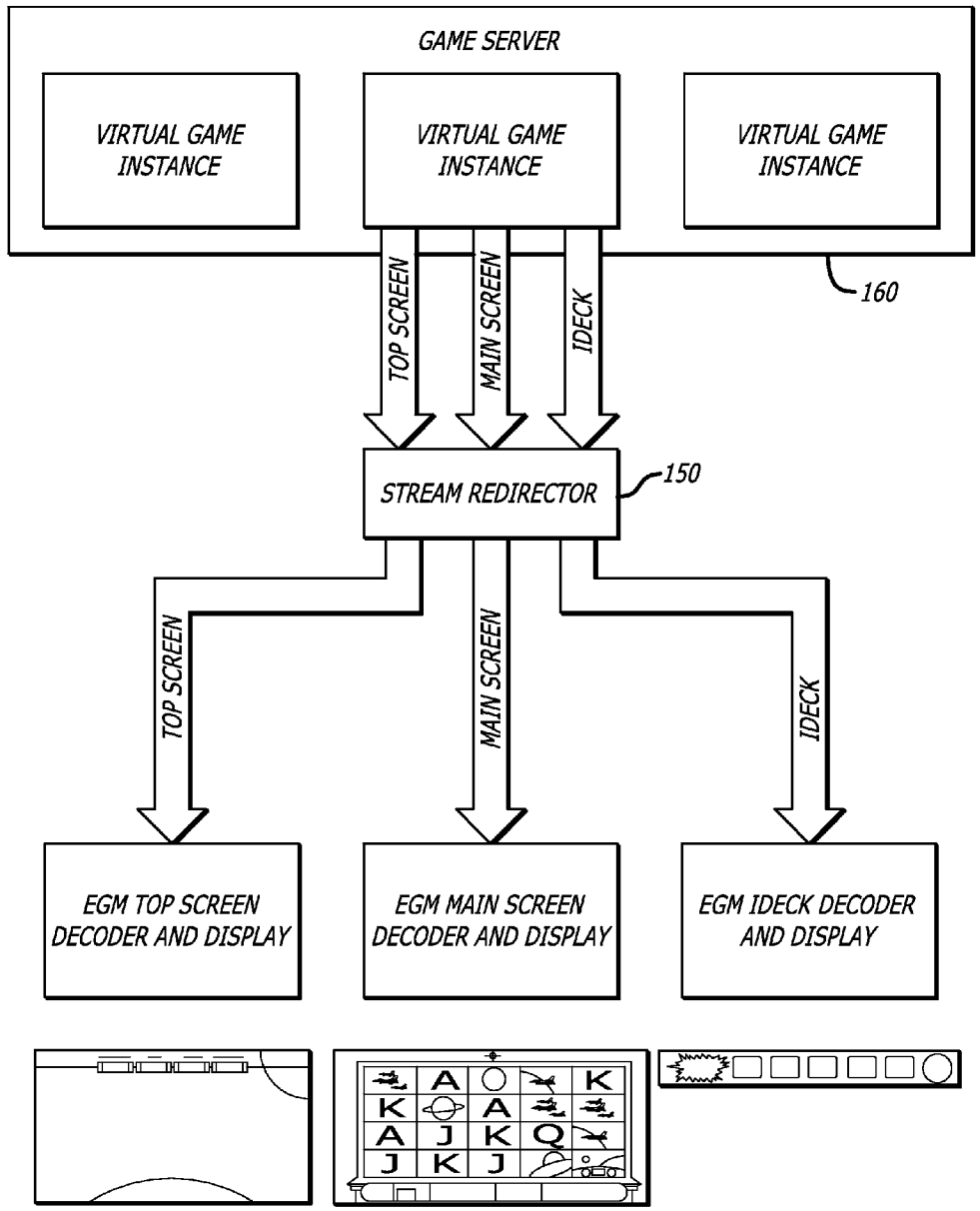
FIG. 2 illustrates the game Total Blast as served by streaming server to an electronic gaming machine.

Referring now to FIG. 2, a system configuration is shown that illustrates how the video streams from the game "Total Blast" may be directed by the EGM 130 using the mobile device-enhanced system 100. In this embodiment of the mobile device-enhanced system 100, there is a Stream Redirector module 150 (shown in FIGS. 2, 6 and 9) interposed between the game server 160 and the EGM 130. In some embodiments, the Stream Redirector module 150 is employed as a display manager that manages the game display on the gaming machine. This Stream Redirector module 150 may not be a physical module (i.e., the Stream Redirector module 150 may be a software (or virtual module). In this embodiment, the Stream Redirector module 150 is depicted as a separate module. Also for the purposes of clarity, player input is not shown in FIG. 2. In this embodiment of the mobile device-enhanced system 100, player input passes in the opposite direction from touchscreen displays to the Stream Redirector module 150 and into the virtual game instance.

As disclosed herein, one or more games may be streamed to a gaming machine 130 or a mobile device 110 over a network 160 such as the internet, a wireless network, or the like. The gaming machine 130 and/or mobile device 110 which is bound to receive graphical data from the server 160 may include a network interface, a decompression module for each display and/or each compressed data stream, video memory, a video encoder for each display, and displays.

The server 160 may include software executable on one or more processors, one or more graphics processors, video memory associated with the one or more graphics processors, one or more compression modules, and a network interface. In other embodiments, the server 160 streams a plurality of games to a plurality of gaming machines 130 and/or mobile devices 110 connected to the network 140.

The software may include software for one or more games 120. In some embodiments, a processor, graphics processor, video memory, and compression module may be dedicated for each instance of gaming software. In other embodiments, one or more of the following may be dedicated for each instance of gaming software: a processor, graphics processor, video memory, and compression. For example, in some embodiments, a single processor may execute each instance of gaming software, but transmit graphical data to one or more graphics processors reserved for each of the games (i.e., four graphics processors, one for each game). Other embodiments may have different configurations of these and other components.

The one or more graphics processors receive graphical data generated as a result of the software being executed on the one or more processors. Upon receiving graphical data, at least one graphics processor renders the data into a frame of a particular format and may store the rendered frame in video memory. At least one compression module may then receive the frame for compression, and compresses (i.e., encode) the frame. Once the frame is compressed, the compressed frame may be sent to the network interface for transmission via a transport protocol over the communication network to the gaming machine 130 and/or mobile device 110.

In some embodiments, one or more system components may be added or removed from the system. For example, in some embodiments, some or all of the graphical data generated at the server 160 may not be compressed by a compression module prior to transmission to the gaming machine 130 or mobile device 110. Therefore, the server 160 may not include one or more compression modules. Otherwise stated, some or all of the graphical data may not be compressed after being rendered by a graphics processor.

In the embodiment, the gaming machine includes a display manager (e.g., stream redirector 150). In other embodiments, the server 160 may include one or more stream redirector 150 instead of the gaming machine 130 (e.g., one for each gaming machine). In yet other embodiments, a network component such as a router may include a stream redirector 150 instead of the server 160 or gaming machine 130. In yet further embodiments, the server 160, gaming machine 130, a network component, or combinations thereof may include a stream redirector 150.

The stream redirector 150 conducts display management processing on graphical data, which may include rescaling (e.g., resizing) and repositioning (e.g., changing display area coordinates) the graphical data while maintaining the aspect ratio of the graphical data. For example, the display management processing may assemble or composite two or more streams of graphical data into a single stream of graphical data. Otherwise stated, the display management processing may take two frames of data and convert them into a single frame of data. In addition, the stream redirector 150 may receive touch data (i.e., touch signals) from the displays, route the touch data, and conduct coordinate transformations if necessary, to the processor executing the game 120 with which the touch data is associated.

Figure 1A:
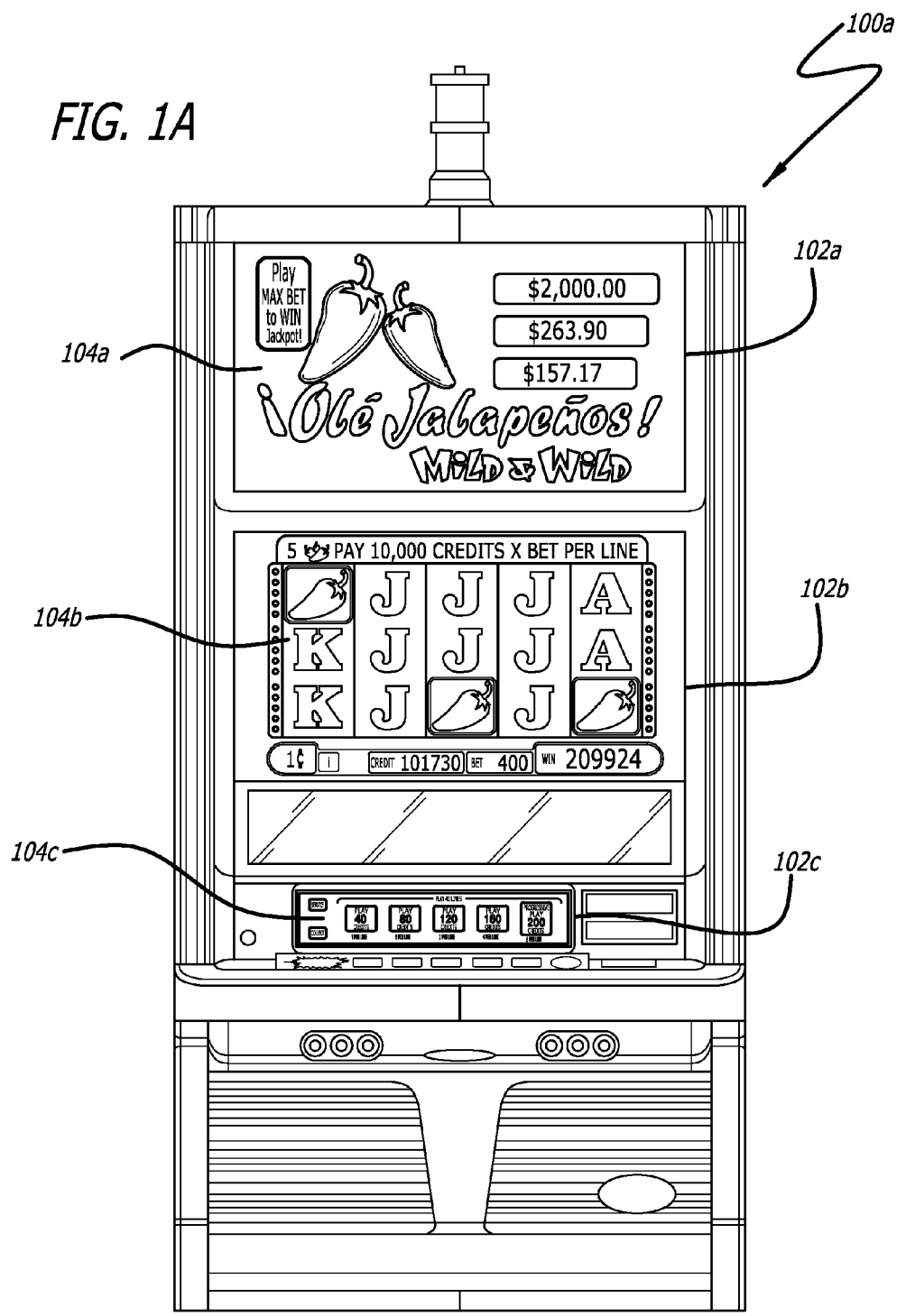
FIG. 1A illustrates one embodiment of a gaming machine running the game "Ole Jalapenos" in a normal play mode.

For example, shown in FIG. 1A is a gaming machine 100a for presenting a game. The gaming machine 100a has a first display 102a for displaying content 104a, a second display 102b for displaying content 104b, and a third display 102c for displaying content 104c. It will be appreciated that any number of displays may be used. As shown, gaming machine 100a is in normal play mode. It is understood that one or more of these displays may be a touchscreen display and function as a player input device. In the embodiment shown, content 104a depicts the title graphics corresponding to the game being displayed by the gaming machine 100a, content 104b depicts reel graphics corresponding to the game being displayed, and content 104c depicts virtual button display deck (e.g., iDeck) graphics. In normal mode, the game and operating system operate as would normally be expected. For example, a first player may approach the gaming machine 100a to play the game displayed thereon.

FIG. 1C is another representation of the normal play mode of gaming machine 100a shown in FIG. 1A. FIG. 1C also shows one embodiment of the gaming machine 100a (e.g., the interaction and communication pathways between displays and the operating system. In the embodiment shown, the game or game module 110a may be installed on a memory accessible to one or more processors of the gaming machine 100a. Of course, in other embodiments, the game or game module 110a may not be installed locally on the gaming machine 100a. Instead, the game or game module 110a may be processed by a server (e.g., game server), which may send data (e.g., graphical, audio, and any other data) over a network for presentment by the gaming machine 100a. Referring back to FIG. 1C, in the embodiment shown, the gaming machine 100a may include an operating system 112a. The game module 110a may communicate with the operating system 112a, the latter of which may perform calls to graphics hardware via standard application interfaces such as OpenGL. The graphics hardware (e.g., a GPU) may include two distinct video adapters such as a primary adapter and a secondary adapter. In one embodiment, the primary adapter may be an NVidia video adapter and the secondary adapter may be an Intel video adapter. The Intel video adapter may be on board the graphics hardware (e.g., GPU). In the embodiment shown, three video outputs are shown—two from the primary video adapter and one from the secondary video adapter. The primary video adapter card is shown outputting DVI video signals to the first display 102a and the second display 102b. The secondary video adapter is shown outputting VGA video signals to the third display 102c. Of course, other embodiments may only include one video adapter, may include one or more displays, and may include a video output for each display. Though not shown, some embodiments of the gaming machine 100a may include a fourth video output that is supplied by, for example, the secondary video adapter to driver a topper. Because a topper may not necessarily display important gaming content, the fourth video signal may not be streamed to a secondary computing device during remote play.

In the embodiment shown in FIG. 1B, the game software 110a interacts with the displays of the gaming machine 100a through the operating system 112a. By modifying the operation of the operating system 112a, redirection of video content or other gaming content (e.g., audio content, haptic feedback content, or any other game content) is enabled without the game software 110a being aware of the redirection. Therefore, regulations controlling the game software 110a do not come into play nor are considered since the game itself, according to the regulations, is not being altered.

Continuing with the example shown in FIGS. 1A and 1C, and now referring to FIG. 1B, the gaming machine 100a is shown in a streamed mode with other system components. In this embodiment, the gaming machine 100a is in communication with the secondary device 106a (shown as an iPad in this specific embodiment) over a network using one or more communication protocols. In this specific embodiment, the gaming machine 100a is in communication with a wireless network access point 108a via an Ethernet connection, and the secondary device 106a is in communication with the wireless network access point 108a such that the secondary computing device 106a may receive data from the gaming machine 100a. Otherwise stated, the rendered output from the game display on the gaming machine 100a may instead be encoded and streamed over Ethernet and then WiFi to a secondary computing device 106a (e.g., any mobile device, such as an iPad). The player may press or otherwise touch the iPad display (or provide any appropriate input on any computing device using any input device such as a keyboard, mouse, touchpad) on the streamed representation. In some embodiments, a streamed representation of a virtual button deck may be displayed to the player on his or her secondary computing device 106a. Data representative of the player's inputs on the secondary computing device 106a is sent from the secondary computing device to the gaming machine 100a to simulate activation of inputs thereon (e.g., simulating a player activating a virtual bet button on a virtual button deck).

In other embodiments, a server in communication with the gaming machine 100a may transmit data to the wireless network access point 108a instead of the gaming machine 100a itself. For example, instead of the gaming machine 100a re-transmitting data (whether modified or not by, for example, a stream redirector module) that it received from the server, the gaming machine 100a may transmit data to the server representative of a player input indicative of a player's desire to play the game on his or her secondary computing device. Upon receiving and processing such data, the server may transmit game data to the secondary computing device 106a directly, without using the gaming machine 100a as a router. In such an embodiment, the server may transmit game data to the gaming machine 100a and the secondary computing device 106a. For example, the game data transmitted to the gaming machine 100a may result in one or more of the displays of the gaming machine 100a displaying that the gaming machine is being used remotely. The game data transmitted to the secondary computing device 106a may be transmitted through a stream redirector module (e.g., a display manager) to, for example, rescale and reposition one or more graphical streams of data for presentment on one or more displays of the secondary computing device.

Whether connecting to the gaming machine 100a, the server, or any other system component, the secondary computing device may transmit device specific information (i.e., device specific characteristics) for processing and analysis. For example, the secondary computing device may transmit information regarding how many displays it has, the physical size of its one or more displays, the resolutions available on its one or more displays, whether one or more displays have touchscreen capabilities, the processing capabilities of the secondary computing device (e.g., CPU info, GPU info, and any other processing capability info), and any other information associated with the secondary computing device that the gaming machine 100a, the server, or any other system component may receive and/or analyze. The device specific information may be used by the gaming machine 100a, the server, or any other system component to rescale and reposition one or more streams of data accordingly.

In streamed mode, the displays on the gaming machine 100a may no longer display the game. Rather, in some embodiments, the gaming machine 100a may display messages indicating that the game is reserved and in use by a player. For example, the first player that approached the gaming machine 100a may decide to leave the immediate proximity of the gaming machine 100a, but may desire to continue play thereon via his or her secondary computing device 106a. Once play of the game has been synched to the first player's secondary computing device 106a, the first player may leave the gaming machine 100a without fear that a second player will approach the gaming machine and engage in play of the game (e.g., wagering the first player's credits, cashing out, or any other play or action not authorized by the first player). This is because a second player approaching the gaming machine 100a would perceive a "game in use" message or other equivalent message or criteria on one or more of the displays of the gaming machine 100a and because certain functionalities of the gaming machine 100a have been disabled. As disclosed herein, one or more timers may be displayed on one or more of the displays of the gaming machine 100a that may indicate to the second player one or more of the following: (1) when the remote play on the first player's secondary computing device 106a will automatically be suspended (e.g., remote play may be limited to a time period according to some embodiments—the time period may be high or low depending on the amount of money the player is willing to wager, the credit denominations being used, and how much money the player has already lost or won), (2) when the gaming machine 100a (or server in communication with the gaming machine 100a) will query whether the first player wishes to continue remote play via the secondary computing device 106a (e.g., by displaying a message on a display of the device 106), or (3) how long the player playing the game typically presented on the gaming machine 100a has been playing remotely.

Figure 1D:
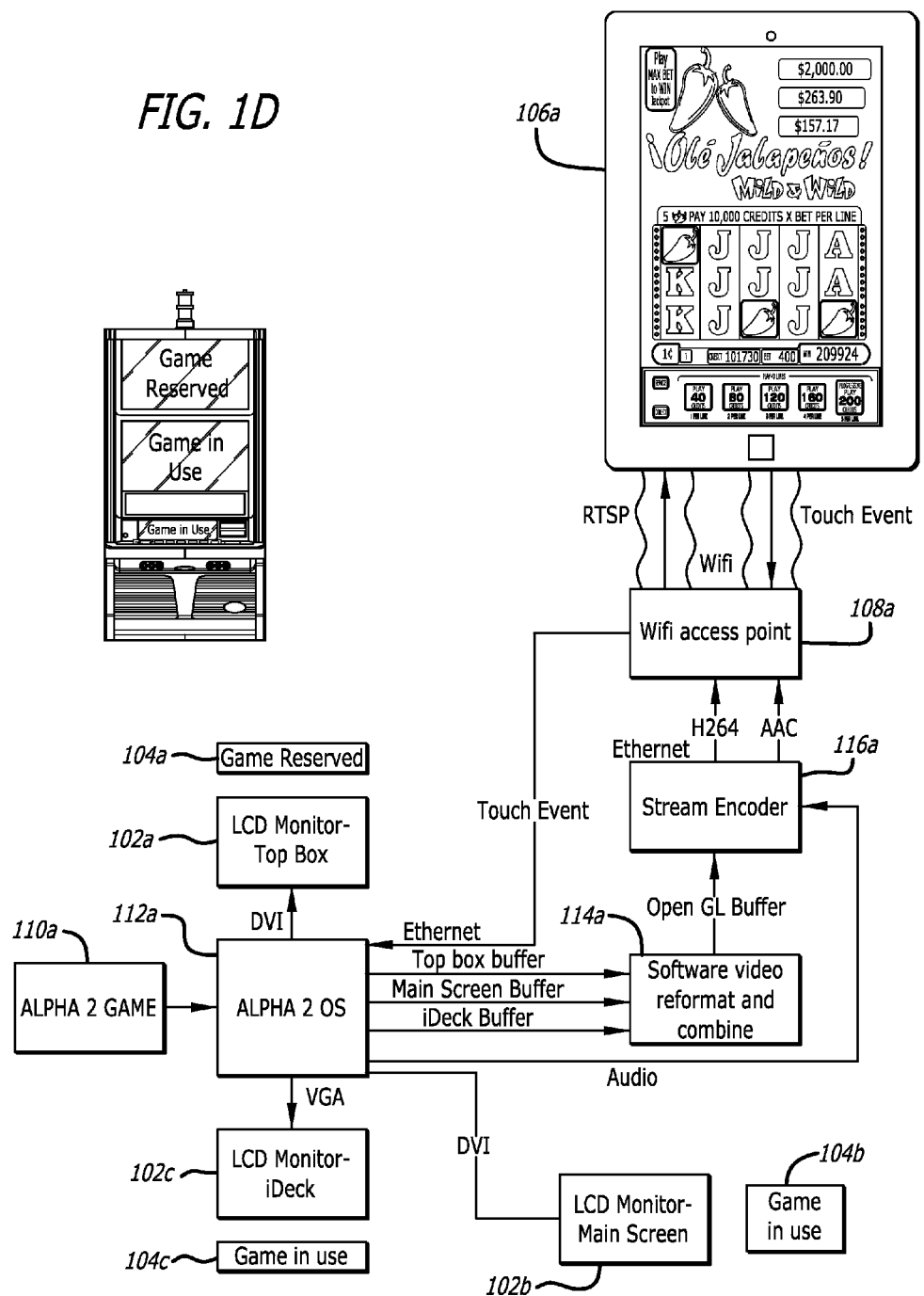
FIG. 1D illustrates one embodiment of a gaming machine running the game "Ole Jalapenos" in a streamed play mode.

FIG. 1D is another representation of the streamed play mode of gaming machine 100a shown in FIG. 1B. FIG. 1D also shows one embodiment of the gaming machine 100a (e.g., the interaction and communication pathways between displays and the operating system). In the embodiment shown, a suitable "game reserved" image or the like is presented on each display of the gaming machine 100a. The content that would normally be displayed is instead redirected to a reformatting module 114a (e.g., a display manager) that combines the content typically displayed on the displays of the gaming machine 100a such as the top box frame graphical data, main screen graphical data, and virtual button deck graphical data. The module 114a passes the combined content to a stream encoder 116a (e.g., a compression module). The stream encoder 116a may also receive audio associated with the game 110a, as shown. Encoded data (e.g., audio content and combined video content) may be sent to the secondary computing device 106a from the stream encoder 116a over a network.

The systems and methods disclosed herein may utilize or otherwise be complemented by the teachings disclosed in commonly owned U.S. patent application Ser. No. 13/273,555, titled Streaming Bitrate Control and Management. Accordingly, U.S. patent application Ser. No. 13/273,555 is hereby incorporated in its entirety by reference. The systems and methods disclosed herein may utilize or otherwise be complemented by the teachings disclosed in commonly owned U.S. patent application Ser. No. 13/273,611, titled Graphics Processing Unit Memory Usage Reduction. Accordingly, U.S. patent application Ser. No. 13/273,611 is hereby incorporated in its entirety by reference. The systems and methods disclosed herein may utilize or otherwise be complemented by the teachings disclosed in commonly owned U.S. patent application Ser. No. 13/840,130, titled System And Method For Cross Platform Persistent Gaming Sessions Using A Mobile Device. Accordingly, U.S. patent application Ser. No. 13/840,130 is hereby incorporated in its entirety by reference.

In one embodiment, the content sent to the reformatting module 114a is uncompressed frame buffers generated by execution of OpenGL libraries. The output from the reformatting module may be an image that is appropriate for the secondary computing device 106a. For example, the image may be reformatted to have the correct aspect ratio in view of the size and other characteristics of the one or more displays of the secondary computing device 106a. In some embodiments, the stream encoder 116a may receive a smaller image to encode than if a raw unformatted image was encoded because the module 114a may combine and reduce the image size of the content. Therefore, the systems and methods disclosed herein not only enable streaming of content to a secondary computing device and compressing that content before delivery, but also enable reduction in bandwidth consumption due a reduction in image size, and in some embodiments, a reduction in the number of frame buffers being compressed (e.g., three frame buffers are combined into one frame buffer before compression thereof).

In the embodiment shown, the stream encoder module 116a encodes image data according to an H.264 encoding scheme (i.e., encoding algorithm) resulting in an H.264 data stream. Latency may be further reduced by tuning the H.264 codec to not use B frames or look-ahead techniques. The audio content may be encoded according to MP3 or AAC encoding schemes. In other embodiments, different video and audio encoding schemes may be used. The encoded data may be multiplexed and encapsulated into a transport stream such as MPEG2-TS, Xiph OGG, or Adobe FLV. Of course, other transport streams may be used.

The transport stream may be sent over the network to the secondary computing device 106a. In the embodiment shown, the transport stream is sent over the Ethernet port connected to the gaming machine 100a using a suitable protocol such as RTSP. The secondary computing device 106a may receive the transport stream over WiFi, decode the transport stream, and display the data output corresponding thereto (e.g., video content and audio content). If the player touches one or more displays of the secondary computing device 106a, a touch coordinate may be transmitted back over the network (e.g., the WiFi/Ethernet link) to the gaming machine 100a for coordinate translation processing. In one embodiment, touch data may be transmitted back to the operating system 112a for the coordinate translation processing. The coordinate translation processing translates the coordinates of the touch data received and determines which display of the gaming machine 100a is being used and where on the display to map it to. The mapped (i.e., translated coordinate) may then be used to determine whether the touch data is a valid input and calls for certain functionality (e.g., a bet, change number of pay lines, spin reels, hit in Black Jack, spin the wheel in Roulette, or any other function related to any input for any game). For example, if the player touches the bottom of the iPad display, the touch data may be translated or otherwise mapped to the appropriate point on the touch screen on the virtual button deck. Continuing with the example, the translated touch data may then be sent to the virtual button deck (e.g., iDeck) driver module for processing.

In other embodiments, data other than "game in use" messages or similar messages may be presented on one or more displays of the gaming machine 100a. The other data may include the game data itself. In one embodiment, for example, the game may be presented in duplicate and perhaps greyed out on the gaming machine 100a as it is played by the player using his or her secondary computing device 106a. In such an embodiment, the gaming machine 100a may generate excitement in the establishment, which may lead prospective players (e.g., people walking by the gaming machine 100a) to be drawn in to watch the action (and possibly start playing gaming machines next to or in the vicinity of the gaming machine 100a). For example, a slot machine style gaming machine may spin the reels on one or more displays of a gaming machine based on the play of the game on the secondary computing device (i.e., when the virtual reels spin on the secondary computing device, they also spin on the gaming machine associated with the remote play). The input devices on the gaming machine 100a may be inoperable to ensure that the remote gaming session is not sabotaged by an unknown player.

In some embodiments, the systems and methods disclosed herein enable a player, such as the second player in the example above, to schedule a remote gaming session to follow an active remote gaming session. For example, the second player in the example above may be disappointed to find that his favorite gaming machine is not only in use, but is being remotely played. In one embodiment, the second player may be forced to check back at a later time. However, in some embodiments, the second player may schedule or otherwise reserve the gaming machine for a second remote gaming session that would follow the first player's remote session once it ends. In such embodiments, the second player's secondary computing device may receive a message (e.g., from the gaming machine 100a, a server, or any other computing device) indicating that the gaming machine 100a is available for remote play. If another player is "in line" or otherwise scheduled for remote play before the second player (i.e., now third player), the third player's secondary computing device may receive a message (e.g., from the gaming machine 100a, a server, or any other computing device) indicating that the gaming machine 100a is available for remote play by the second player, which serves as a status update to the third player.

In some embodiments, once a player that has reserved a remote gaming session receives a message on his secondary computing device indicating that the gaming machine 100a is available, the player may be presented with options. One option may be that he or she can choose to forgo the reservation and choose not to initiate a remote gaming session, in which case the next player "in line" may be queried. Another option may be that he or she may choose a "local play" option where the player is afforded enough time to go to the actual gaming machine 100a to play. In some embodiments, the player may be afforded 1 minute, 2 minutes, 5 minutes, 10 minutes, or any amount of time deemed appropriate. If the "local play" option is selected by the player, the player may be required to pay for every minute of play that the gaming machine 100a is not in use (i.e., for every minute that elapses without the player activating any inputs at the gaming machine 100a). Of course, another option may be that he or she may choose to initiate the remote gaming session thereby rendering the actual gaming machine 100a inoperable by another player in view of the remote use thereof.

As disclosed herein, the systems and methods enable a safe streaming mode for a player to confidently leave a gaming machine while playing the corresponding game on his or her secondary computing device. In some embodiments, a safe streaming mode includes ensuring no other player may interact with the gaming machine while the gaming machine is remotely being played. For example, in one embodiment, a bill acceptor or ticket acceptor is configured such that it will not receive a bill/ticket while the gaming machine is engaged in remote play. The gaming machine is also configured to not enable initiation of game play while the gaming machine is engaged in remote play. The gaming machine may also be configured to not allow a cash-out event (e.g., issuance of a TITO voucher) while engaged in remote play unless the system verifies the cash-out event is being initiated by the player engaged in the remote play. Thus, it is understood that the systems and methods disclosed herein enable a secure gaming environment by preventing another player from illegitimately commandeering the gaming machine without the consent of the player who is engaged in remote play. In some embodiments, a secondary computing device of the player may be associated with any gaming machine and any venue.

In another embodiment, the bill/ticket acceptor remains enabled when beginning a safe streaming mode for a player to leave a gaming machine and play the corresponding game on his or her secondary computing device or mobile device. During remote play of this embodiment, the enabling the bill acceptor allows a player to temporarily return to the gaming machine and insert additional funds in order to return to playing the corresponding game on the secondary computing device without having to end and restart the remote session. More specifically, the bill acceptor, or similar device, is enabled under player control. For example, the secondary computing device may have a button or menu item that allows the player to enable the bill acceptor. It is contemplated that this feature will temporarily enable the bill acceptor function. In certain embodiments, the player may enable the bill acceptor for a limited period, e.g., sixty-seconds, to allow a player enough time to insert one or more bills into the bill acceptor. After the timeout, the bill acceptor would be disabled to prevent another player from approaching the gaming machine and inserting a bill into the bill acceptor of a gaming machine that is being played remotely and not available to other players. It also is contemplated that the player may enable the bill acceptor for a limited period after a bill has been inserted into the bill acceptor. At the expiration of this limited period, the bill acceptor is disabled. Further, the player may also enable the bill acceptor for a limited amount of time, and after a bill has been inserted, the timeout is increased by another amount of time, e.g., thirty-seconds, to allow the player to insert another bill into the bill acceptor. In these embodiments, once the player presses a subsequent spin button or other action on the secondary computer device, the bill acceptor on the gaming machine would be disabled. Allowing the player to enable the bill acceptor for a limited amount of time and then disabling the bill acceptor soon thereafter prevents accidental insertions of bills by another player. This feature also would work with accepting smart cards, tickets, or other forms of currency into the gaming machine when a player is remotely playing a game.

Further, other peripheral devices at the gaming machine could be enabled under the control of the remote player. For example, the remote player could enable the iView player tracking interface to allow the player to perform functions on the iView such as credit transfer or viewing points accumulated, without allowing other players to operate the same function when remote play is activated. In markets where a player tracking card is physically locked in the gaming machine, a player could temporarily enable the eject button using the secondary computing device to remove the card and insert another card. This feature may be useful when a player has multiple cards each containing credits. By allowing a remote player to remove and insert another player card, a player can continue to play the game on the secondary computing device without having to end and restart the session. To prevent another player from accidentally enabling a device in remote use, the player may be required to enter a PIN or other security code previously established, or may be prompted with a confirmation message.

Referring now to FIG. 3, a process is shown using the mobile device-enhanced system 100 that illustrates what occurs when a player needs to leave an EGM 130, yet would rather continue playing. Examples of why a player may wish to continue playing could include, by way of example only, and not by way of limitation: (1) Qualification for a goal such as a bonus round, (2) A perceived lucky streak; (3) A high progressive jackpot that the player feels is obtainable; and (4) to leave the machine such as, for example, to retire to a smoking area, bar or other venue which permits continued gaming.

Despite wishing to continue, a player may nevertheless have no option but to leave the vicinity of the EGM 130 for a pre-existing engagement or even to catch a flight home. By using the mobile device-enhanced system 100, a player may continue playing the gaming session until the player is out of network range or leaves the area where gaming is permitted.

In one embodiment, when a player leaves an EGM 130 while using the mobile device-enhanced system 100, the player removes their player tracking card from the player tracking card reader. If the player wishes to continue playing the gaming session on their mobile device 110, the player may signal appropriately by selecting an icon or other command on the EGM 130 or iView display (or other player tracking module display).

In yet another embodiment, the mobile device-enhanced system 100 may employ an EGM 130 that incorporates a Bluetooth transmission system. In such an embodiment, when a player is seated at the EGM 130, an application running on the mobile device 110 is also Bluetooth-enabled and is in communication with the EGM. This establishes a link between the game session and the mobile device 110. When the player moves out of Bluetooth transmission range from the EGM 130, or the Bluetooth transmission link is otherwise broken, the game session link may continue to be active from the game server 160, even though it is not continuously connected.

Continuing now with respect to FIG. 3, as a player leaves the EGM 130 their account is disassociated with the EGM 130. If a game session is not currently in progress (e.g., if no credits are active), and there is no progress state associated with the game session, then the gaming session is terminated and no action is performed.

Figure 4:
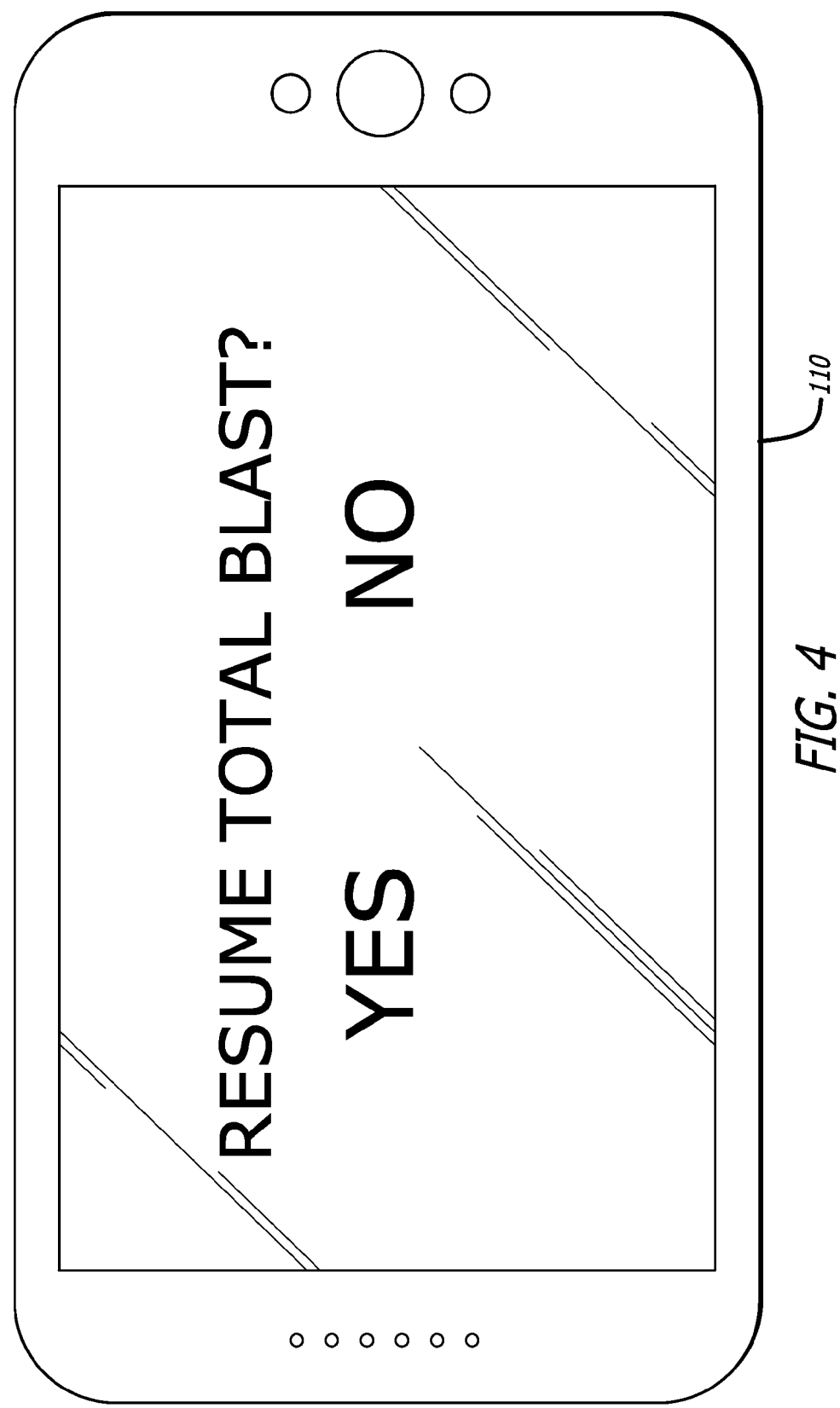
FIG. 4 illustrates an example output shown to player on mobile device at end of electronic gaming machine session.

However, when using mobile device-enhanced system 100, if a gaming session is in progress when a player leaves the EGM 130, the player is presented with an option to move their experience to their mobile device. This presentation may take place on either or both of the EGM 130 and mobile device 110. In another aspect of the mobile device-enhanced system 100, to further notify the player of the mobile gaming options, the player's mobile device 110 may vibrate or play a sound to bring attention the possibility of continuing the game. Such a notification is shown in FIG. 4.

If a player doesn't wish to continue playing the session, the game session is terminated. Any credits or game state are preserved in the player account for later use. Otherwise, the Stream Redirector module 150 modifies the output of the video streams to suit the mobile device 110, and begins sending the video streams to the mobile device via a network 140 (e.g., which is preferably WiFi, but is also possible over a cellular data connection if gaming regulations permit).

Figure 5:
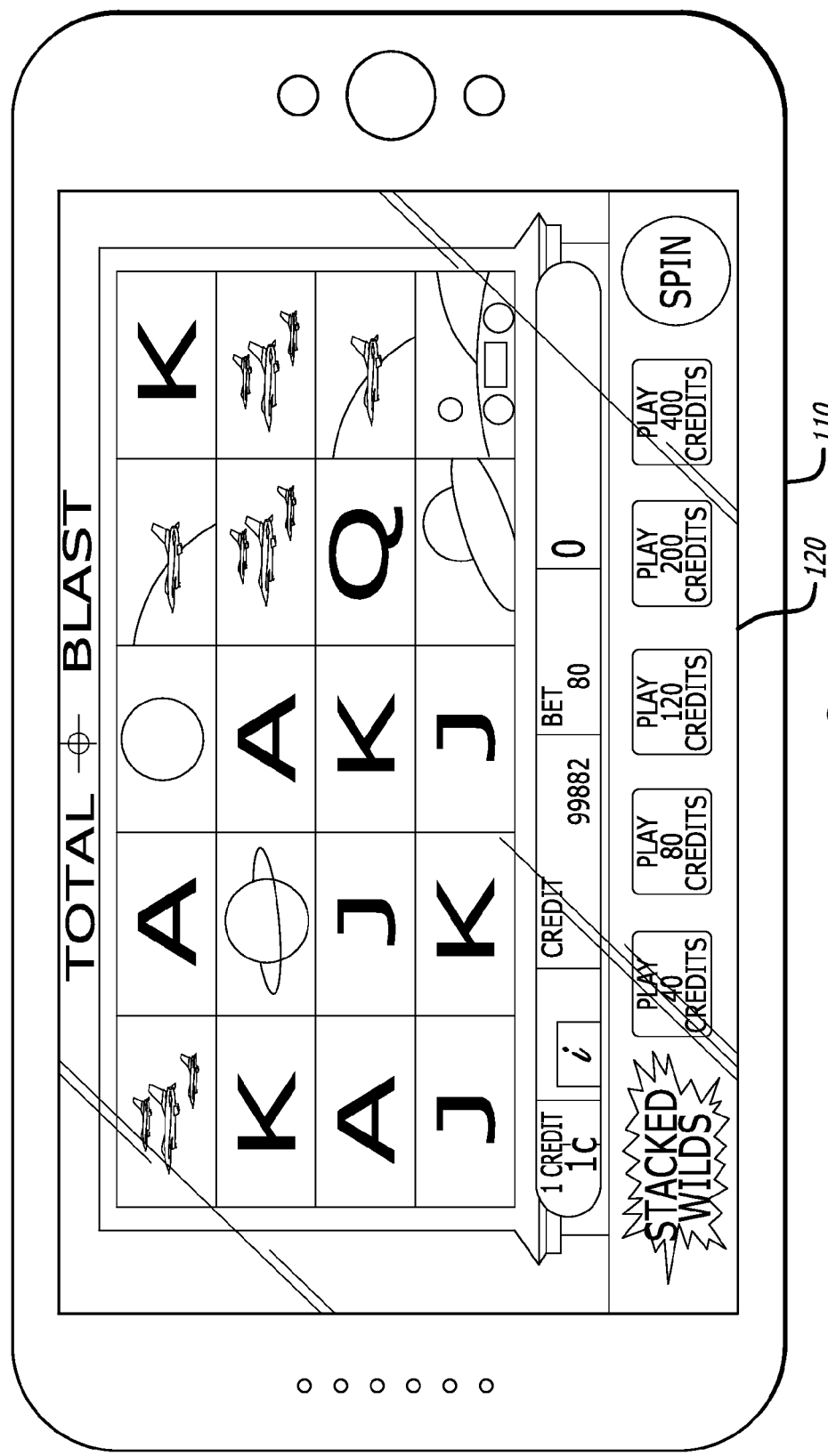
FIG. 5 illustrates a main screen and iDeck (e.g., virtual button deck) streamed to mobile device.

Referring now to FIG. 5, an embodiment is shown using the mobile device-enhanced system 100 that illustrates how the "Total Blast" game may be presented to the player on the player's mobile device 110. It should be noted that this display on the player's mobile device 110 typically consists of two video streams (or audio-video streams) mixed together into one; the Main Screen stream, along with the iDeck (virtual button deck) stream.

Referring now to FIG. 6, a configuration of the mobile device-enhanced system 100 is shown that illustrates how the mobile connection is established. From the perspective of the virtual game instance, nothing has changed with respect to executing the game logic and rendering the graphics of the game. The operation of the Stream Redirector module 150 has changed however. The Stream Redirector module 150 now re-encodes both the main screen streaming content and iDeck streaming content into one combined stream of content. This re-encode process may also adjust the screen resolution and bitrate of the resulting stream of content to better suit the capabilities of the mobile device 110 and/or network 140. In embodiment of the mobile device-enhanced system 100 that employ games in which all three screens are necessary (e.g., the top screen is functional) for a game to perform correctly, the Stream Redirector 150 may perform more complex logic to support the merging of all three streams of content.

In another aspect of the mobile device-enhanced system 100, when a player touches a relevant point of the display on the player's mobile device 110, the coordinates are remapped by the Stream Redirector module 150 into the original resolution of the display, and passed back to the relevant touchscreen input of the virtual game instance. This remapping of the touchscreen coordinates assists in compensating for varying screen sizes and proportions between the display(s) of the EGM 130 and the display of the player's mobile device 110.

When using the mobile device-enhanced system 100, once a virtual game's content streams are redirected towards a mobile device 110, the EGM 130 begins a new gaming session. In some embodiments, this gaming session is of an identical game 120 (but different instance) to the game 120 that was redirected to mobile device 110. In other embodiments, another game may be chosen by the game server 160 to be executed on the EGM 130 (that is different than the game being shown on the mobile device 110), dependent upon heuristics such as the time of day, number of patrons in casino, or other data.

Another aspect of the mobile device-enhanced system 100 enables a player to use a mobile device 110 to facilitate a gaming session platform transfer. In one example, shown in FIG. 7, a player approaches an EGM 130 with an existing game session running on their mobile device 110. This may be a game session that originated on that EGM 130 at an earlier time, but this is not necessary. Using the mobile device-enhanced system 100, the player associates their account with the EGM 130. Preferably, this action is performed by the player inserting their player tracking card. Alternatively, the player may activate a command icon on the display of the EGM 130, or as discussed above, a Bluetooth pairing between the EGM 130 and the mobile device 110 may be used to establish a link.

In some embodiments, a software application may be loaded onto the mobile device 110 (or any secondary computing device) that readies the mobile device for connection to an EGM by enabling the mobile device to retrieve information regarding a connection management server. In one embodiment, the software application may be acquired via an app store, such as the Apple App Store or the Google Play Store. FIG. 3A depicts one embodiment of a process (e.g., a process caused by execution of software instructions of the software application) that readies the mobile device for connection to an EGM. For example, the process may ensure that that the mobile device (i.e., client device) can authenticate a connection management server, and that only valid client accounts may access the connection management server.

In some embodiments, the process depicted in FIG. 3A may leverage the WiFi API's (i.e., Application Programming Interfaces) present in mobile devices. When WiFi is enabled on a mobile device, the operating system of the mobile device may use WiFi adapter hardware to maintain a list of Access Points (APs) that are within radio range. As shown in FIG. 3A, this step may be performed at block 120a. Each of the AP has an associated Service Set Identifier (SSID) (i.e., a string of text) that is broadcast by the AP. This list is updated as the mobile devices moves around entering and leaving the range of Access Points. Once, the software application is initiated, the mobile device retrieves the list of available WiFi APs and their corresponding SSIDs (block 120a). The mobile device then determines whether any APs are associated with a venue running the streaming system at block 122a. If an AP is associated with a venue running the streaming system, the mobile device attempts to connect to the AP using, for example, a PKI method. In one embodiment, a PKI method may include using pre-stored keys (PSK) and certificates to ensure the AP is legitimate such as that shown at block 124a. Once connected to an AP, the mobile device may need to obtain the IP address of a connection management server. In one embodiment, the mobile device may obtain this IP address by using a NoCatAuth gateway server, as depicted at block 126a. The NoCatAuth server may intercept all http requests and respond with a login webpage. The login webpage may be presented on the mobile device. In some embodiments, stored credentials (possibly associated with a CMS player tracking account) may be used to log into the NoCatAuth gateway server. The general use of the NoCatAuth gateway server authorization process is depicted at block 128a. Once logged in, the NoCatAuth gateway server may send the current connection management server address to the mobile device, as shown at block 130a.

Figure 3B:
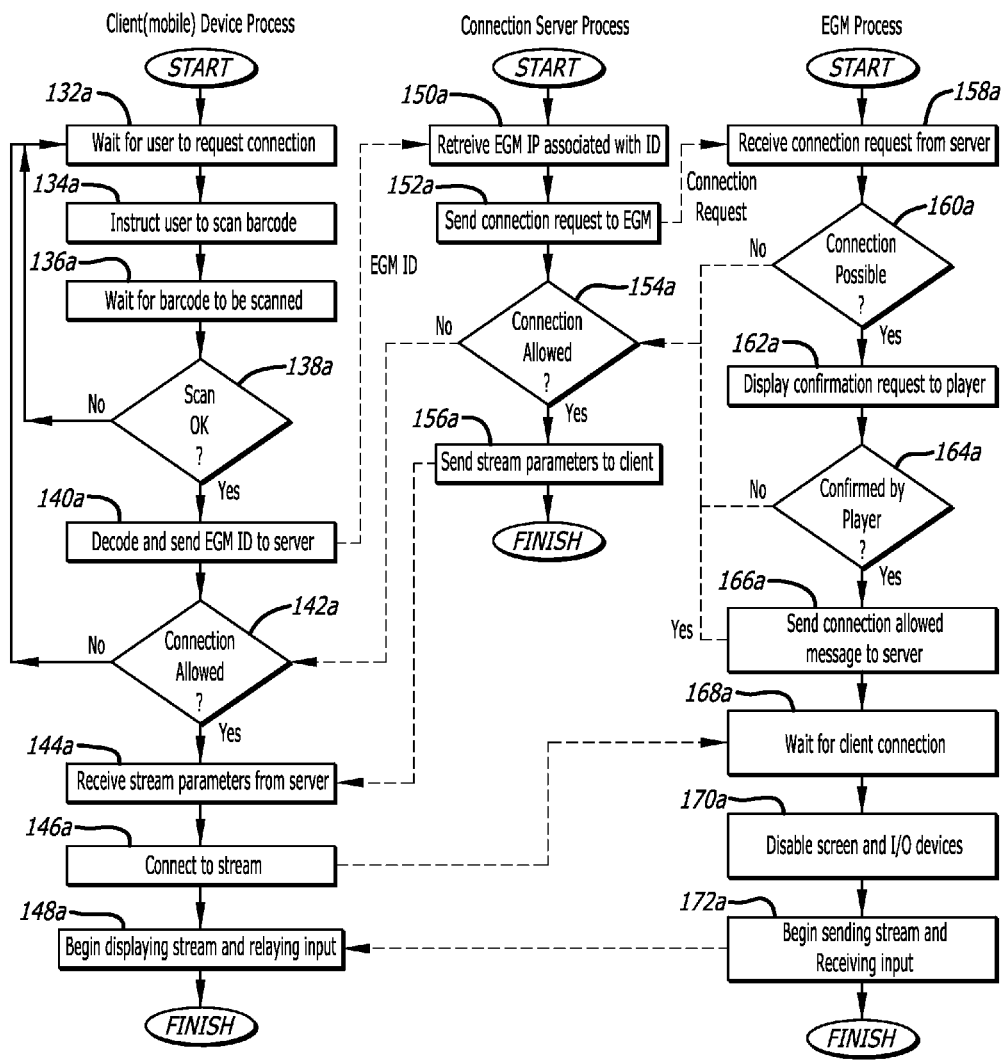
FIG. 3B illustrates one embodiment of a process that enables initiation of a remote gaming session on a mobile device.

Referring now to FIG. 3B, one embodiment of a process is depicted that enables the mobile device to be associated with a particular EGM and initiate a remote play session. It is understood that the client device may not connect to the EGM for a remote gaming session in other embodiments as disclosed herein. Instead, according to other embodiments, the client device may connect to a game server to receive game data therefrom during a remote gaming session. In some embodiments, a connection server may not be used. In such embodiments, the client device may maintain a list of IP addresses associated with EGM-specific identifiers, or the client device may obtain the IP address of the EGM from, for example, a QR code displayed on the EGM. In such embodiments, connection requests may go directly from the client device to the EGM.

Referring back to the embodiment shown in FIG. 3B, at block 132a, the player may request association with a particular EGM using his or her mobile device (i.e., one type of client device). In some embodiments, the mobile device may have already completed the process depicted in FIG. 3A prior to the request for association. In some embodiments the user may have previously downloaded a companion application to their mobile device to enable the binding of the mobile device to the game (or game stream) or the EGM may offer a link for the user to download the application before proceeding. Following block 132a, the player is queried to identify the EGM that the player seeks to associate with his or her mobile device at block 134a. In some embodiments, the player may associate his or her mobile device with a particular EGM by scanning, e.g. using the mobile device camera to acquire an image, an EGM-specific identifier such as a barcode, glyph, graphic or QR code located on the EGM (e.g., presented on a display or not on a display). The EGM-specific identifier may uniquely identify the EGM in the venue. In other embodiments, the player may input an EGM-specific identifier that is not a QR code or barcode (e.g., combination of numbers or letters) located on the EGM (e.g., presented on a display or not on a display). In some embodiments, the EGM-specific code may temporally change (e.g., every minute, every 5 minutes, every hour, every day, or any other time period) or change after every remote play session. Such embodiments ensure that players do not troll or otherwise needlessly tie up the associated EGM with illegitimate play. Such embodiments also ensure that the player requesting a remote play session is present at the EGM at the time of the request. For example, a player may write an EGM-specific code or take a picture of a QR code for later use. Of course, in some embodiments, such action may be allowed. GPS or other geo-locational data may also be used to verify that a player is physically located at the EGM or within a particular venue before initiating streaming play.

As disclosed herein, alternatives to printed barcodes or QR codes may be used. Barcodes could be presented on a display of the EGM as an overlay for example. In other embodiments, Bluetooth, RFID, or other technologies may be used to transmit the EGM-specific identifier or IP address instead of optical codes.

In addition, according to some embodiments, the processes disclosed herein may be reversed with respect to the player requesting a remote gaming session. For example, the player may utilize a graphical user interface presented on a display of the EGM to scan for mobile devices within range (e.g., within Bluetooth range or other wireless technology range) that are available for connection. The player may select one of the mobile devices from the list to connect to connect or otherwise establish a communication link between the EGM and the selected mobile device. A confirmation request may be displayed on a display of the mobile device asking the player to confirm that he or she wishes to associate his or her mobile device with the EGM.

As shown at block 136a, the process may wait for the EGM-specific identifier to be scanned or otherwise entered. Once the EGM-specific identifier has been input, it is determined whether the input is a valid EGM-specific identifier at block 138a. If not, the process may return to block 132a. If the input is a valid EGM-specific identifier, then the process may continue to block 140a where the EGM-specific identifier (e.g., data representative of the EGM-specific identifier) may be sent to the connection server for further processing. The connection server may maintain a list of EGM-specific identifiers (whether static or dynamic) and corresponding current IP addresses. Accordingly, in embodiments utilizing a connection server, the connection server may retrieve an IP address of the EGM associated with the EGM-specific identifier at block 150a. At block 152a, the connection server may send a connection request to the EGM identified by the EGM-specific identifier. It is understood that the processes performed by the client device (e.g., mobile device), connection server, and EGM run in parallel with various information in the form of data being transmitted between the client device, connection server, and EGM.

Upon receiving the connection request at block 158a, the EGM may determine whether the requested connection is possible or otherwise available at block 160a. For example, the requested connection may be denied if the game is tilted or out-of-service. As another example, the requested connection may be denied if there are insufficient credits on the EGM to enable a meaningful gaming session (i.e., a session measured by, for example, the number games that may be played based on the available credits). In this regard, the process according to some embodiments may require that a certain number of credits be available for play. In such embodiments, the process may determine whether enough credits have been input to play a minimum of 1, 5, 10, 25, or any number of games based on the minimum bet, maximum bet, or any other bet amount. Of course, other embodiments may not require a certain number of credits to initiate a remote gaming session because the player may be enabled to input credits via the device on which he or she is playing the game in the remote gaming session.

If the requested connection is denied, the EGM may inform the connection server and the client device of the denial at blocks 154a and 142a, respectively. In embodiments where the EGM sends such information to the connection server and the client device, processing resources may be saved because, for example, the connection denial information may serve as an interrupt and stop any processing being performed by the connection server and the client device with the client device returning to block 132a upon receiving such an interrupt. For example, such an instance may occur where a connection request was initially allowed or otherwise approved but later denied due to later processing.

Likewise, if the requested connection is approved or otherwise allowed, the EGM may inform the connection server and the client device of the denial at blocks 154a and 142a, respectively. The client device may present a notification to the player that the connection request has been allowed and that the remote gaming session may commence shortly. Following the approval of the connection request, the EGM may, at blocks 162a and 164a, confirm that the player requesting the remote gaming session is actually at the EGM.

In one embodiment, the EGM may present a confirmation request on one or more displays of the EGM that may be touched positively by the player before the remote gaming session can commence. For example, the confirmation request may be a pop-up window that may read "Do you want to move your game and credits to be played on your mobile device?" As another example, the confirmation request may be a message that reads: "Do you want to move the game and credits to be played on mobile device: DEVICE NAME'S IPAD?" The player may select "Yes" or "No" on the confirmation request. If a player confirms that he or she wishes to initiate a remote gaming session, a connection allowed message is sent at block 166a and may be received by the connection server and the client device. Following block 166a, the EGM waits for client connection at block 168a.

Upon receiving the connection allowed message, the connection server may, at block 156a, send remote gaming session data to the client device. Remote gaming session data may include the IP address and other data associated with the EGM. At block 144a, the client device may receive the remote gaming session data from the connection server and accordingly connect to the EGM over IP or any other communication protocol. As part of the remote gaming session initiation process, negotiation may take place as to the correct format for the data to be received in based on the client device characteristics (e.g., screen size, resolution, processing capabilities, and the like).

In some embodiments, before the remote gaming session commences, certain hardware devices (e.g., player input devices) or software modules of the EGM may be disabled so that they may not be used during the remote gaming session. For example, all touchscreens, physical buttons, the bill acceptor, and ticket printer may be disabled. According to one embodiment, the touchscreen capabilities of any display screens may be disabled, but the displays may still present information thereon. In one embodiment, touch screen data may still be transmitted from a display to a processor; however, the processor does not accept the input. In other embodiments, the disabling of the capabilities may mean that the display does not transmit touch data upon being touched. According to the embodiment shown in FIG. 3B, this may occur at block 170*a*. Following the disablement of certain hardware or software modules of the EGM, the remote gaming session may commence. In the embodiment shown, the EGM may stream gaming data to the client device and receive input data from the client device once the remote gaming session commences. This functionality is represented at block 172*a*. Likewise, the client device may display the streamed gaming data received from the EGM and relay activation of any input devices (e.g., a touchscreen) via input data to the EGM. This functionality is represented at block 148*a*.

As disclosed herein, the EGM may replace the dynamic output of the game with static "Game Reserved" images or the like. Such images may be shown on the displays of the EGM throughout the remote gaming session with the actual output of the game instead being sent through the reformatting module and stream encoder according to one embodiment.

The confirmation request helps prevent someone from subverting the process by making a copy of the EGM-specific identifier and attempting to initiate a remote gaming session away from the EGM using a current player's funds because the current player at the EGM would be made aware of the attempt and would be able to stop it (e.g., by selecting "No"). As disclosed herein, the EGM-specific identifiers may be dynamic in that they change after, for example, every gaming session, a period of time, or any other measure. Dynamic EGM-specific identifiers may further help prevent illegitimate initiation of a remote gaming session.

In some embodiments, the system may automatically select "No" for the player after a predetermined length of time has elapsed (e.g., 5 second, 10 seconds, 30 seconds, 1 minute, or any other time period). The default selection of "No" after a predetermined period of time ensures that a player who leaves the EGM while the confirmation request is displayed does not have a remote gaming session initiated by another player (albeit on the client device of the player who left the EGM).

In some embodiments, the operating system on the EGM may permanently display an icon at a suitable location on a display (e.g., main display or iDeck) that would only allow streaming to be enabled if pressed with the default position being "off" as a further safeguard. In such embodiments, if streaming is disabled, a connection request by a secondary computing device is ignored. If a user has enabled streaming, the availability of streaming may return to the disabled state after a period of time if a remote gaming session is not enabled within that time (e.g., 1 minute, 5 minutes, or any amount of time). In some embodiments, the availability of streaming may return to the disabled state after a cash-out event occurs on the EGM. As another example, the availability of streaming may return to the disabled state if no credits are present on the EGM for a period of time.

Figure 3C:
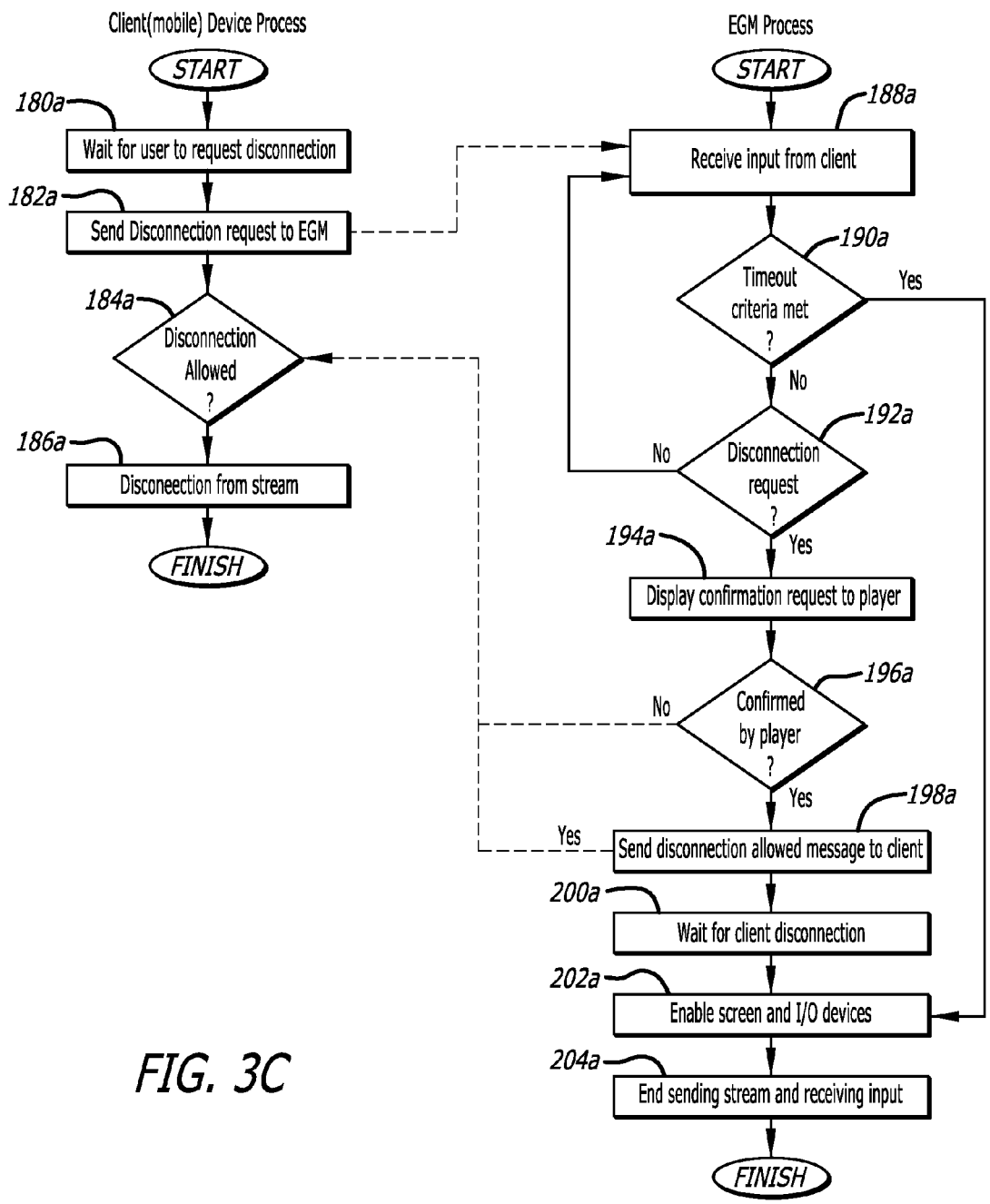
FIG. 3C illustrates one embodiment of a process that enables termination of a remote gaming session on a mobile device.

Referring now to FIG. 3C, one embodiment of a process is depicted that enables a mobile device (e.g., any secondary computing device) to be disconnected from a remote gaming session. A remote gaming disconnection may be player-initiated or system-initiated (e.g., initiated by the EGM). For example, if a player's credit balance is at or below a certain threshold for a period of time, the venue may wish to return the EGM to its normal status so that another player may use it. In this way, the systems herein are enabled to measure inactivity. In some embodiments, the credit threshold may be 0 credits or a number of credits less than the number of credits required for one or more minimum bets on the EGM. In such embodiments, the time period may be 1 minute, 5 minutes, 10 minutes, or any other time period.

The system-initiated disconnection time period may be based on different credit thresholds and the player's credit balanced in relation thereto. For example, if a player's credit balance is at or below a certain threshold, then the time period may be a first time period, whereas if a player's credit balance is at or above a certain threshold, then the time period may be a second time period. In one embodiment, the first time period may be less than the second time period. For example, if a player's credit balance falls below the number of credits required for a single minimum bet for 2 minutes, the remote gaming session may be terminated. Likewise, if a player's credit balance would allow for two or more minimum bets and the credit balance has not increased or decreased (i.e., no bets have been made) for 10 minutes, the remote gaming session may be terminated. It is understood that the player's credit balance may be monitored just as the player input devices may be monitored. For example, the system may terminate the gaming session if player input data has not been received from the player's mobile device for a period of time.

In some embodiments, any remaining credit balance remains on the EGM after the remote gaming session is terminated. In other embodiments, any remaining credit balance may be returned to the player after the remote gaming session is terminated if the player's identity is known. In other embodiments, the EGM may enter a tilt mode if there are remaining credits on the EGM after a remote gaming session is terminated. In some embodiments, initiation of a remote gaming session may require a player to agree to properly cash-out remaining credits at the end of the remote gaming session or else agree that he or she will lose those credits since they may, for example, remain on the EGM. In still other embodiments, the remaining credits may be transferred to a player account stored on a server. Still further, a "code" or other indicia may be generated and stored by the mobile device that when entered by the player during a subsequent remote gaming session on a mobile device or local gaming session at a gaming machine, restores the remaining credits for further play.

In some embodiments, the mobile device of the player engaging in a remote gaming session may receive from, for example, the EGM a prompt requiring the player to affirmatively respond to continue the remote gaming session. Such a prompt may read "Are you still playing?" The player may select "Yes" or "No." "No" may automatically be selected after a time period has elapsed. A player may be required to affirmatively respond to such a prompt after a time period elapses (e.g., every 10 minutes, every 15 minutes, every 30 minutes, or any defined period of time).

A player-initiated disconnection or termination of the remote gaming session may begin by the player initiating a cash-out event (e.g., by pressing "Cash-Out" on the screen on the mobile device). In some embodiments, a player may initiate a cash-out event using the EGM to receive a credit voucher. However, to ensure that the player actually engaged in the remote gaming session is the player requesting the cash-out at the physical EGM, the EGM may send a confirmation message to the mobile device requiring the user to confirm whether a cash-out event has been requested by him or her. Some embodiments may use biometrics and/or GPS or other locational data to verify the player is physically located at the EGM. In some embodiments, the mobile device may present a cash-out code that the player must input at the EGM for the cash-out event to be processed. Of course, the player may turn off such messages to prevent another player from harassing him or her during the remote gaming session (e.g., constantly attempting to cash-out an EGM involved in a remote gaming session).

In embodiments where a player initiates termination of the remote gaming session using the mobile device, a confirmation window may be presented to the player. This window may be generated by the EGM and streamed to the mobile device, or be performed natively by the mobile application if it is aware of the location of the virtual cash-out button on the mobile device display. The window may ask the player to confirm that the cash-out request is valid. If the player confirms the request is valid, then the player may be informed by, for example, another pop-up window (again, generated by the EGM and streamed to the mobile device, or be performed natively by the mobile application) to return to the EGM. The second pop-up window asking the player to return to the EGM may present a cash-out code to the player that someone at the EGM would not know. For example, the secret cash-out code may be a randomly chosen word or combination of letters or numbers.

In some embodiments, the EGM may display the proper cash-out code among other non-functional cash-out codes. The EGM may ask the player to touch the cash-out code shown on the mobile device, and if correctly chosen, the mobile device is disconnected and the EGM is re-enabled for normal play to continue (e.g., re-enabling player input devices on the EGM). Of course, in other embodiments, the player is asked to select the right code from a plurality of wrong codes. Instead, the player is asked to input the code by, for example, entering each letter, number, or symbol of the code using a virtual keyboard presented on a display of a gaming machine. In some embodiments, once the cash-out code is entered, a ticket voucher is printed by the EGM. In other embodiments, once the cash-out code is entered (e.g., at the gaming machine associated with the remote gaming session or a cash-out kiosk), the credits (or money corresponding thereto) may be sent directly to a player account. In other embodiments, the cash-out code need not be entered at the EGM for the player to receive his or her funds. Instead, the player may enter the cash-out code at a cash-out kiosk (e.g., ATM/bill breaking machine) or provide the cash-out code to a cashier. The cash-out kiosk may be connected to a network and receive cash-out codes along with the corresponding credits and cash value of the credits from mobile devices over the network. In this way, a player may input the cash-out code at the cash-out kiosk without having to find the EGM associated with the player's remote gaming session. In some embodiments, once the cash-out code is presented to the player, the remote gaming session is terminated since the player need not approach the EGM associated with the remote gaming session to effectively cash-out. This enables the EGM to return to normal play mode sooner because the EGM does not need to wait for the player to travel back to the EGM to terminate the remote gaming session. In some embodiments, Bluetooth, RFID technology, biometrics, or GPS technology may be used to ensure the player is at the EGM with the mobile device before the EGM was returned to normal play.

One purpose of the cash-out code is to ensure that a player pressing "Cash-Out" on the mobile device is not beaten to the EGM by another person who could then steal the credits by pressing the "Cash-Out" button on, for example, the virtual button deck once the EGM was returned to normal play. In some embodiments, the cash-out code may be made available to the player via the mobile device, but not presented thereon until the player requests the actual presentment of the code itself.

In some embodiments, the cash-out code may be a barcode, a QR code, or any other unique indicia related only to the remote gaming session from which the cash-out event is initiated may be presented on the mobile device. The player may take this session-specific code, just as the other cash-out codes discussed, to the EGM or a cash-out kiosk. However, instead of the player manually entering the code or selecting the code, the EGM or the cash-out kiosk is enabled to read the code with a scanner (e.g., barcode reader or QR code reader).

In some embodiments, a secret code may be used to establish a connection to the EGM as an alternative to barcodes. In such embodiments, the player may first touch a streaming icon on the EGM display causing a code (e.g., secret word) to be displayed. Next, the player may start or otherwise initiate the mobile streaming application, and be presented with a short list of random codes (e.g., random words) to choose from with each word being supplied by the connection server or the EGM. Selecting the matching word may identify the EGM that the player is nearest to and the process may then continue with the confirmation window. This way, any EGM may be used for "cash-out" so the player need not seek out a specific EGM (e.g., the EGM from which the player's remote gaming session was associated).

According to some embodiments, the systems and methods disclosed herein may use a Bally Alpha 2 EGM, a standard Ethernet infrastructure (wired and WiFi), and an optional connection server which may be a standard PC running a Windows operating system. According to some embodiments, video stream encoding may be performed using the H.264 codec and MPEG TS encapsulation over a protocol such as RTSP. Audio encoding may be performed using the AAC codec. Also according to some embodiments, the mobile device may be an Apple iPad 2 or iPad 3, or an Android tablet computer running Ice Cream Sandwich 4.0.3 or later. It will be appreciated that any combination of system components, hardware components, and communication protocols may be used.

Referring now specifically to the process shown in FIG. 3C, one embodiment of a process is depicted that enables a mobile device (e.g., any secondary computing device) to be disconnected from a remote gaming session. At block 180*a*, the mobile device may wait for disconnection or termination request (whether player-initiated or system-initiated). In the embodiment shown, the mobile device is shown waiting for a disconnection or termination request from the player. Once a termination request is received, the process may proceed to block 182*a* where the mobile device sends the termination request to the EGM. At block 184*a*, the mobile device determines whether termination is allowed. In some embodiments, block 184*a* determines whether the termination is allowed based on, for example, data received form the EGM such as a disconnection or termination allowed message.

At block 188*a*, the EGM is shown receiving, as input, the termination request from the mobile device. Following block 188*a*, the process may proceed to blocks 190*a* and 192*a* where it may be determined whether a timeout period has elapsed based on, for example, player inactivity, and whether the received data is in fact a termination request. In some embodiments, player inactivity may include neither confirming nor denying the termination request. The timeout period may be any time period.

If the timeout period has not elapsed and the received data is a termination request, then the process may proceed to block 194*a* where the EGM may display a confirmation request to the player asking the player to confirm whether he or she had in fact requested termination of the remote gaming session. At block 196*a*, the player may respond to the confirmation request. If the player does not confirm the termination request, data representative of such an input may be sent to the mobile device from the EGM (block 198*a*). The mobile device may then proceed to block 180*a* instead of 186*a* in such a circumstance. Otherwise stated, the mobile device does not suspend or otherwise disconnect itself from the remote gaming session. However, if the player does confirm the termination request, data representative of such an input may be sent to the mobile device from the EGM. The mobile device may then proceed to block 186*a* instead of block 180*a* in such a circumstance. Otherwise stated, the remote gaming session is terminated. At block 200*a*, the EGM may wait for data from the mobile device indicating that the mobile device has disconnected from the remote gaming session. Once such data is received, the EGM may, at block 202*a*, enable input and output devices (or otherwise return them from a partial-functionality state to a full-functionality state) so that normal play may be initiated on the gaming machine. At block 204*a*, the remote gaming session may be considered terminated since the gaming machine may now be available for normal play (e.g., normal play mode).

As disclosed herein the secondary computing device (e.g., mobile device) may have different characteristics from a gaming machine (e.g., EGM). Therefore, the systems and methods disclosed herein enable the deployment of a game on a secondary computing device that has different characteristics than the EGM to which the game is associated. The systems and methods herein enable a wide range of games to be deployed on a wide range of mobile devices.

For example, an EGM may have one, two, three, four, or more displays of varying sizes, resolutions, and aspect ratios. Mobile devices may have more than one display, but generally have just one display. In some embodiments, the display(s) of a mobile device may be oriented in either a portrait or landscape mode. For example, a user may rotate his or her mobile device to view the display(s) on the mobile device in a portrait orientation or a landscape orientation. The displays of various mobile devices generally have different display characteristics. For example, the following mobile devices are currently sold in the U.S. with associated resolutions and aspect ratios. In landscape orientation, the Apple iPad 2 has a resolution of 1024 pixels (width) by 768 pixels (height), and has an aspect ratio of 1.33. In landscape orientation, the Apple iPhone 4 has a resolution of 960 pixels (width) by 640 pixels (height), and has an aspect ratio of 1.5. In landscape orientation, the Apple iPhone 5 has a resolution of 1136 pixels (width) by 640 pixels (height), and has an aspect ratio of 1.78. In landscape orientation, the Asus TF700 has a resolution of 1920 pixels (width) by 1200 pixels (height), and has an aspect ratio of 1.6. In landscape orientation, the BlackBerry Playbook has a resolution of 1024 pixels (width) by 600 pixels (height), and has an aspect ratio of 1.7.

The systems and methods disclosed herein enable reformatting of any existing game so that it may be presented on one or more displays of a mobile device. In some embodiments, the entire real estate of a display (i.e., all pixels) on a mobile device may be used in presenting a reformatted game on the mobile device. In other embodiments, less than the entire real estate of a display (i.e., all pixels) on a mobile device may be used in presenting a reformatted game on the mobile device. For example, 50%-99% of the pixels may be used.

In some embodiments, a virtual button deck (e.g., iDeck) graphical user interface may be represented in a large enough portion of the mobile device display to enable a player to easily operate it. For example, a gaming machine with a main screen display and a virtual button deck display may have graphical data associated with each display, which may be combined and shown on a single display of a mobile device. The graphical data associated with the virtual button deck may be reformatted (e.g., resized) and presented on a portion of the mobile device display (e.g., the lower 20% in a landscape orientation), whereas the graphical data associated with the main screen may be reformatted and presented on another portion of the mobile device display (e.g., the upper 80% in a landscape orientation). Of course, in other embodiments, the graphical data associated with the virtual button deck may be reformatted (e.g., resized) and presented on the entire mobile device display. After a player, for example, selects a bet amount on the mobile device display using the reformatted graphical user interface, the mobile device may switch to displaying graphical data associated with the main screen display that has been reformatted and presented on the entire mobile device display.

In some embodiments, reformatting the graphical data presented on a gaming machine may result in deformation of content (e.g., stretching, shrinking, or otherwise skewing the content such that the original aspect ratio of the content is not maintained). However, the systems and methods disclosed herein may determine that if deformation of content occurs, such deformation may be acceptable provided that the deformed content is perceivable as being related to the source content (i.e., the content as it is presented on the gaming machine) with, for example, minimal deformation. In some embodiments, the level of deformation may be determined based on the aspect ratio of the content before reformatting and after reformatting. For example, if the original content has an aspect ratio of 2, and after reformatting the content has an aspect ratio of 1, then the content may be perceivably stretched height-wise. However, if the content has an aspect ratio of 2.1 or 1.9, the deformation of the content may not be perceivable, readily perceivable, or the like. This is because the 2.1 or 1.9 aspect ratio is closer to the original aspect ratio than that of 1.

Accordingly, in some embodiments, this relationship is leveraged to set up acceptable and unacceptable levels of deformation. In one embodiment, acceptable levels of deformation may include when the aspect ratio of the reformatted content is within 1%, 5%, 10%, 20%, or any other percentage of the aspect ratio of the original content. For example, if the original content has an aspect ratio of 1.6, deformation in reformatted content related thereto may be acceptable if it is within the range of 1.584-1.616 (e.g., if the aspect ratio of the reformatted content is required to be within 1% of the aspect ratio of the original content), 1.52-1.68 (e.g., if the aspect ratio of the reformatted content is required to be within 5% of the aspect ratio of the original content), 1.44-1.76 (e.g., if the aspect ratio of the reformatted content is required to be within 10% of the aspect ratio of the original content), or 1.28-1.92 (e.g., if the aspect ratio of the reformatted content is required to be within 20% of the aspect ratio of the original content). In one embodiment, unacceptable levels of deformation may include when the aspect ratio of the reformatted content is not within 1%, 5%, 10%, 20%, or any other percentage of the aspect ratio of the original content.

As disclosed herein, content from multiple displays on one device may be combined into a single stream or frame for another device. While content may be reformatted based on the aspect ratio of the display and deformed accordingly, the deformation measurement disclosed herein is based on the aspect ratio for each piece of content against its associated original content.

In some embodiments, the systems and methods disclosed herein leverage the different orientations available (i.e., landscape or portrait) of a display. For example, some games may play better in a portrait orientation on a mobile device while other games may play better in a landscape orientation on the same mobile device.

Figure 31A:
FIG. 31A illustrates a screen shot of game content associated with a Bally V22 game ("Ole Jalapenos"), which is displayed across two landscape oriented 1.77 aspect ratio displays in the embodiment shown.
Figure 31B:
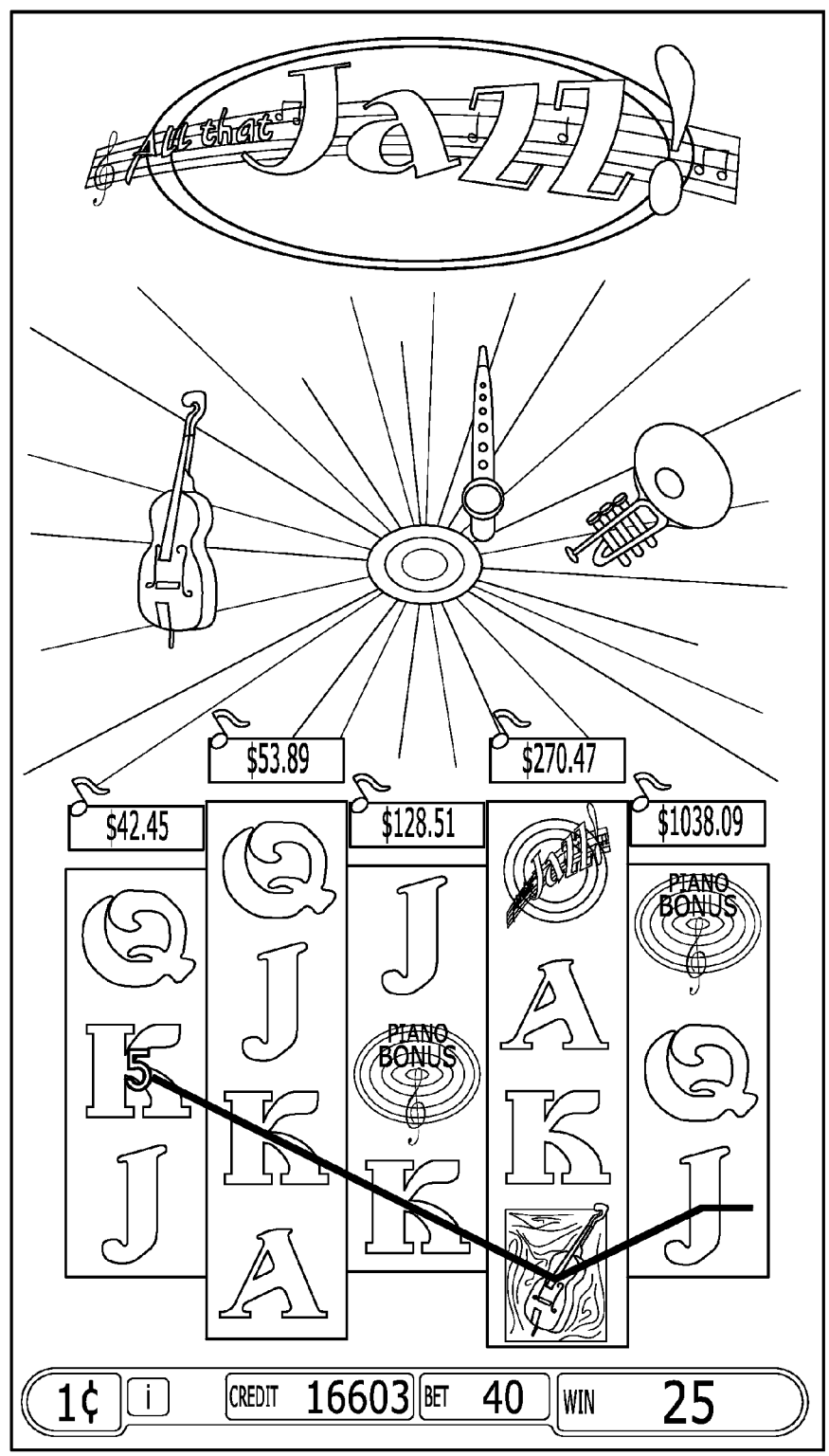
FIG. 31B illustrates a screen shot of game content associated with a Bally V32 game ("All That Jazz"), which is displayed across one portrait oriented 1.77 aspect ratio display in the embodiment shown.
Figure 31C:
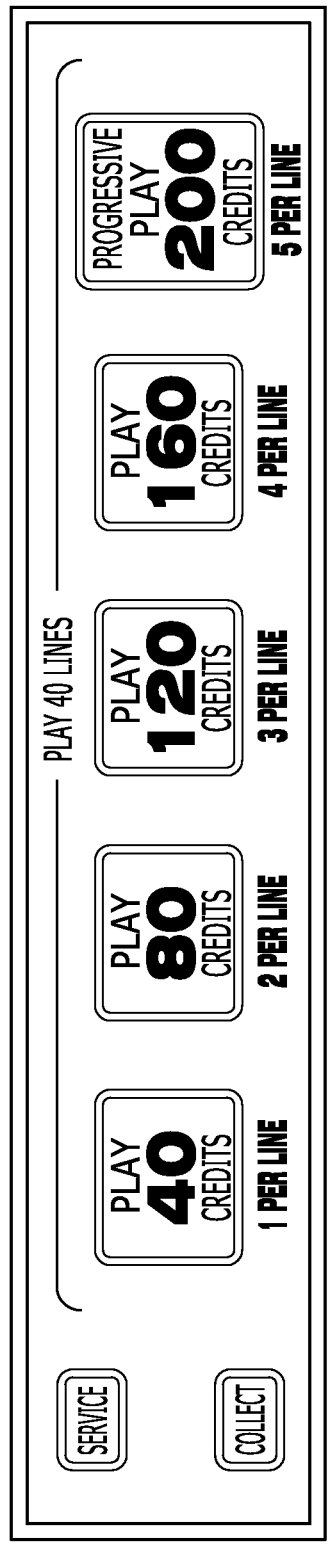
FIG. 31C illustrates a screen shot of game content associated with a Bally iDeck display having an aspect ratio of 5.29 in the embodiment shown.

Referring now to FIGS. 31A-C, examples of content taken from Bally Alpha 2 products is shown for illustrative purposes. Of course, the content may change based on the game and the gaming machine for which it is designed. It should further be noted that while the various embodiments herein are described with reference to electronic EGMs that the present invention could also be applied to electronic gaming tables. Thus, the term EGM should be understood to include electronic gaming tables where a player may wish to remotely play at a player position.

FIG. 31A shows a screen shot of graphical data associated with a Bally V22 game ("Ole Jalapenos"), which is displayed across two landscape-oriented 1.77 aspect ratio displays. Each of these displays has a resolution of 1360 pixels by 768 pixels. Combined together, as shown, they produce a composite image having a resolution of 1360 pixels by 1536 pixels and an aspect ratio of 0.88. FIG. 31B shows a screen shot of graphical data associated with a Bally V32 game ("All That Jazz"), which is displayed across one portrait oriented 0.56 aspect ratio display having a resolution therefore of 768 pixels by 1360 pixels. FIG. 31C shows a screen shot of graphical data associated with a Bally iDeck display that is utilized by both the Bally V22 "Ole Jalapenos" game and the Bally V32 "All That Jazz" game. The Bally iDeck display in this embodiment has a resolution of 1280 pixels by 242 pixels and an aspect ratio of 5.29.

Figure 32A:
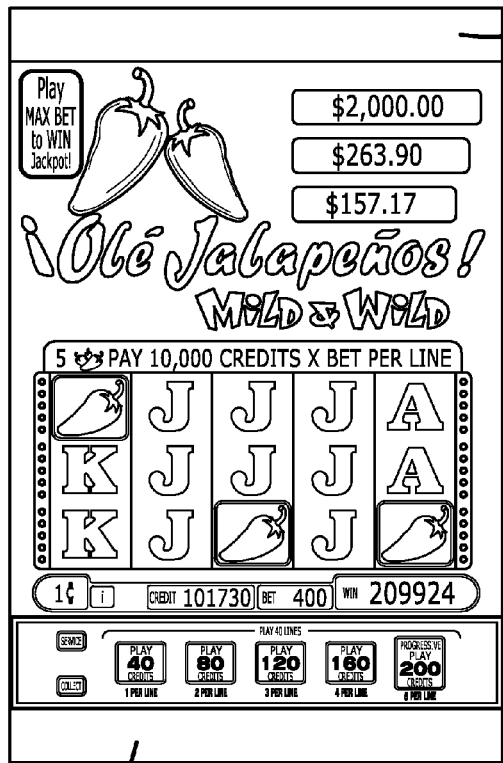
FIGS. 32A-B show two mobile device displays presenting reformatted content corresponding to the original content shown in FIGS. 31A-C according to one embodiment.

Continuing with the examples shown in FIGS. 31A-C, FIGS. 32A-B show two mobile displays presenting the graphical data corresponding to the graphical data shown in FIGS. 31A-C according to one embodiment. In the embodiment shown, the display 300a in FIG. 32A has an aspect ratio of 16:10 (1.6), and is displaying the V22 game "Ole Jalapenos" reformatted to fit on the display 300a using the correct aspect ratio. In the embodiment shown, the way the graphical data associated with the "Ole Jalapenos" game has been reformatted has resulted in large unused areas 302a of the mobile device display. The embodiment shown in FIG. 32A illustrates an instance of letterboxing that may occur when content is reformatted to preserve the aspect ratio of the game.

Figure 32B:
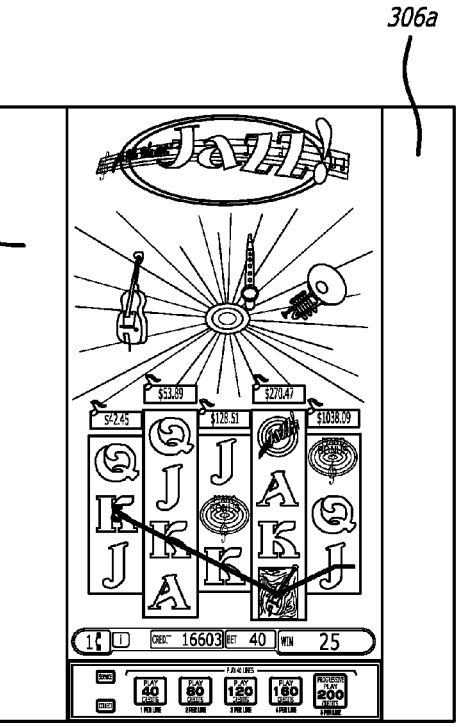

In the embodiment shown, the display 304a in FIG. 32B has an aspect ratio of 4:3 (1.33), and is displaying the V32 game "All That Jazz" reformatted to fit on the display 304a at the correct aspect ratio. In the embodiment shown, the way the graphical data associated with the "All That Jazz" game has been reformatted has resulted in large, unused areas 306a of the mobile device display. The embodiment shown in FIG. 32B illustrates an instance of pillarboxing that may occur when content is reformatted to preserve the aspect ratio of the game.

Figure 32C:
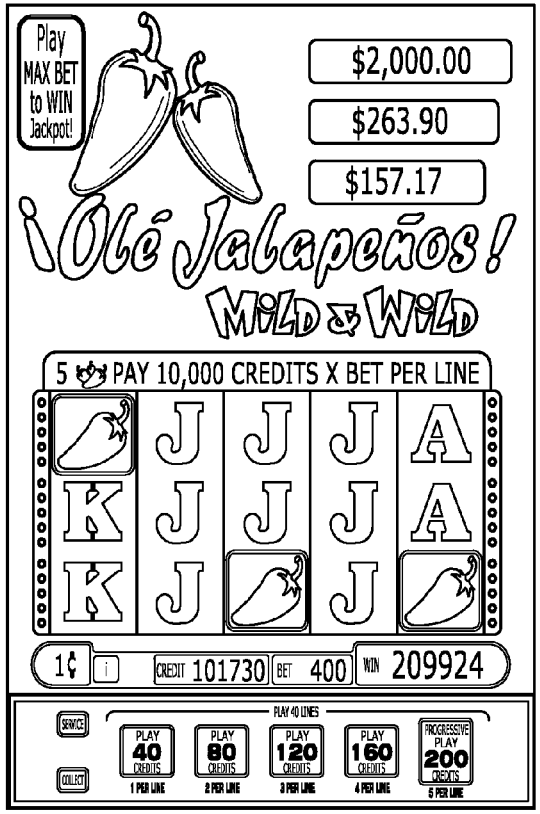
FIGS. 32C-D show the two mobile devices shown in FIGS. 32A-B presenting reformatted content corresponding to the original content shown in FIGS. 31A-C according to another embodiment.
Figure 32D:
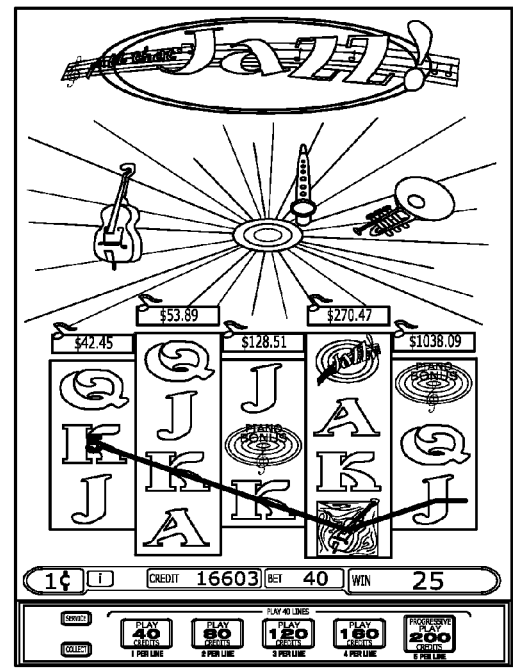

Failing to utilize more of the mobile device display in the embodiments as shown in FIGS. 32A-B, content, such as the graphical user interface displayed on a virtual button deck, is rendered smaller in size than otherwise may be possible. Otherwise stated, the systems and methods disclosed herein may eliminate unused areas on a display by enlarging or otherwise stretching content to fit the entire display. For example, in some embodiments, the content may be stretched (e.g., deviate away from the correct aspect ratio of the game) such that the entire display is used (i.e., there are no unused areas or portions). FIG. 32C illustrates one embodiment of the display 300a presenting the V22 game "Ole Jalapenos" reformatted to fit on the display 300a without any unused areas. As shown, the game is stretched to ensure that there are no unused areas in this embodiment. Likewise, FIG. 32D illustrates one embodiment of the display 304a presenting the V32 game "All That Jazz" reformatted to fit on the display 304a without any unused areas. As shown, the game is stretched to ensure that there are no unused areas in this embodiment. In some embodiments, the amount of stretching depicted in FIGS. 32C-D may be deemed unacceptable to some users or the game designer because it may no longer closely represent the game as presented on the gaming machine itself. Therefore, in some embodiments, the systems and methods disclosed herein may reduce the amount of deformation by reformatting content so that it does not utilize the entire display of the mobile device. In such embodiments, the content may or may not be deformed within an acceptable limit.

Figure 32E:
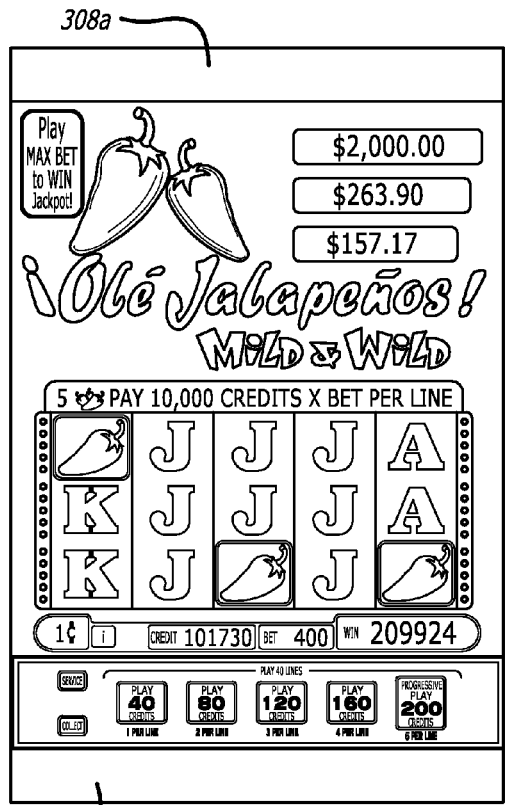
FIGS. 32E-F show the two mobile devices shown in FIGS. 32A-B presenting reformatted content corresponding to the original content shown in FIGS. 31A-C according to another embodiment.

In some embodiments, the systems and methods disclosed herein may reduce the size of any unused areas on a display by enlarging or otherwise deforming (e.g., stretching or shrinking) content within acceptable limits. Otherwise stated, the content may be reformatted so that the aspect ratio of the reformatted content is within a certain percentage of the aspect ratio of the original content. For example, content may be stretched, but within acceptable limits that may reduce but may not eliminate unused portions of the display. In some embodiments, advertisements may be presented in any unused portions of a display on the mobile device. FIG. 32E illustrates one embodiment of the display 300a presenting the V22 game "Ole Jalapenos" reformatted to fit on the display 300a with unused areas 308a. As shown, the unused areas 308a are smaller than the unused areas 302a shown in FIG. 32A thereby reducing the letterbox effect within acceptable reformatting limits (i.e., the letterbox effect is reduced by reformatting the original content so that when displayed, the reformatted content has an aspect ratio within a certain percentage of, for example, the aspect ratio of the original content). Likewise, FIG. 32D illustrates one embodiment of the display 304a presenting the V32 game "All That Jazz" reformatted to fit on the display 304a with unused areas 310a. As shown, the unused areas 310a are smaller than the unused areas 306a shown in FIG. 32B thereby reducing the pillarbox effect within acceptable reformatting limits (i.e., the pillarbox effect is reduced by reformatting the original content so that when displayed, the reformatted content has an aspect ratio within a certain percentage of, for example, the aspect ratio of the original content).

Figure 32F:
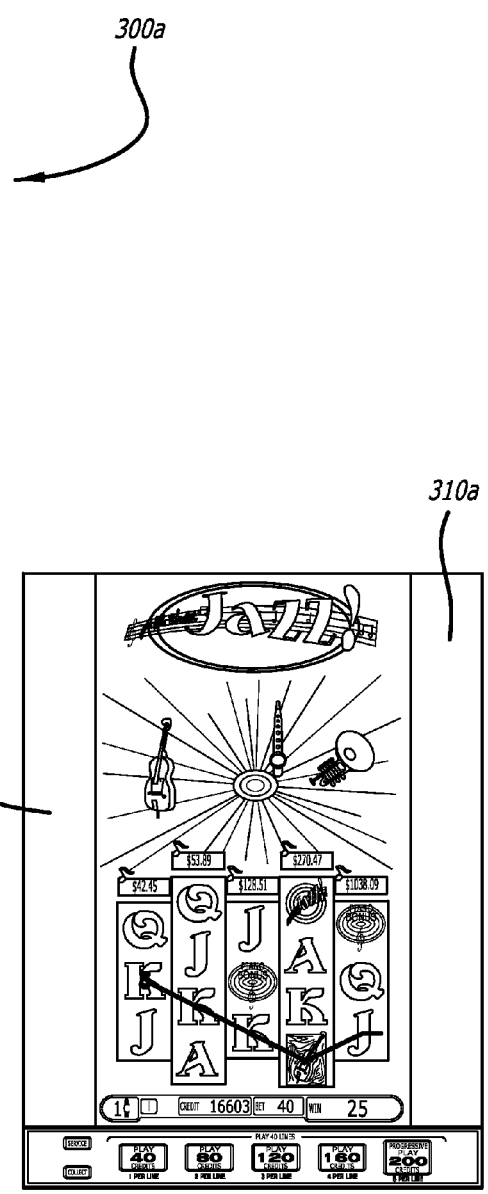
Figure 33:
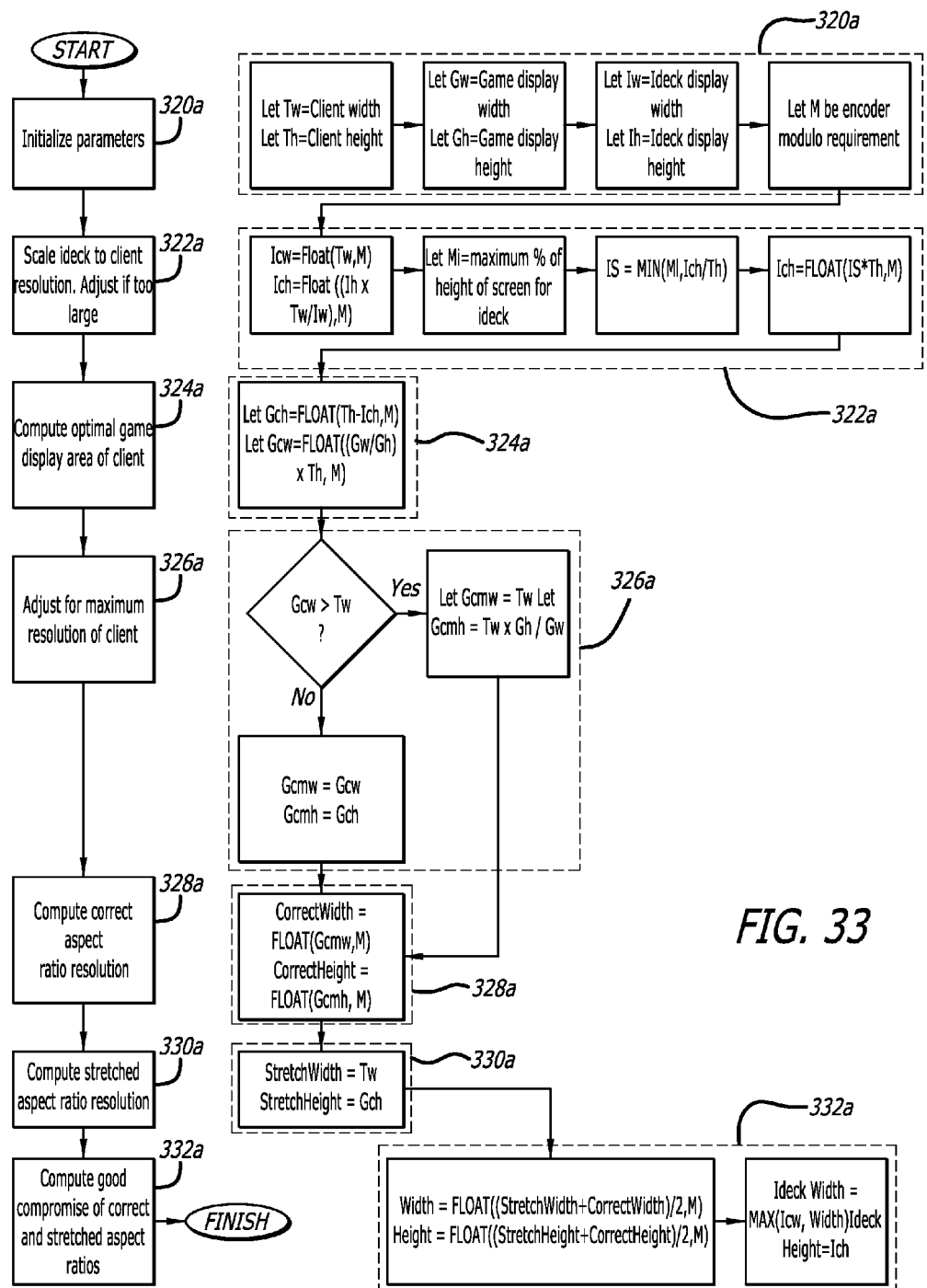
FIG. 33 illustrates one example of a process associated with the reformatting of content according to one embodiment.

Referring now to FIG. 33, one example of one embodiment of a method to determine optimal output for a given input resolution and given display is shown. For example, the video output presented on the displays shown in FIGS. 32E-F may have been optimized (i.e., reduced the amount of any unused areas on a display by reformatting original content so that when displayed, the reformatted content has an aspect ratio within a certain percentage of, for example, the aspect ratio of the original content) using the method shown in FIG. 33. The method shown in FIG. 33 may be performed by a mobile device, a gaming machine, a game server, any other computing device, or a combination thereof. As shown, each block on the left is shown in more detail on the right.

At block 320a, parameters may be initialized. In one embodiment, initializing the parameters may include setting variables to equal the width and height of the mobile device display and the width and height of the gaming machine displays that present game content that will be reformatted for display on the mobile device (e.g., the combined main game and top box displays of a V22 gaming machine, the main display of a V32 gaming machine, and the virtual button deck display). Width and height may be in terms of pixels or any other unit of measurement.

In embodiments where graphical data is compressed (e.g., according to the H.264 codec) prior to transmission to the mobile device, a variable (shown as M) may also be initialized for the encoder modulo. The encoder modulo may be used to adjust implementations where the content may be streamed to the mobile device. Encoding methods, such as H.264, generally impose a requirement that the source content be a multiple of some value (i.e., the modulo) in both width and height. A typical value M may be 8. If streaming is not required, M may be set to 1 (i.e., setting M to 1 informs the system that the graphical data is not compressed upon reception by the mobile device or otherwise before transmission to the mobile device).

If the mobile device initializes the display parameters, the mobile device may transmit data to the gaming machine requesting display information. In response to this request, the gaming machine may transmit display data back to the mobile device that includes information on, for example, the width and height of each display on the gaming machine. In some embodiments, only information on displays that present content that will be reformatted for presentation on the mobile device may be transmitted to the mobile device. If the gaming machine initializes the display parameters, the gaming machine may transmit data to the mobile device requesting display information. In response to this request, the mobile device may transmit display data back to the gaming device that includes information, for example, relating to the width and height of each display of the mobile device that is available for presenting graphical data. If another computing device, such as a game server, initializes the display parameters, display data may be received from the mobile device and the gaming machine following a request for such information.

In some embodiments, the width and height of each display may be different or the same as the width and height of the content displayed in each display. Therefore, in some embodiments, the width and height of the content associated with each display of the gaming machine may be initialized in addition to the width and height of each display. However, in other embodiments, the width and height of the content associated with each display of the gaming machine may be initialized instead of using the width and height of displays. This may occur, for example, when the content is reformatted to fit displays of the gaming machine so it may correspond more accurately to user resolution and aspect ratio data of the original content before it is reformatted to fit the displays of the gaming machine in such embodiments.

After the parameters are initialized at block 320a, the method may proceed to block 322a where the resolution of the virtual button deck display (or the resolution of the content presented on the display in some embodiments) may be scaled (e.g., reduced in size if the resolution of the virtual button deck display is too large for the mobile device) based on the parameters of a display on the mobile device. In one embodiment, an optimal target resolution may be determined based on the resolution of the virtual button deck display with respect to the resolution of the display on the mobile device. For example, the resolution of the virtual button deck display may be 1280 pixels by 242 pixels and the display on the mobile device may be 768 pixels. The content typically displayed on the virtual button deck display may be scaled so that it is 768 pixels in width instead of 1280 pixels in width, and correspondingly 144 pixels in height instead of 242 pixels in height to maintain the aspect ratio. It is understood that the actual perfect aspect ratio would yield a height of 145 pixels, but this value is adjusted for encoder modulo requirements. Throughout the method shown in FIG. 33, this adjustment may take place when required.

In some embodiments, if block 322a results in the scaled content associated with the virtual button deck display exceeding some percentage of the display area on the mobile device (e.g., 10%-25%), then block 322a may further scale (e.g., reduce in size) the content associated with the virtual button deck display. This may occur for example, where scaling the content associated with the virtual button deck display would produce an unacceptably large representation of the virtual button deck on the mobile device.

At block 324a, any remaining area on the display of the mobile device may be calculated. In one embodiment, the remaining area may be calculated by subtracting the vertical resolution (i.e., the height in pixels) of the scaled content associated with the virtual button deck display from the available vertical resolution of the mobile device. The remaining pixels from this subtraction multiplied by the width of the display of the mobile device may indicate the available area that may be used to display other game content other than the virtual button deck content. In some embodiments, the entire area may be used (e.g., as shown in FIGS. 32C-D) whereas in other embodiments, less than the entire area may be used (e.g., as shown in FIGS. 32E-F).

At block 326a, the optimum resolution of the remaining game content may be determined similar to how the optimum resolution was determined for the content associated with the virtual button deck. In some embodiments, optimum or optimized resolution refers to maintaining an optimized aspect ratio. As disclosed herein, an optimized aspect ratio may be considered optimized when the aspect ratio of the reformatted content is within 1%, 5%, 10%, 20%, or any other desired percentage of the aspect ratio of the original content. For example, an adjustment may be made if the optimal vertical resolution of the remaining game content would lead to a horizontal resolution (i.e., the width in pixels) requiring content to be cropped in either width or height. Rather than crop content, if the horizontal resolution would be too large for example, the vertical resolution of the remaining game content may be further scaled so that the horizontal resolution is not wider than the width of the display on the mobile device (i.e., the width of the display on the mobile device being the target resolution).

At block 328a, the maximum possible correct aspect ratio resolution may be determined based on the calculations performed in blocks 320a, 322a, 324a, and 326a. Content scaled according to the maximum possible correct aspect ratio resolution may look like the content shown in FIGS. 32A-B but may too much unused display area.

At block 330a, the maximum possible stretched aspect ratio resolution may be determined. For example, the scaled width of the content will be the width of the display on the mobile device. The scaled height of the content will be based on the height relationship between the different content combined and displayed together. Content scaled according to the maximum possible stretched aspect ratio resolution may look like the content shown in FIGS. 32C-D, but may appear too stretched or otherwise distorted.

Figure 34:
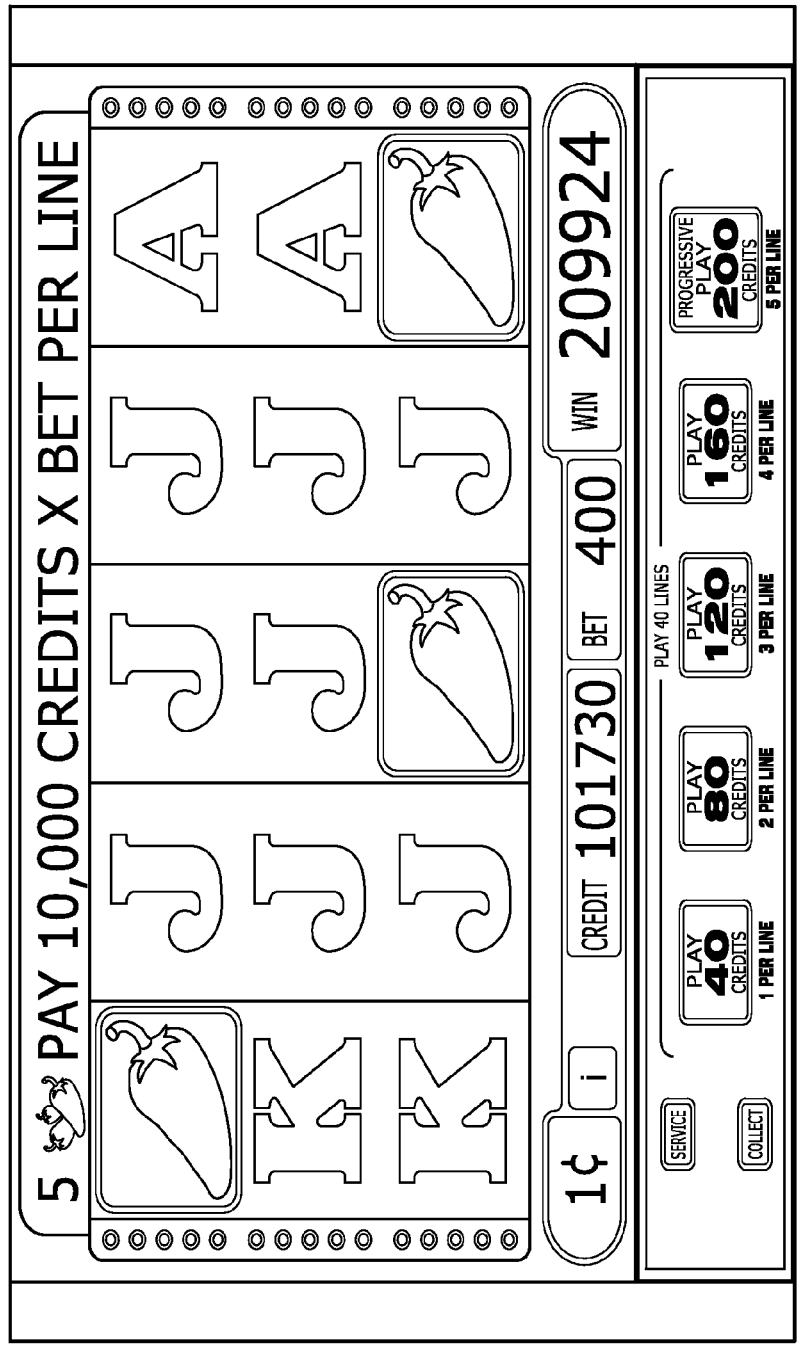
FIG. 34 illustrates one example of a display on a mobile device presenting reformatted content corresponding to the original content shown in FIGS. 31A and 31C according to one embodiment.

At block 332a, the resolutions determined at blocks 328 and 330a may be used to produce a compromise between the two blocks 328a and 330a resulting in a not too stretched and not too letterboxed/pillarboxed image presented on the mobile device display. If the content associated with the virtual button deck was previously adjusted then the content may be rescaled so that the content does not end up too small. While rescaling the content associated with the virtual button deck may result in perceivable stretching of the image, such stretching may be within acceptable limits and is illustrated in the embodiment shown in FIG. 34. Specifically, FIG. 34 shows a V22 game presented on a single mobile device screen with game content associated with the main screen of the V22 game displayed at the correct aspect ratio, but with the virtual button deck content of the V22 game being stretched according to a compromise stretch/aspect ratio. In addition, FIG. 34 also shows an embodiment where it has been determined that title screen content associated with the V22 game was not to be displayed to enable the displayed content to be larger.

Figure 35B:
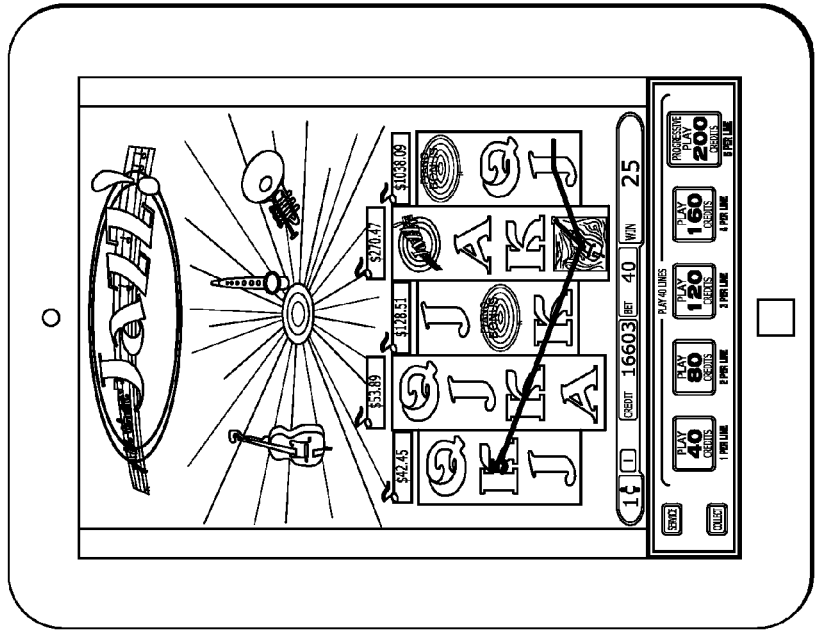
FIGS. 35A-D illustrate two different mobile devices having different display characteristics displaying two different games in the portrait orientation using the process illustrated in FIG. 33 according to one embodiment.
Figure 35A:
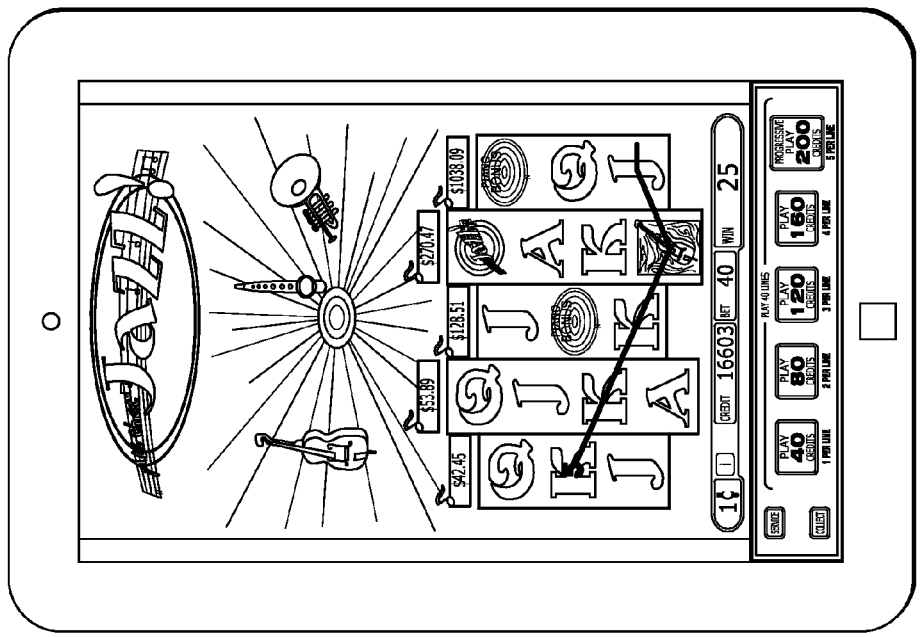
Figure 35D:
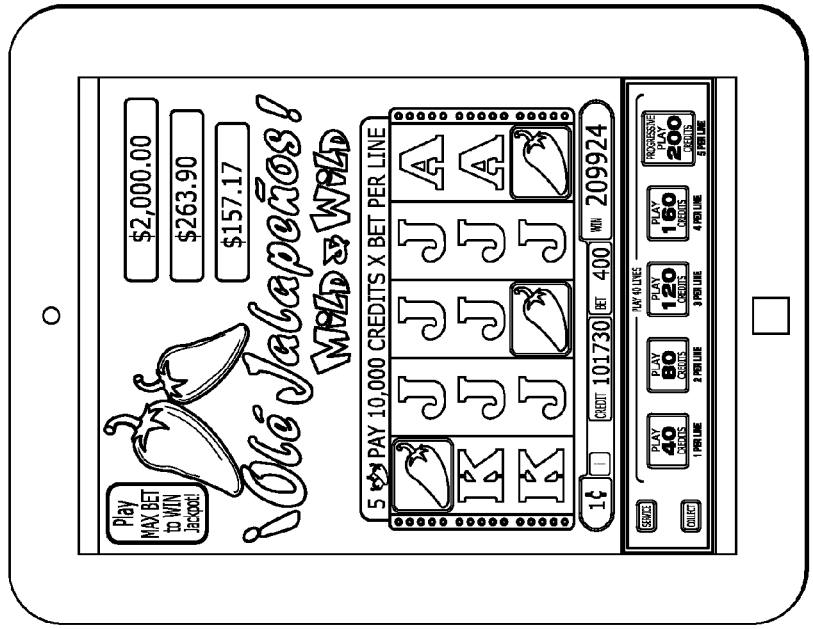
Figure 35C:
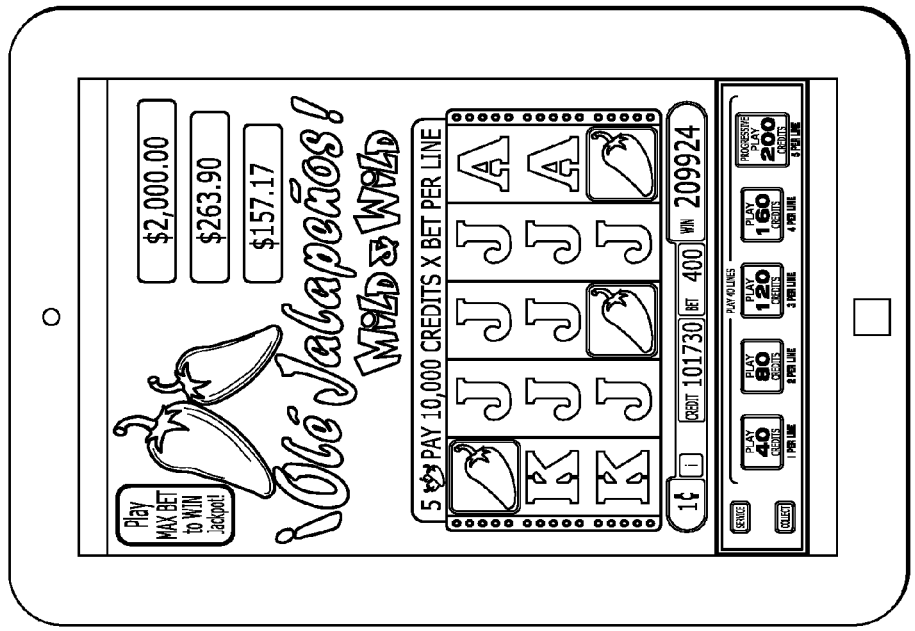

Referring to FIGS. 35A-D, two different mobile devices having different display characteristics are shown displaying two different games in the portrait orientation using the compromise method disclosed herein. The mobile device shown in FIGS. 35A and 35C has a 16:10 aspect ratio display, and the mobile device shown in FIGS. 35B and 35D has a 4:3 aspect ratio display. FIGS. 35A and 35B illustrate that the compromise method disclosed herein enables a game (e.g., the V32 game) to be reformatted to fit various displays having different characteristics. Similarly, FIGS. 35C and 35D illustrate that the compromise method disclosed herein enables a game (e.g., the V22 game) to be reformatted to fit various displays having different characteristics. While the unused areas on the 16:10 display and the 4:3 display may be different, the commonality between the two different presentations of each game is that the content is displayed at a compromise between displaying the correct aspect ratio (and possibly leaving large, unused areas of the display), and displaying too much deformation (while possible using the entire display).

In some embodiments, the systems and methods disclosed herein may determine if a game should be represented in either a landscape orientation or mode, or a portrait orientation or mode. FIG. 36 depicts one example of one embodiment of an orientation determination process 350a. At block 352a, the process may determine the width (in pixels) and height (in pixels) of the mobile device display in portrait mode. At block 354a, the process may determine the optimal portrait resolution based on the width and height of the mobile device display determined at block 352a. In some embodiments, the optimal portrait resolution may simply be the width in pixels and the height in pixels determined are found at block 352a. At block 356a, the process may determine the portrait mode aspect ratio based on the optimal portrait resolution determined at block 354a.

At block 358a, the process may determine the width (in pixels) and height (in pixels) of the mobile device display in landscape mode. At block 360a, the process may determine the optimal landscape resolution based on the width and height of the mobile device display determined at block 358a. In some embodiments, the optimal portrait resolution may simply be the width in pixels and the height in pixels determined are found at block 358a. At block 362a, the process may determine the landscape mode aspect ratio based on the optimal landscape resolution determined at block 360a. Of course, in some embodiments, calculation of the resolution and aspect ratio of the mobile device display may be based on the portrait resolution and aspect ratio. For example, if the process determines (by, for example, querying a processing unit in the mobile device) that the portrait resolution is 640 pixels (W) by 960 pixels (H) and the portrait aspect ratio is 640/960 (0.67), then the landscape resolution may be determined by switching the width and height values (960 pixels (W)×640 pixels (H) and reversing the calculation for the aspect ratio (960/640 which equals 1.5). In such an embodiment, the processing unit in the mobile device may not be queried a second time. Likewise, the aspect ratio for the Once the resolution or aspect ratio of the mobile device display for the portrait orientation and landscape orientation is known, these values may be used to determine whether the game content should be presented using the landscape or portrait orientation of the mobile device display. In some embodiments, the resolution or aspect ratio of the two different orientations of the mobile device display may be compared against the resolution or aspect ratio of the game content (i.e., the original game content before reformatting thereof). For example, at block 364a, the process may determine the resolution and aspect ratio of the game content (i.e., the original game content before reformatting thereof) by, for example, querying the gaming machine or a game server associated with the game content. It may then be determined which aspect ratio or resolution (i.e., landscape or portrait) of the mobile device is closest to the aspect ratio or resolution of the game content at block 366a. Whichever aspect ratio or resolution is closest, the corresponding orientation is determined to be the correct mode of display. For example, if it is determined at block 366a that the aspect ratio of the portrait mode of the mobile device display is less than or equal to the aspect ratio of the game content, then the process may determine that the game content should be displayed using the portrait mode of the mobile device display at block 368a. However, if it is determined at block 366a that the aspect ratio of the portrait mode of the mobile device display is greater than or equal to the aspect ratio of the game content, then the process may determine that the game content should be displayed using the landscape mode of the mobile device display at block 370a. In some embodiments, the process 350a may perform absolute subtraction, but computing the magnitude of a normalized vector subtraction may be used for better accuracy in other embodiments.

FIGS. 37A-B shows a mobile device with the display in the landscape orientation presenting content. The display in FIG. 37A may have a 1.6 aspect ratio and the display in FIG. 37B may have a 4:3 aspect ratio.

As disclosed herein, the systems and methods enable existing content (e.g., a game) designed for a first computing device (e.g., a gaming machine) to be displayed on a second device (e.g., a mobile device) for which the content was not originally designed. The systems and methods do not require user intervention for determining optimal resolutions and aspect ratios for any mobile device and any content (e.g., any games). The systems and methods may maintain a consistent presentation of virtual button deck content across a range of mobile devices and content (e.g., any games). The systems and methods enable content to be displayed on a mobile device, for which it was not designed, in the correct orientation automatically. In some embodiments, the correct orientation may be the orientation that results in less deformation of the image data presented there (e.g., less stretching).

Figure 8:
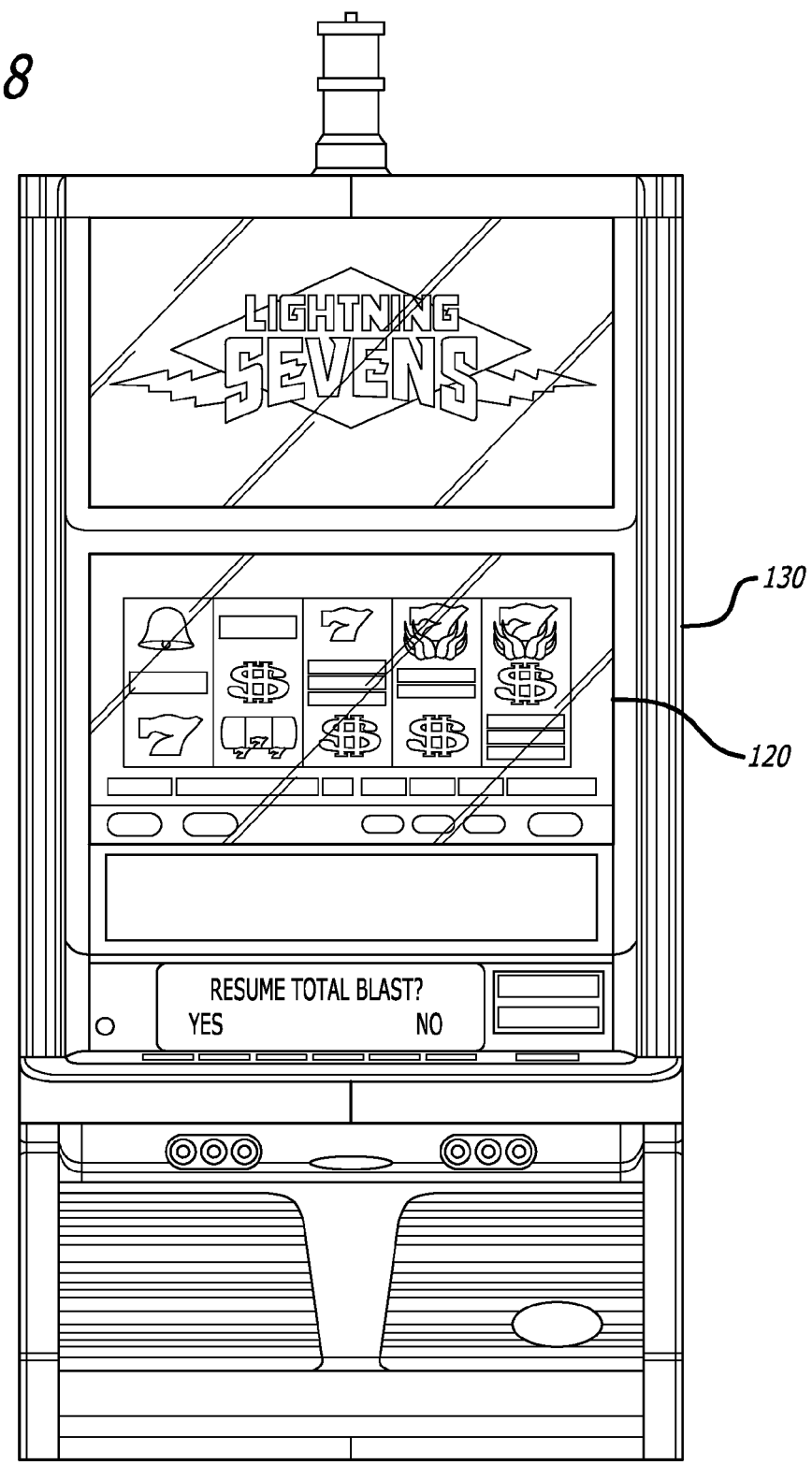
FIG. 8 illustrates an iView display message for player.

Once the EGM 130 and the mobile device 110 have been associated with each other, the game server 160 checks to see if a game session is in progress. If a game session is in progress, an option is presented on the EGM 130 and/or the mobile device 110 to move the gaming experience to the EGM 130. FIG. 8 shows the mobile device-enhanced system 100 presenting this option to the player.

Notably, as shown in FIG. 8, the game currently being played on the EGM 130 may not be the same game as on the mobile device 110. In this example, the EGM 130 was previously playing the "Lightning Sevens" game, but the game that is presented on the mobile device 100 is the "Total Blast" game. If the player chooses to continue playing "Total Blast" game, the virtual instance of the "Lightning Sevens" game is shut down or may be hibernated. Using the mobile device-enhanced system 100, a hibernated game may be later "woken up" by the player when the player again needs to leave the vicinity of the EGM 130, but would still like to continue to play a game. In this manner, the player can use the mobile device-enhanced system 100 to pick up where he or she left off with the previous gaming session on the mobile device 110.

In another embodiment of the mobile device-enhanced system 100, a further enhancement is possible when the game on the mobile device 110 is re-directed to an EGM 130. Since the player typically has a mobile device 110 in their possession containing software that is capable of receiving a video stream and sending back touchscreen player input, the player's mobile device 100 can be used to enhance the gaming experience at the EGM 130.

Figure 9:
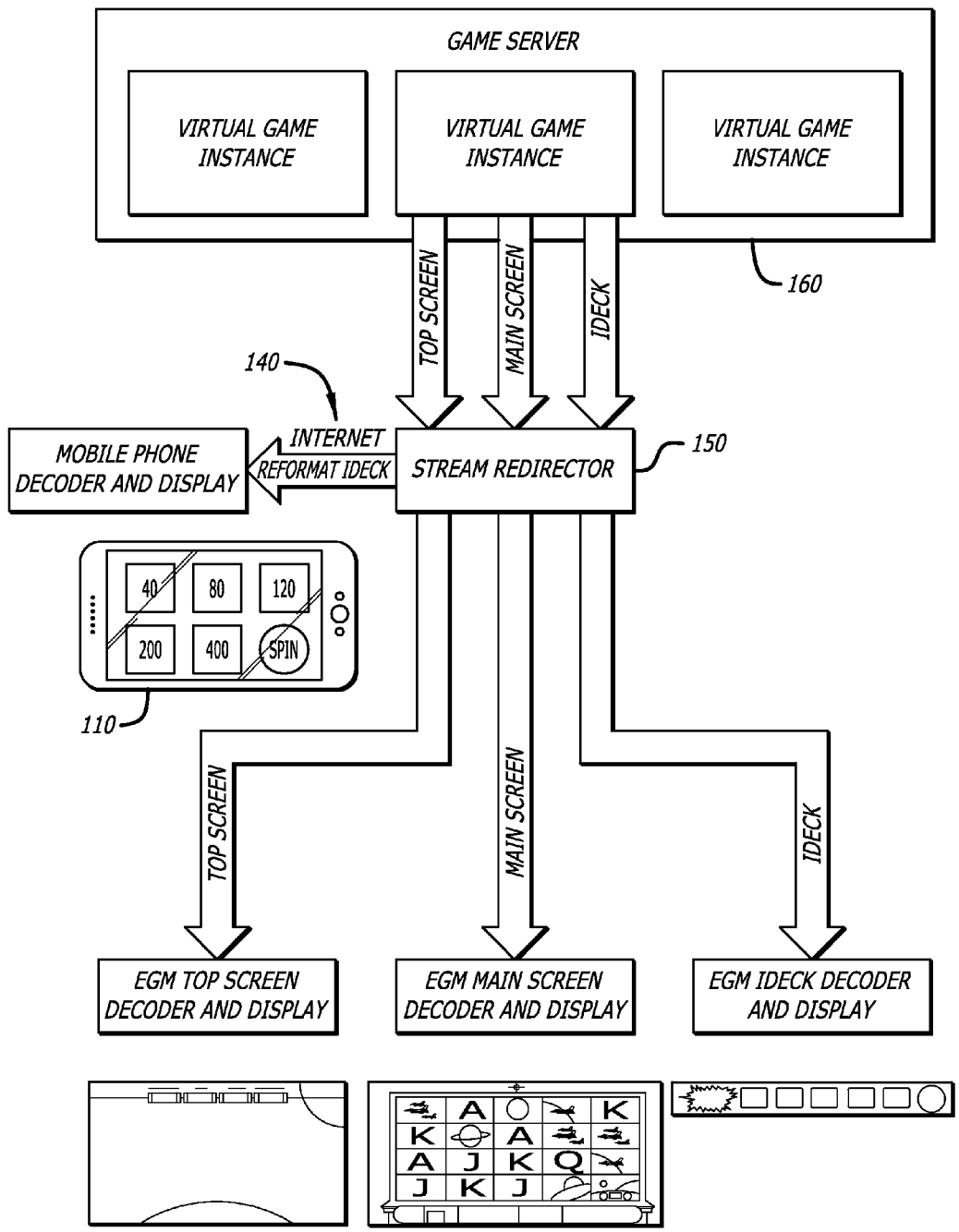
FIG. 9 illustrates the game Total Blast as served by streaming server to an electronic gaming machine and mobile device for replicated iDeck.

An example of such an enhancement using the mobile device-enhanced system 100 is shown in FIG. 9. In this example, the mobile device-enhanced system 100 is configured such that the Stream Redirector module 150 is sending outputs from the virtual game instance onto the displays of the EGM 130. In addition, the Stream Redirector module 150 is also sending a reformatted and re-encoded copy of the iDeck display (or other virtual button deck display) over the network 140 to the mobile device 110. In this example, this copy enables the player to use the mobile device 110 as a replacement iDeck. In this manner, a player can sit back and comfortably interact with the game using their mobile device 110 rather than leaning forward towards the EGM 130.

Further enhancements are also possible with this configuration. The mobile device 110 could have additional content displayed upon it, which could also interact with the displays of the EGM, as described with respect to Augmented Reality Gaming, U.S. application Ser. No. 12/969,462, which is hereby incorporated in its entirety by reference.

Notably, the mobile device-enhanced system 100 lends itself to personalized gaming experiences. Since a gaming session is tied to a mobile device 110 and/or player account, games may be designed that have longer storylines than a single spin. If a player closes the mobile application, the virtual game instance may remain active or hibernated, ready for the player to resume at a later time on the mobile device 110 or an EGM 130. Also, in some embodiments, the games 120 may be designed to operate differently depending upon the display device. For example, a dice game may be operated at an EGM 130 by a button press or a touchscreen gesture, but when running on the mobile device 110, the accelerometer of the mobile device 110 (if available), may be used to "shake" the mobile device, and thus the virtual dice, to initiate a wager.

While the above embodiments of the mobile device-enhanced system 100 have been discussed with respect to the use streaming technology to deliver the content to the display devices (e.g., the mobile device 110, the EGM 130, and the like), other embodiments of the mobile device-enhanced system 100 use conventional 'thick-client' technology. In some such implementations, the mobile device may not be "trusted" (by gaming regulation standards), so a persistent network link would be used to host the game outcome in a secure server-based environment.

In such an embodiment, instead of stream redirection, both the EGM 130 and the mobile device 110 would host software applications implementing the game presentation. At the point where the game is "transferred" from EGM 130 to mobile device 110 or vice-versa, the game state instead would be transferred along with meter values to the new client. In the case of moving to the mobile device 110 (if the EGM 130 has been actually performing all of the game logic without a server), a new game virtual instance would be created at the server 160 for hosting the game 120 on the "insecure" mobile device 110. When moving from the mobile device 110 to a non-server based EGM 130, the data from the virtual instance would be passed to the EGM, and then the virtual instance of the game 120 would be shut down.

Additionally, preferred embodiments of the mobile device-enhanced system 100 typically enable: (1) players to continue playing games even when they are not at an EGM 130; (2) players to have an EGM-like experience on mobile devices 110; (3) games to be enhanced to take into account the availability of a mobile device 110, without the extra costs associated with providing mobile devices 110 to the players; and (4) game play to be limited to only operate within WiFi range of EGMs 130, which may be advantageous for gaming regulations.

Moreover, preferred embodiments of the mobile device-enhanced system 100 typically include structural and/or operational features such as: (1) seamless transfer of game play between mobile devices 110 and EGMs 130 (and vice-versa); (2) saving of gaming session for resumption later, either on a mobile device 110 or on an EGM 130, and (3) use of mobile device 110 as alternative input device to EGM 130.

Figure 10:
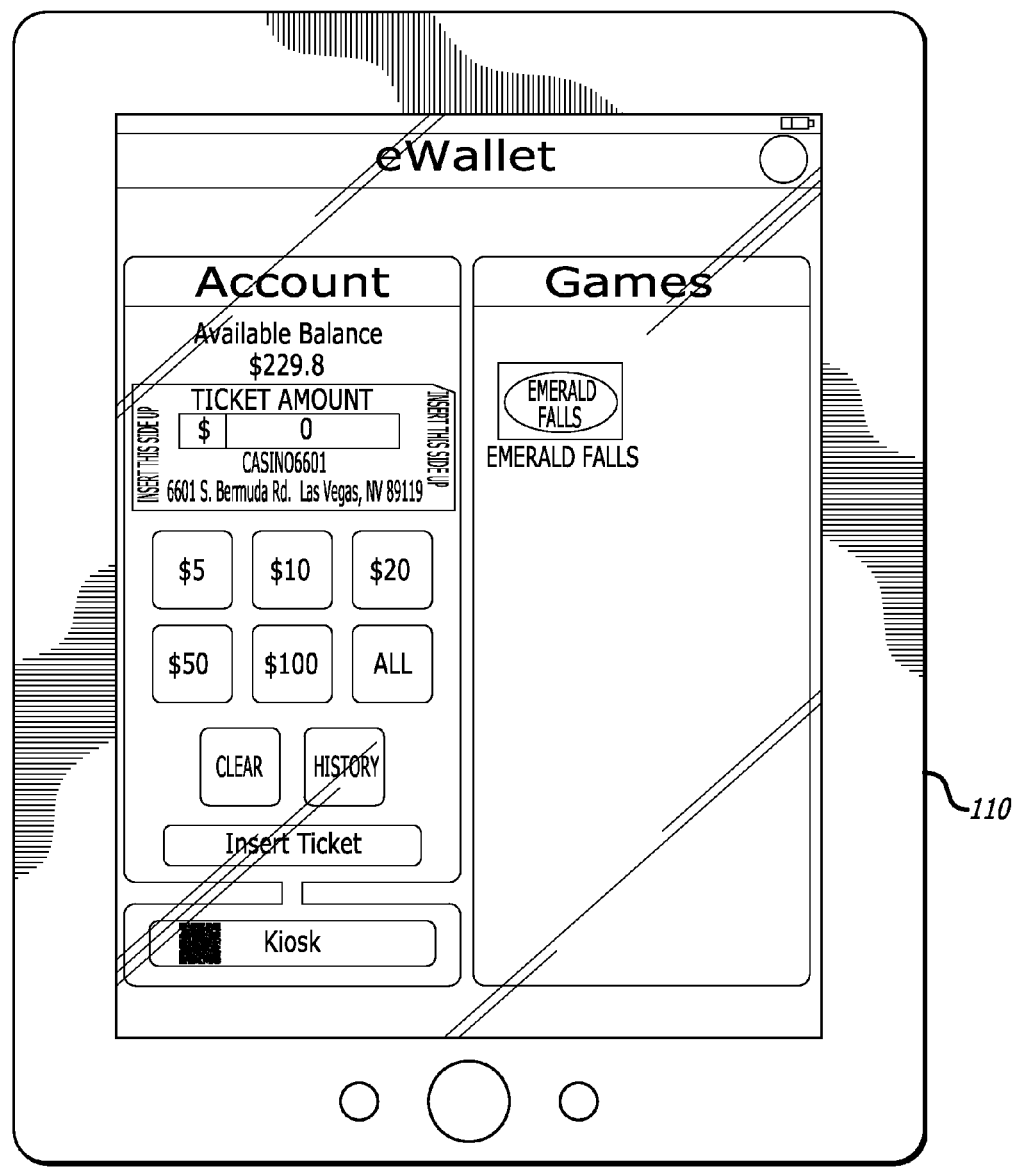
FIG. 10 illustrates an embodiment of the Mobile application.

A preferred embodiment of this mobile device-enhanced system 100 enables players to play game sessions across mobile and conventional EGM platforms as shown in FIG. 10. Additionally, some aspects of this mobile device-enhanced system 100 are directed towards the transfer of funding between electronic gaming machines, mobile devices, and paper tickets, as well as cash/credit cards.

According to the various embodiments the meters associated with the EGM are updated even through play that is occurring remotely on a mobile device. The reporting related to EGM events to a slot accounting system (SAS) therefore remains and to the system appears transparent. Further, the recordation of events which takes place at the EGM, such as recording a certain number of prior plays to resolve disputes, still occurs.

Figure 11:
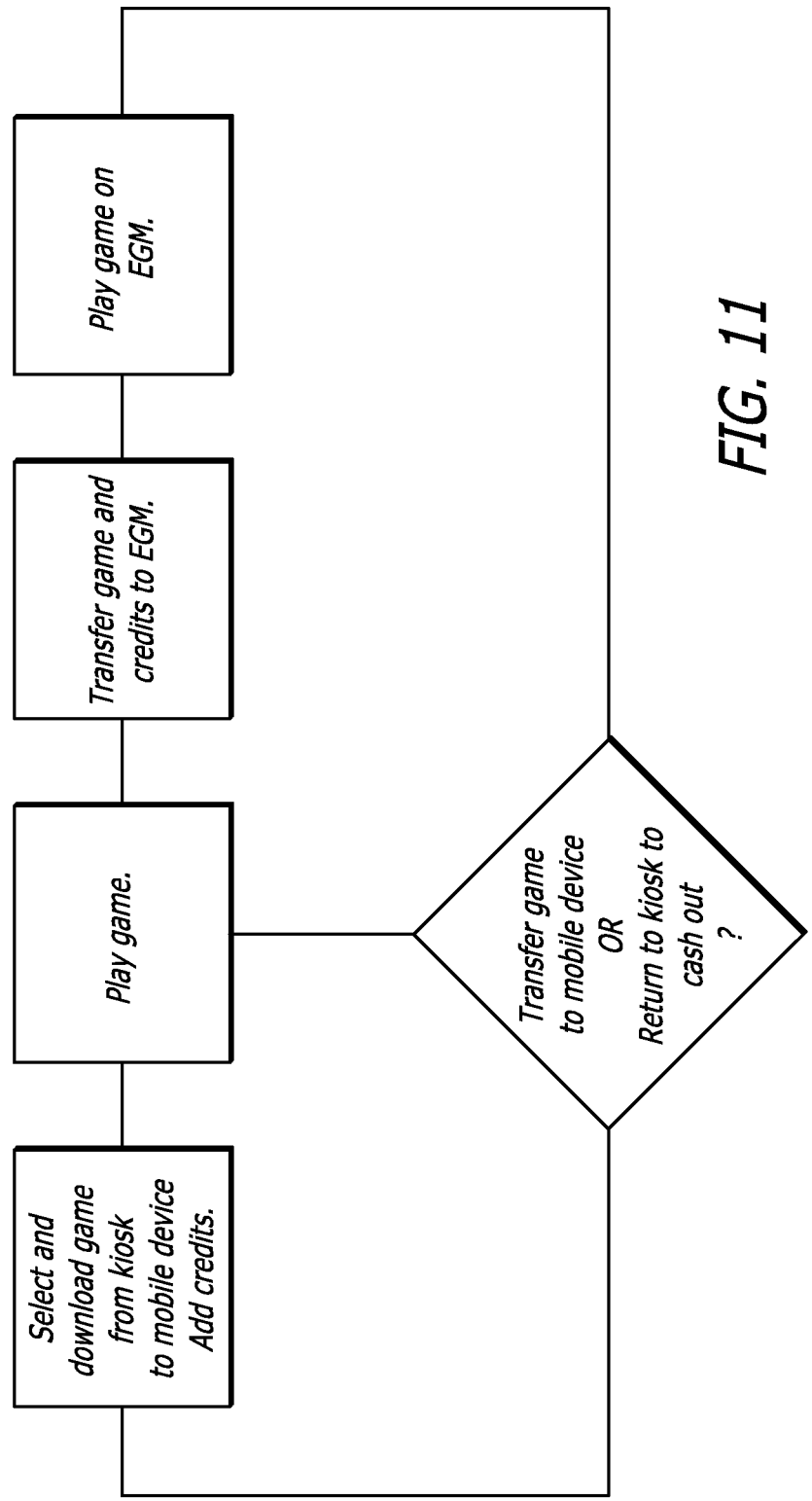
FIG. 11 illustrates a player's perspective of the operation of a preferred embodiment.

The Mobile Wallet:

In embodiment of this mobile device-enhanced system 100, the mobile device 110 acts (from the player's perspective) as a mobile wallet. However, in actual implementation and functionality, the mobile device 110 does not store the funds. These financial transactions and related transaction records are stored in a database on a server. The mobile device 110 must therefore have network connectivity to be functional. This is a configuration that may be achieved through the use of smart phones and ubiquitous nature of network infrastructure, such as 3G or WiFi mobile phone networks. In a preferred embodiment of the mobile device-enhanced system 100, the mobile device 110 also has a rear-facing camera that is capable of acquiring QR codes or barcodes. Specifically, FIG. 11 illustrates how a player may interact with the mobile device-enhanced system 100.

Figure 12:
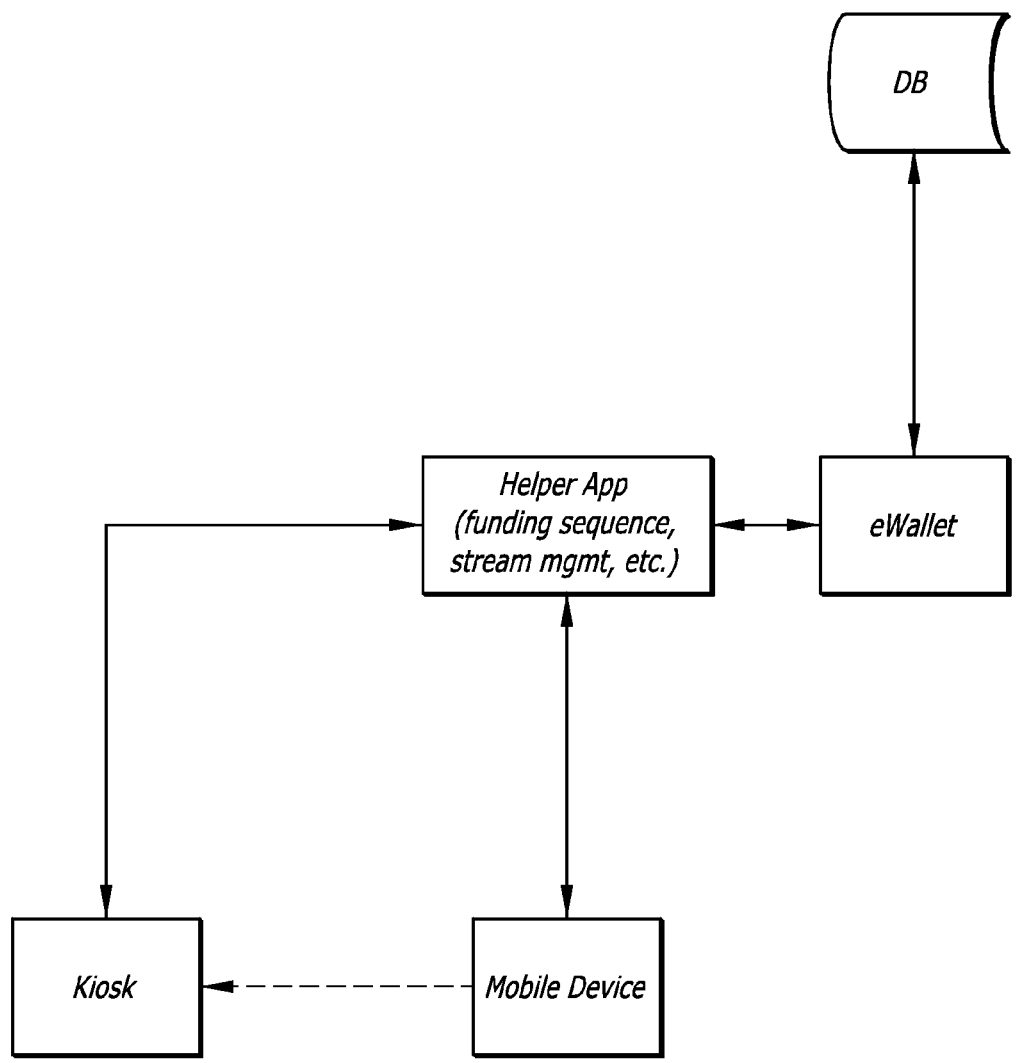
FIG. 12 illustrates a system overview.

In one embodiment of the mobile device-enhanced system 100, the mobile wallet is configured to interface with via an application that is loaded onto the mobile device 110 (as well as on kiosks and EGMs 130). Accordingly to one embodiment, FIG. 12 shows how this helper application interacts with other elements of the mobile device-enhanced system 100, such as kiosks and EGMs 130.

In one embodiment of the mobile device-enhanced system 100, security levels are utilized for identification and/or authentication during the association process. These security components include identification and/or authentication of the device ID of the gaming machine and mobile device, the user name of the player, and the password of the player. In some embodiments of the mobile device-enhanced system 100, biometrics are used to assist in the security efforts of the employed to access the mobile device and the player's financial account. In such an embodiment, a biometric reader may be used which may take a variety of forms, for instance, a fingerprint reader, iris scan, microphone and voice recognition software, hand vein pattern detection, or combinations thereof. In alternate embodiments, a patron's written signature may be digitized and verified against a signature database. For example, a player may sign on a surface computer display with finger or stylus. Biometric analysis may be performed at the gaming system (e.g. table or arcade style gaming systems) or may be performed by remotely located remote system computer system. A player's unique PIN may be used with foregoing identification and authentication techniques.

Also, for example, a player's identity and proximity may be detected by the sensor subsystem or other subsystem of the gaming system. For instance, a transponder carried by a piece of media or a wireless communication device which is carried by or otherwise associated with a player may be wireless detected via wireless interrogation. The piece of media may take any of a variety of forms, for instance a loyalty program card, driver's license, credit, debit or prepaid card. Proximity data acquired by the gaming system may, for example, include a location in the casino (e.g., x, y, and z coordinates or GPS data). The gaming system or some other system may associate the proximity data with a player identifier. Based at least one part on the location coordinates, the system may create a logical relationship between the player identifier and a particular gaming system, a table identifier, seat identifier and/or player position identifier.

A player may identify him or herself at the gaming system by placing a piece of media (e.g. loyalty program or patron club card, driver's license, credit, debit or prepaid card) on the playing surface. A sensor subsystem may read the media, and a CMP/CMS system may identify the player from the read information. The display subsystem may display indicia representing cash and/or point balances one or more accounts associated with the player. The player may employ a user interface to transfer funds from their account, for example, to a credit meter of the gaming system or as virtual chips. The transfer may require entry and approval of a personal identification number (PIN), biometric data, and/or password. The user interface may include one or more user selectable icons displayed on or below the playing surface, or some separate device such as a PIN pad, keypad or keyboard, for example located at each seat. Transfers may employ appropriate security protocols and encryption, for example AFT or WAT transfer protocols of SAS or the GSA G2S class, respectively.

In some embodiments, the mobile device-enhanced system 100 facilitates wireless transfer of funds from a personal computing device and/or wireless communication device capable of performing funds transfer using the Mobile Wallet inside the device, from a remote financial institution, or from other points or cash funds account. Personal computing and/or wireless communication devices may take a variety of forms, for example a cell phone, iPhone, personal digital assistant (PDA), laptop computer, BLACKBERRY, TREO and other such devices. The device may establish wireless communication with the table or arcade style gaming system or with a casino patron account. Funds may be debited from or credited to the device or a remote financial account. The communication protocol may take a variety of forms, for example, Bluetooth or WiFi, but other standard networking protocols are envisioned as long as the protocols support security via authentication and/or encryption of the transmissions and transactions.

Funding Game Play Using the Kiosk:

Another embodiment of the mobile device-enhanced system 100 facilitates a kiosk to be used to enable a player to add or release funds from their play game. This is performed in a manner somewhat similar to a conventional Ticket-In-Ticket-Out (TITO) system, but without the use of tickets, ticket printers, or ticket readers. The kiosk does not require a ticket printer (or bill validator) for other funding sources, such as credit cards, debit cards, and the like.

Figure 13:
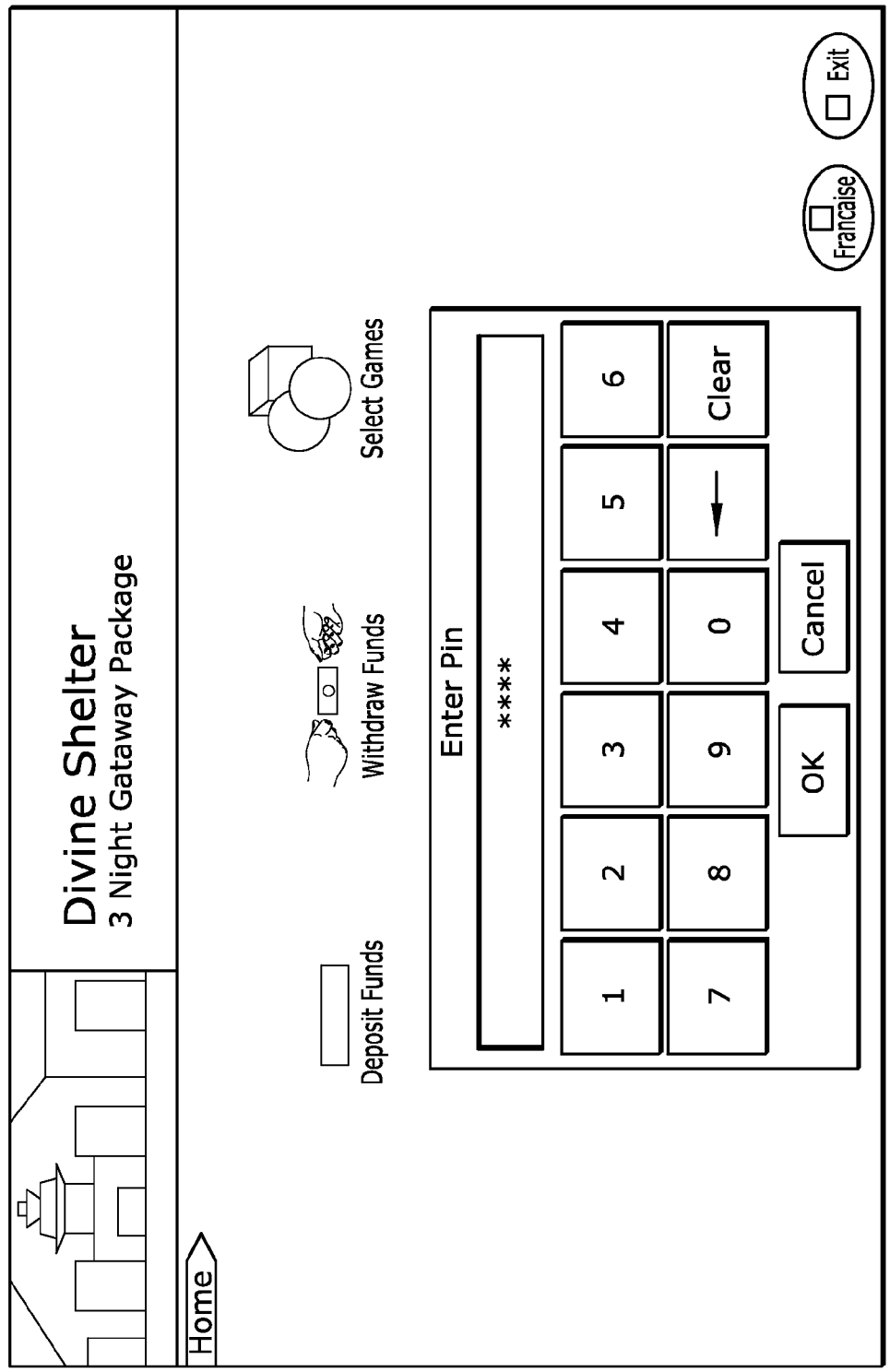
FIG. 13 illustrates an example of a Kiosk implementation.
Figure 14:
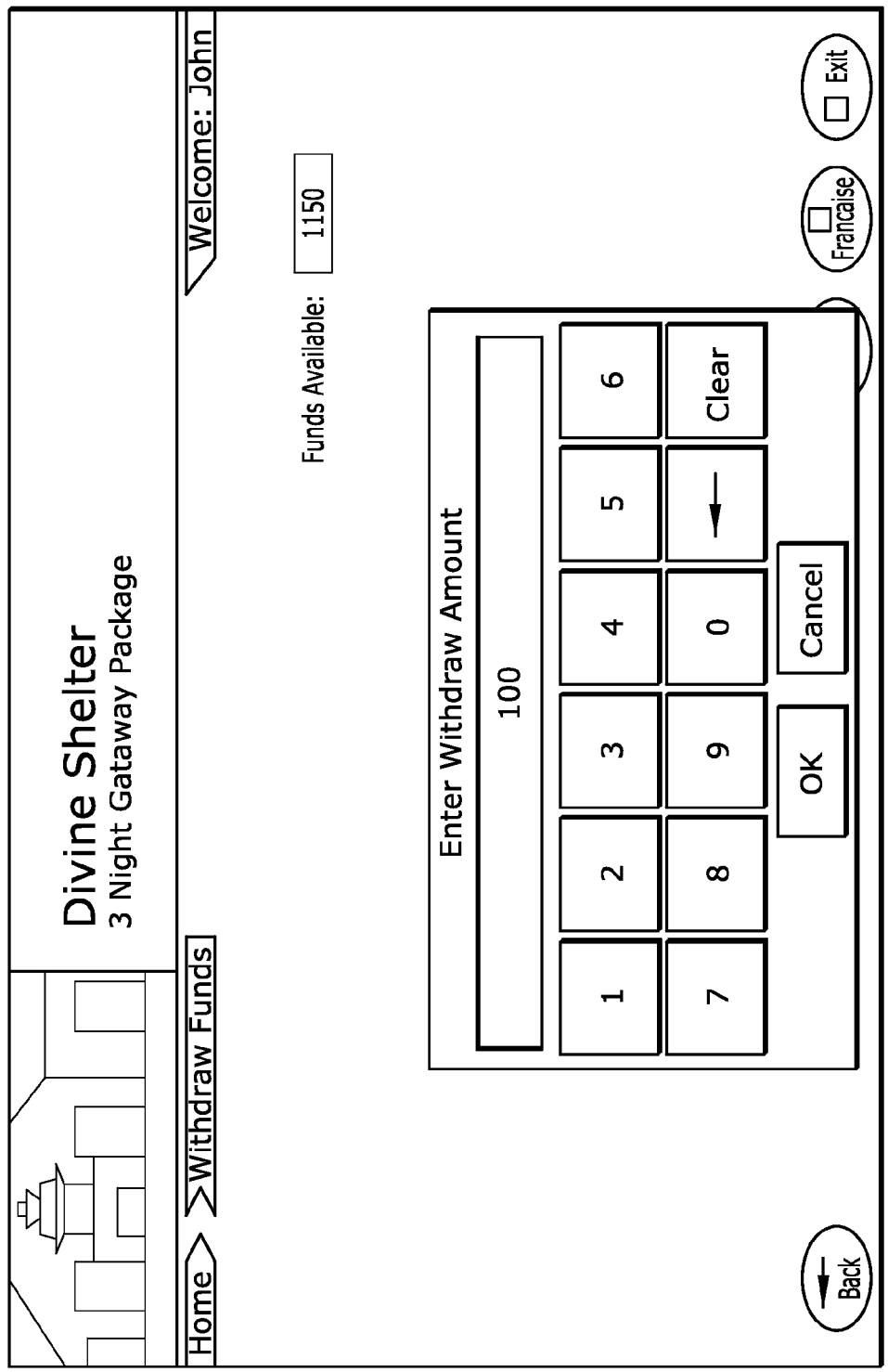
FIG. 14 illustrates Kiosk integration using the Application for funding.

Referring now to FIG. 13 and FIG. 14, in one embodiment of a kiosk in the mobile device-enhanced system 100 is shown. A player may swipe their credit card or debit card to access funds, or insert cash via a bill acceptor. These funding sources may be applied to a mobile wallet using the mobile device-enhanced system 100.

Figure 15:
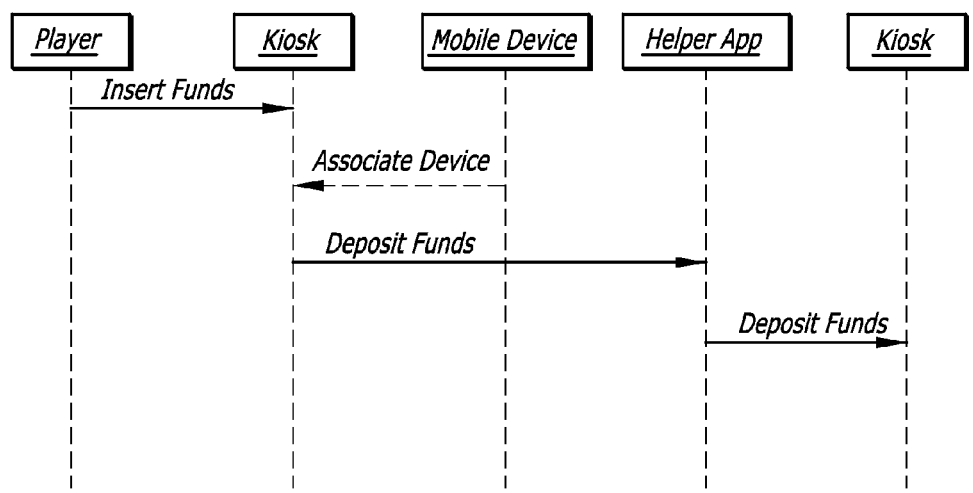
FIG. 15 illustrates a Kiosk Mobile device funding without player card.
Figure 16:
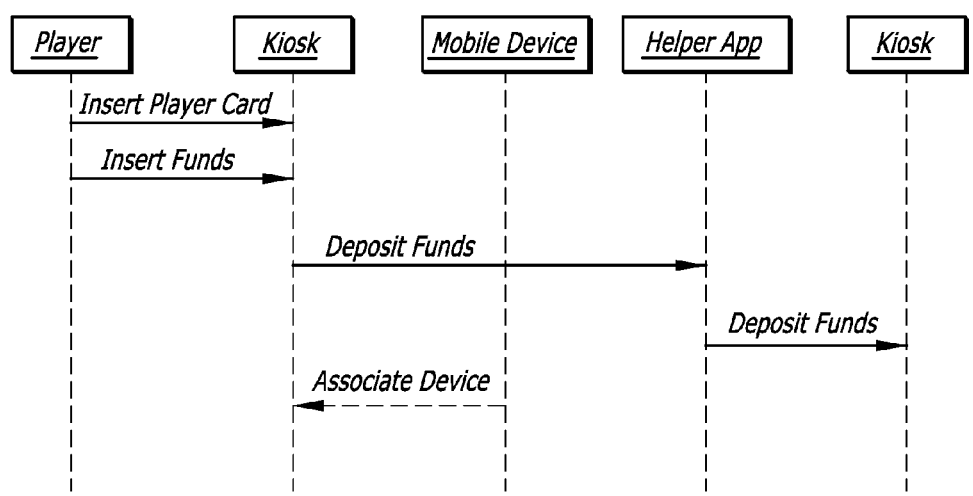
FIG. 16 illustrates a Kiosk Mobile device funding with player card.

To apply funds to a mobile wallet using the mobile device-enhanced system 100, the player must either associate a mobile device 110 or player tracking card with the kiosk. As shown in FIG. 16, to associate a player tracking card with the kiosk, the player simply swipes the card when prompted. To associate with a mobile device 110 with the kiosk, the kiosk preferably uses a QR/barcode reader. The mobile wallet application has the capability to display a QR code on the display of the mobile device 110. In response to prompting, the player activates the association function of the mobile application and places the mobile device 110 (e.g., smart phone) under the barcode reader. As shown in FIG. 15, in such an embodiment, the kiosk application then reads the QR code and from the display of the mobile device 110 and uniquely identifies the mobile device, and thus, its mobile wallet account in the database.

In either case when the association is complete, funds are in the mobile wallet and can be used at an EGM 130 or on a mobile device 110 for game play. In a further enhancement, for mobile device play, the player can choose the initial game or available game suite from the kiosk as well.

Figure 17:
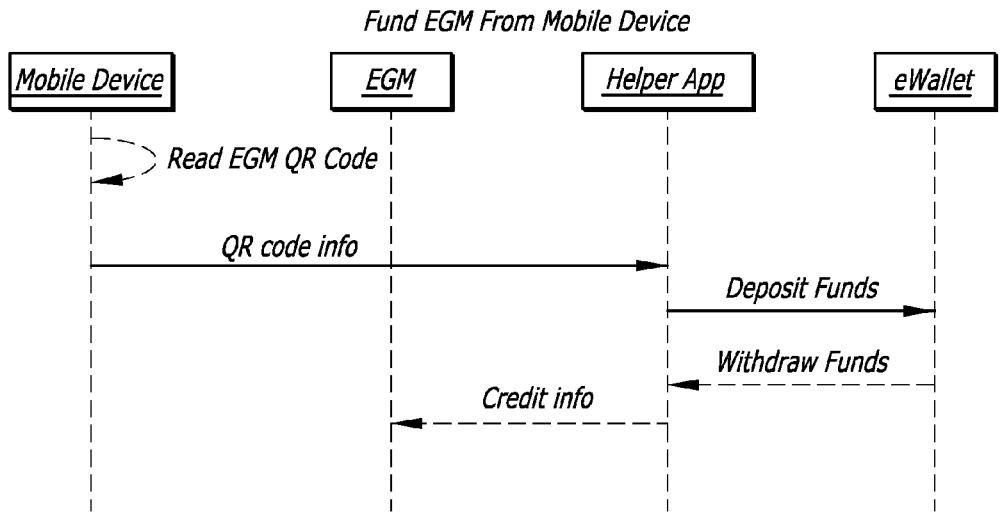
FIG. 17 illustrates an electronic gaming machine receiving funding from a mobile device without using a player card.
Figure 18:
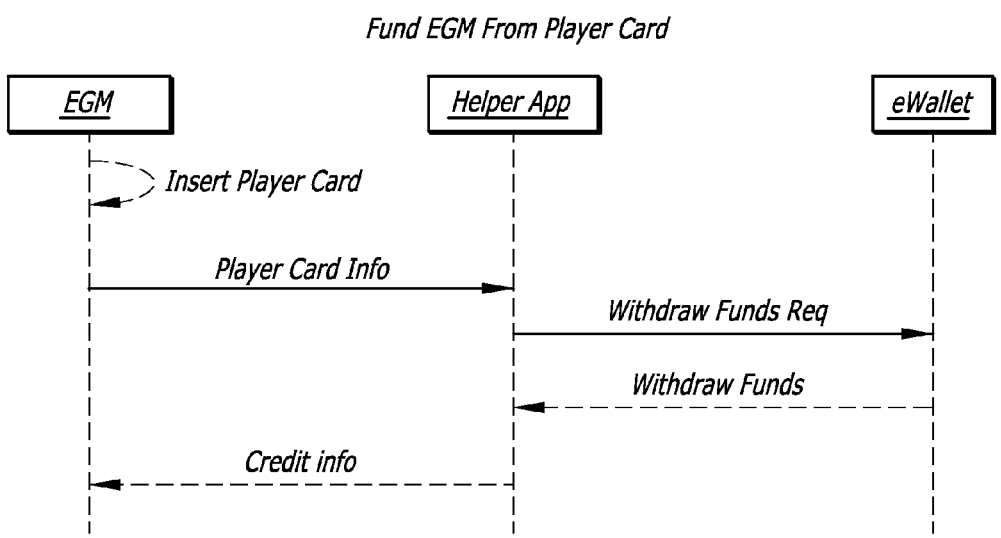
FIG. 18 illustrates an electronic gaming machine receiving funding from a player card.

Funding Game Play at an EGM:

As shown in FIGS. 17 and 18, using the mobile device-enhanced system 100, a player may also fund game play at an EGM 130 using a mobile device 110 or player card.

Specifically, FIG. 17 and FIG. 18 each show possible transaction flows. In one of the scenarios shown, a player card is not used, while in the other scenario shown, a player card is in use.

Figure 19:
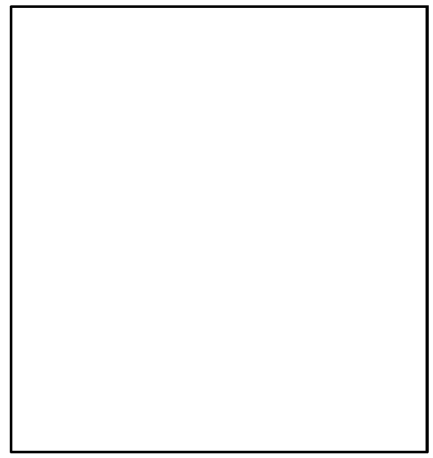
FIG. 19 illustrates a Mobile application to perform association with an electronic gaming machine.
Figure 20:
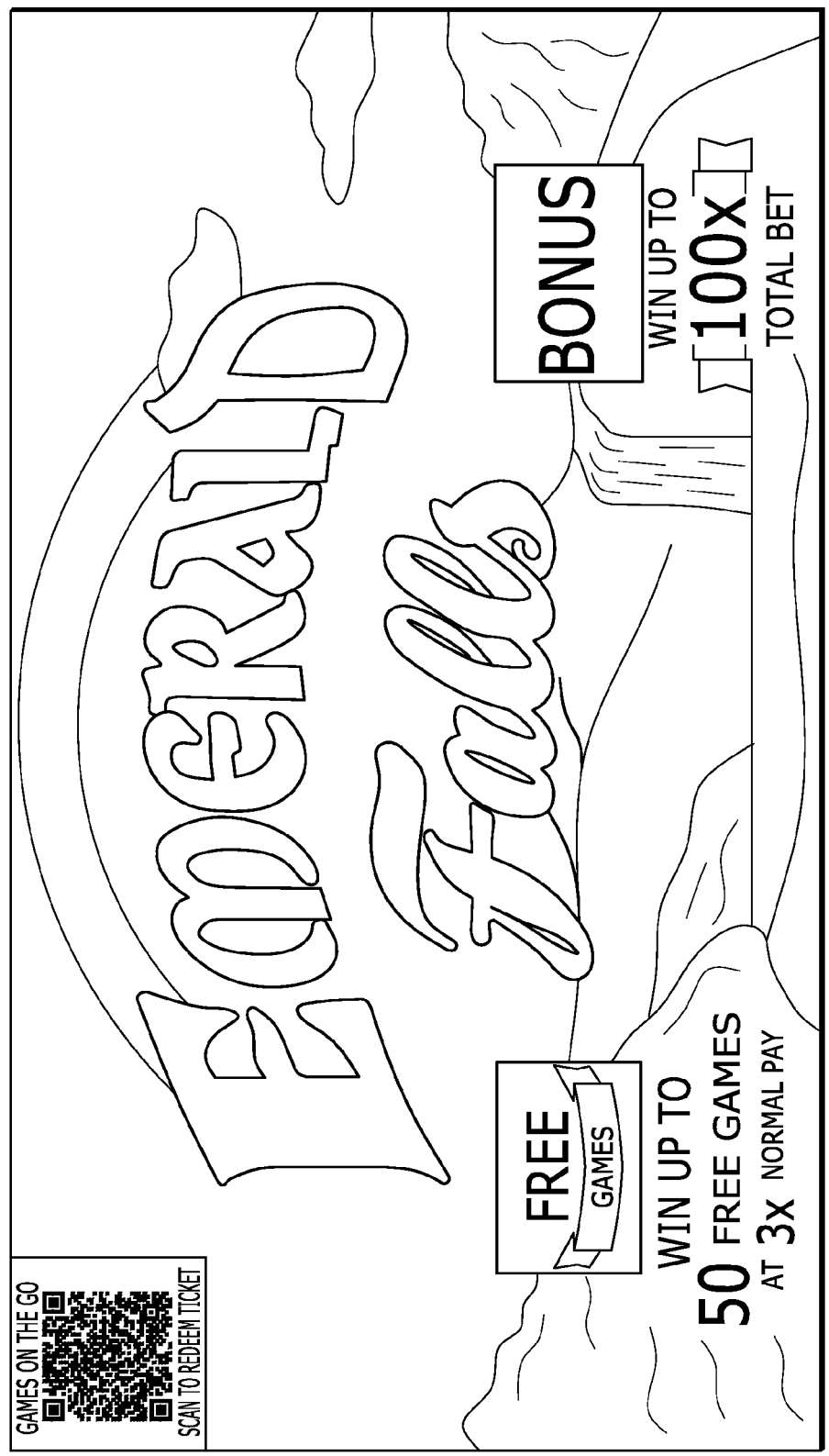
FIG. 20 illustrates an electronic gaming machine artwork with QR code for mobile association.
Figure 21:
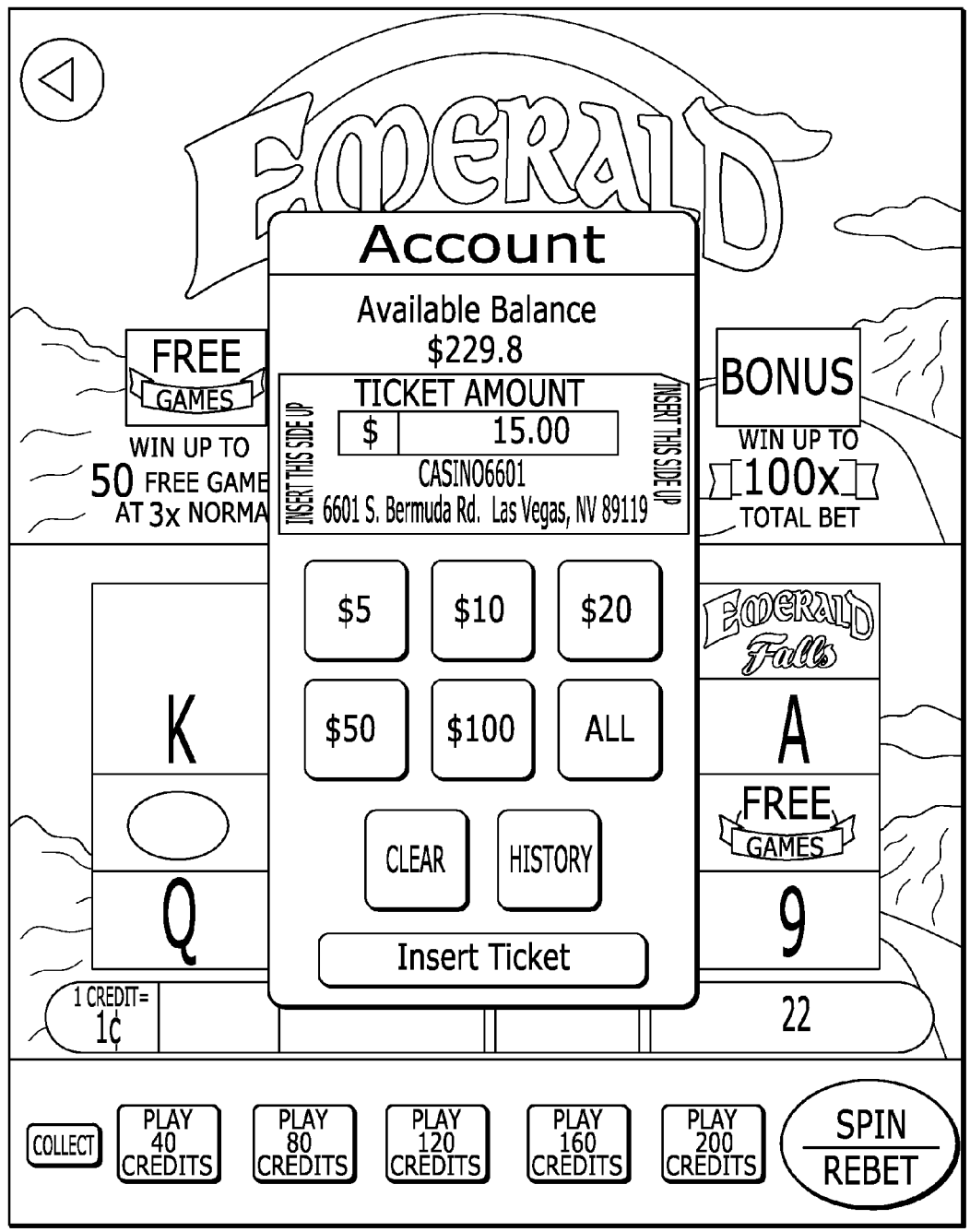
FIG. 21 illustrates a mobile version of game with mobile wallet integration.

In one embodiment of the mobile device-enhanced system 100 where a mobile device 110 is being used, the player associates the mobile device 110 with the EGM 130. This is achieved by bringing up an association function of the mobile device 110, as shown in FIG. 19. In this embodiment, the player then points the camera of the mobile device 110 at the EGM 130, which is modified to display a QR code on its artwork as seen in FIG. 20. This QR code uniquely identifies the EGM 130 and enables the mobile wallet helper application to direct the funds being withdrawn to be correctly deposited on the EGM. As shown in FIG. 21, the user interface for this transaction may be presented on the mobile device 110. Conversely, funds won or inserted into the bill acceptor of the EGM 130 may be delivered to the mobile wallet upon cashout, for use on the mobile device 110 or at a kiosk, as described below.

Multi-Platform Game Play:

In some preferred embodiments, a player may switch their game play from an EGM to a mobile device and back again. This type of game transfer between platforms is referred to herein as "Games on the Go." Once a mobile device 110 and an EGM 130 are associated with each other, a gaming session can be moved from one to the other. Additionally, once a mobile device 110 and an EGM 130 are associated with each other, funding also can be moved from one to the other. In one embodiment of the mobile device-enhanced system 100, this association may be preferably performed by the QR code acquisition described above with respect to FIG. 20, or via the insertion of a player tracking card to associate a player tracking account with both the EGM 130 and mobile device 110. In addition to these preferred methods, alternative methods could include manual input of an account name/PIN at the EGM 130 or communication over Bluetooth or NFC between the EGM and the mobile device 110.

Figure 22:
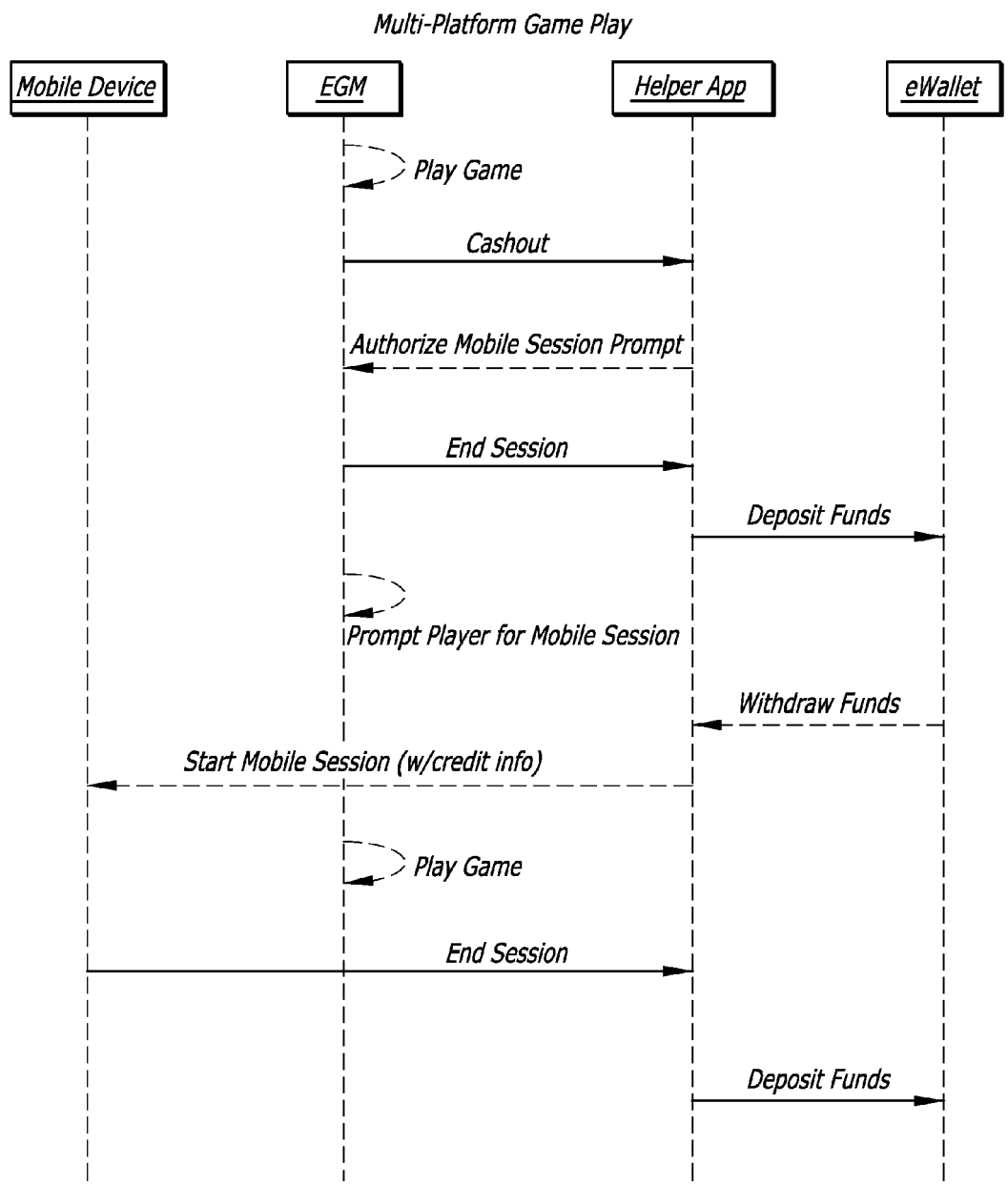
FIG. 22 illustrates an overall process for combined game play between a mobile device and an electronic gaming machine without using a player card.
Figure 23:
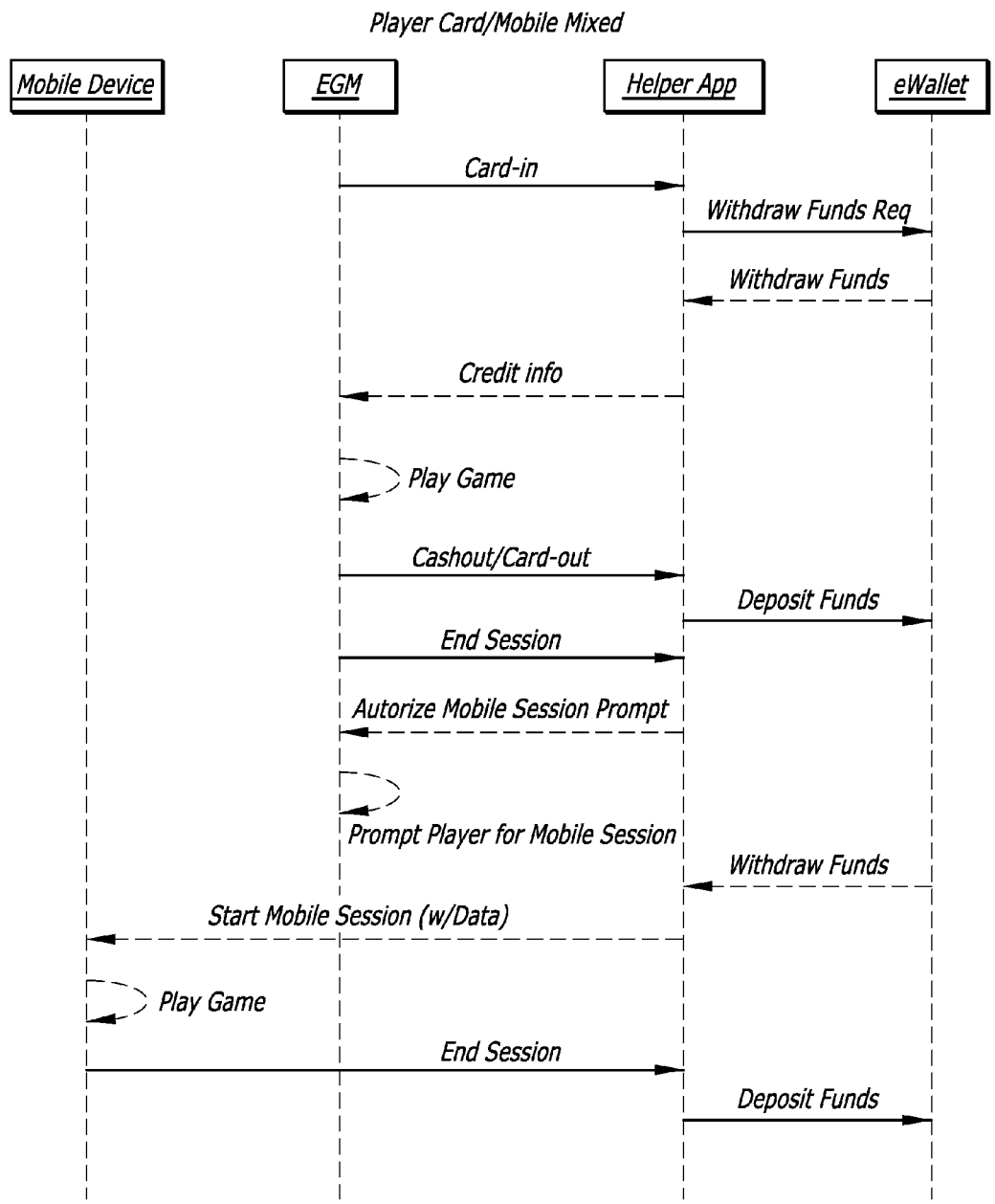
FIG. 23 illustrates an overall process for combined game play between a mobile device and an electronic gaming machine with a player card.

Transactions which may trigger the movement of the session could include a QR scan by the player, which would move the gaming session from a mobile device 110 to the EGM 130. As shown in FIG. 22, pressing the cashout button at the EGM 130 would initiate (or prompt) movement of the gaming session from the EGM to the mobile device 110 (i.e., in the opposite direction). As shown in FIG. 23, in the case of a transaction in which a player card is being used, carding out would also prompt movement (i.e., transfer) of the gaming session.

Figure 24:
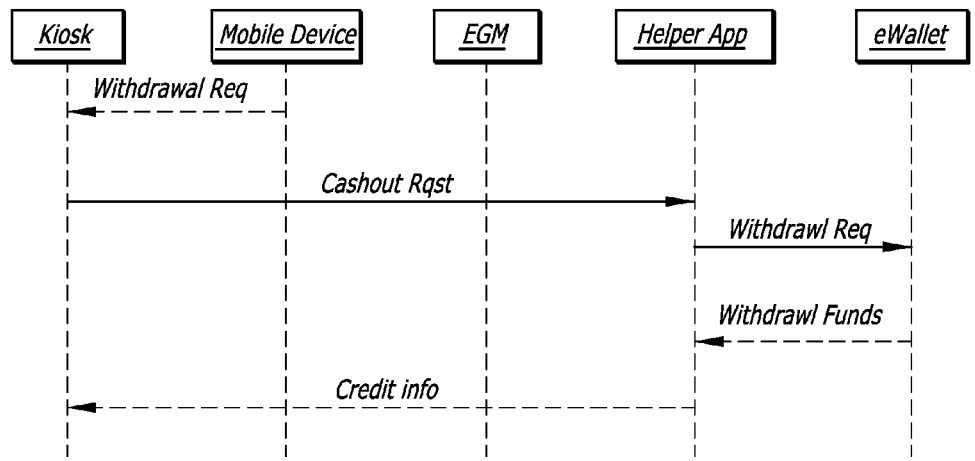
FIG. 24 illustrates a Kiosk redemption embodiment from a mobile device without player card.
Figure 25:
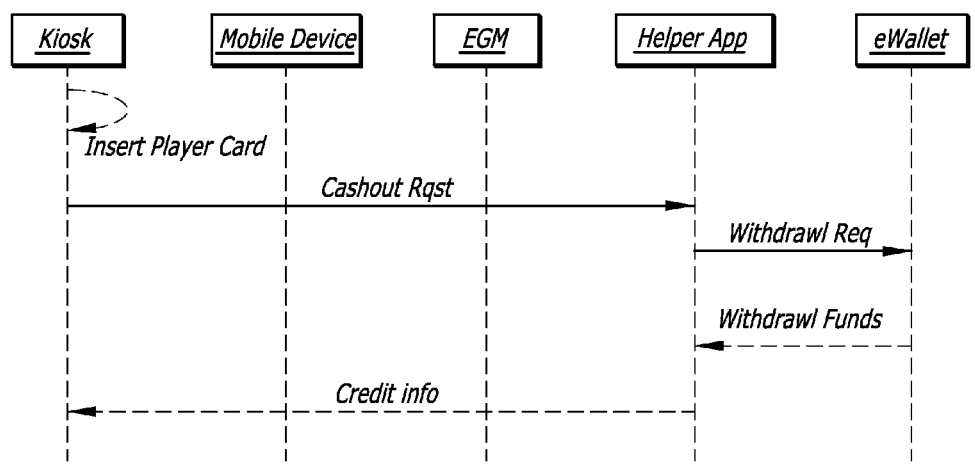
FIG. 25 illustrates a Kiosk redemption embodiment with a player card.

Kiosk Credit Redemption:

As noted above, in some preferred embodiments of the mobile device-enhanced system 100, the kiosk may be used to redeem credits as cash or direct funding into an external (bank/credit card) account. The transaction flows for these embodiments are shown in FIG. 24 and FIG. 25. Specifically, in FIG. 24 the players use their mobile devices 110 to identify the correct mobile wallet account to the kiosk. In one preferred embodiment, the players do this by pressing "Redeem ticket" on their mobile device 110. This causes a mobile device 110 to display a QR code which can be scanned by the QR/barcode scanner affixed to the kiosk. Importantly, this transaction corresponds to the redemption process of a conventional physical ticket (which may be redeemed by being scanned by the same scanner).

Alternatively, as shown in FIG. 25, if a player has a player tracking card, the player can insert this card in the kiosk. This allows the kiosk to identify the mobile wallet account and present options to the player for withdrawal of cash.

Physical Ticket Acquisition by a Mobile Device:

An additional feature of the mobile device-enhanced system 100 enables a player to convert existing physical tickets into mobile wallet funds by the use of a barcode scanner application built into the mobile application. This scanner application uses the rear camera on the mobile device 110 to read the barcode on the ticket and deposit the funds into the mobile wallet account. The physical ticket can then be discarded.

In one embodiment of the mobile device-enhanced system 100, the system enables players to easily consolidate tickets and also convert tickets into funds even after they have left the casino, which is conventionally difficult. Such funds may be used for online game play, or at a later date in the casino without having to keep possession of physical tickets.

In some embodiments, the mobile device-enhanced system 100 provides features that include: (1) integration with existing ticket printer and bill acceptor infrastructure, (2) handling both player tracked accounts and anonymous players, (3) ease of use for player comfortable with TITO (inserting their phone into a scanner rather than a ticket, similar to the way supermarket self-serve checkouts or boarding pass terminals at airports may work), (4) not requiring extra peripherals at the EGM (since association is achieved by display of QR code on artwork and only a software change is needed), and (5) enabling players to fund an EGM from their mobile device or vice versa.

Preferred embodiments of the mobile device-enhanced system 100 typically include: (1) a smartphone or tablet with rear facing camera and network connectivity (e.g., WiFi or Broadband), (2) QR code technology as the preferred visual encoding of identifiers, and (3) a Kiosk with an optical scanner for reading barcodes/QR codes. Moreover, preferred embodiments of the mobile device-enhanced system 100 typically include structural and/or operational features such as: (1) use of mobile device as a way of transferring funds between multiple EGMs or EGMs and kiosks, (2) conversion of paper tickets into mobile wallet funds, and (3) seamless transfer of funds along with game session.

A preferred embodiment of this gaming system, which includes cross platform persistent gaming sessions using a mobile device, leverages existing mobile "smart phones." By way of example only, and not by way of limitation, such smart phones include Apple's iPhone series, Google's Droid and Nexus One series, Palm's Pre series, and RIM's Blackberry series of smart phones. Most, if not all, of these smart phones include a built-in camera that can be controlled by software applications. Accordingly, preferred embodiments of this gaming system "move" the camera from the gaming machine to a smart phone. In more detail, the components that make up the gaming system having cross platform persistent gaming sessions using a mobile device may be seen in FIGS. 10-25.

The captured image is also sent up to the CMS via the secure cellular internet connection. As an alternative to the use of secure connections over the internet, a WiFi local network may also be used if it is present in the casino. At the CMS, the image analysis software passes the self-portrait to the facial recognition system.

In addition to the credentials described above, in another aspect of some embodiments, the smart phone itself may be "married" to a particular user. In such embodiments, in every transaction a unique identifier for the phone may also be transmitted. This identifier is set at the time of installation, and cannot be changed by the technician. Alternatively, the phone's IMEI (International Mobile Equipment Identity) number or other cellular identifier may be used.

In addition to a barcode on the exterior of the gaming machine, each peripheral within the machine may also have a barcode. By scanning the barcode with the camera on the mobile phone using the mobile phone application, context sensitive help may also be retrieved for maintaining the peripheral, or for determining the asset status or configuration of a peripheral.

In such embodiments of the disclosed gaming system, smart phones are utilized that include a built in gyroscope, as well as location tracking technology such as a digital compass and a GPS system (Global Positioning System). These features enable the accurate position and orientation of the smart phones and its user to be derived. Additionally, some other embodiments of the disclosed gaming system use object recognition and OCR (Optical character recognition) techniques combined with location/orientation derivation to provide players in casinos easy ways of finding games, progressive jackpots, particular machines, and other players of their choice.

In another aspect of some embodiments, gaming systems are utilized that include mobile gaming capabilities. In such embodiments of the disclosed gaming system, smart phones are utilized that include built in object recognition technologies and OCR (Optical character recognition) techniques combined with location/orientation derivation to provide players in casinos with additional gaming options and opportunities. In one embodiment of a gaming system that includes mobile gaming capabilities, the gaming system leverages the possession by players of smart phones to enable the manufacturer to build profiles of players and target valuable players for promotions of key products of the manufacture.

Continuing, in some embodiments of the gaming system having mobile gaming capabilities, the "Geographic Restrictions" file includes some combination of cell tower identifier, reverse DNS lookup, and GPS address to restrict the eligibility of some bonuses. In another aspect of some embodiments, the "Demographic Restrictions" file includes some bonuses that are available to players in certain demographic groups such as age-ranges. In still another aspect, the "Time Restrictions" field includes bonuses that may be only available at certain times of the week or for a fixed length of time.

Referring now to the smart phone application of the gaming system having mobile gaming capabilities, the smart phone application is comprised of a number of smaller modules. In some embodiments, the smart phone application has a user interface that interfaces with the Player Web Interface module. This enables the smart phone application to provide periodic updates with new offers which may be targeted to the player.

An alternative for players who do not have access to a smart phone is that casinos or bars may be supplied with phones capable of running the mobile phone application. In the event of a qualifying win, the player calls for assistance and has an attendant or bartender performs the photo verification process.

In some embodiments of the disclosed gaming system, players may use their smart phone to take a photo of the machine and obtain access to the following capabilities: (a) Tournament across venues (e.g., each player signs in, time limited, and the like); (b) take photo of a game (or barcode) to download a mobile application version of the game; (c) obtain a free copy of the mobile game for winning some trivial amount (which ensures players play a game a minimum amount of time); and (d) take a photo of game to see what gaming machine manufacturer offers are available.

Some preferred implementations of the disclosed embodiments use (1) a smart phone for the client, (2) any suitable web server for communication with the smart phone and registration of players, and (3) OpenCV image analysis software. Additionally, some embodiments provide features that include, by way of example only: (1) alternative player tracking, bonusing, and a marketing method for gaming manufacturers, (2) the capabilities to work with existing games without requiring any modification, and (3) leveraging existing smart mobile phone infrastructure. In other aspects, some embodiments provide: (1) detection of a win by image analysis, without any access to game code; (2) detection of fraudulent entries by analysis of symbols displayed, meters on the screen, location and time of image taken; (3) capture of multiple images to prevent fraud and also more accurately detect wins; (4) alternative method of determining player value (e.g., using win amounts instead of using coin in); (5) enabling the addition of ad-hoc tournaments to existing games; and (6) enabling the targeted marketing of new games for valuable players.

Figure 26:
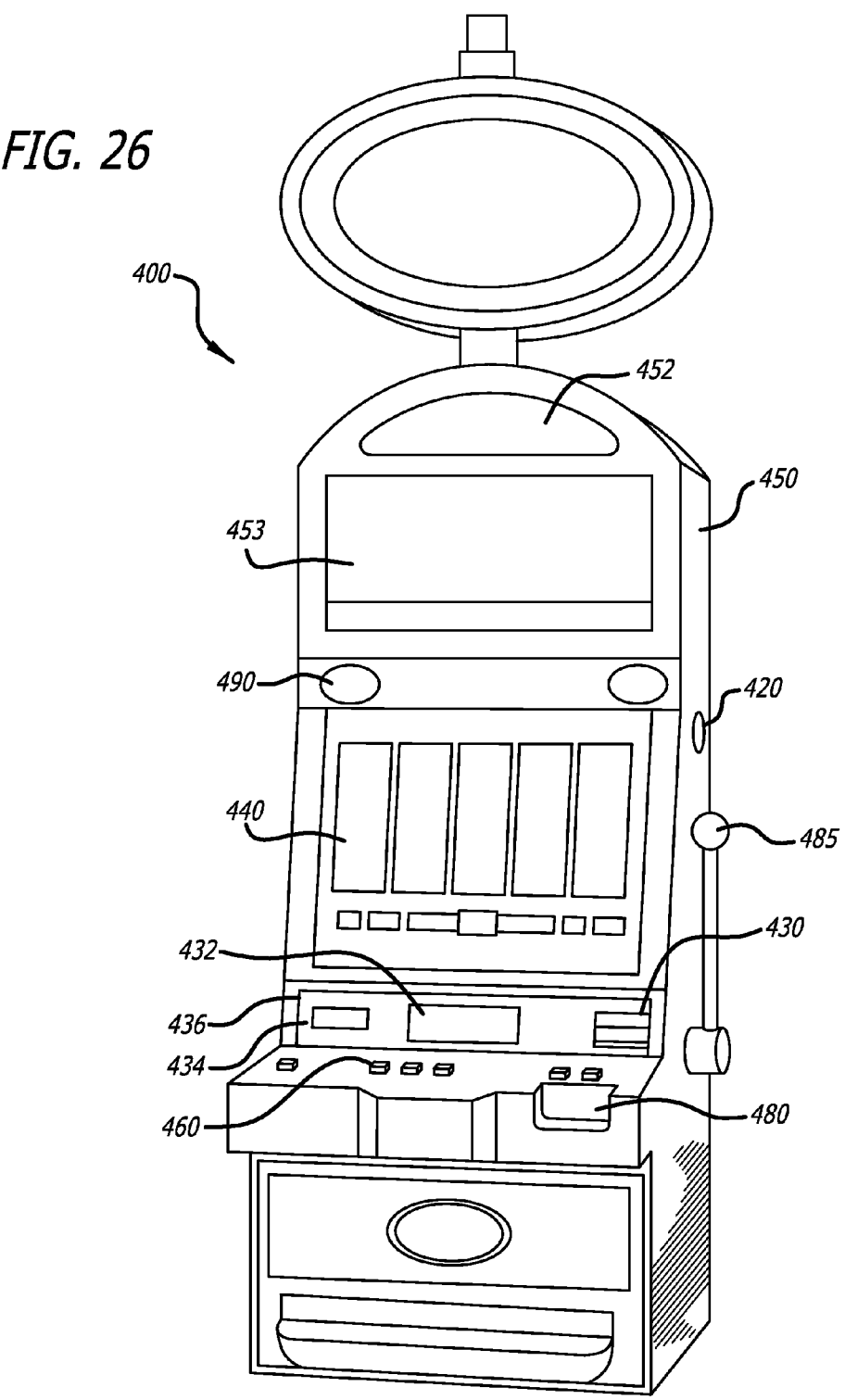
FIG. 26 is a perspective view of a gaming machine in accordance with one or more embodiments.
Figure 27:
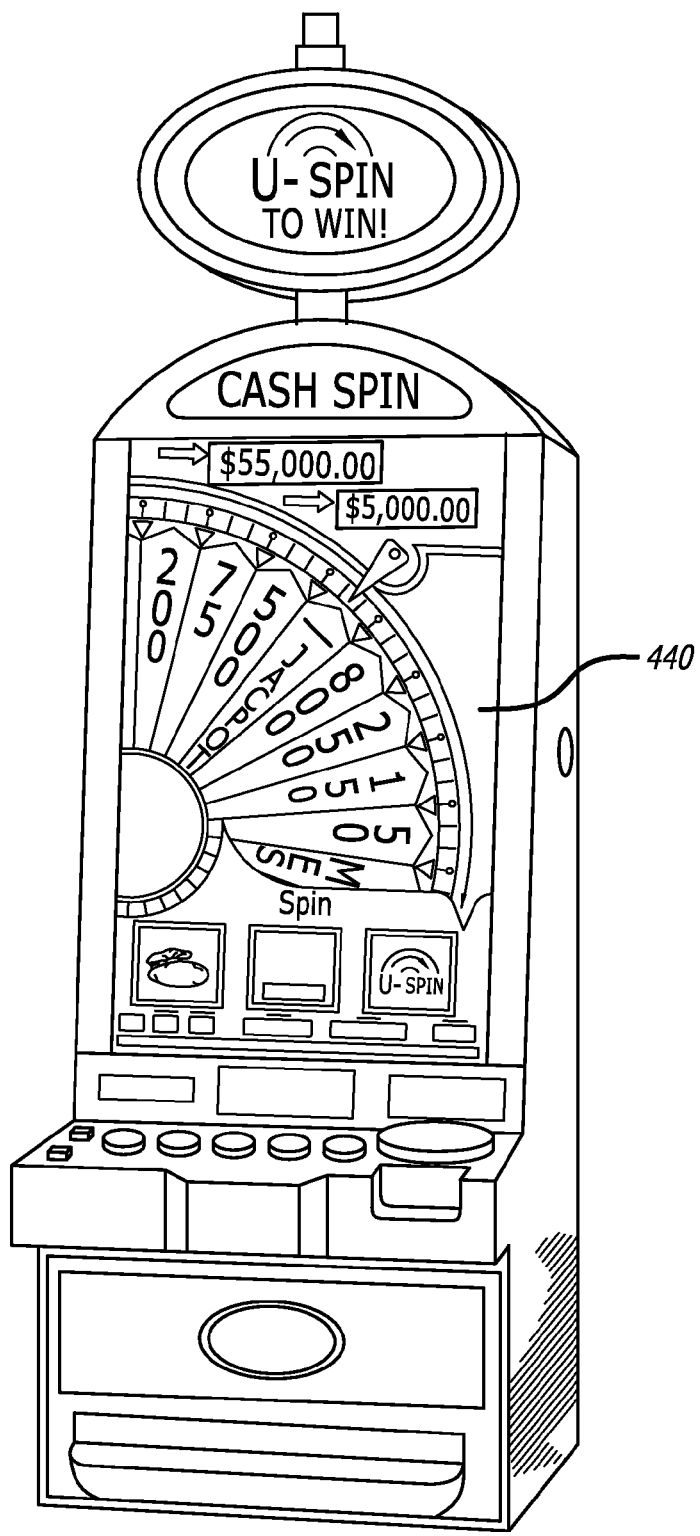
FIG. 27 is a perspective view of another embodiment of a gaming machine.

In accordance with one or more embodiments, FIGS. 26 and 27 illustrate a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480, and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

In another aspect of one embodiment, the plurality of player-activated buttons 460 may be used for various functions such as, but not limited to, selecting a wager denomination, selecting a game to be played, selecting a wager amount per game, initiating a game, or cashing out money from gaming machine 400. The Buttons 460 functions to input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, which is hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 440 is typically a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 27 illustrates an example of a portrait mode game display 440 having widescreen dimensions in accordance with one embodiment of the invention. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated in its entirety by reference. Furthermore, as described above, game display 440 may include transparent portions which cover and may interact with displays on mechanical reels, as described in U.S. application Ser. No. 12/113,112, entitled, "MECHANICAL REELS WITH INTERACTIVE DISPLAY," filed on Apr. 30, 2008, which is hereby incorporated in its entirety by reference.

Game display 440 may also present information such as, but not limited to, player information, advertisements and casino promotions, graphic displays, news and sports updates, or may even offer an alternate game. This information may be generated through a host computer networked with gaming machine 400 on its own initiative, or it may be obtained by request of the player using either (1) one or more of the plurality of player-activated buttons 460; (2) the game display itself, if game display 440 comprises a touch screen or similar technology; (3) buttons (not shown) mounted on game display 440 which may permit selections such as those found on an ATM machine, where legends on the screen are associated with respective selecting buttons; or (4) any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 28A:
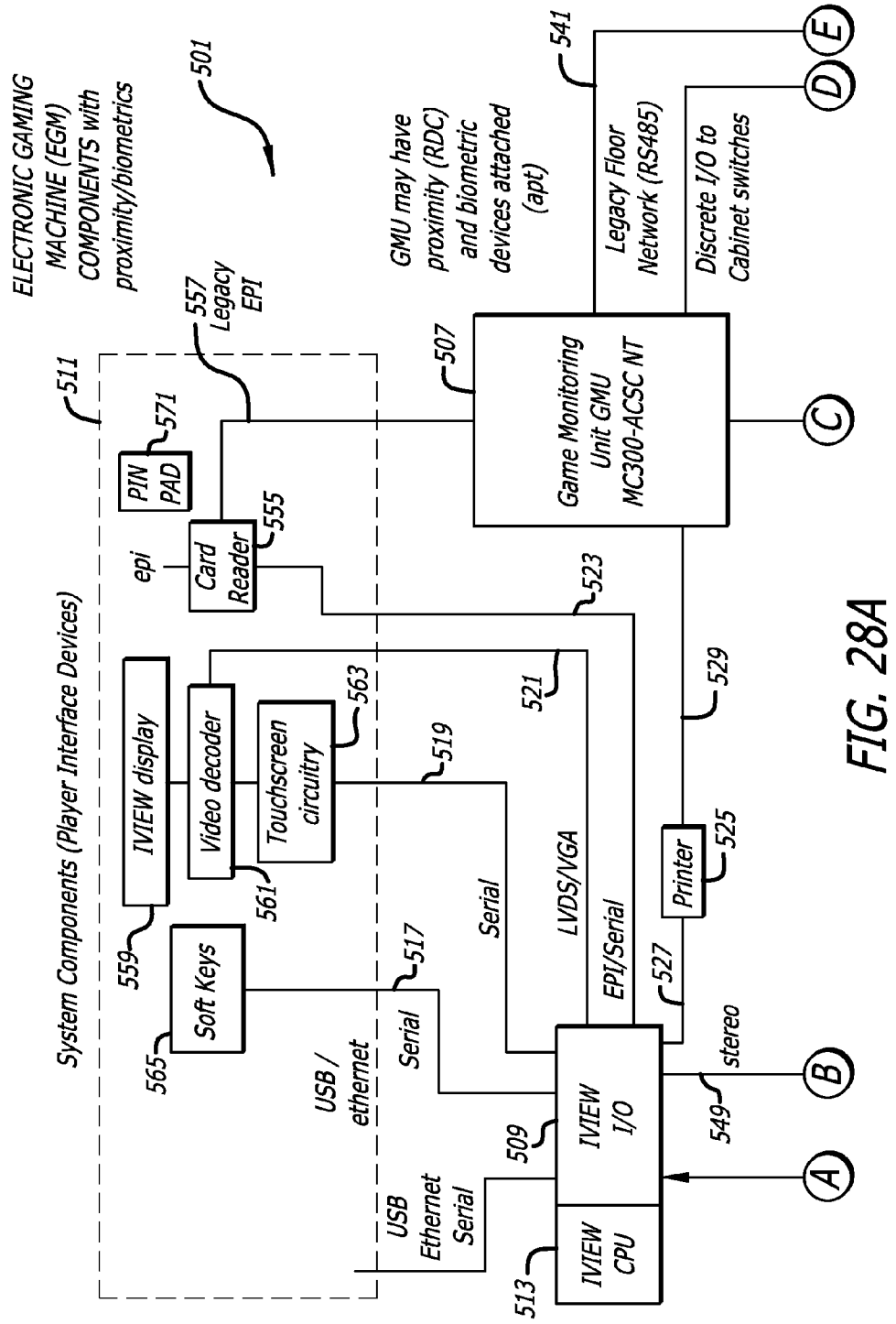
FIGS. 28*a* and 28*b* are block diagrams of the physical and logical components of the gaming machine of FIG. 26.
Figure 28B:
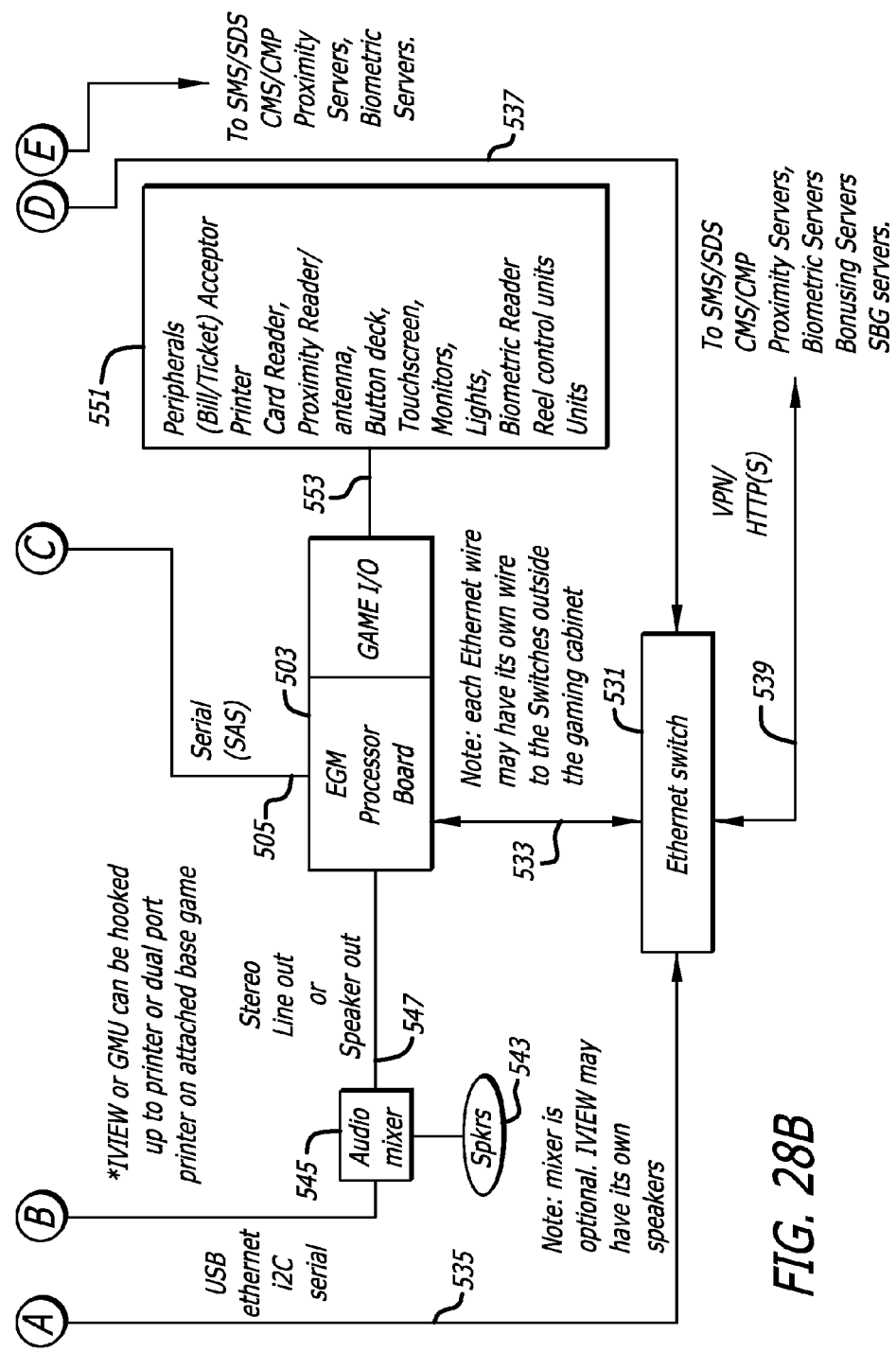

Referring to FIGS. 28*a* and 28*b*, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iVIEW unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having an interactive wheel feature game. The various components and included devices may be installed with conventionally and/or commercially available components, devices, and circuitry into a conventionally and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon.

The game program includes a random number generator to provide a display of randomly selected indicia on one or more displays. In some embodiments, the random number generator may be physically separate from gaming machine 400. For example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board, a GMU processor, and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509, which is operable as the player interface. PID 509 connects to card reader 555 through bus 523, display 559 through video decoder 561 and bus 521, such as an LVDS or VGA bus.

As part of its programming, the PID processor executes coding to drive display 559 and provides messages and information to a player. Touch screen circuitry interactively connects display 559 and video decoder 561 to PID 509, such that a player may input information and cause the information to be transmitted to PID 509 either on the player's initiative or responsive to a query by PID 509. Additionally, soft keys 565 connect through bus 517 to PID 509 and operates together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially-available Bally SDS/SMS) and/or casino management system (such as a commercially-available Bally CMP/CMS).

The GMU system component has a connection to the base game through a serial SAS connection and is connected to various servers using, for example, HTTPs over Ethernet. Through this connection, firmware, media, operating system software, or gaming machine configurations can be downloaded to the system components from the servers. This data is authenticated prior to installation on the system components.

The system components include the iVIEW processing board and game monitoring unit (GMU) processing board. The GMU and iVIEW (or other player tracking unit) can be combined into one like the commercially available Bally GTM iVIEW device. This device may have a video mixing technology to mix the EGM processor's video signals with the iVIEW display onto the top box monitor or any monitor on the gaming device.

Figure 29:
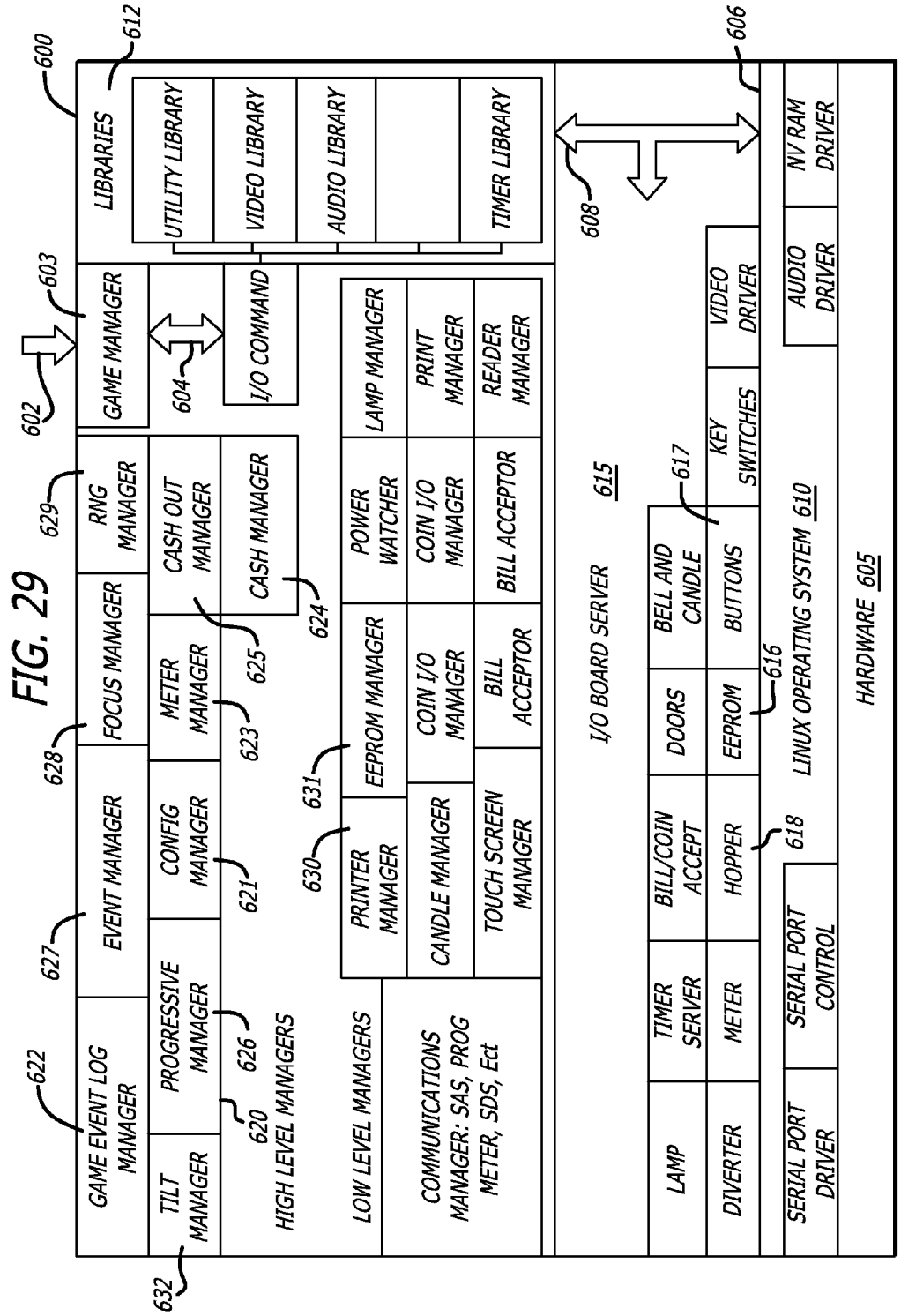
FIG. 29 is a block diagram of the logical components of a gaming kernel in accordance with one or more embodiments of the invention.

In accordance with one or more embodiments, FIG. 29 is a functional block diagram of a gaming kernel 600 of a game program under control of processor board 503, using gaming kernel 600 by calling it into application programming interface (API) 602, which is part of game manager 603. The components of game kernel 600, as shown in FIG. 29, are only illustrative and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such as a UNIX-based or Windows-based operating system, allows game developers interfacing to the gaming kernel to use any of a number of standard development tools and environments available for the operating systems. This is in contrast to the use of proprietary, low-level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general, (ii) kept to a minimum, and (iii) easier to leave than extract. In such cases, the low-level communications are handled within operating system 610, and the contents are passed to library routines 612.

Thus, in a few cases, library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able to make use of API 602 to use the capability over that of a cabinet having traditional monaural sound).

Game manager 603 provides an interface into game kernel 600, providing consistent, predictable, and backwards-compatible calling methods, syntax, and capabilities by way of game application API 602. This enables the game developer to be free of dealing directly with the hardware, including the freedom to not have to deal with low-level drivers as well as the freedom to not have to program lower-level managers 630, although lower-level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started. The configuration manager 621 has the data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger. Otherwise stated, the logger object is not aware of the contents of logged messages and events. The log manager's (622) job is to log events in non-volatile event log space. The size of the space may be fixed, although the size of the logged event is typically not. When the event space or log space fills up, one embodiment deletes the oldest logged event (each logged event has a time/date stamp, as well as other needed information such as length), providing space to record the new event. In this embodiment, the most recent events are found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters. The soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash-in (624) and cash-out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, and the like, that may generate errors. A random number generator manager 629 is provided to allow easy programming access to a random number generator (RNG), as an (RNG) is required in virtually all casino-style (gambling) games. The RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash-out devices correctly and selects any selectable cash-out denominations. During play, a game application may post a cash-out event through the event manager 627 (the same way all events are handled), and using a call-back posted by cash-out manager 625, and cash-out manager 625 is informed of the event. Cash-out manager 625 updates the credit object, updates its state in non-volatile memory, and sends an appropriate control message to the device manager that corresponds to the dispensing device. As the device dispenses dispensable media, there typically are event messages being sent back and forth between the device and cash-out manager 625 until the dispensing finishes. After the dispensing finishes, the cash-out manager 625, having updated the credit manager and any other game state (such as some associated with meter manager 623) that needs to be updated for this set of actions, sends a cash out completion event to event manager 627 and to the game application thereby. The cash in manager 624 functions similarly to cash out manager 625, addressing requirements for controlling, interfacing, and managing actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of an 8-bit command, and data writes to the EEPROM device to write the appropriate data in the proper location within the device. Any errors detected are sent as IPC messages to game manager 603. Preferably, all of this processing is asynchronously performed.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligently distributed I/O which debounces the buttons, in which case button module 617 may be able to communicate with the remote intelligent button processor to retrieve the button events and simply relay them to game manager 603 via IPC messages. In still another embodiment, the I/O library may be used for pay-out requests from the game application. For example, hopper module 618 must start the hopper motor, constantly monitoring the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional application are both fully incorporated herein in their entirety by explicit reference.

Figure 30A:
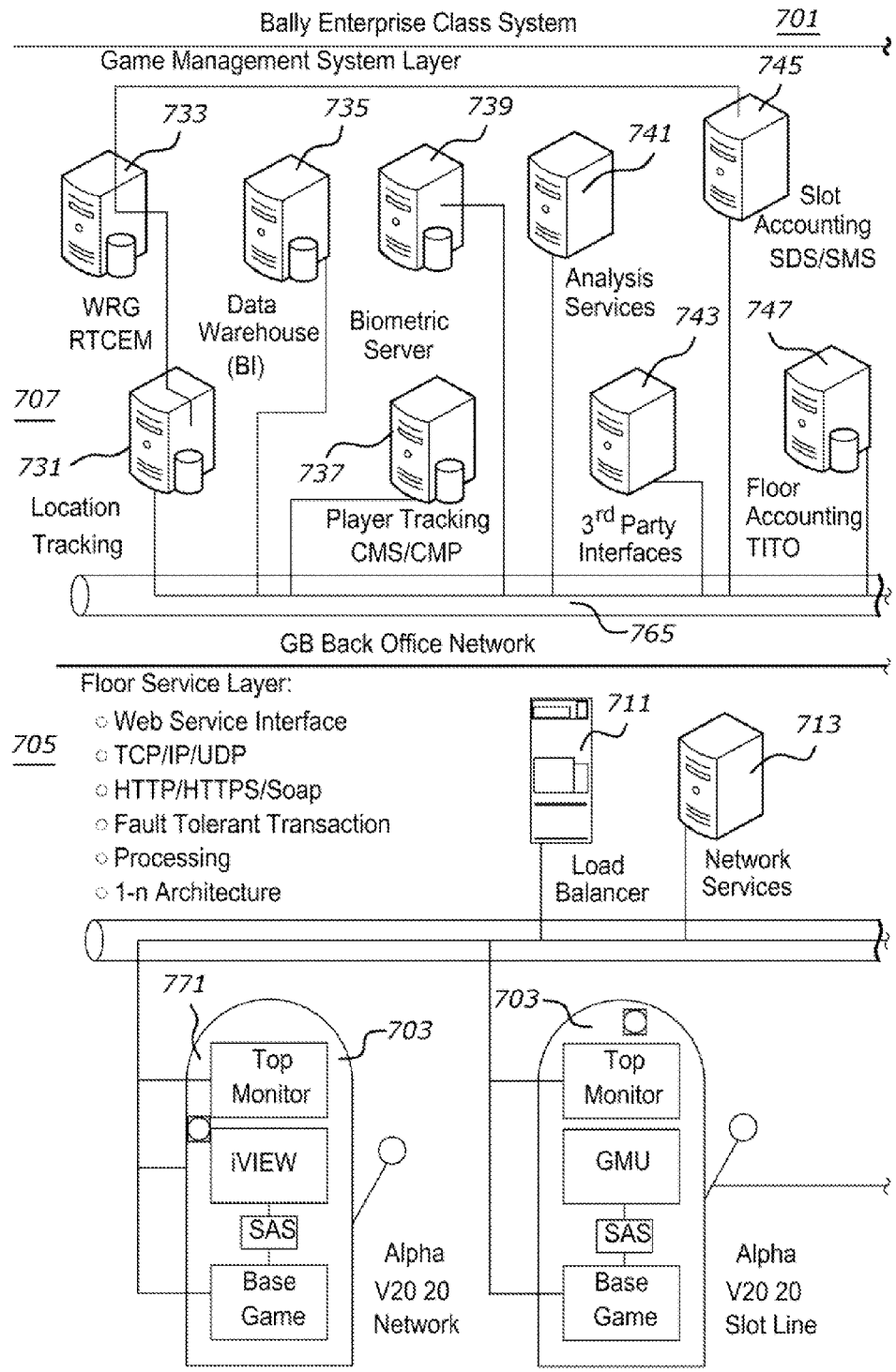
FIGS. 30*a* and 30*b* are schematic block diagrams showing the hardware elements of a networked gaming system in accordance with one or more embodiments.
Figure 30B:
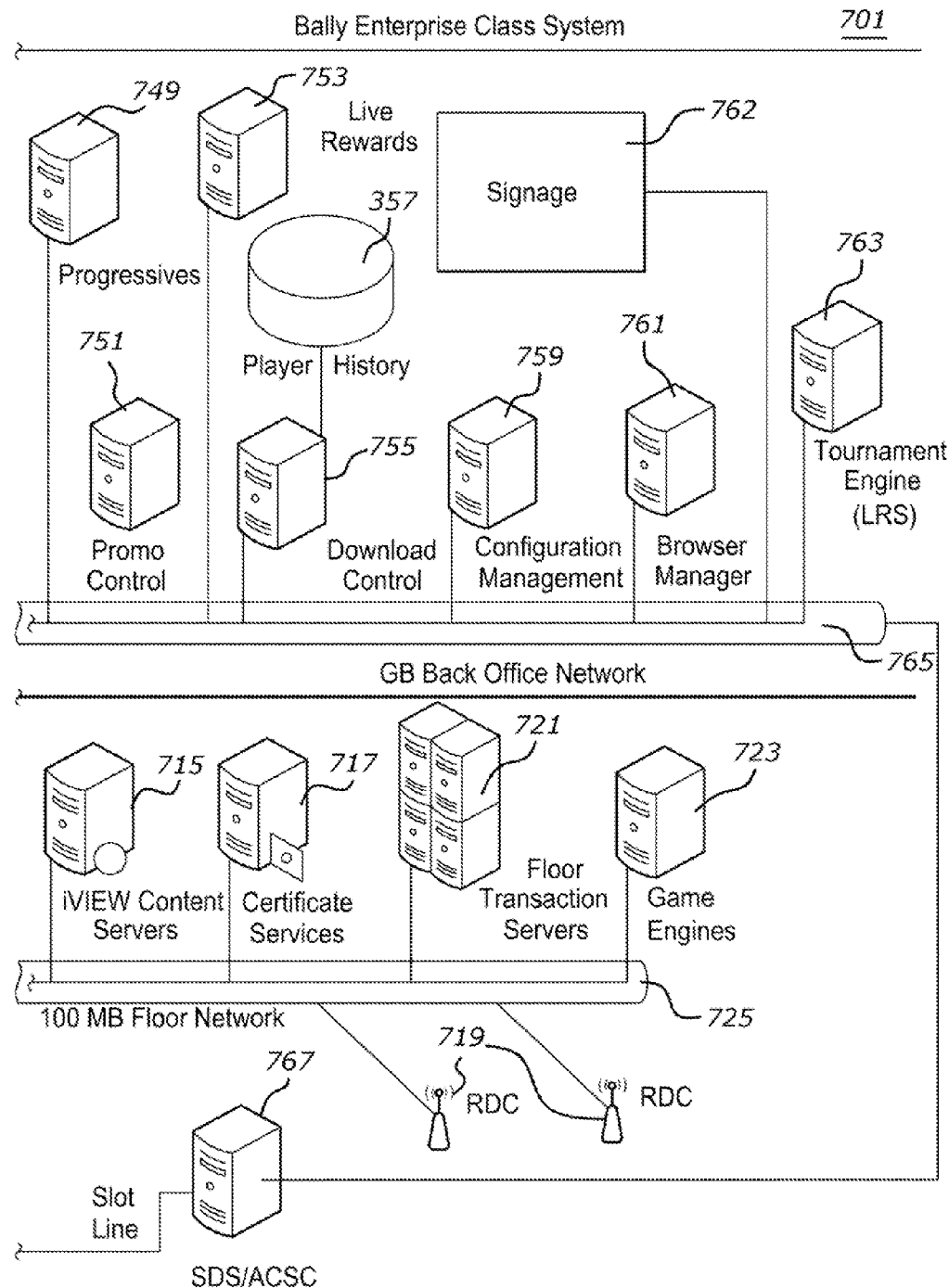

Referring to FIGS. 30*a* and 30*b*, enterprise gaming system 701 is shown in accordance with one or more embodiments. Enterprise gaming system 701 may include one casino or multiple locations and generally includes a network of gaming machines 703, floor management system (SMS) 705, and casino management system (CMS) 707. SMS 705 may include load balancer 711, network services servers 713, player interface (iVIEW) content servers 715, certificate services server 717, floor radio dispatch receiver/transmitters (RDC) 719, floor transaction servers 721 and game engines 723, each of which may connect over network bus 725 to gaming machines 703. CMS 707 may include location tracking server 731, WRG RTCEM server 733, data warehouse server 735, player tracking server 737, biometric server 739, analysis services server 741, third party interface server 743, slot accounting server 745, floor accounting server 747, progressives server 749, promo control server 751, bonus game (such as Bally Live Rewards) server 753, download control server 755, player history database 757, configuration management server 759, browser manager 761, tournament engine server 763 connecting through bus 765 to server host 767 and gaming machines 703.

The various servers and gaming machines 703 may connect to the network with various conventional network connections (such as, for example, USB, serial, parallel, RS485, and Ethernet). Additional servers which may be incorporated with CMS 707 include a responsible gaming limit server (not shown), advertisement server (not shown), and a control station server (not shown) where an operator or authorized personnel may select options and input new programming to adjust each of the respective servers and gaming machines 703. SMS 705 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases is maintained and utilized in performing their respective functions.

Gaming machines 703 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 707 and/or SMS 305 servers and devices, firmware, media, operating systems, and configurations may be downloaded to the system components of respective gaming machines for upgrading or managing floor content and offerings in accordance with operator selections or automatically depending upon CMS 707 and SMS 705 master programming. The data and programming updates to gaming machines 703 are authenticated using conventional techniques prior to installation on the system components.

In various embodiments, any of the gaming machines 703 may be a mechanical reel spinning slot machine, video slot machine, video poker machine, video bingo machine, keno machine, or a gaming machine offering one or more of the above-described games including an interactive wheel feature. Alternately, gaming machines 703 may provide a game with an accumulation-style feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under the control of a group game server are disclosed in U.S. application Ser. No. 11/938,079, entitled "Networked System and Method for Group Gaming," filed on Nov. 9, 2007, which is hereby incorporated by reference in its entirety for all purposes.

Remote Control Device Management

Figure 38:
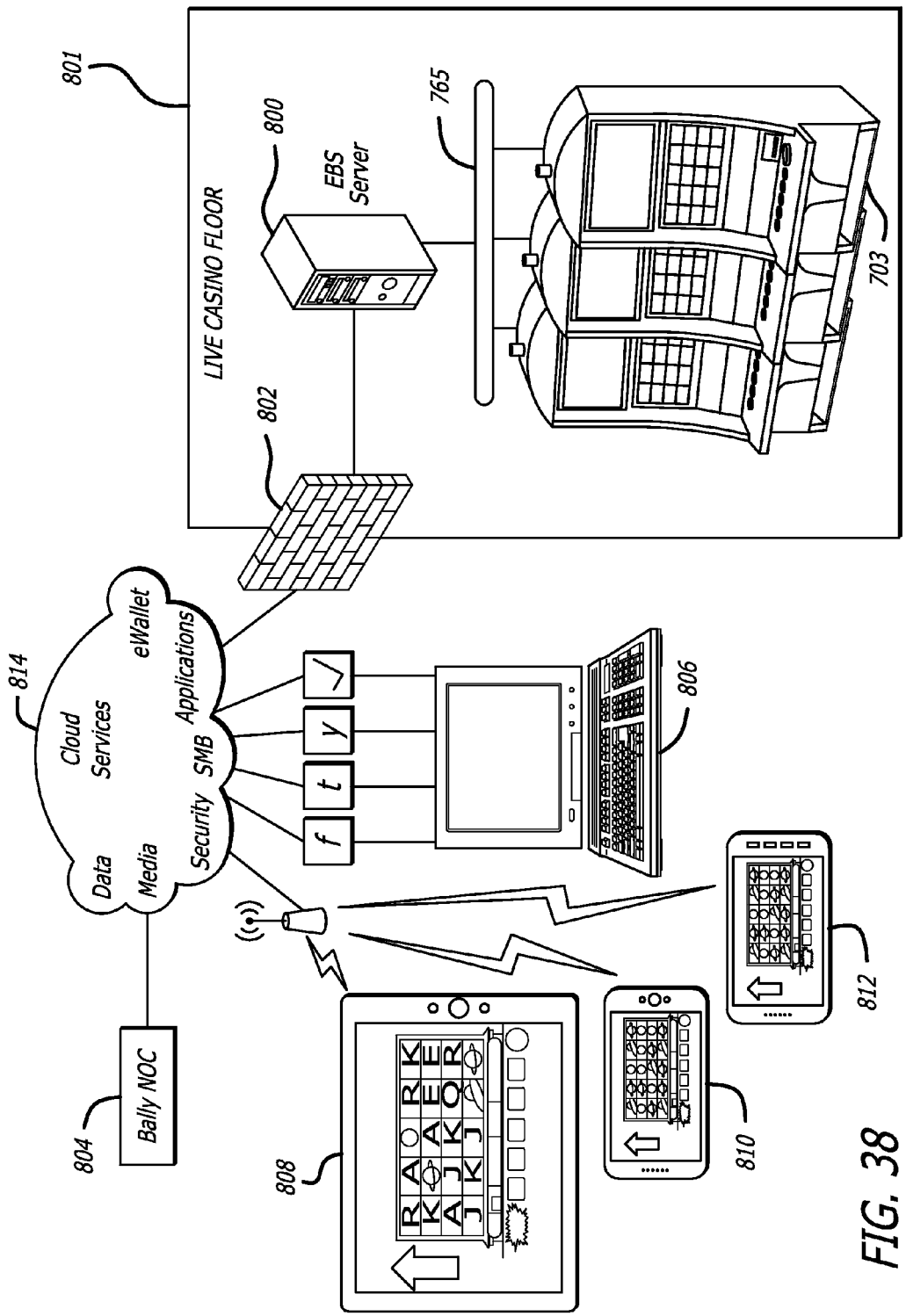
FIG. 38 is a diagram showing an example of architecture for tying a casino enterprise network to an external provider of games and content to Internet or broadband communication capable devices.

By way of example, and not by limitation, the present invention may be implemented or promoted by or through a system as suggested in FIG. 38. At 801 is the gaming enterprise system which may be hosted at a casino property enterprise, across several casino enterprises or by a third party host. The gaming enterprise system 801 has a network communication bus 765 providing for communication between the gaming machines or gaming devices 703 and various servers as described above with respect to FIGS. 30A,B. To provide the functionality illustrated in FIG. 38, a feature server 800, such as a Bally Elite Bonusing Server, is connected to the network communication bus 765 for communication to the gaming system 801, the gaming devices 703 and the various servers and other devices as described above. Through a secure network firewall 802 the feature server 800 is in communication with a cloud computing/storage service 814 which may be hosted by the casino enterprise, a licensed third party or if permitted by gaming regulators an unlicensed provider. For example, the cloud service 814 may be as provided by Microsoft® Private Cloud Solutions offered by Microsoft Corp. of Redmond, Wash., USA. The cloud service 814 provides various applications which can be accessed and delivered to, for example, personal computers 806, portable computing devices such as computer tablets 808, personal digital assistants (PDAs) 810 and cellular devices such as telephones and smart phones 812. For example, the cloud service 814 may provide and support the enterprise applications in association with the feature server 800. The cloud service 813 may also facilitate the delivery of content to user/players by supporting updates and advertising through the enterprise applications to the remote device user/player. The cloud service 814 includes security for secure communication with the cloud service 814 between the player/users and the cloud service 814 and between the cloud service 814 and the gaming enterprise system 801. Security applications may be through encryption, the use of personal identification numbers (PINS), biometric identification, location determination, or other devices and systems. As suggested in FIG. 38 the cloud service 815 stores or accesses player/user data retrieved from players and from the gaming enterprise system 801 and feature server 800.

The players may access the cloud service 814 and the applications and data provided thereby through the Internet or through broadband wireless cellular communication systems and any intervening sort range wireless communication such as WiFi. The players may access the applications and data through various social media offerings such as Facebook, Twitter, Yelp, MySpace, LinkedIn, or the like.

The cloud service 814 may also host game applications to provide virtual instances of games and features, such as described herein, for free, promotional, or where permitted, P2P (Pay to Play) supported gaming. Third party developers may also have access to placing applications with the cloud service 814 through, for example a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 814. When a player accesses the cloud service 814 certain media may be delivered to the player in a manner formatted for their application and device.

The cloud service 814 enables the casino enterprise to provide base games and features and to market to and foster player loyalty. To drive such interaction various incentive programs may be employed including, as described above, users earning or being awarded mystery game chances which may be redeemed at their next visit to the casino enterprise or, where permitted, during play on their remote devices.

According to one embodiment of the present invention, a player is permitted to associate a mobile device such as a table or mini-tablet computer, smart phone, laptop computer or other mobile computing device with a selected gaming device 703 for the purpose of migrating or moving the game play from the gaming device 703 to play on the mobile device. The mobile device may be provided by the host casino enterprise or may be the player's own device. With this remote game play feature the player may transfer their game, as played on the physical gaming device 703 (or a facsimile), to their mobile device to play, for example, in another area such as from a non-smoking area of the casino to a smoking area. The player may, through their mobile device, make wagers, prompt play, and receive game outcomes derived by the processor(s) of the gaming device 703 and delivered through the network to the mobile device. Meters at the gaming device 703 may be maintained to the degree required and are copied to the mobile device.

Embodiments of Remote Control Gaming

Figure 39:
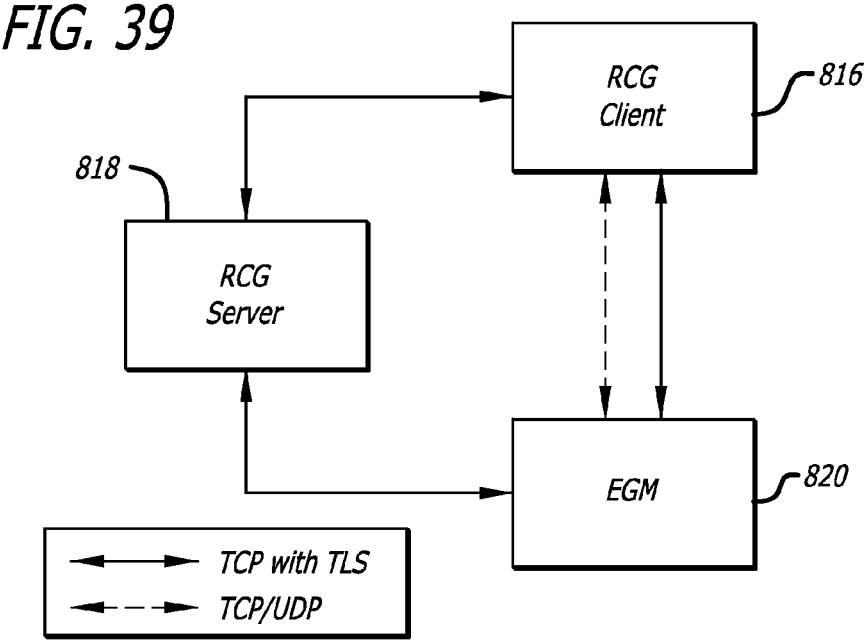
FIGS. 39 and 40 illustrate an overview of a system for performing remote gaming.

By way of example, the components involved in a remote control gaming system are shown in FIG. 39. This system includes a remote control gaming client ("RCG client") 816, a remote control gaming server ("RCG server") 818, and a gaming machine (EGM) 820. In one embodiment, the gaming machine 820 acts as a streaming host and streams the game content to the RCG client over TCP/UDP. The gaming machine 820 may use RTSP (real time streaming protocol) on the streaming channel and touch inputs from the RCG client 816 may be transferred to the gaming machine 820. In one embodiment, the RCG server may be responsible for the gaming machine and the RCG client registration, authentication, authorization and session management, logging and managing player's identity on the remote device, and management of the RCG client. The RCG client 816 will act as the streaming client and after an initial approval from the RCG server and successful pairing with the gaming machine 820, the RCG client will communicate touch inputs to the gaming machine.

Figure 40:
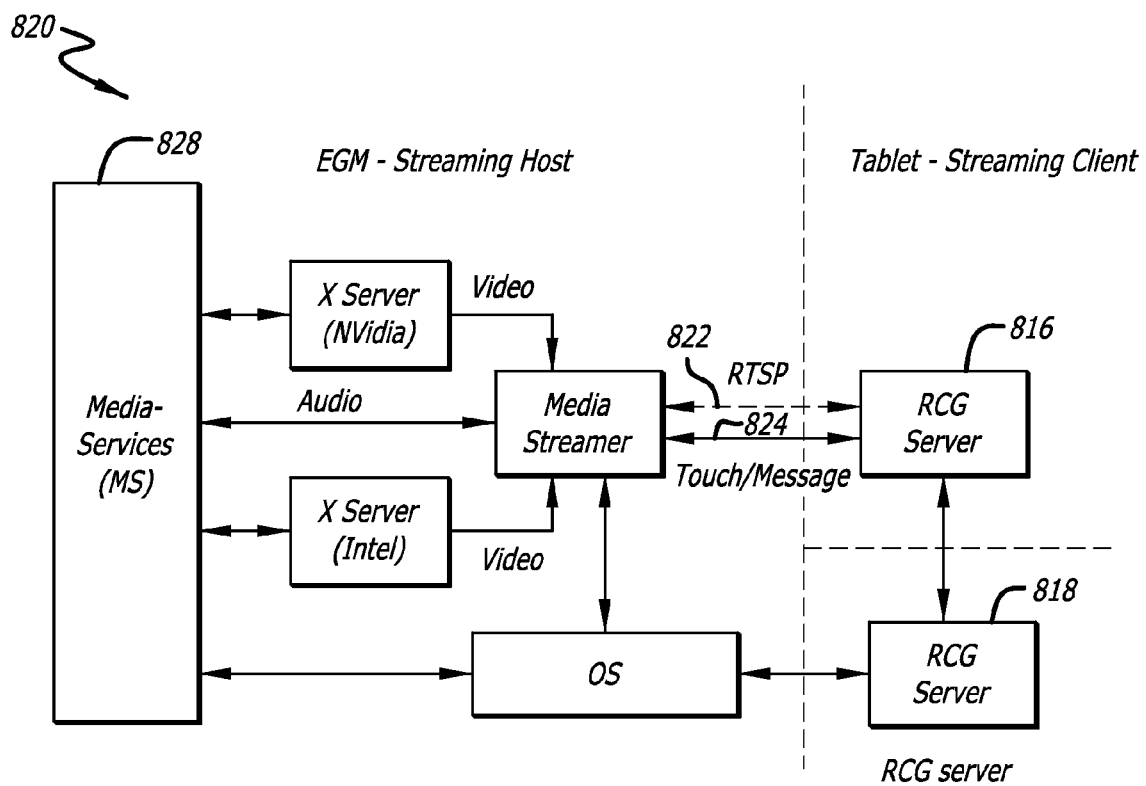

In one embodiment, a system for enabling a safe streaming mode for a player to confidently leave a gaming machine while playing the corresponding game on his or her secondary computing device is shown in FIG. 40. In order to support remote control gaming, Bally's Alpha OS may be modified to handle remote gaming sessions and a streaming host is added to the gaming machine. As shown in FIG. 40, the connections between the gaming machine 820 and the RCG server 818 and between the RCG server and the RCG client 816 are on secure channels. There are also two channels between the gaming machine and the RCG client, a first channel 822 for streaming (UDP or TCP) and a second channel 824 for touch and event communication (TCP). Touch inputs may be passed from media streamer client 816 and to the game manager for processing. The first channel 822 for streaming may be configured for either TCP or UDP and may be dedicated to stream only content. At this application level, logic, touch, or any other messaging shall be handled in this layer. In one embodiment the first channel 822 is left non-secure to optimize performance. In this embodiment, the first channel 822 can only view the streaming content and fraudulent activity will not be able to impact the behaviour of gaming machine or remote device. However, in other embodiments the first channel may be secured.

Still referring to FIG. 40, media streamer 826 acts as the streaming process and real time streaming protocol (RTSP) protocol may be used for streaming in one embodiment. The design is not restricted to any specific protocol, and other protocols like HLS may be used. Media streamer may abstract software and hardware encoding. To support sound encoding, sound server 828 may be modified to pass buffers to media streamer 826. Surround sound games may also be supported so direct ALSA sound inputs may not be used.

During a remote control gaming session, the physical spin button on the gaming machine may be emulated using a "spin sprite" that can be streamed from the server. Also, in one embodiment, the IDeck window may be scaled to accommodate the spin sprite button, which will allow handling snap reels and two step spin jurisdiction requirements. Further, all game buttons, including number of lines and lines per bet will function the same during the remote play. The game manager may be modified for operator menu changes and new remote gaming session event history additions in the operator menu. The RCG session event history will track the start date and time of the remote gaming session and the game play recall screen may mark game play records as remote game plays. More specifically, the entire remote gaming session may be traceable at all three component levels. The gaming machine remote gaming session history details may be stored in the gaming machine operator menu section under the gaming machines critical data section. Similar history also may be stored for RCG client and RCG server.

As discussed above, fund transfers, cash outs, jackpot processing (requiring operator attendant intervention), and any other money transaction may be disabled during a remote gaming session. However, as discussed above in other embodiments, these money transaction features may be temporarily enabled by the player during remote gaming. Also, as discussed above the gaming machine 820 may only allow one active remote client at time. Further, the remote gaming session may terminate and a message may be shown on mobile device and gaming machine that the remote session has ended when any of the following occur: any win over Credit Limit to Voucher, Funds Transfer, Hopper, and Hand Pay; jackpot hand pays; insufficient credits to continue game play; player leaves designated gaming area; attendant key is turned; any door on the gaming machine is opened; any tilt condition occurs on the gaming machine; or any cabinet or game disable commands are sent from the host. The remote gaming session may be terminated for any other reason.

Figure 41A:
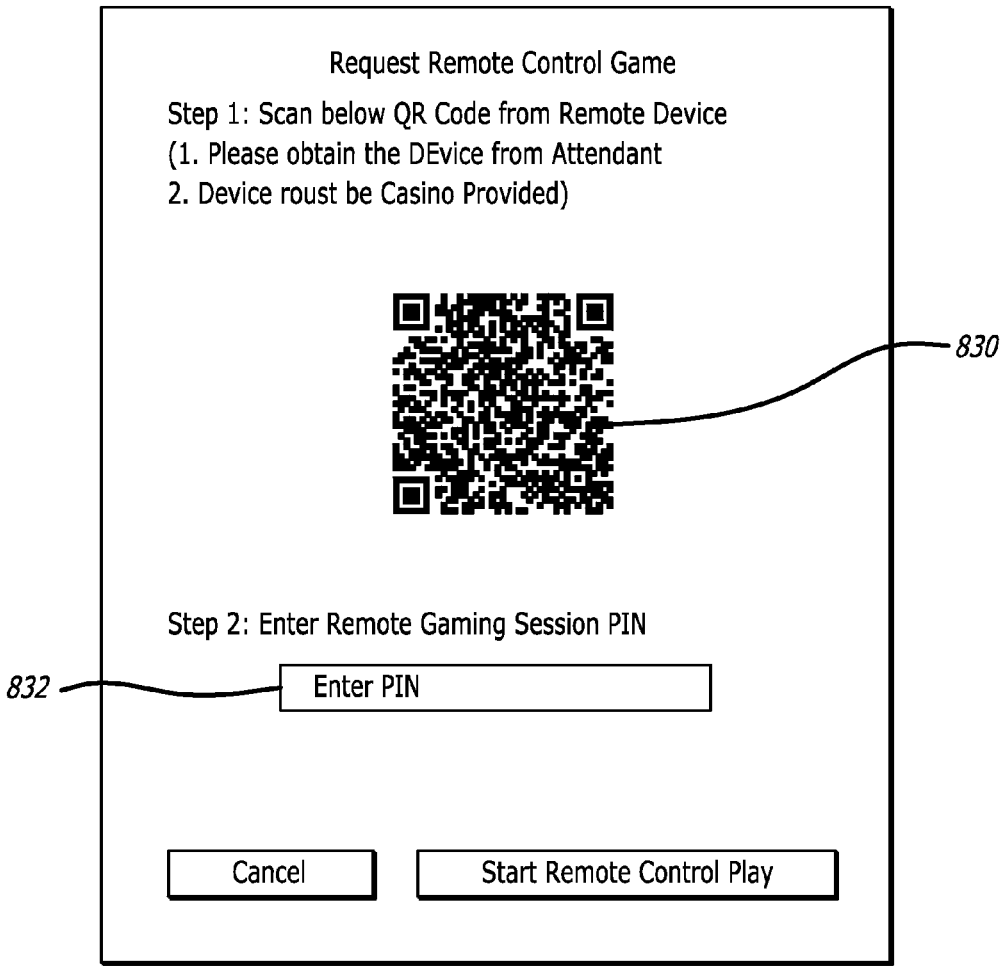
FIG. 41A illustrates an example of a screen shot for requesting a remote control game.

To start a remote gaming session in one embodiment, a player may press a service button, or the like, at the gaming machine. This will bring up a menu at the gaming machine allowing the player to select "Play Remote Gaming Session" or the standard option of sending a service request. Once the player selects "Play Remote Gaming Session", the gaming machine will display another screen revealing a unique QR code 832 associated with the gaming machine as shown in FIG. 41A. The player then scans the QR code on the gaming machine using the camera built into the mobile device. The RCG Client will prompt the player to enter a PIN in box 832 that will be active for the session. The QR code and this PIN is passed to the RCG server which contacts the gaming machine and asks it to confirm that the request for remote control is valid. The gaming machine displays a confirmation dialog and waits for a touch from the player or attendant before responding with a confirmation or denial. If no touch is present within a set timeout, the remote connection is denied. The purpose of the above process is to ensure that the player making the remote request is actually in control of the gaming machine. This prevents spoofing by copying the QR code and using it elsewhere. A unique bar code or other indicia may also be scanned by the player's mobile device instead of a QR code.

If the gaming machine is rebooted during an active remote gaming session, a handshake with the RCG Server may re-initialize the remote gaming session, and the gaming machine may re-initialize the streaming client connection. If an error occurs on the gaming machine, the remote gaming session will be disconnected and a default message may be displayed on the remote device.

Figure 41B:
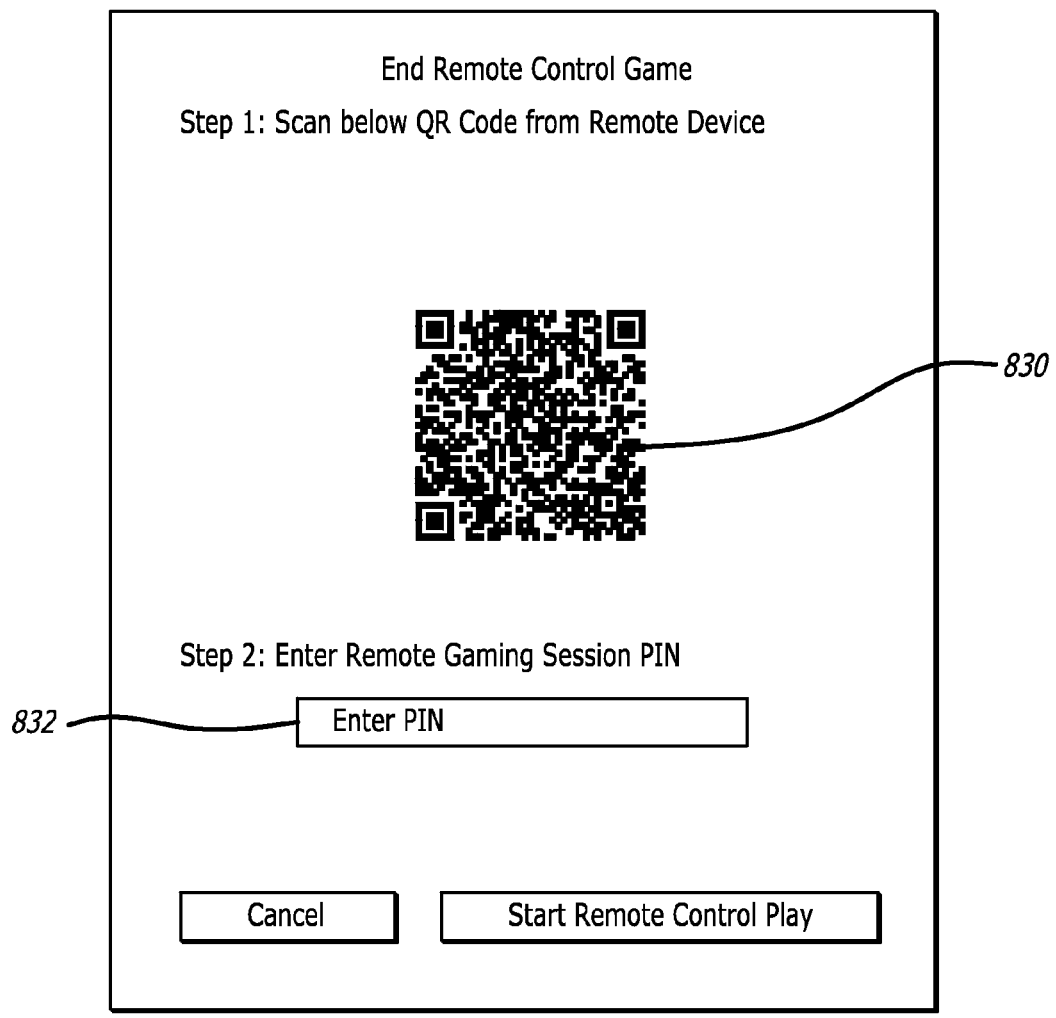
FIG. 41B illustrates an example of a screen shot for ending a remote control game.

To end a remote gaming session in one embodiment, the player may press a "Service" button, or the like, on the mobile device. This may bring up a menu on the mobile device allowing the player to send a standard service request ("Call Attendant") or "End Remote Gaming Session". The request may be sent to the RCG server where the generation of a unique verification number that may be passed to both of the paired devices (RCG Client mobile device and the gaming machine). The gaming machine may bring up a screen displaying the unique number with the button "Request End Session". The player may select the "Request End Session" button and may be shown the QR Code 830 on the gaming machine as shown in FIG. 41B. The player will scan the QR code with the mobile device and enter the PIN number in box 832 used at the start of the remote gaming session. The PIN number is entered on the gaming machine. The information will be verified by the RCG Server and the session will be ended. The gaming machine will return to normal play mode. As stated above, a unique bar code or other indicia may also be scanned by the player's mobile device instead of a QR code.

RCG Server

By example only and not by way of limitation, the RCG server 818 may run on a Windows 2008 Server using the latest service pack. The applications may be written using the C# language on the .Net 4.5 framework. The data may be stored on Microsoft's SQL Server 2008 using the latest service pack. The SQL reporting services component may be used for all reports. The RCG server 818 may include an RCG service application. This application is a Windows service that will open up a TCP socket for client applications to connect to for sending and receiving messages. Internally, each message received may be passed onto a separate worker thread for processing. The RCG server may also include an RCG Dashboard application. The RCG Dashboard application is an administrative console application that may be used by authorized personnel for managing devices, users, and system configuration. It may also contain a set of reports used for auditing purposes. Further, the RCG server may include an RCG Watchdog application. The RCG Watchdog application is an application whose sole purpose is to ensure that the RCG service is running and report on any event that has resulted in the failure of that service.

Figure 42B:
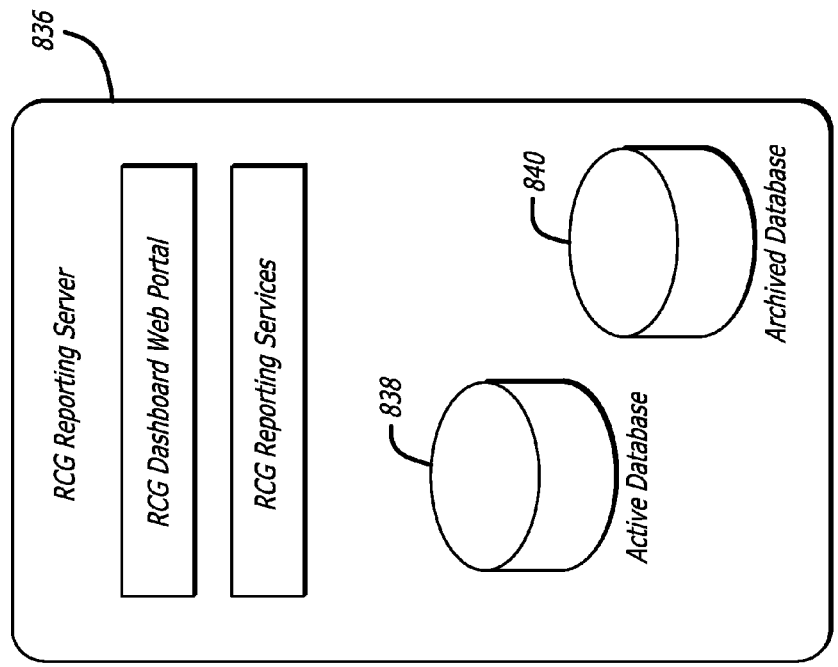
FIGS. 42A and 42B illustrate an embodiment of a remote control gaming server deployment.
Figure 42A:
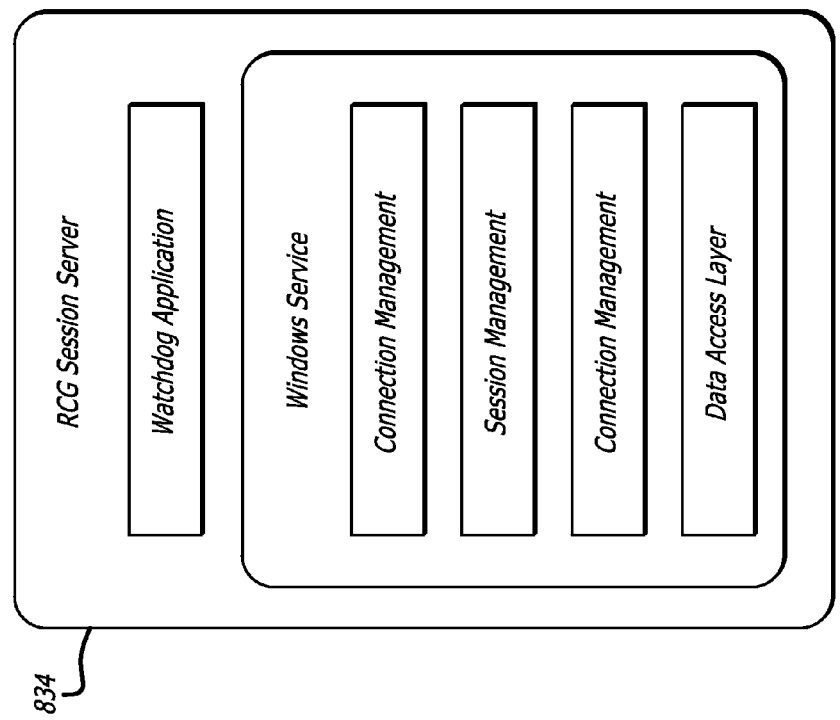

One embodiment of a deployment model for separating the server that manages the remote gaming sessions and the server that hosts the dashboard, reporting services, and databases are shown in FIGS. 42A and 42B. As shown in the figures, the RCG server is separated into an RCG Session Server 834, which includes the Watchdog application and Windows services, and a RCG Reporting Server 836, which includes an active database 838 and an archived database 840.

As shown in FIG. 42A, the RCG Windows service is organized into connection management, session management, core services/business logic, and data access layer. The connection management is a sub-component that manages client connections using the RCG service. As messages are received, they are delegated to worker threads for processing. The session management is a sub-component for maintaining the states of all the active remote gaming sessions. Core services/business logic are encapsulated and utilized by the management components. These core services may include: device authentication, device pairing validation, application logging, configuration management, event notification processing, and data archiving. The data access layer is a layer of abstraction components use as data needs to be accessed from and persisted to the database.

Another application of the RCG server is the RCG dashboard. By way of example only, the RCG dashboard is a web-based application than can run on standard browsers that support Cascading Style Sheets (CSS) and Javascript. It may be developed on the Microsoft .NET 4.0 framework hosted by the Microsoft IIS Web Server. It may adhere to the MVC 4 design pattern with Razor Views. The RCG dashboard may have internationalization and localization support. The following four main sections may be provided for: System Configuration, Active Remote Session Management, Reporting, and the ability to start and stop the RCG service. FIG. 43 depicts an example screen of the gaming machine (EGM) configuration screen in the right-side pane, selected under the Configuration Menu shown in the left-side pane.

By way of example only, the RCG client 816 may be written in Java, using the latest Android Development SDK. The target version is the latest version released for Android 4.3. The RCG Client may maintain a TCP connection with the RCG Server and registers. The RCG client 816 may authenticate and connect to an available WiFi network, and create a secure channel using the WiFi network to the RCG server. Also, the RCG client may receive configuration settings from the server upon receipt of a register device request and periodically when system configuration settings have changed. The RCG client 816 may send a pairing request to the RCG server 818 when a player desires to play the game remotely. The sequence is initiated when the player takes a snapshot of a QR code displayed at the gaming machine as described above with reference to FIG. 41A. In addition the RCG client creates a streaming channel (RTSP) with the gaming machine for receiving the video stream outputted from the corresponding game and creates a secure channel (TCP) for passing touch inputs back to the gaming machine for game processing. With validation being made at the RCG server, the RCG client prevents unauthorized usage using credentials from the player and employee. In one embodiment, the RCG client provides a geo fence based on configurable location boundary parameters at the server. The geo fence is used to prevent the player from "drifting" out of range of the designated usage areas. If the player does cross the geo fence and outside of an area designated for remote gaming, then the remote gaming session may be paused until the player returns to the designated remote gaming area inside the geo fence. The gaming session may also be terminated if the player crosses the geo fence and leaves the designated area. In addition, the RCG client may maintain an audit log of the session recording any significant events, along with touch inputs entered by the player, and may provide an ability to review current session logging to help resolve player disputes. The RCG client also notifies the RCG server of any significant events. Further, the RCG client may display warning messages to players when approaching wireless boundaries, and may display warning messages of low battery usage to allow players enough time to complete the session on the mobile device before its battery power is depleted.

Security

Figure 44:
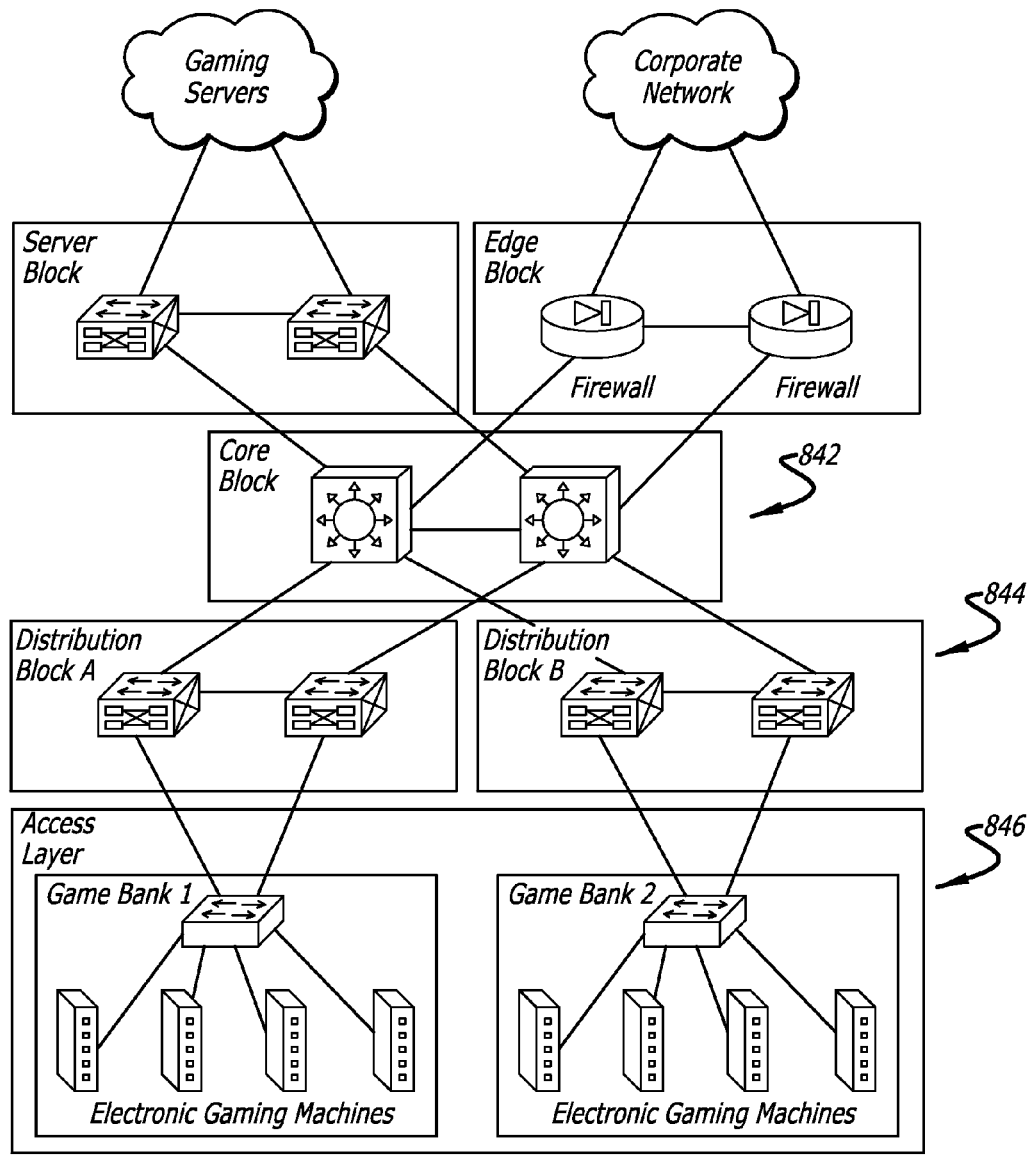
FIG. 44 illustrates an overview of a three-tiered network topology for a high speed network floor.

In one embodiment, security of the system includes a 3-tiered network topology for a high-speed network floor as depicted in FIG. 44. As shown, the network may include core 842, distribution 844, and access 846 layers. The core layer 842 is the central location of the gaming network and where the services reside. For remote control gaming, the core layer includes the servers for the RCG Server and RCG Database. Firewalls may be used to control access to the core layer directly connected to the gaming core switches.

Figure 45:
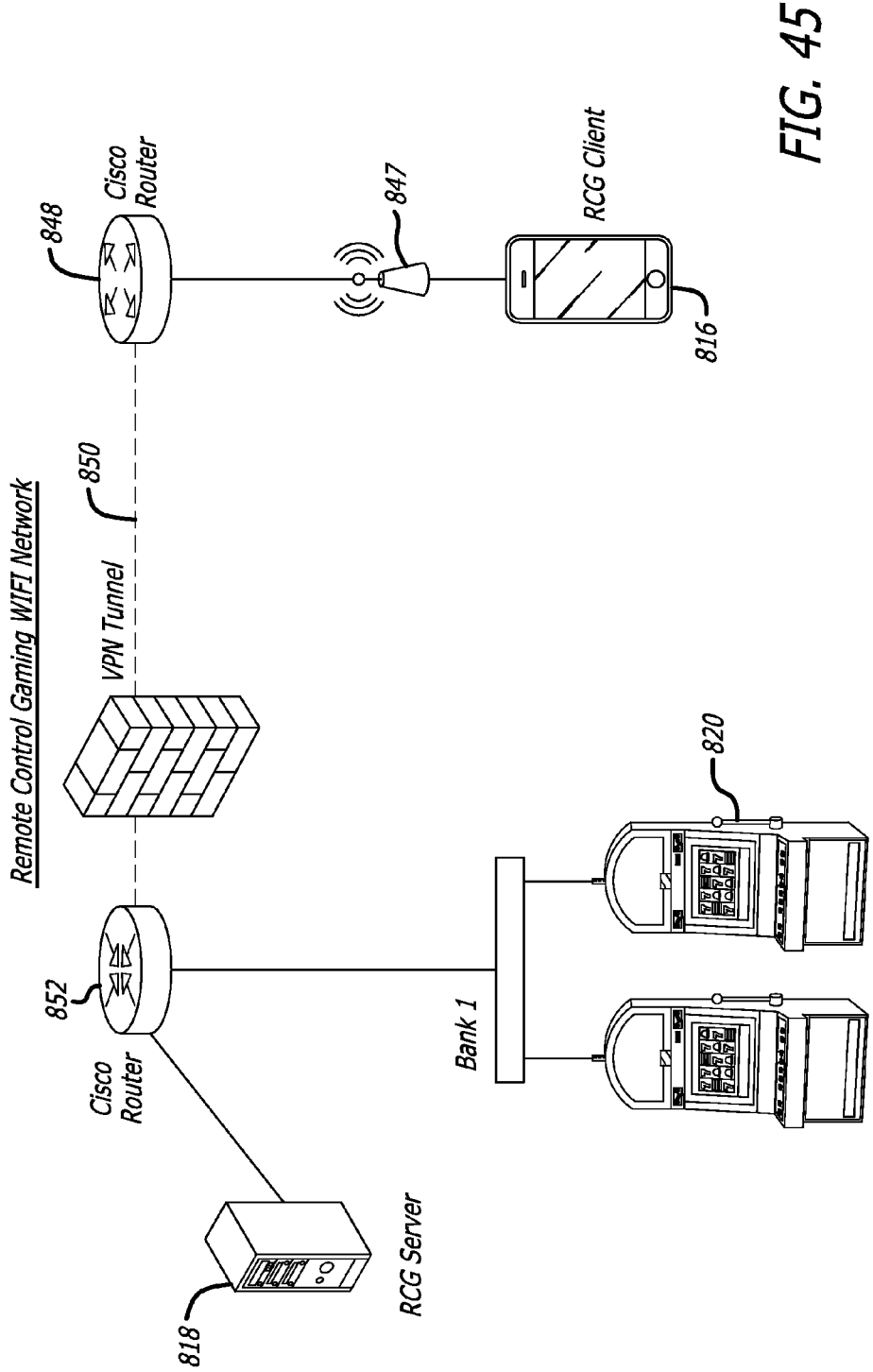
FIG. 45 illustrates an overview of one embodiment of a remote control gaming WiFi network.

The core layer 842 may include Wireless Access Points (WAPs) 847 outside of the firewall and connected to a router 848 as shown in FIG. 45. This connection may be made through a VPN tunnel 850. Communication from the RCG client (mobile device) 816 directed to the RCG server 818 may be routed through a router 852 within the gaming network. Communication from the RCG client 816 to the gaming machine (EGM) 820 will also be routed to the gaming machine through the use of connected routers at the other layers of the network. Use of the VPN tunnel from the WAPs to the routers should ensure a secure channel.

To improve physical security of the system in one embodiment, the WAPs 847 may be located in a secure, access-controlled environment, and only authorized personnel should have access to the devices. Further, all mobile devices for use in the remote gaming system may be provided by the casino. For security reasons, the mobile devices or tablets may be handed out to players as dictated by the security policy of the casino. In one embodiment, the mobile devices may contain only software installed by authorized personnel and may not contain any un-approved software. Additional security mechanisms such as Intrusion Detection and Intrusion Prevention software may be installed on the mobile devices. Theft prevention devices may be attached to the mobile devices. In other embodiments, however, players may be required to bring their own mobile device for remote game play.

In one embodiment, the WAPs 847 may be connected to a network router or bridge outside of the casino's private network firewall. The Service Set Identifier (SSID) for all access points will be obfuscated. Further, communication between the mobile device 816 and the WAP 847 may be authenticated through the use of digital certificates to improve network security. Encryption and authentication for the wireless network may use the Wifi Protected Access (WPA2) for authentication.

To increase access security, the mobile device 816 may add additional user authentication through the use of a PIN to ensure authenticated access of the device. Authentication is accomplished at the RCG server 818. In one embodiment, the mobile device may connect to the WAP 847 using secure credentials. In this embodiment, only authorized personnel may have access to RCG dashboard, including any administrative functions (such as system configuration changes). All changes to the system (i.e., RCG server) will be logged by the system including the person making the change, a description of what was changed, the value of the element before the change, the value of the element after the change, and the data and time when the change was made.

Also to improve security, message communication between the RCG client 816 and the RCG server 818 may use TLS encryption over TCP channel. Message communication between the RCG client mobile device and the gaming machine (EGM) also may use TLS encryption over TCP channel for touch inputs and event passing. Further, all sensitive data, including PINs, may be encrypted within the message before the entire message is encrypted using a standard encryption algorithm, such as MD-5 SHA-1 hash algorithm. It should be understood that the system may include other suitable security protocols.

In one embodiment, sensitive data that is stored may be encrypted and remain encrypted before being written to the database. In this embodiment, only approved personnel following the casino's internal controls may be able to acquire direct access to the database. Also, sensitive data will not be stored on the mobile device or tablet. Further, session data on the mobile device may be deleted from the mobile device (RCG client) when the session has ended and the logs have been successfully sent to the RCG server.

To further mitigate the risk of tampering, in one embodiment, only 'dumb' H264 streamed content may be sent from the gaming device 820 to the RCG client 816 and only raw x/y touch positions may be sent back to the gaming machine. Subverting the mobile device application has limited appeal as it only allows modifying the H264 display, which can easily be checked against the gaming machine that shows unmodified game output. Any difference could signal tampering with the system. However, there is still the small risk that a criminal could modify the RCG client (mobile device) such that it might capture login information for operators or players. Thus, in one embodiment, an aggressive wipe/provision process and key management system may be used. First, the mobile device may be provisioned in a kiosk mode, and no access will be possible to the settings or package installation. In addition, no modification will be possible by an unauthorized user. Second, under current Android security models, to obtain root access, which is necessary to install any software that could subvert an application, a mobile device must be powered down, reset, and wiped by the Android boot system. While the wipe offers some protection, there are workarounds that sophisticated hackers could use involving the mobile device's recovery mode. In any event, the mobile device must be rebooted to take advantage of such workarounds. Therefore, the casino may monitor any reboot of the mobile device by session interruptions, and the mobile device may be prevented from returning to a session after reboot. In this embodiment, it may be required that the mobile device be returned to the casino operator. After a mobile device has been handed to the casino operator in a rebooted state, it may be compromised. Thus, in one embodiment, the mobile device may be taken offline by the casino operator and put through a provisioning process that may consist of rebooting the mobile device, wiping it, installing the system software image, and re-registering the mobile device with the RCG server. This process may be automated through an application. In this scenario, a player returning a rebooted mobile device may be given an alternate mobile device to continue remote control gaming play.

The example security protocol described above may prevent any modified mobile device from still operating, and still, a further layer of security may also be implemented in one embodiment to prevent the use of the mobile device as a starting point for an attack on the gaming machine network. In one example, the mobile device application contacts the RCG server 818 over WiFi to retrieve a list of valid WiFi access points and pre-shared keys for communication with the gaming machine (EGM) network. This list may be prevented from being written to non-volatile storage on the mobile device. Furthermore, the initial WiFi connection to the RCG server may require a pre-shared key. This key also may never be written to non-volatile storage on the mobile device and must be supplied at every reboot. In order to make this key difficult to obtain, the key may be stored on a PIN protected NFC tag that the mobile device must be touched against on reboot. The tag may be located in a secure area away from players where only authorized personnel can access. The effect of this type of security is that if a hacker were to walk away with a mobile device, the hacker would not be able to obtain a key to provide access to the RCG server or gaming network. Again, it should be understood that other security protocols could be used with the system.

Wireless Communication

In one embodiment, the network may provide for several degrees of wireless communication with the mobile device. Certain area of a gaming venue may be prohibited from gaming activities such as areas where underage persons are present whereas other areas such as, for example, a smoking area or the casino floor or a bar within the casino are authorized for gaming. Further, a casino enterprise may wish to exclude areas from gaming to prevent patrons from leaving with enterprise-provided mobile devices. These wireless areas or hotspots are defined by wireless stations, e.g. WiFi stations that are divided into two classes—a session-only class and a streaming capable class. When the mobile device is in an area where the near field transceiver is arranged according to the sessions-only class, live, streaming gaming may not be conducted. The mobile device may display a message informing the player that they must move to another location. In one embodiment, a map or other information may be provided to lead the player to a permitted area. While the mobile device is in the second-class area live streaming of gaming may take place. In session-only areas the near field transceivers need not handle streaming data and their broadcast and receiving range may be larger (and hence the transceivers may be spaced further apart) than the streaming capable class of transceivers since full bandwidth is not required. The streaming class of the transceivers in permitted areas may be closer together since full bandwidth may be consumed.

In regards to the foregoing the near field wireless transceivers can be used to determine the location of the mobile device. A global positioning system (GPS) found in many mobile devices may also be used.

Figure 46:
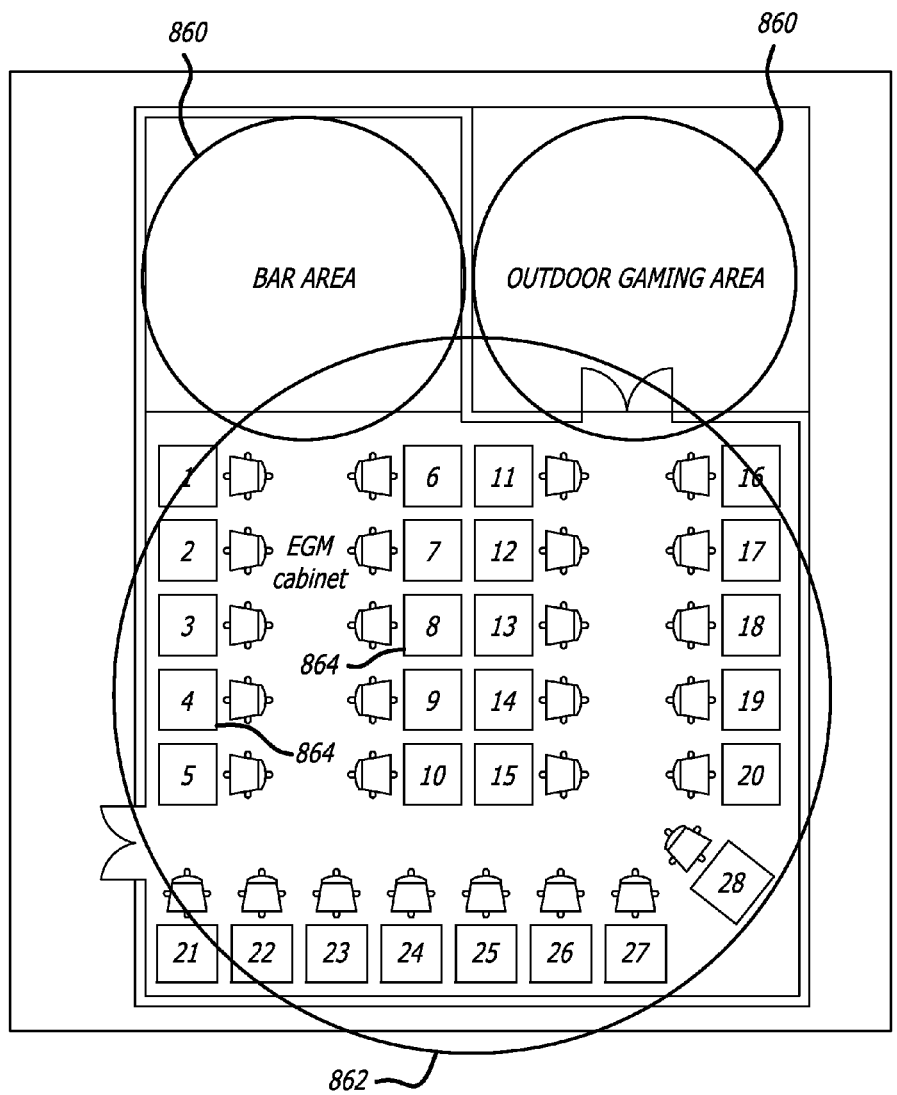
FIG. 46 illustrates a schematic of an example casino with WiFi access points for establishing and streaming a remote control game.
Figure 47:
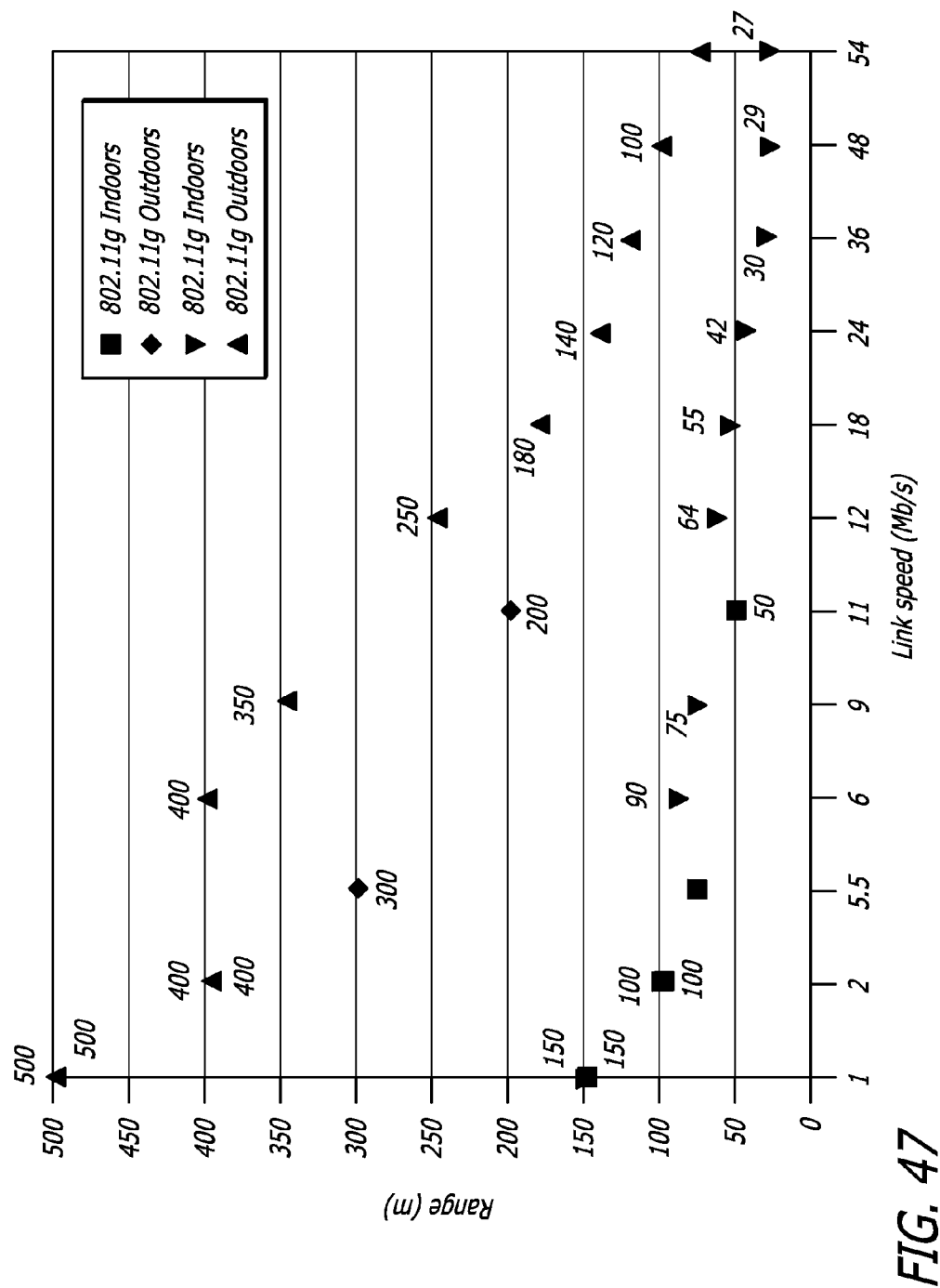
FIG. 47 illustrates a chart showing WiFi (802.11g) performance data for indoors and outdoors.

FIG. 46 depicts an example casino floor operating one embodiment of the present invention. In this example, each WiFi base station is represented by a circle that encompasses an area in which it can be connected to, which assumes that the area of coverage of a WiFi base station extends a uniform distance from the radio transmitter. One skilled in the art would understand that this circular representation is only partially true since radio signals are attenuated by walls more than air. The further a receiver is from a transmitter, the weaker the WiFi signal, which leads to lower data rates. For streaming applications such as this, significant bandwidth is required for each client, about 5 megabits per second is a reasonable estimate. FIG. 47 depicts theoretical performance data for 802.11g WiFi. In order to sustain a theoretical maximum of 54 megabits indoors, the chart in FIG. 47 shows that the maximum range is 27 meters. In comparison, the charts depicts that a much smaller bandwidth of 2 megabits can be transferred over 100 meters.

Based on experience, it may be reasonable to expect full bandwidth for streaming game play to only be available within 10-15 meters of a transmitter, and this would mean that to supply a casino with enough transmitters to cover the whole of the gaming floor could be cost prohibitive. Such a saturation of transmitters also leads to other problems as each radio interferes with the others, leading to reduced throughput. In one embodiment, the WiFi base stations are separated into two classes, a stream capable station 860 and a session-only capable station 862. When associated with a stream capable base station, the mobile device can stream game content, but when associated with a session-only base station, the mobile device will instead inform the user that they must move to a stream enabled area to activate streaming. As shown in FIG. 46, the stream capable stations 860 are located in areas near the gaming floor of the casino, e.g., in a bar area or outdoor gaming area. However, the stream capable stations 860 may be located in location in or near the casino. Also, FIG. 46 shows the session-only capable station 862 to be located on the gaming floor of the casino.

In one embodiment, gaming machines (EGMs) 864 hosting games that are to be streamed will be located within the session-only area of the casino. This would allow a player or operator to easily associate a gaming machine with a mobile device as discussed above, but would not allow streaming of game content to commence until the player moved to a streaming enabled zone of the casino.

Figure 48:
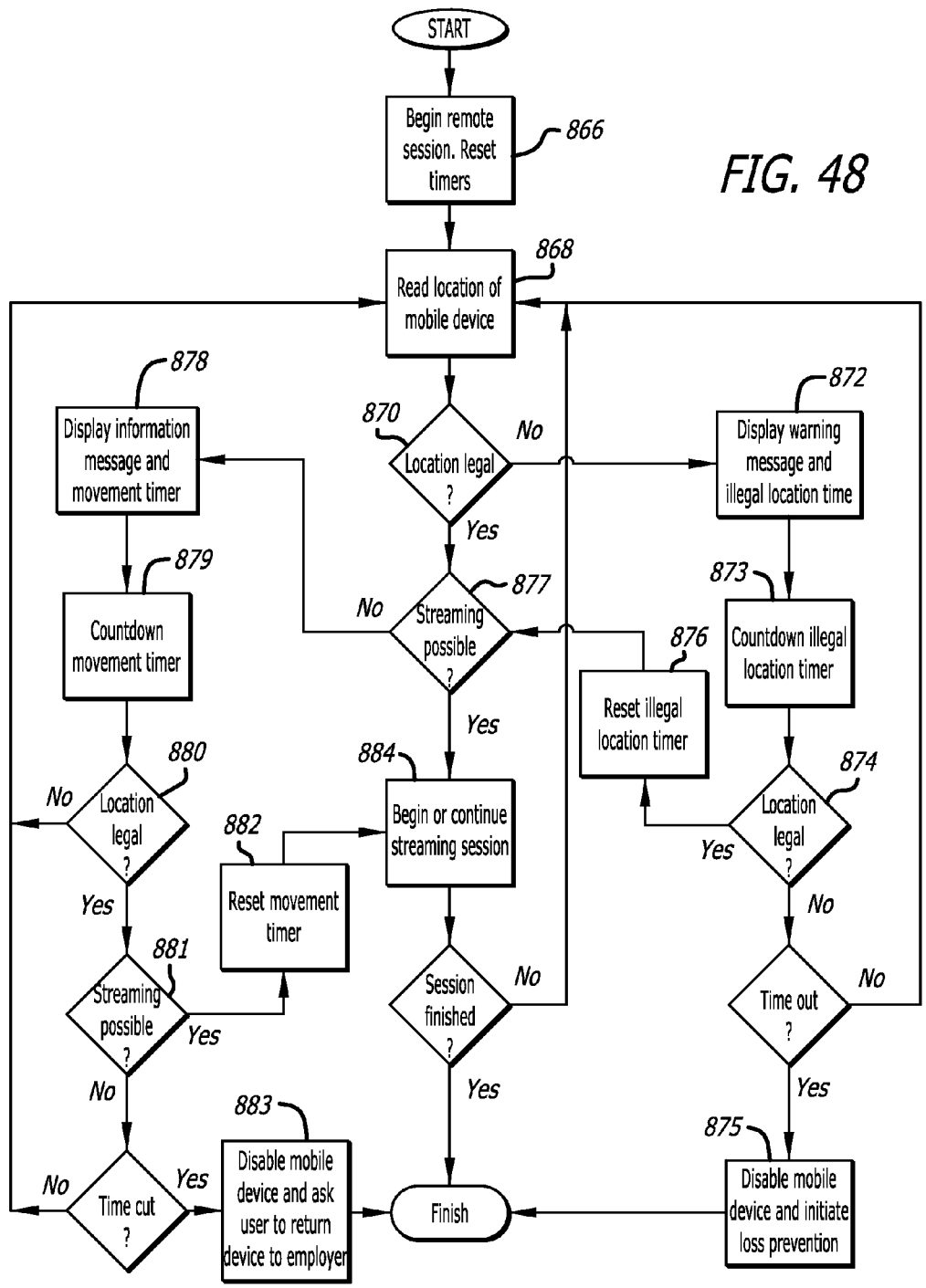
FIG. 48 illustrates one embodiment of an overall process to administer remote control gaming sessions.

FIG. 48 depicts a flow chart depicting one embodiment of how the system will operate. This process could be operated on either the mobile device or a server that has communication links to the mobile device and/or gaming machine. If the process depicted in FIG. 48 is operated on a server rather than a mobile device, then the logic required at the mobile device is as simple as reporting position and displaying messages from the server. Making the mobile logic simple in this way may be beneficial for approvability. The first step in the process is the commencement of the remote session at step 866. The logic for this is described above in detailed. Next, the location of the mobile device is determined at step 868. A process for achieving this is described below with reference to FIG. 49, using only WiFi technology. It has also been contemplated that other more accurate location positioning systems may be used such as that developed by the In-Location Alliance. In addition, where available, GPS may be used for determining position. GPS does not work very well inside buildings, but performs very well outdoors. One of the advantages of this in terms of this application is that by necessity the smoking areas of a casino may be located outside. When streaming is restricted to only outdoors, it may be preferred to implement logic such that streaming is only allowed when (a) a valid GPS lock is acquired and (b) the position derived from this lock is within a geo-fenced area.

Next the system determines if the location of the mobile device is legal at step 870. There are three distinct states for the mobile device depending upon the location, including, (1) the device is in an illegal location, (2) the device is in a location where streaming is not allowed but establishing and holding a session available is possible, subject to some rules, and (3) the device is in a location where streaming is allowed. As a mobile device moves area to area of the casino it may move between these states. To allow a player to operate the device without too onerous conditions, both of the states that do not allow streaming may have countdown timers associated with them. If a player moves into an area where the mobile device is not allowed, such as those areas not covered by the stream capable stations 860 or the session-only capable station 862 shown in FIG. 46, streaming may be disabled and a countdown is displayed on the mobile device at step 872 and 873. The location of the mobile device will continue to be monitored at step 874. If the countdown reaches zero and the mobile device is still not in a legal location, the mobile device may be disabled at step 875 and other actions taken such as signalling the casino that the device needs to be retrieved from the player. If the mobile device does enter a legal location then the illegal location timer is reset at step 876.

As shown in FIG. 48, if the mobile device is in a legal location, then the system determines if streaming game content is possible at step 877. If streaming is not possible, then an informational message and countdown movement timer may be displayed on the mobile device at steps 878 and 879. The effect of the countdown timer in the session-allowed-but-no-streaming zone is to allow the player to successfully traverse the casino floor to the smoking area in a reasonable time. Because maintaining a session requires much less data—kilobits a second rather than megabits—this can be achieved with a much lower density of WiFi access points. In some installations, the operator may set much different countdown timeout values for areas where sessions are allowed and not allowed based on the size of the casino and other factors. The location of the mobile device continues to be monitored at steps 880 and 881, and if the mobile device enters a location where streaming game content is possible, then the timer is reset at step 882. If the countdown reaches zero and the mobile device is still not in a location where streaming is possible, the mobile device may be disabled at step 883 and other actions taken such as signalling the casino that the device needs to be retrieved from the player.

When a timeout occurs, the action taken may differ. In one embodiment, if the player is in the session-enabled area, they may be allowed to re-establish the session at the gaming machine 864. If the player is outside of an allowed area, the message on the device may be more aligned with loss prevention, informing the player that if they do not return the device they may be liable for replacement of the device.

Once the mobile device is in a legal location with access to streaming game content, such as the areas depicted as the stream capable stations 860 in FIG. 46, a remote gaming session may begin at step 884 of FIG. 48. Once the remote gaming session ends, the player may return the mobile device to the casino operator and possibly return to the gaming machine.

In locations where player tracking cards are used as part of session management, for example, in casinos where smartcards are deployed as combined electronic wallets/player tracking cards, there may be additional logic when the mobile device is disabled as shown in FIG. 48. In these locations the smartcard also may be disabled and ejected from the gaming machine. This would end the streaming session, but protect the player funds in the account. The player may need to have the smartcard re-enabled or replaced to continue gambling.

Figure 49:
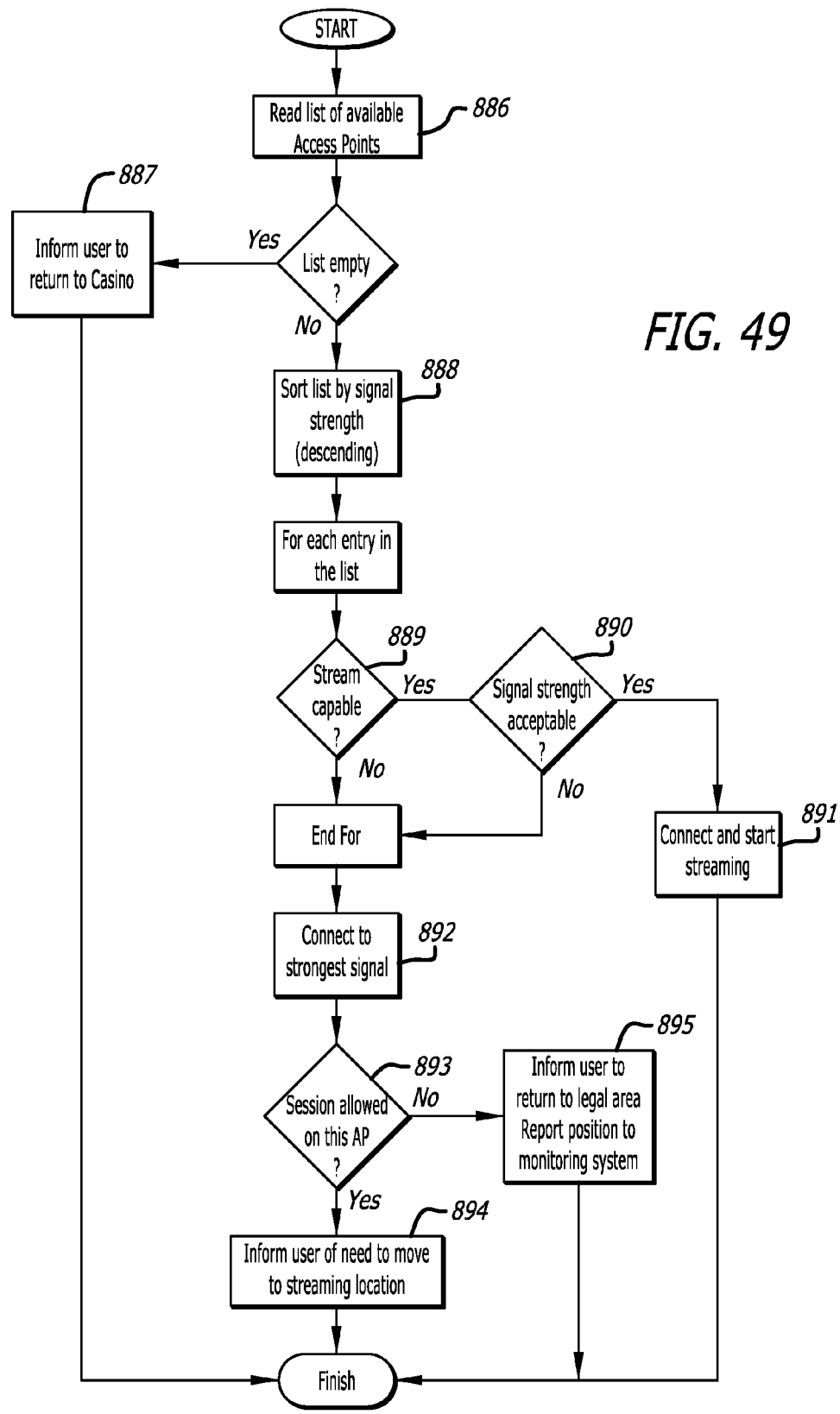
FIG. 49 illustrates one embodiment of a process to connect a mobile device to an access point (AP) for remote control gaming.

Referring now to FIG. 49, one embodiment of a process for determining whether a mobile device may use WiFi access points to stream game content is shown. It is a standard feature of WiFi client chipsets that they are capable of maintaining a list of available access point identifiers (known as BSSIDs) and associated signal strengths while in parallel communicating with a particular access point. In one embodiment, each access point may have a common SSID, and the individual BSSID may be used for determining streaming or session allowance. A list of BSSIDs and associated capability (streaming, session-only or not-allowed) is downloaded to the mobile device as either part of the provisioning of the mobile device application software, or as part of the streaming session initiation described in the previous disclosure. Downloading as part of the session initiation allows the BSSID list to be modified as required.

In one embodiment, the BSSID list may also only be downloaded on the first session initiation, and subsequently only when updates are required. Following FIG. 49, the mobile device executes this process periodically, for example, every 30 seconds. The BSSID list may be downloaded at once any period of time. However, a shorter period may be more accurate, but a longer period would cause less battery usage.

At step 886 shown in FIG. 49, the device reads the list of available access points determined by the WiFi client chipset along with their associated signal strengths. If no available access point is found, it is assumed that the device has left the casino and after a suitable timeout, the device is locked such that no further interaction is possible without operator intervention. The user is informed of this by a message displayed on the device at step 887. If access point(s) are found, the list of APs is sorted by signal strength, with the highest strength first in the list at step 888. Each AP BSSID in the list is tested in turn against the BSSID list stored on the device. At steps 889 and 890. If the BSSID is noted as allowing streaming and the signal strength meets the minimum required for adequate streaming bandwidth, then streaming is commenced or continued at step 891.

If no BSSID is available for streaming, a further test is done on the strongest available BSSID. If sessions are allowed on this BSSID, then the user is informed that the session is established but that they must move to a valid streaming location (such as the outdoor smoking area) at step 894. A countdown may also start. This case would also be met by a streaming-capable BSSID with inadequate signal strength. If the strongest available BSSID is noted as being 'session and streaming denied' then the lockout countdown occurs as before, with the added feature that because the device is within range of a venue access point it is possible to inform the venue when timeout is reached without using an alternative data backhaul. At step 895, the mobile device may display a message to the player to return to a legal area and the position of the mobile device may be reported to the server if the mobile device is not in an area that allows starting a session or streaming game content.

It should be noted, of course, that some mobile devices also have data backhauls such as 4G or LTE, so even without access to WiFi, signalling can be transmitted to the venue informing of a device leaving the venue. The location of the device may also be transmitted using GPS.

Locating Gaming Machine after Ending Remote Game Play

With a large number of gaming machines on large casino floors, players that begin a remote gaming session and leave the gaming machine may not remember which gaming machine to return to after an extended period of remote play. As discussed above, returning to the gaming machine may be necessary in some embodiments in order to cash out or for inserting further funds. In other embodiments, there may be no requirement to return to the gaming machine with the mobile wallet integration, as disclosed above.

Figure 50:
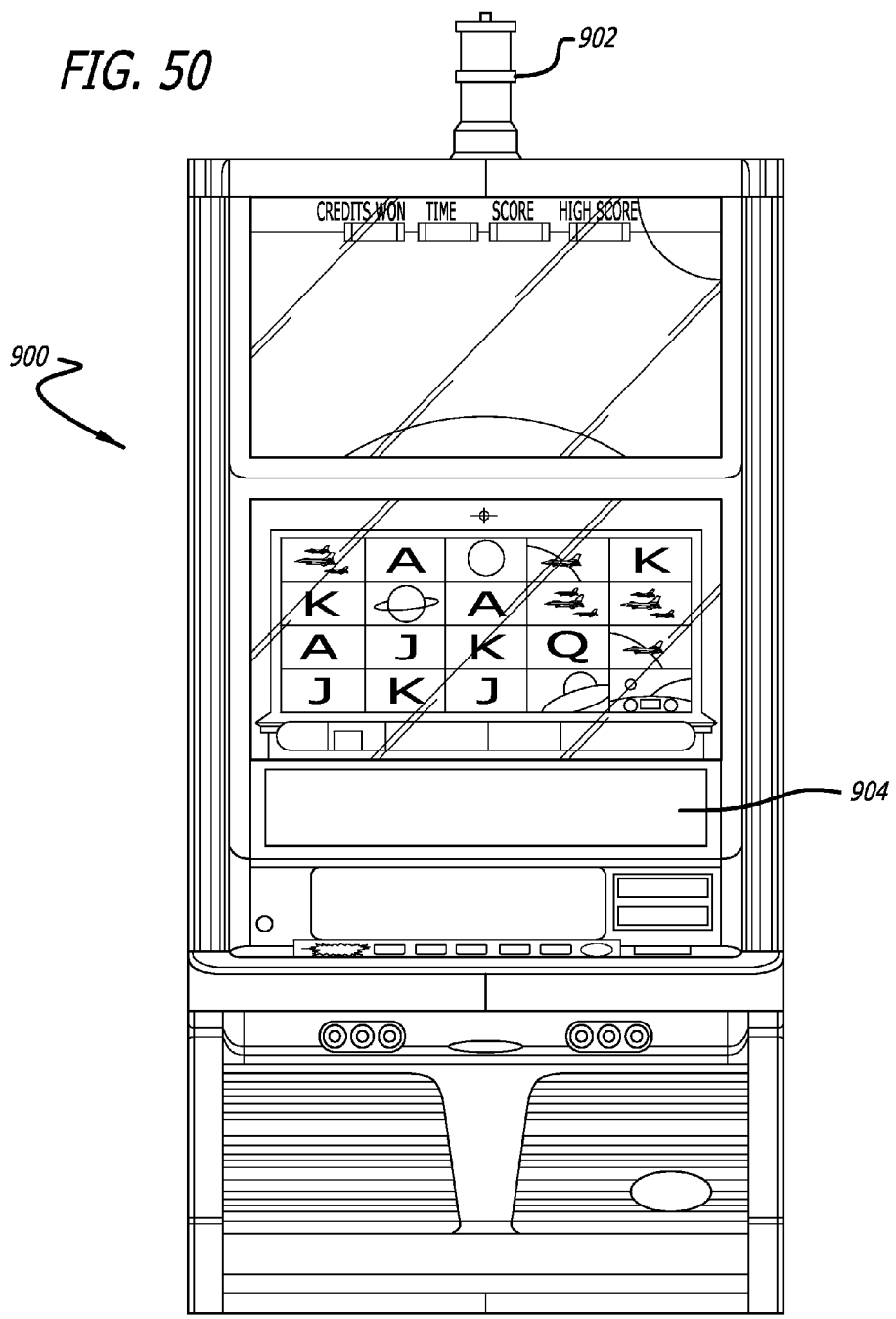
FIG. 50 illustrates one embodiment of a gaming machine having a candle and speakers that may both be used to help a player locate the gaming machine.

Referring now to FIG. 50, a gaming machine 900 is shown having candle 902 and a speaker 904. In one embodiment, the candle 902 includes of a stack of lights that may illuminate under certain conditions. For example, if a player presses the service button on the iDeck of the gaming machine, one of the lights on candle may flash to alert an attendant to assist a player at the gaming machine. Although players may ignore the candle because it is out of their eye-line when they are seated at the gaming machine and they are never trained to look at it, in one embodiment, the candle 902 may be used by players to locate the gaming machine where they began their remote gaming session. In addition, sounds may be played by both the gaming machine 900 and mobile device to further help this accomplishment. Directions may also be provided on the screen of the mobile device to help the player navigate through the casino floor to return to the correct gaming machine. In another example, the number or other identification of the gaming machine may be provided to the player on the mobile device, and then the player can refer to a map of the casino floor in order to return to the appropriate gaming machine.

Figure 51:
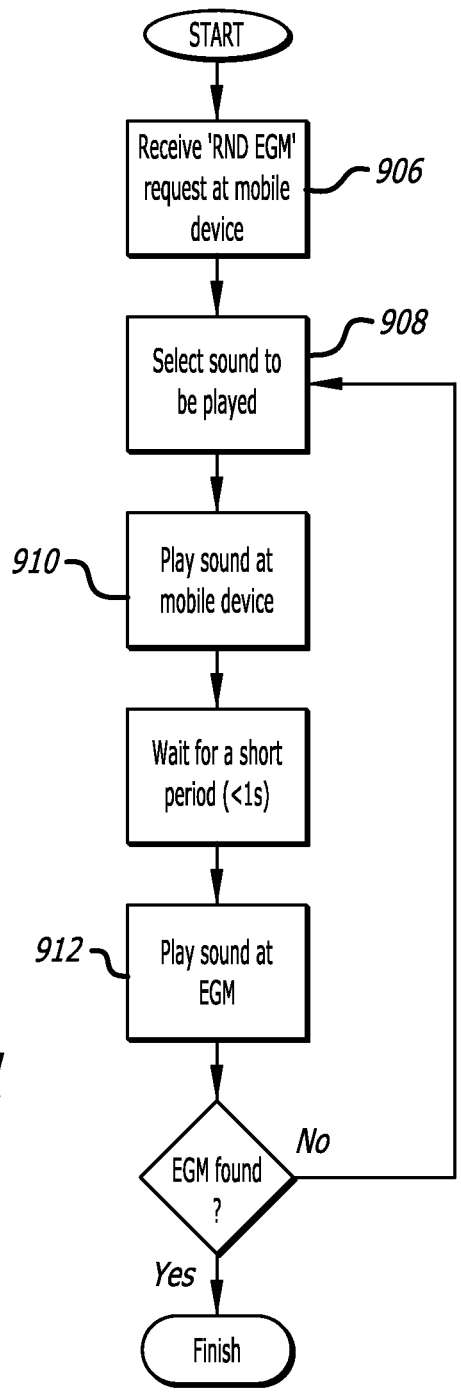
FIG. 51 illustrates one embodiment of a process for locating a gaming machine in a casino.

FIG. 51 depicts a flowchart of a basic process to locate the gaming machine at the player's request. In this example, the player may be located in a remote area from the gaming machine, such as area 860 as shown in FIG. 46. If the player desires to return to the gaming machine, the player need require assistance to locate to the correct gaming machine. Thus, at step 906, the player may select the 'Find EGM' or similar control on their mobile device. In one embodiment, this feature may be mapped into the service button menu.

Figure 52:
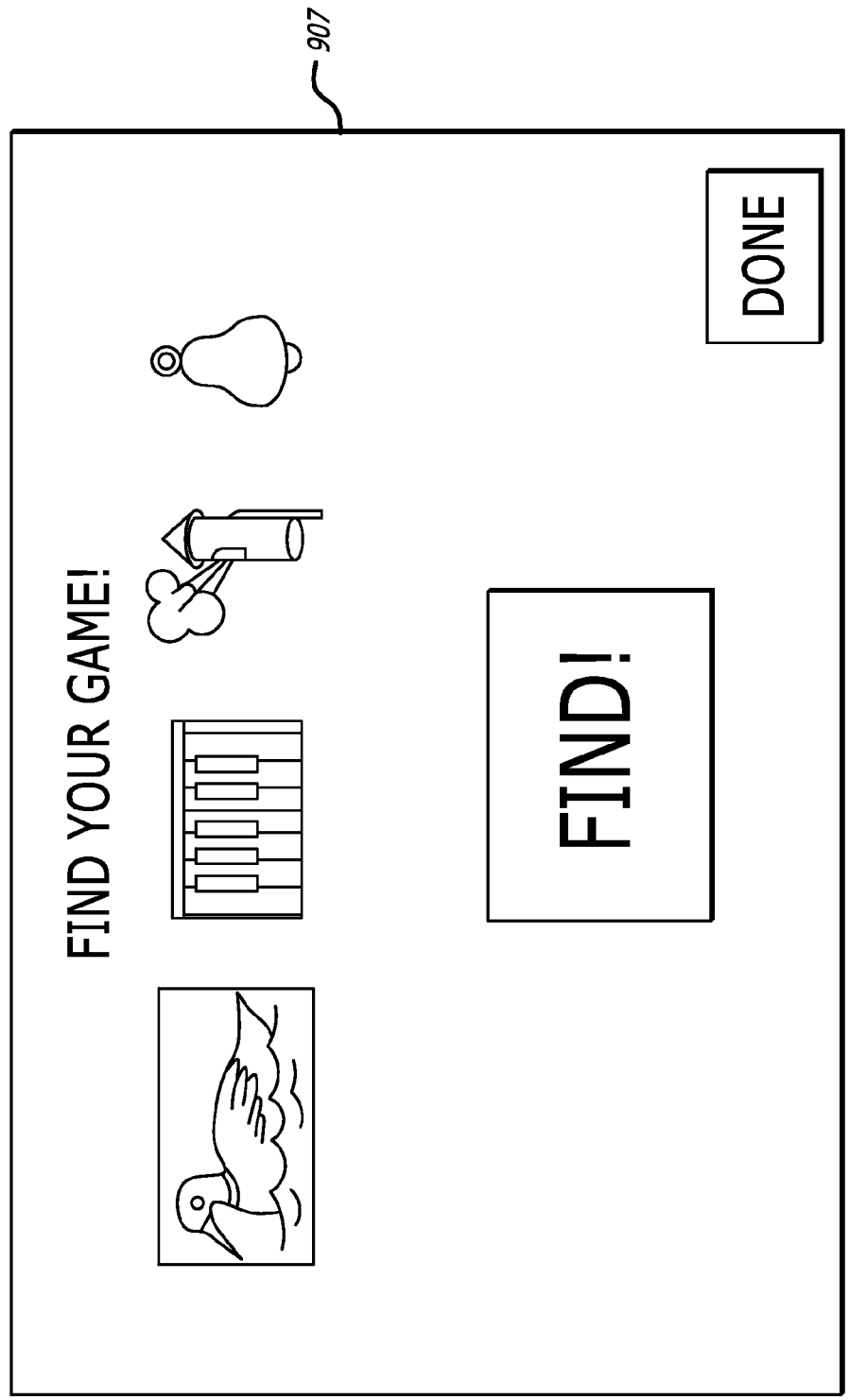
FIG. 52 illustrates one example of a screen shot on a mobile device to allow a player to select a sound to play on a gaming machine in order to help locate the gaming machine associated with the mobile device.

As an example only and not by way of limitation, a screen, such as the screen 907 shown in FIG. 52 may be presented to the player on the mobile device. On screen 907, there a selection of sounds may be available to the player. More than one sound possibility is available so that if multiple players are trying to find a gaming machine at the same time they can each choose different sounds. In one embodiment, a default sound would be chosen randomly or may be assigned by a server that is aware of other 'Find EGM' processes currently active so that each player has a different locator sound.

After being presented with options in this example, the player may select the sound to be played at step 908 by presses the 'Find EGM' sound. This causes the sound the player chose to be played through speakers of the mobile device so the player can be familiar with the selected sound at step 910. In this example, the gaming machine 900 may the play the same sound after waiting a short period, such as one second, at step 912. In one embodiment, both the gaming machine and mobile device will continue to play the selected sound, such that the gaming machine is echoing the selected sound being played by the mobile device. During both sounds being played, the gaming machine 900 may also flash one or more of the lights on the candle 902. Once the player locates the gaming machine, both sounds stop playing and the flashing candle light stops as well.

In different embodiments, the signalling to play the sounds can come from either the mobile device or the gaming machine. In one embodiment, the gaming machine streams all audio and video content to the mobile device, so the screen shown in FIG. 52 also may be streamed from the gaming machine to the mobile device. In this example, the gaming machine streams the sound first to the mobile device then plays it locally.

After the selected sounds have been played on the mobile device and gaming machine, if the player has not yet found the gaming machine the process can repeat. This allows a player to iteratively find a gaming machine by repeating the process described in FIG. 51. If a player cannot hear the audible selection from the gaming machine, or if the player repeats the process above a certain predefined limit, an attendant may be summoned by the RCG server signalling the STM (Service Tracking Manager) system to assist the player. This process is not limited to RCG streaming solution and the process outlined in FIG. 51 may be used by any 'locate an EGM' application loaded onto a mobile device.

Wifi Access Management

In one embodiment, the system and method for remote control gaming sessions includes streaming game content between the gaming machine (EGM) and the mobile device using a WiFi network. The gaming machine communicates the stream through the WiFi Access Point (AP) to the mobile device. As several remote control gaming sessions may concurrently be in progress, a WiFi AP may be shared across multiple remote devices.

Figure 53:
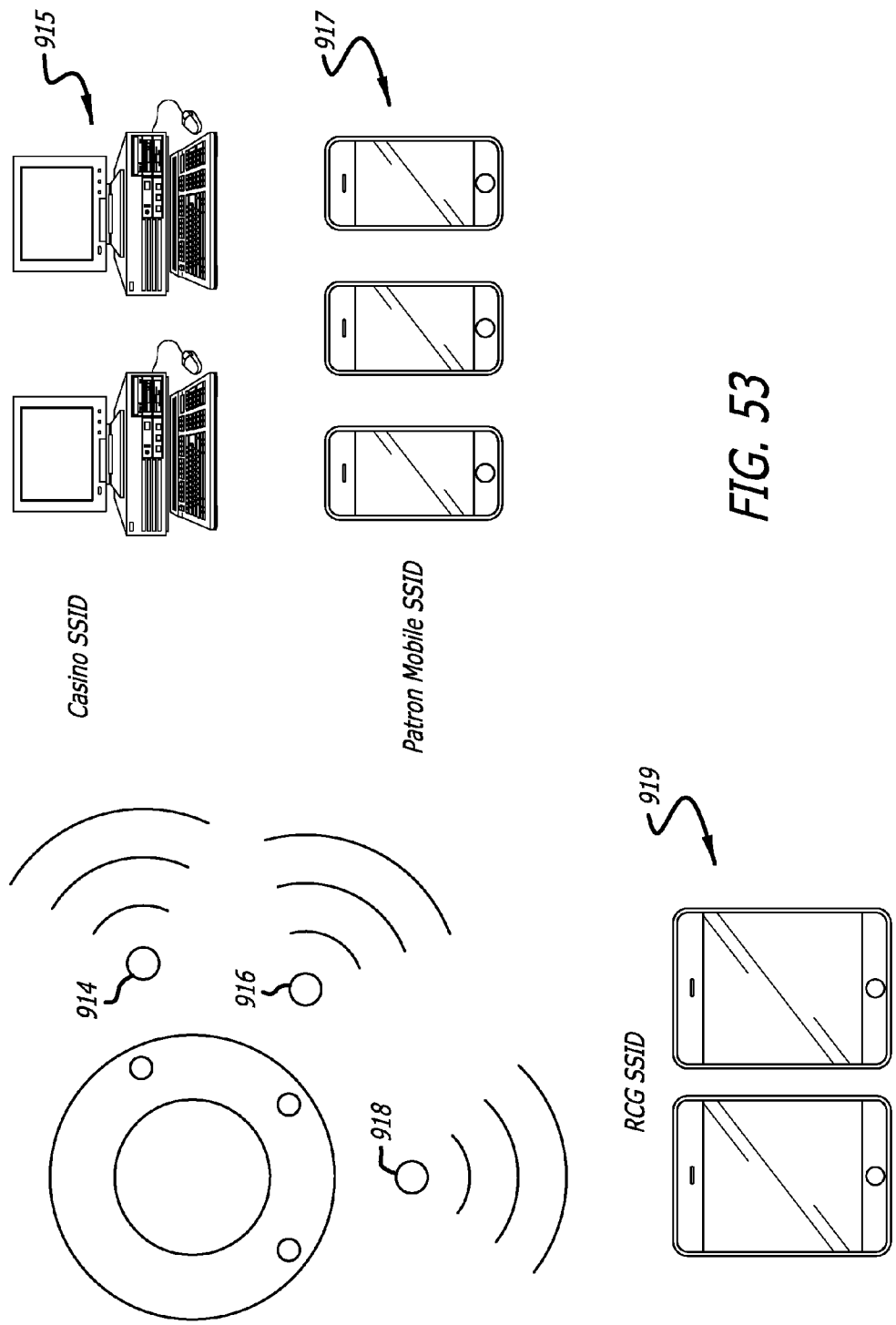
FIG. 53 illustrates an overview of a system for connecting multiple mobile devices to multiple access points.

In general, multiple WLANs can exist in a given airspace and each WLAN requires a unique name, which is called the service set identifier (SSID). In these examples, a casino may contain multiple SSIDs (or WLANs). As shown in FIG. 53, a casino SSID 914 may be set up in a casino and used for employees to connect with casino systems on their laptop systems 915 or mobile phones. Further, a patron SSID 916 may be set up in a casino and used by patrons to connect with casino systems from a casino mobile application installed on the player's mobile device 917 (tablet, phone, etc.) or on a mobile device designated for player use by the casino. A remote control gaming (RCG) SSID 918 may also be set up in a casino and used by casino designated mobile devices 919, such as tablets, used for RCG to connect with gaming machines and RCG systems for remote gaming. In other embodiments, players may connect the RCG SSID using appropriate applications installed on the mobile devices, such as smartphones or tablets. Access Points (APs) provide connectivity between the RCG mobile device and the RCG server and the gaming machine through the WiFi medium. Each AP is identified by BSSID. Each SSID will have many AP's each of them being identified by its BSSID. Mobile devices in this system may be connected to gaming machines through WiFi Aps with each AP being identified by a BSSID.

Significant network traffic over the RCG SSID may result if multiple players concurrently use the remote control gaming system. When there are several parallel sessions, the quality of display may be impacted. The following approaches may be used to handle significant network traffic caused by streaming gaming content between gaming machines and mobile devices.

In one embodiment, a dedicated WiFi network may be used to manage the number of parallel remote control gaming sessions. With an independent WiFi set up, the RCG system monitors the overall load on the SSID as well the load on the APs. In certain embodiments, there can be many SSIDs allocated for the RCG system. The number of SSIDs depends on factors such as the area allocated for RCG system, capacity of WiFi Equipment, estimated number of players, etc. Each of the SSIDs to be used for the RCG system is configured in the RCG system with details such as the APs (BSSIDs) associated and the capacity of the SSID.

When a RCG session is established in one embodiment, the mobile device will connect to the SSID and BSSID combination that can provide the maximum strength. When more than one SSID is used by the casino, the mobile device assesses the strength of the SSID using the RSSI value (Received Signal Strength Indicator). Based on the RSSI value, the mobile device may connect to the SSID with the maximum RSSI value.

In order to manage the stream quality of the gaming content being distributed from the gaming machine to the mobile device during an RCG session, the RCG system keeps information about the bandwidth requirement for each gaming machine/game combination. This is obtained by associating the gaming machine/game with the minimum, maximum, and average bandwidth of the stream. This can be computed in the following exemplary ways. In one example, the RCG system pre-computes the minimum and maximum bandwidth for the given gaming machine/game combination during production. This data may be made available in a game that can be queried by the RCG system and entered in the data associated with the gaming machine/game combination. Alternatively, the data can be manually entered in the RCG system by an operator. In another example, the RCG system may dynamically compute the bandwidth. In this example, the mobile device software can keep track of the minimum, maximum, and average bandwidth communicated during the remote control gaming session. This data is updated regularly in the RCG system. As the data before the first run will not be available, a configurable default value may be maintained. In both of these examples, this data relating to the bandwidth may be used when new sessions are initiated and connected to APs.

There may be several smoking areas or other areas where remote gaming is allowed, as shown in FIG. 46. This mandates one or more WiFi APs be placed in each of these areas. As APs have limited bandwidth, it is critical to control the number of sessions that each AP can support. The display quality of all the connected sessions can get severely impacted if connections are allowed through an AP without proper monitoring of the bandwidth consumption. If there are active sessions running using an AP that is already full, a new session added to that AP can lead to poor display quality on all the other session running. In addition, the new session will also have a poor quality stream display. This may impact the experience of all the patrons connected to the AP. Therefore, it is critical to monitor the current bandwidth consumption and manage the sessions to ensure a smooth experience for all the connected sessions.

In one embodiment, the RCG system manages gaming quality and bandwidth in the following approach. Each gaming machine (EGM)/game combination requires a specific bandwidth. A low complexity game on a V22 EGM will require lower streaming bandwidth compared to a high complexity game on a V32 monitor. Thus, the RCG system associates a specific bandwidth requirement for each gaming machine/game combination. With this association, the RCG system may track the current bandwidth consumed by the mobile devices that are connected to a given AP. When a new remote control gaming session is requested over an AP, the RCG system analyzes the bandwidth consumed by the remote sessions connected through the given AP. If the new session needs bandwidth that can be accommodated in the remaining AP bandwidth, then connection is allowed. Otherwise, the player is recommended to move to another area of the casino so connection to another AP can be established. The AP connected to the remote session is identified through the BSSID of the AP.

Figure 54:
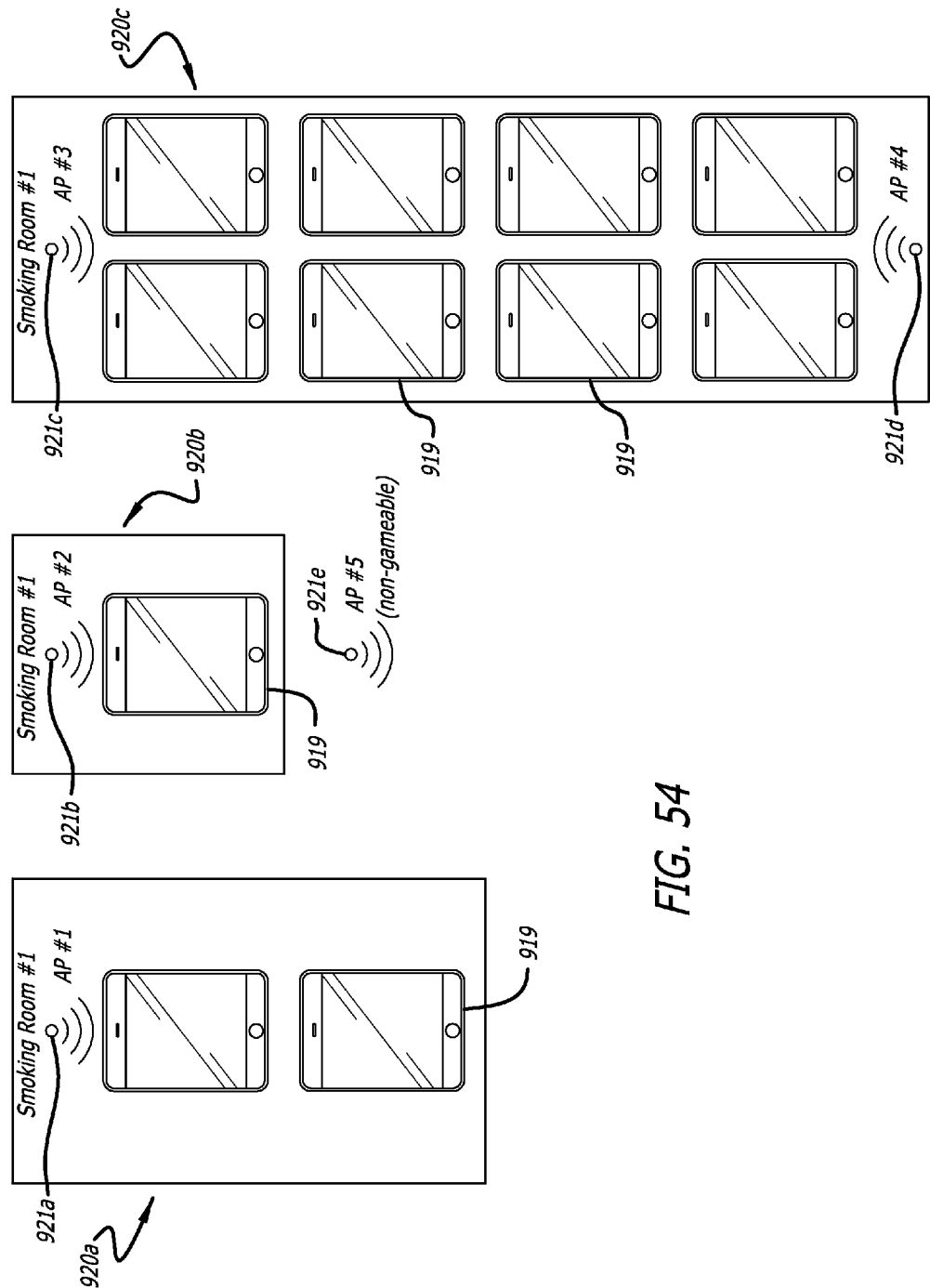
FIG. 54 illustrates multiple access points in multiple rooms for connecting mobile devices to a gaming machine for remote control gaming.

An example of this is provided in FIG. 54, where there are eleven remote control gaming sessions concurrently in progress on mobile devices 919 in three smoking rooms 920a, 920b, and 920c. Further, as shown in FIG. 54, there are five APs 921a, 921b, 921c, 921d, and 921e. In this example, the larger smoking room 920c includes APs 921c and 921d. Further, AP 921e is a non-gameable AP that is located outside of the smoking rooms. In this example, AP 921a has a capacity of 25 MBits/second and the current bandwidth consumption is 21 MBits. If a player walks into the smoking room 920a with a remote session active that requires 2 MBits/second, the player is allowed to continue his remote control gaming session because 2 MBits/second can be accommodated with the remaining 4 MBits/second on AP 921a. Continuing with this example, if another player walks into the same smoking area 920a with a remote session active that requires 3 MBits/second, the RCG system will inform that player to go to another smoking area in order to connect to another AP. This is because the additional 3 MBits/second requirement cannot be accommodated with the remaining bandwidth of 2 MBits/second.

In one embodiment, the RCG system manages active remote gaming sessions when a player moves from one AP zone to another. A smoking area or other designated area from remote play may have one or more zones, and each zone may have its own AP. Players may move from one zone to another. In one example, smoking room 920c is a large area and has two APs 921c and 921d as shown in FIG. 54. As a player enters the smoking room 920c, the mobile device tablet may connect to the system through AP 921c or AP 921d depending on the distance between the mobile device and the AP and the availability of bandwidth. If a player moves from one AP area to another, for example, AP 921c to 921d, and the area of AP overlap is not significant, the mobile device 919 may suffer from lack of connection or a very feeble connection to the AP. This may impact the quality of the gaming session. Instead of showing a poor quality stream of gaming content, the RCG system may pause the stream of game content until it connects to the AP with strength enough for streaming the gaming content.

When a player moves from one AP zone to another, for example AP 921c to AP 921d in smoking room 920c, the bandwidth of the AP 921d is analyzed by the RCG system along with the session bandwidth required. If the player's session can be accommodated within the available bandwidth of AP 921d, then the player may be allowed to move into the zone and connect through AP 921d. Otherwise, if the player's session cannot be accommodated by AP 921d, the RCG system will inform the player to move to another AP zone.

To avoid a security attack in this embodiment, the mobile devices 919 performing remote control gaming sessions may only go through the WiFi networks that are configured in the RCG system. All wireless SSIDs and BSSIDs must be configured in the RCG system to allow a remote session to pass through the SSIDs and BSSIDs. During a remote session of one embodiment, the RCG client disables all the other WiFi networks configured in the mobile device. This may avoid someone copying the communication through another network (man-in-middle attack). A player trying to connect to a public WiFi network through a WiFi hotspot attached to his personal smartphone can be prevented by this approach.

In certain embodiments, it may be important to find the location of a player. Thus, in one embodiment, a player may call for assistance from a casino employee when the player is in the smoking area or other remote control gaming area. The reasons can vary and may include ordering a drink, food, or asking a question related to gaming. The player does this by pressing a "Call Attendant" button, or the like, on the mobile device 919. There may be several areas in the casino where remote gaming is allowed, the RCG system provides a feature by which the casino employee can locate the player automatically. This is done by the RCG system identifying the AP (BSSID) the mobile device is connected to. When the player calls for help, the casino employee is provided with the information identifying the AP. As each AP is associated with a smoking area/zone (or designated remote gaming area) in the casino, the casino employee can then trace the location of the player requesting assistance.

In certain embodiments, the RCG system maintains data for each remote control gaming session and the bandwidth consumption of each AP. With this information, the RCG system can dynamically increase the quality and revert back to default quality based on bandwidth availability. For example, an AP has some remote sessions underway with default quality and there is extra bandwidth available, some or all of the sessions can be streamed with higher quality. This will need coordination between the gaming machine (EGM) and the mobile device. As an example, AP 921a in FIG. 54 supports a total of 30 MBits/second. If there are three remote control gaming sessions in progress with the first session requiring 2 MBits/second, the second session requiring 4 MBits/second, and the third session requiring 7 MBits/second, then the total bandwidth consumption to 13 MBits/second. In this example, these sessions use default quality for the gaming session. To operate at a higher quality, the first session will need 5 MBits/second, the second session will need 8 MBits/second, and the third session will need 14 MBits/second. Thus, the total consumption at higher quality will be 27 Mbps. Since AP 921a supports 30 MBits/second, it is possible to increase the remote gaming sessions to higher quality feed. The RCG system negotiates between the mobile device 919 and the gaming machine to transmit at "High Quality", which means that bandwidth consumption is now 27 MBits/second.

Continuing with this example, a fourth remote control gaming session is established that requires 4 MBits/second for default quality, which means that the total bandwidth required to add the fourth remote control gaming session is 31 MBits/second. This is greater than the 30 MBits/second bandwidth AP 921a can support. In this situation, the RCG system may downgrade one of the high quality streams to its default quality. If the RCG system selects the second session to downgrade (8 MBits/second to 4 MBits/second), then the total consumption for the first three sessions will be 23 MBits/second. Now the RCG system can allow the fourth session to connect taking the total bandwidth to 27 MBits/second.

Similar to the embodiment discussed above, the RCG system may limit the player to play only on selected APs in order to create a geo fence. In this way, the RCG system may prevent players who enter non-gaming areas from continuing a remote control gaming session. In one embodiment, this may be done by installing non-gameable APs attached to the remote gaming SSID. For example as in FIG. 54, a non-gameable AP 921e can be kept near the exit of the designated areas for remote control gaming sessions. If the player leaves a designated area, the mobile device will attempt to connect to the non-gameable AP 921e, which will have a stronger signal when the player leaves the designated area. As AP 921e will be marked as non-gameable, the mobile device will inform the player to return to the designated area if the player wishes to continue the remote control gaming session. This same approach may be used if the player tries to exit the casino with a mobile device that belongs to the casino. Non-gameable APs may be placed in the exit areas of the casino to alert casino operators about player movement in the non-gameable areas.

The RCG system may also manage the gaming quality at lower battery levels. In one embodiment, the battery level of the mobile device may have three thresholds. When the battery reaches a level one threshold (e.g., 20% of battery life remaining), the player is alerted about the low battery level and advised to plug the mobile device into a power source or return the device to the casino operator. When the battery level continues to drop and reaches a level two threshold (e.g., 10% of battery life remaining), the remote control gaming session may be paused until power is provided to the mobile device. If the battery level drops even further to a level three threshold (e.g. 5% of battery life remaining), the remote control gaming session may be suspended to ensure that the mobile device does not switch off when the session is still active. It should be understood that the casino operator may alter the requirement for the amount of battery life remaining before triggering any of the three levels. These embodiments help ensure that a high quality player experience is maintained.

In one embodiment, the RCG system may extend battery management by dynamically decreasing the quality of the stream or reducing the brightness of the display. In certain embodiments, the function to extend the battery life is automatic and in other embodiments the player's consent may be required to initiate battery management control. In one example, if the battery level reaches a certain threshold, (e.g., 20%), the player is provided an option to continue game play with lower quality. If the player accepts to play with lower quality, the RCG system negotiates between gaming machine (EGM) and the mobile device to reduce the quality of streaming game content. By reducing the bit rate, the mobile device does less computing and consumes less power, thereby extending the time the player can play the remote game. The same approach also may be done with reducing the brightness of the display of the mobile device.

Figure 55:
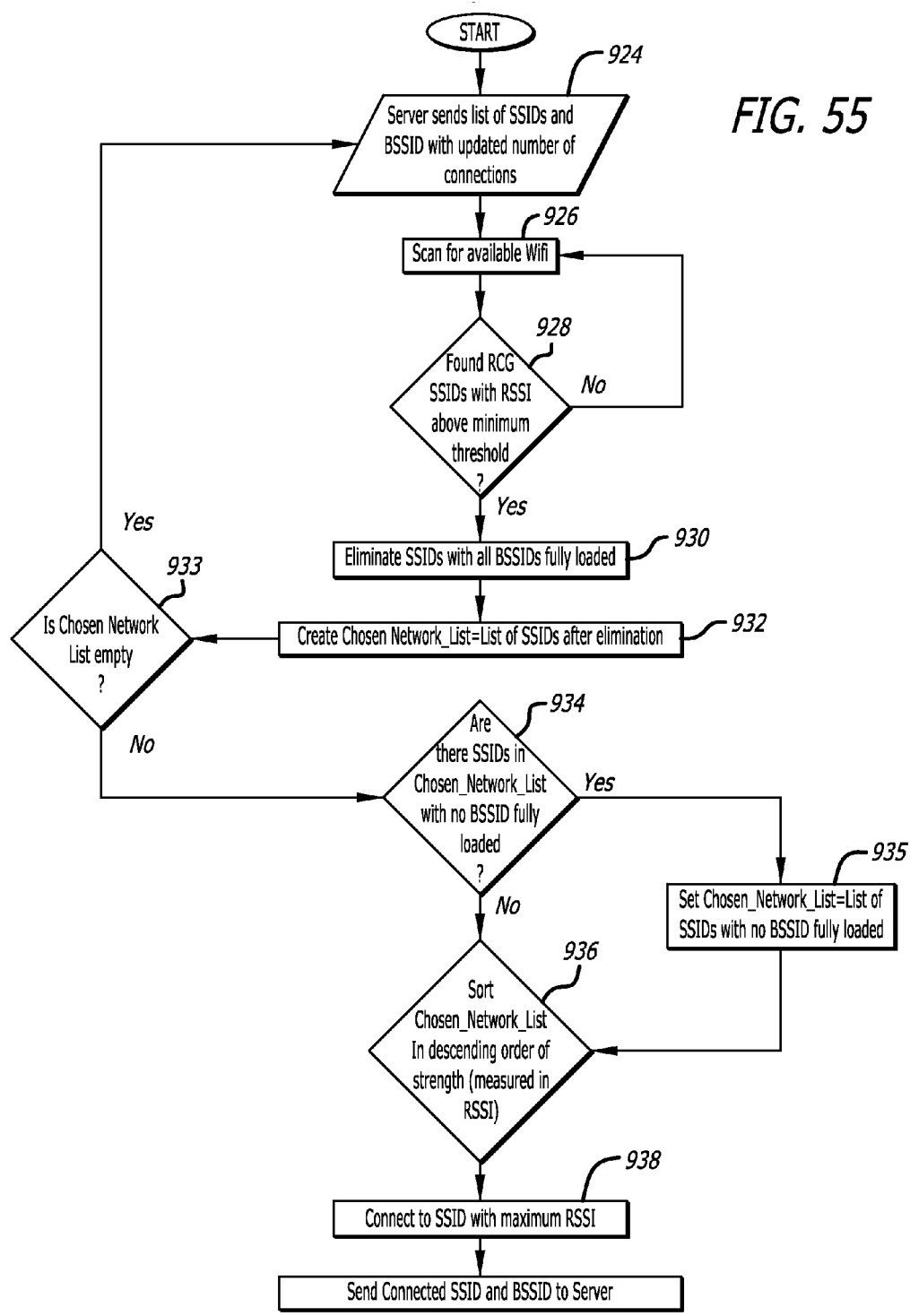
FIGS. 55 and 56 illustrate examples of algorithms to connect a mobile device to a SSID or BSSID for remote control gaming.

In one embodiment, the mobile device may connect to an SSID through the method shown in FIG. 55. At step 924, the mobile device (client) receives a list of RCG SSIDs and BSSIDs with a number of clients connected in each of the BSSID from the RCG server. This list is dynamically updated every time the RCG server sends a new network list with updated numbers. Next, at step 926, the mobile device initiates scan to determine if any of the RCG networks given by the RCG server are present. At step 928, the mobile device determines if the RSSI (Received Signal Strength Indicator) values are above the minimum threshold required for streaming the desired gaming content. If no such network is identified, the mobile device repeats this step until a sufficient network is identified. If there are RCG networks (SSIDs) that satisfy minimum threshold value for the mobile device, the mobile device determines if all BSSIDs of any such SSID are fully loaded (a fully loaded BSSID has maximum number of RCG sessions running on them already) and eliminates those SSIDs at step 930 since they cannot accommodate any more RCG session. The mobile device then creates a Chosen_Network_List that includes SSIDs available for streaming game content at step at step 932. At step 933, if no network is available for streaming game content, the mobile client connects to the SSID with the highest signal strength to communicate to server and jumps to step 924. Streaming is not possible with this connection.

If there are networks available for streaming gaming content, the mobile device determines if there are SSIDs with no BSSID completely loaded at step 934. All the BSSIDs in this list would be able to accommodate one/more sessions. This list may then be updated as the Chosen_Network_List at step 935. The mobile client then sorts the Chosen_Network_List based on the order of signal strength (measured in RSSI) at step 936. The SSID with the maximum RSSI is chosen for connection at step 938. Once connected, the mobile client may send connected SSID and BSSID to the RCG server at step 940.

Figure 56:
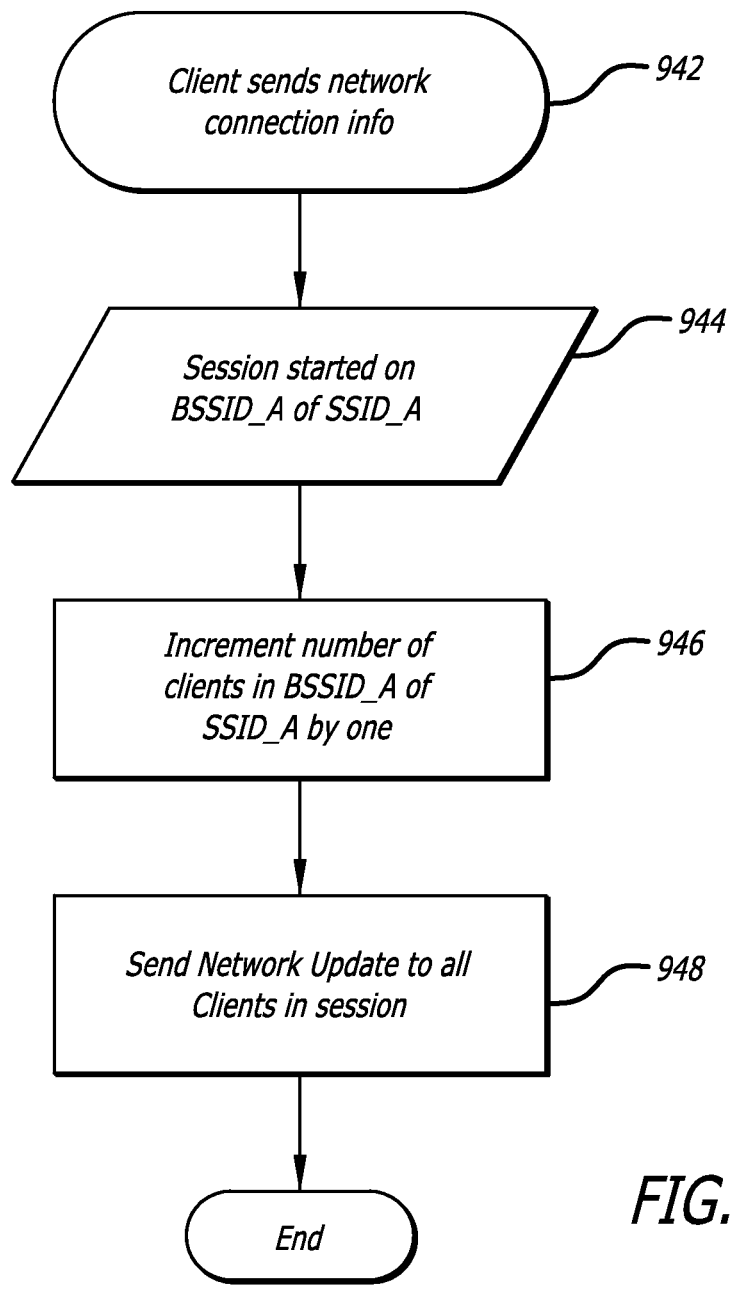

One embodiment of a process for connecting mobile device (client) to a network is shown in FIG. 56. As shown, once the mobile device is connected to an appropriate SSID, the mobile device sends network connection information to the RCG server at step 942. Next the remote control gaming session is started on a specific SSID and BSSID, such as SSID_A and BSSID_A at step 944. The RCG server increments the number of clients connected to SSID_A and BSSID_A by one at step 946. Next, the RCG server sends a network update including the number of clients connected to each SSID to all mobile clients in session at step 948.

Figure 57:
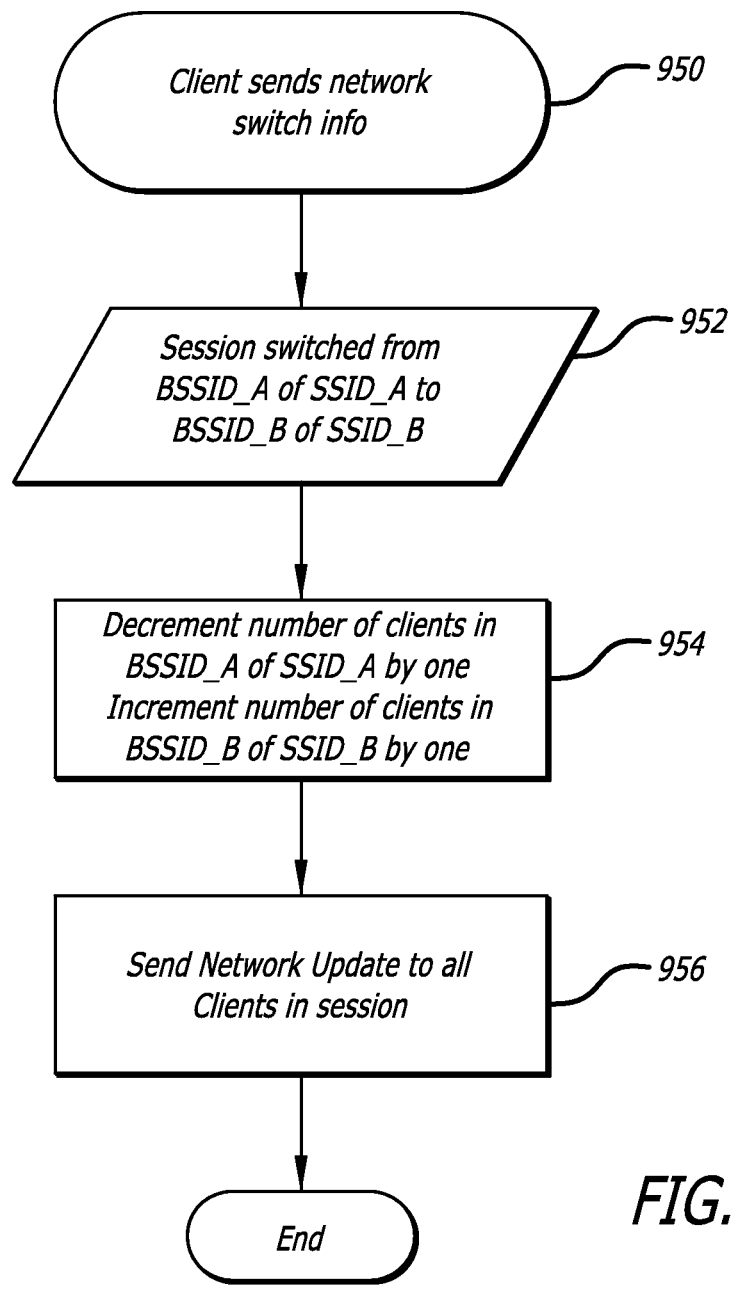
FIG. 57 illustrates an example of an algorithm to switch a mobile device from one SSID or BSSID to another SSID or BSSID.

One embodiment of a process for switching a mobile device (client) from one network to another is shown in FIG. 57. As shown, once the mobile device enters another zone and the signal strength of another SSID is stronger than the current signal strength of the SSID connected to the mobile device, the mobile device sends network switching information to the RCG server at step 950. Next the remote control gaming session is switched from one SSID to another, such as switching from BSSID_A of SSID_A to BSSID_B of SSID_B at step 952. The RCG server then decrements the number of clients in BSSID_A of SSID_A by one and increments the number of clients connected to BSSID_A of SSID_A by one at step 954. Next, the RCG server sends a network update including the number of clients connected to each SSID to all mobile clients in session at step 956.

Mobile Reformatting

Figure 58:
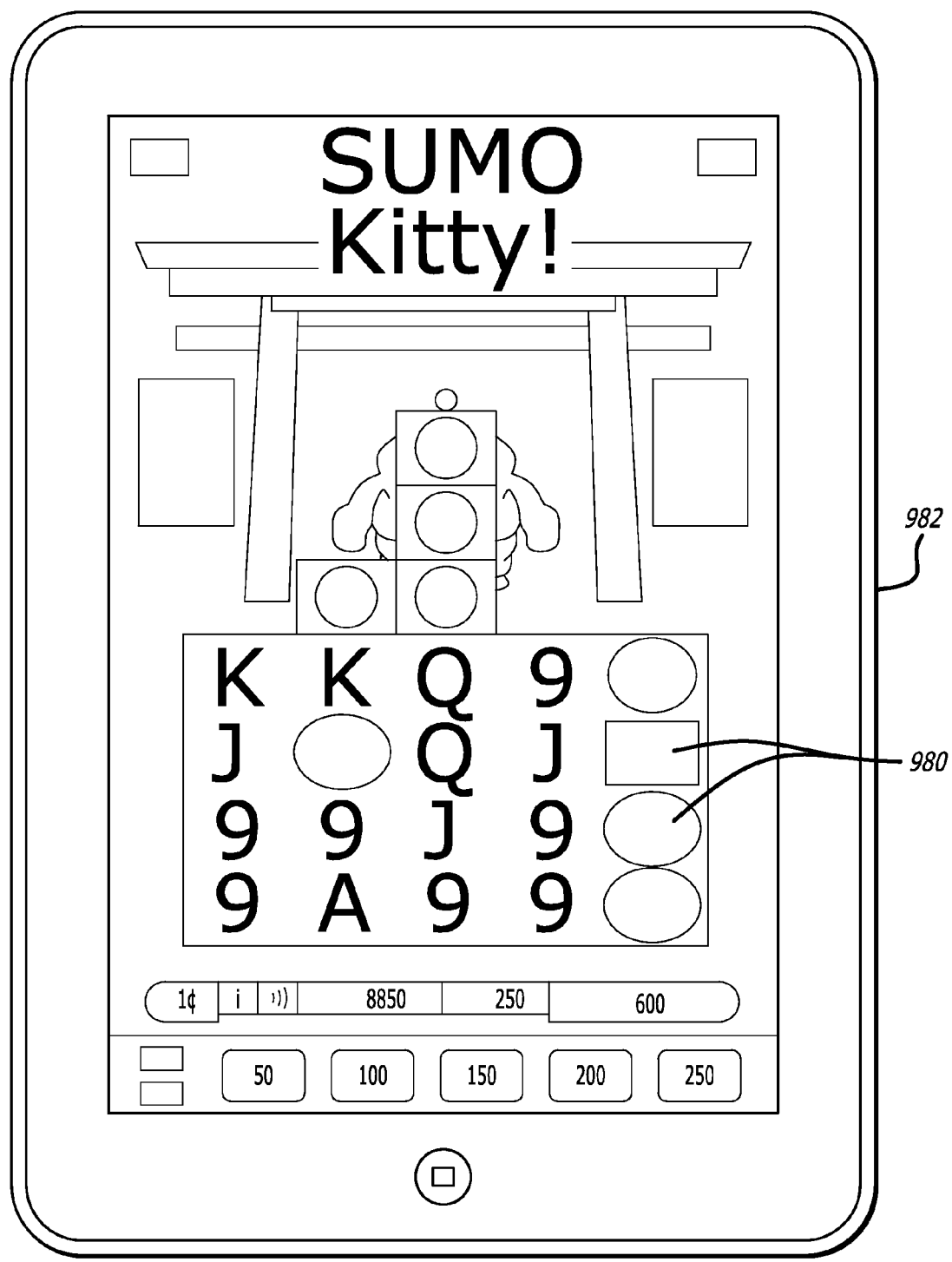
FIG. 58 illustrates a mobile device running the game "Sumo Kitty!" and displaying all active content.

In one embodiment, the content displayed on the mobile device may be automatically reformatted for the best fit on the mobile device. The system described above is capable of working with a wide range of games and is capable of working on a wide range of mobile devices that may have varying aspect rations. In one example, displaying all active game content on a mobile device may make it difficult to view the reel symbols or other indicia on the screen of the mobile device. This is because the mobile device must display all active game content, which for a Bally gaming machine (EGM) is typically every display bar on the topper. In consequence, as shown in FIG. 58, the reel symbols 980 take up only a small portion of the overall display on the mobile device 982. Although in some embodiments the reel symbols 980 are the most important element for some players, only displaying the reel symbols on the display of the mobile device 982 might create other problems. For instance, the upper portion of the display on gaming machines may be used by game designers to periodically display important content, such as that shown in FIG. 58. Specifically in the example shown in FIG. 58, hot zones are shown in the upper portion of the display that build anticipation by being seen as nearly missing or approaching the reels during a spin. Thus, it may not be acceptable to simply only show the reel symbol portion of the screen at all times. However, in certain embodiments, only the reel symbols may be shown on most or all of the display of the mobile device.

Figure 59:
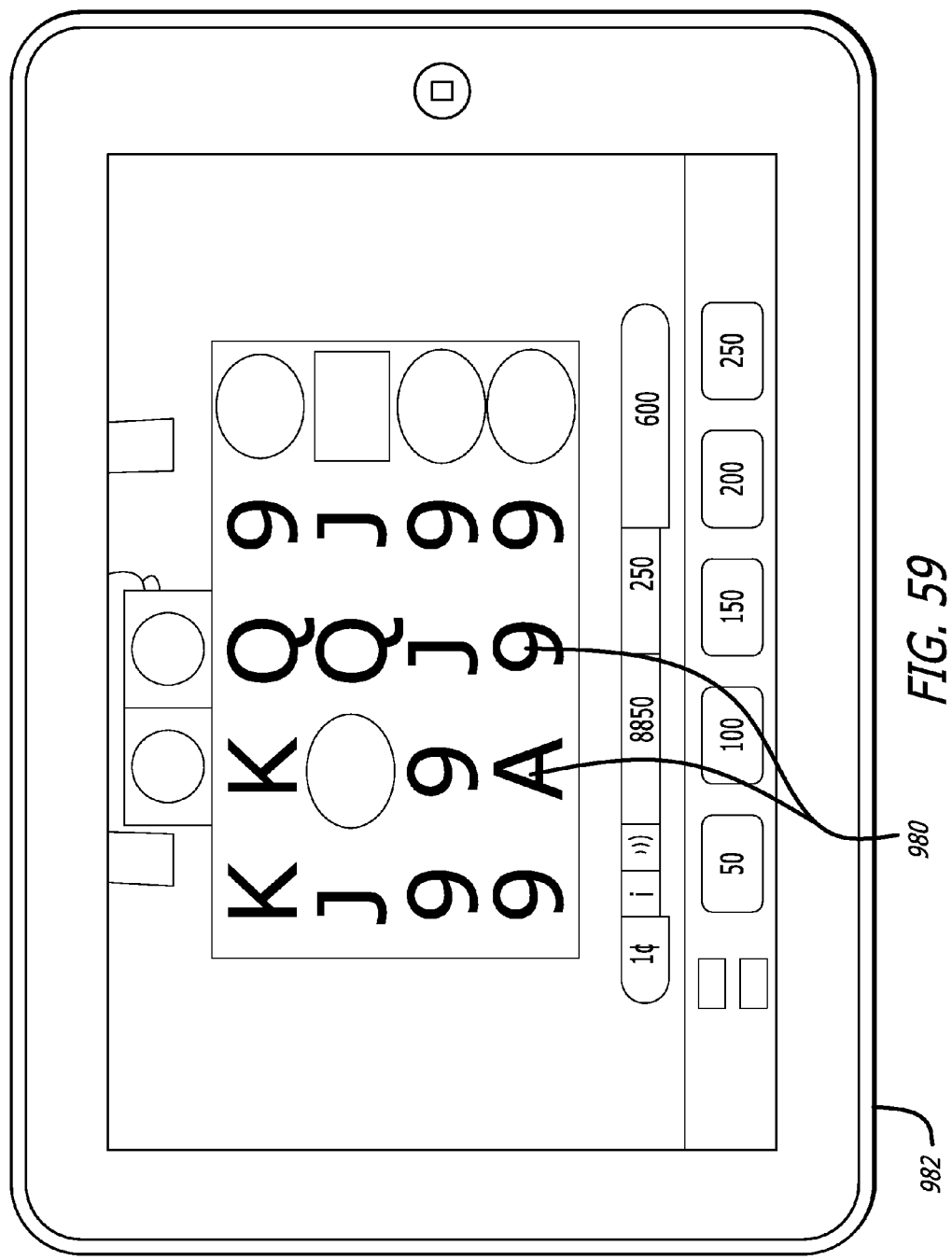
FIG. 59 illustrates a mobile device running the game "Sumo Kitty!" and displaying only prime content.

The mobile devices 982 shown in FIGS. 58 and 59 are oriented differently. In FIG. 58, the mobile device 982 is in a portrait orientation and the mobile device 982 shown in FIG. 59 is in a landscape orientation. In one embodiment, as shown in FIG. 58, when the mobile device 982 is in the portrait orientation, all active content from the gaming machine is shown on the display of the mobile device. And when the mobile device 982 is in the landscape orientation as shown in FIG. 59, only prime content is shown. In other embodiments the player may decide and choose the orientation of the mobile device and the amount of content that is shown on the mobile device. It should also be understood that all active content may be shown when the mobile device is in landscape orientation and only prime content may be shown when the mobile device is in the portrait orientation.

Figure 60:
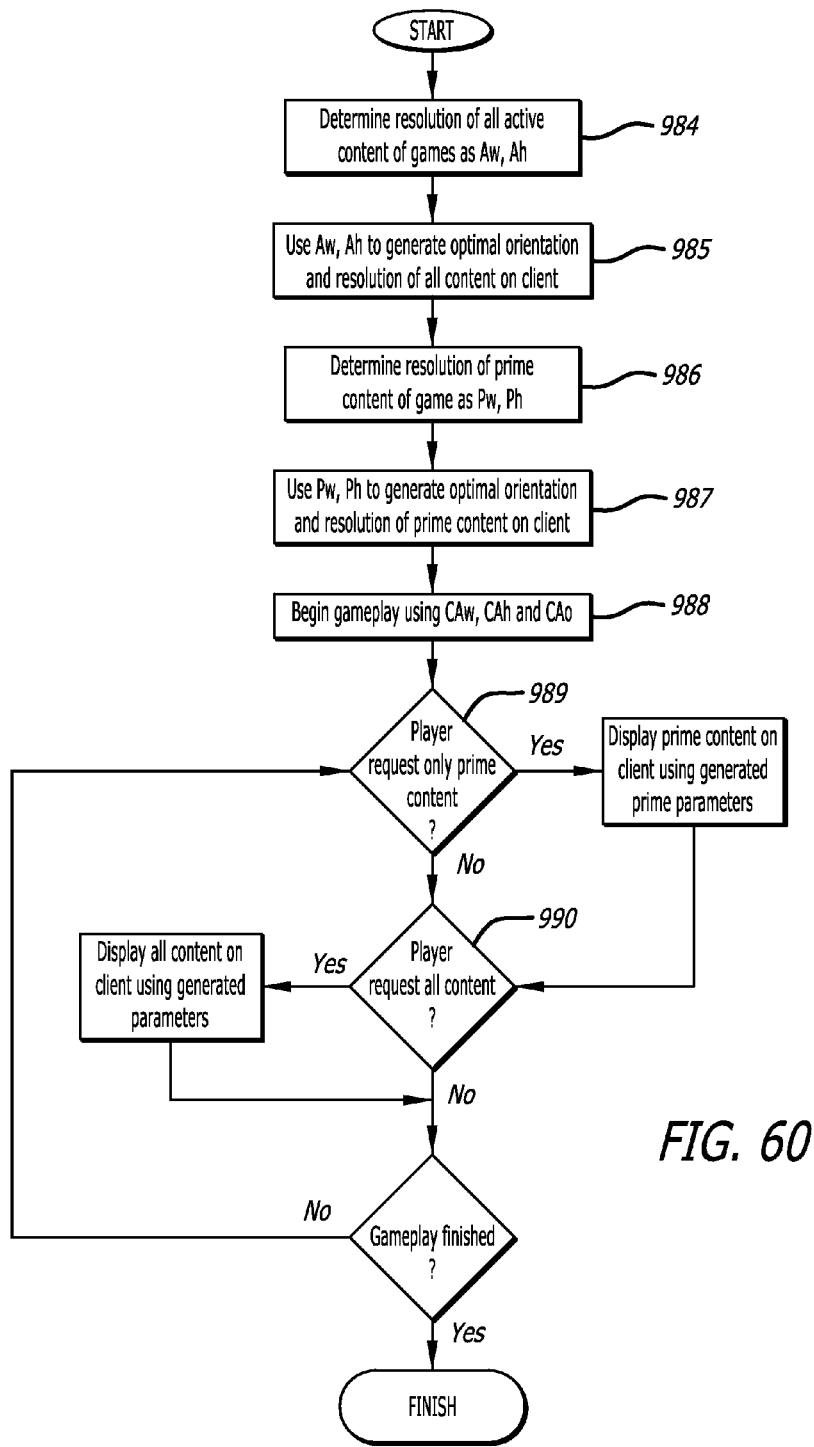
FIG. 60 illustrates a process to use prime and active content on a mobile device during remote control gaming sessions.

A process such as that shown in FIG. 60 may be used to automatically adjust the content sent from the gaming machine to the mobile device depending upon player preference. First, at step 984, the active content for a game is determined. This is generally comprised of all displays for a game necessary for operation. Using the game "Sumo Kitty" as an example, a Bally V32 product, as shown in FIG. 58, it consists of a portrait mode 32 inch display and the iDeck display. For a V22/22 game, it would consist of both the main and top box landscape mode displays along with the iDeck. In neither case would the topper signage be included in this embodiment.

Next, the active content is used as an input for the reformatting method described above. This generates optimal client resolutions and positioning for both the iDeck and the active content. Both of these steps were previously performed in the original disclosure. In this embodiment, a subsection of the active content, now described as prime content, is also used as an input for the mobile reformatting method. In the example shown in FIG. 59 this consists of the bottom 50% of the V32 display along with the iDeck. The choice of 50% could be adjusted on a game-by-game basis, but is a good starting point and could easily be used for all V32 games. For V22/22 games, 50% of the two displays is equivalent to the bottom display only, which again is a starting point that could easily be used for all V22/22 games. As shown in FIG. 60, step 985 includes using Aw and Ah to generate optimal orientation and resolution of all content on client device, and step 986 determines resolution of the prime content of the game as Pw and Ph. At step 987, the system uses Pw, Ph to generate optimal orientation and resolution of prime content on the client device (mobile device).

Streaming game content can then begin from the gaming machine to the mobile device at step 988 when game play begins using Caw, CAh and Cao. In one embodiment, all of the active content is sent from the gaming machine to the mobile device. In certain embodiments, the amount of content sent from the gaming device to the mobile device can be switched by the player between all active content and the prime content only as shown at steps 989 and 990 of FIG. 60. In these embodiments, it is possible that all game content is sent to the gaming machine and only specific content, such as the prime content, is shown on the screen of the mobile device. The player may execute the switch by pressing an icon on the mobile device that switches the amount of content from all active content to prime content only, or vice versa. The player also may execute the switch from all active content to prime content only by rotating the mobile device from portrait to landscape orientation, using the accelerometers commonly found in mobile devices to detect the new orientation. The player or casino operator may also set a preference in a menu on the mobile device to always choose a particular mode of operation.

Figure 61:
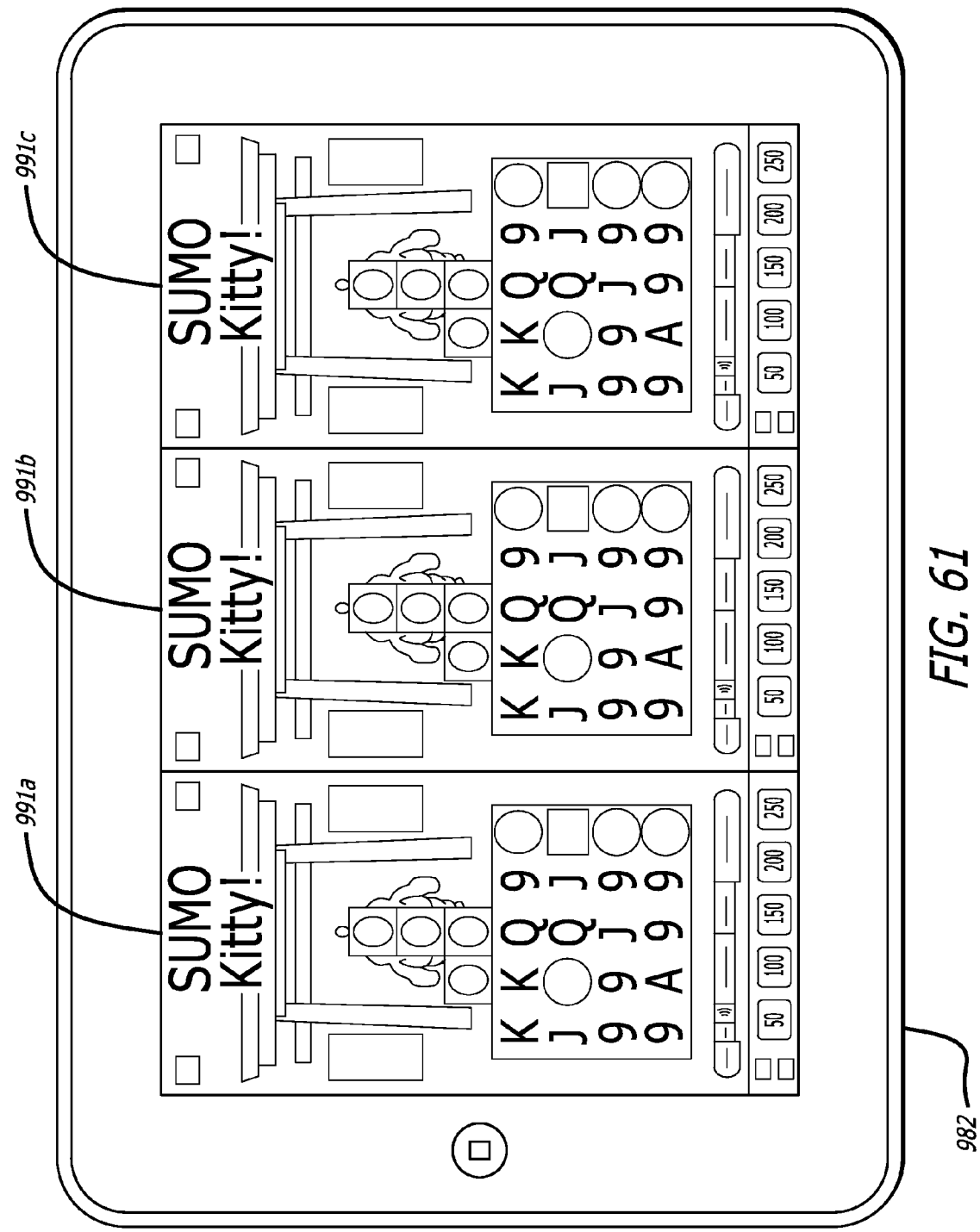
FIG. 61 illustrates a mobile device running three concurrent games showing all active content.
Figure 62:
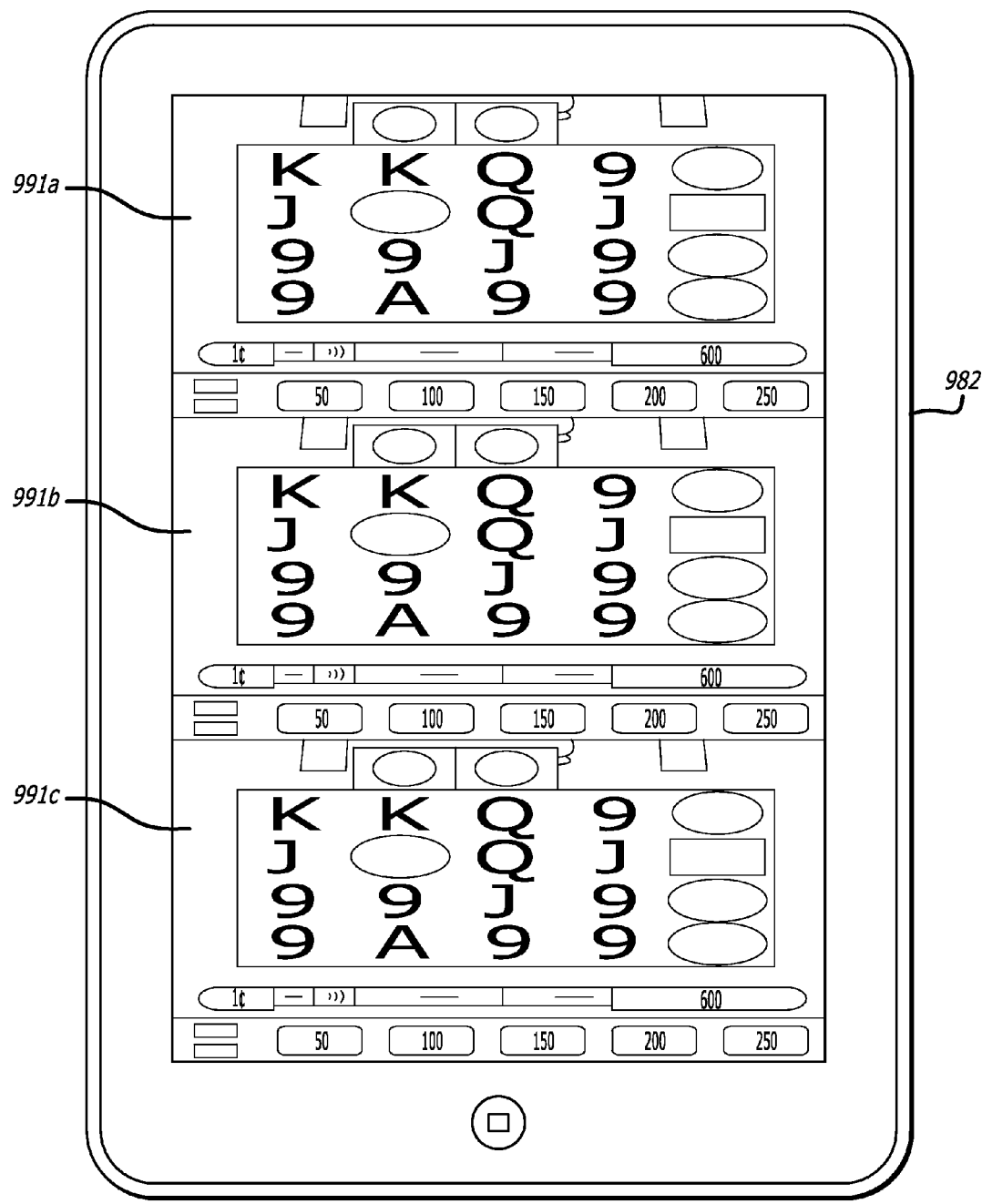
FIG. 62 illustrates a mobile device running three concurrent games showing only prime content.

As discussed above in this application, one method determines an optimal orientation (landscape or portrait) for a given content. It is understood that using normal values for V32, V22 or V22/32, all active content would produce a portrait orientation, and 50% of display would produce a landscape orientation. For V22/V32 the extent of the V22 display would be used for prime content, rather than 50%. This method shows meaningful content depending upon orientation. It should be noted that this method also is applicable for non-streamed games and could be used for any gaming content such as thick client internet gaming. It should be noted that these methods are not restricted to one game at a time. As shown in FIGS. 61 and 62, three concurrent games 991*a*, 991*b*, and 991*c* are presented on one mobile device. In FIG. 61, the three concurrent games are showing all active content, and in FIG. 62, the three concurrent games are showing only prime content. The embodiments described herein are used to determine orientation, positioning and scaling. The only difference with the embodiment shown in FIGS. 61 and 62 is that the client device resolutions are divided by 3 on each access in turn, x for landscape and y for portrait.

Additional Embodiment of Mobile Wallet for Casino

Figure 63:
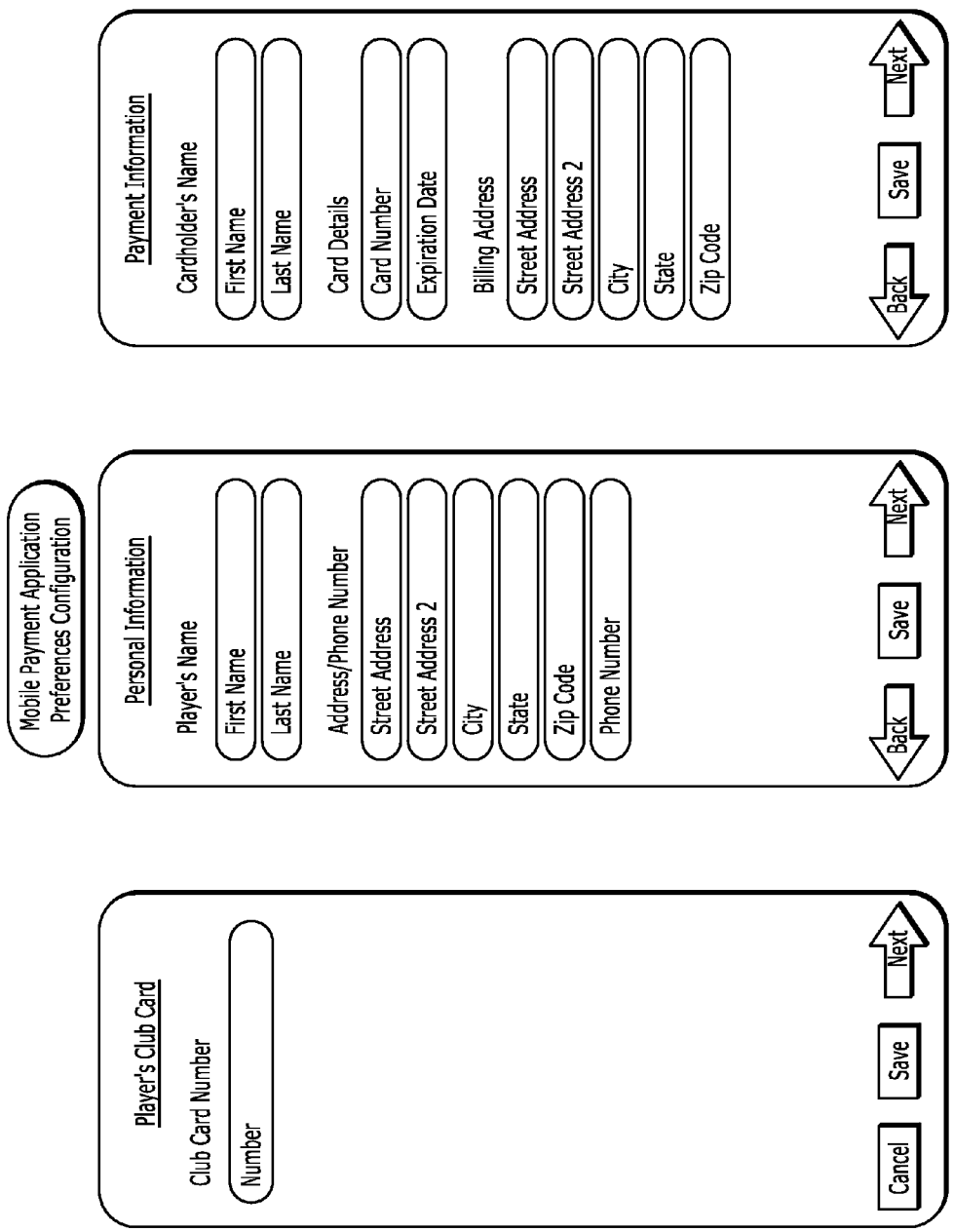
FIGS. 63*a*-63*f* illustrate various displays of a mobile phone for configuring a payment application.

In this embodiment, Ticket-In-Ticket-Out (TITO) is either somewhat or eventually completely replaced by a mobile phone application operated by the player on their own personal mobile phone or smartphone. The player typically installs this application on their phone by receiving and activating a link to a URL supplied by the casino. This link may take the form of a printed QR code or be contained in email promotions. FIGS. 63*a*-63*f* depict an example of how the player may configure the application when installed. First, they associate the phone with a player card number (FIG. 63*a*). This allows the casino management system (CMS) to link the player's phone to card-in and card-out events at a particular gaming machine (EGM). These embodiments of the mobile wallet or e-wallet for a casino also may be used to transfer funds between the CMS and the gaming machine while a remote control gaming session is in progress. Further, the mobile phone (or mobile tablet) used to transfer funds in these embodiments may be the same device that is running the remote control gaming session or it may be a separate device.

FIGS. 63*b* and 63*c* show example screen shots that allow a player to enter personal and payment information. The player may associate existing bank account or a 3rd party wallet (such as Paypal or Google Wallet) with the phone application as sources of funding. Further, the player may configure rules for the transferring funds to gaming machines as shown on the sample screen shot of FIG. 63*d*. For example, the player may set rules as to when funds may be automatically transferred, such as when credits reach a minimum. Players may also set harm minimization rules, such as ending sessions after a period of time or limiting the amount transferred during a session. A player may also set a maximum amount on the EGM credit meter. If the player is successful in their gaming session, and hits a win that takes them over the maximum credit meter their excess funds may be immediately transferred back into the phone wallet.

In one embodiment, a player may also set up frequently used transfer amounts as shown in the sample screen shot shown in FIG. 63*e*. Players also may populate the frequently used transfer amount openings with standard amounts, such as $20, $50, $100 and $200. Finally, a player may set their preferred authentication method, be it PIN, verbal recognition, facial recognition, password or even none.

Once installed and configured, this embodiment of the mobile wallet application may be enabled for 'push notifications'. This is a class of signals that is supported by all major phone platforms. A push notification is a signal that causes the application to become active, and can be sent over the internet. Once active, the application may communicate with a server interactively. In this embodiment the server would be connected to the casino CMS. Assuming a player has installed the application on their phone, they can then go to the casino and insert their player tracking card into an EGM as normal. At this point, the processes shown in FIGS. 64 (server side) and 65 (device side) are performed.

Figure 64:
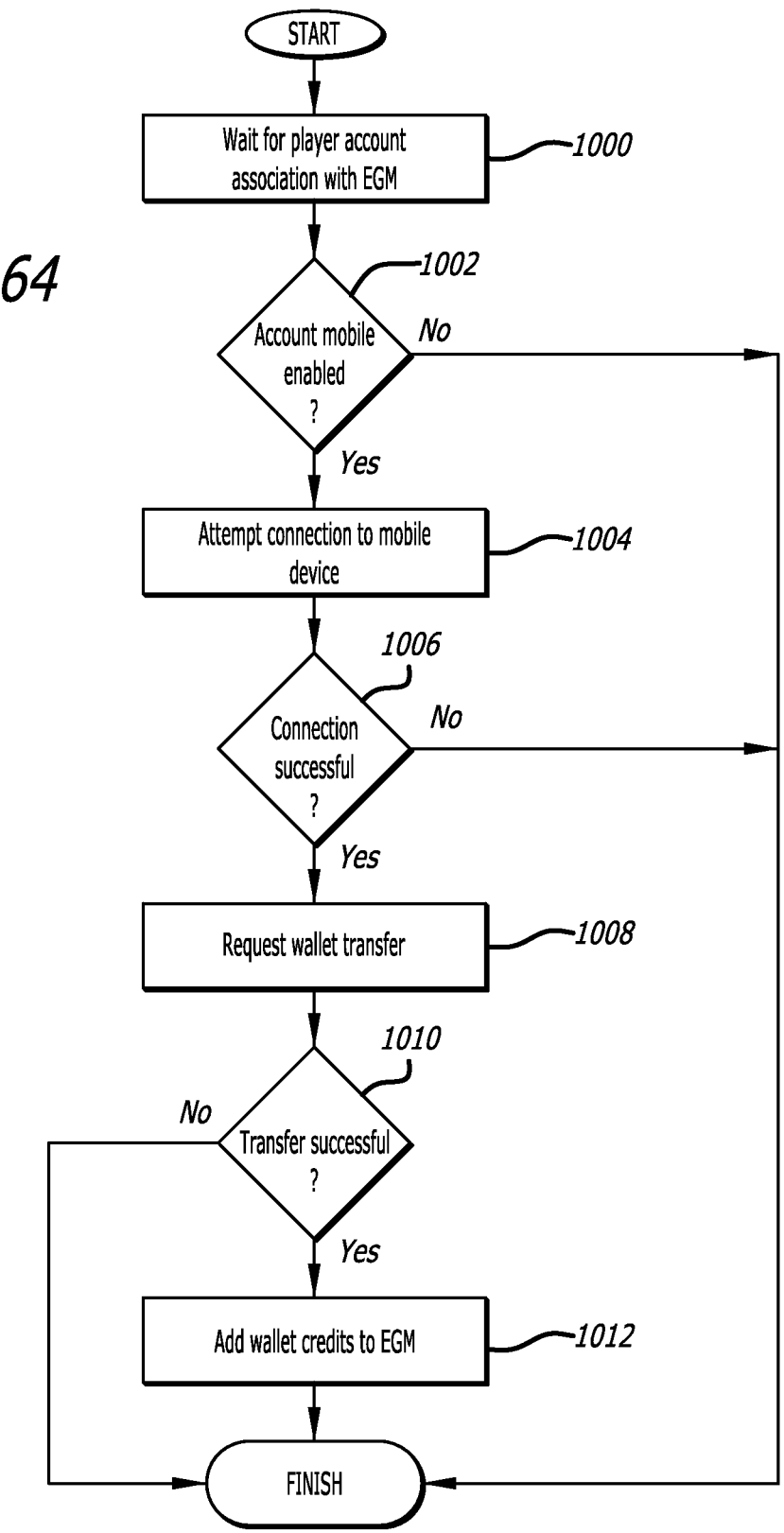
FIG. 64 illustrates one embodiment of a casino management server process to transfer funds from an e-wallet to a gaming machine.
Figure 65:
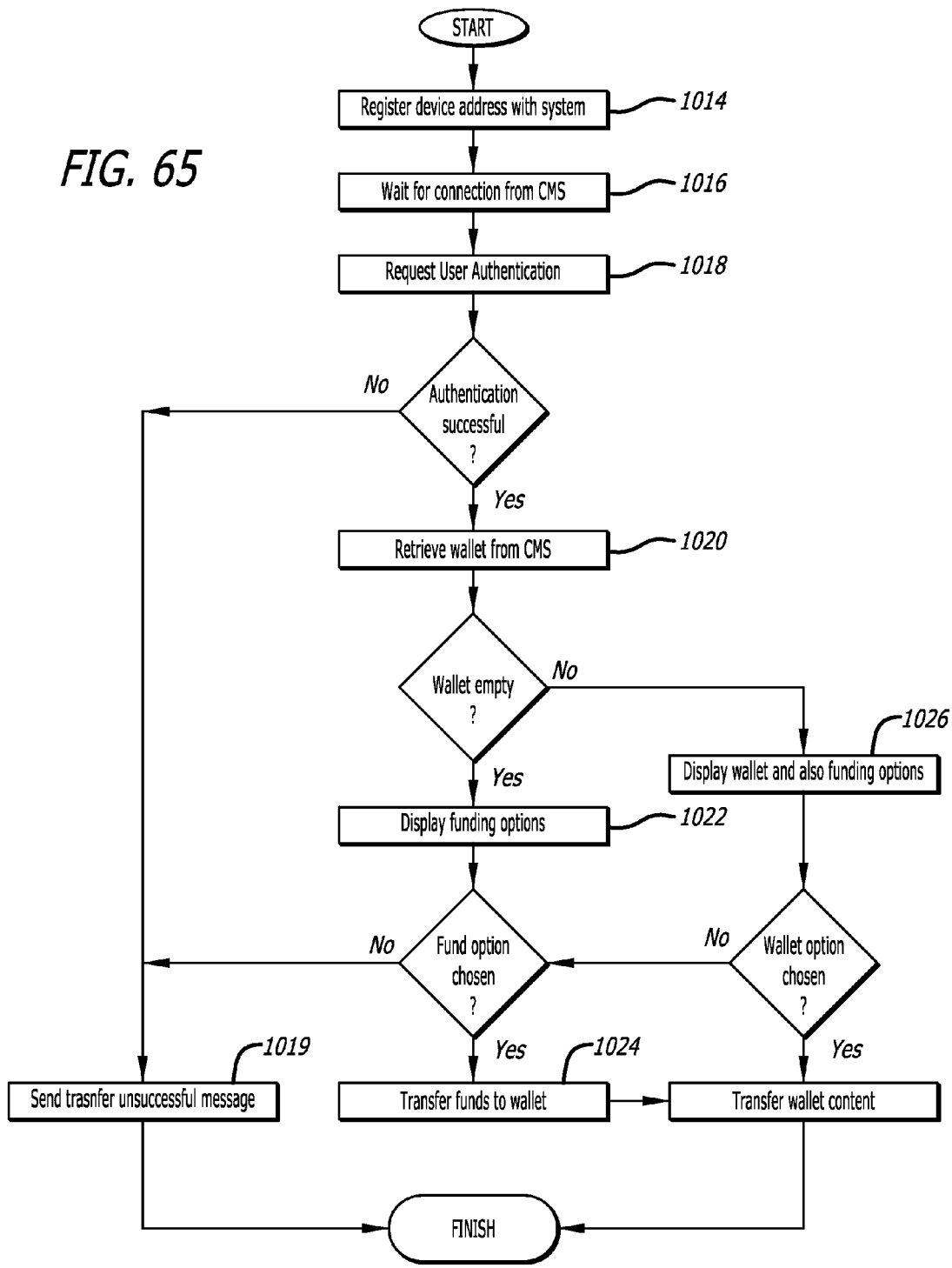
FIG. 65 illustrates one embodiment of a mobile device process to transfer funds from an e-wallet to a gaming machine.

Referring to FIG. 64, inserting the player tracking card into a gaming machine (EGM) associates the player with the EGM at step 1000. This embodiment is not limited to just player tracking cards. A player also may associate their electronic wallet or phone with the EGM by scanning a QR code attached to the EGM or EGM display, or by other means such as Bluetooth communication, Indoor Positioning Systems or biometrics such as facial recognition. If the player tracking account indicates an active mobile phone linked to the account (step 1002), the CMS attempts to connect to the mobile phone (step 1004) and sends a push notification to the phone. If this connection is successful (step 1006), the CMS requests a transfer from the wallet at step 1008. If the wallet transfer request is successful (step 1010), credits from the wallet are added to the EGM at step 1012. The process may then move to the mobile device process as shown in FIG. 65.

Figure 66:
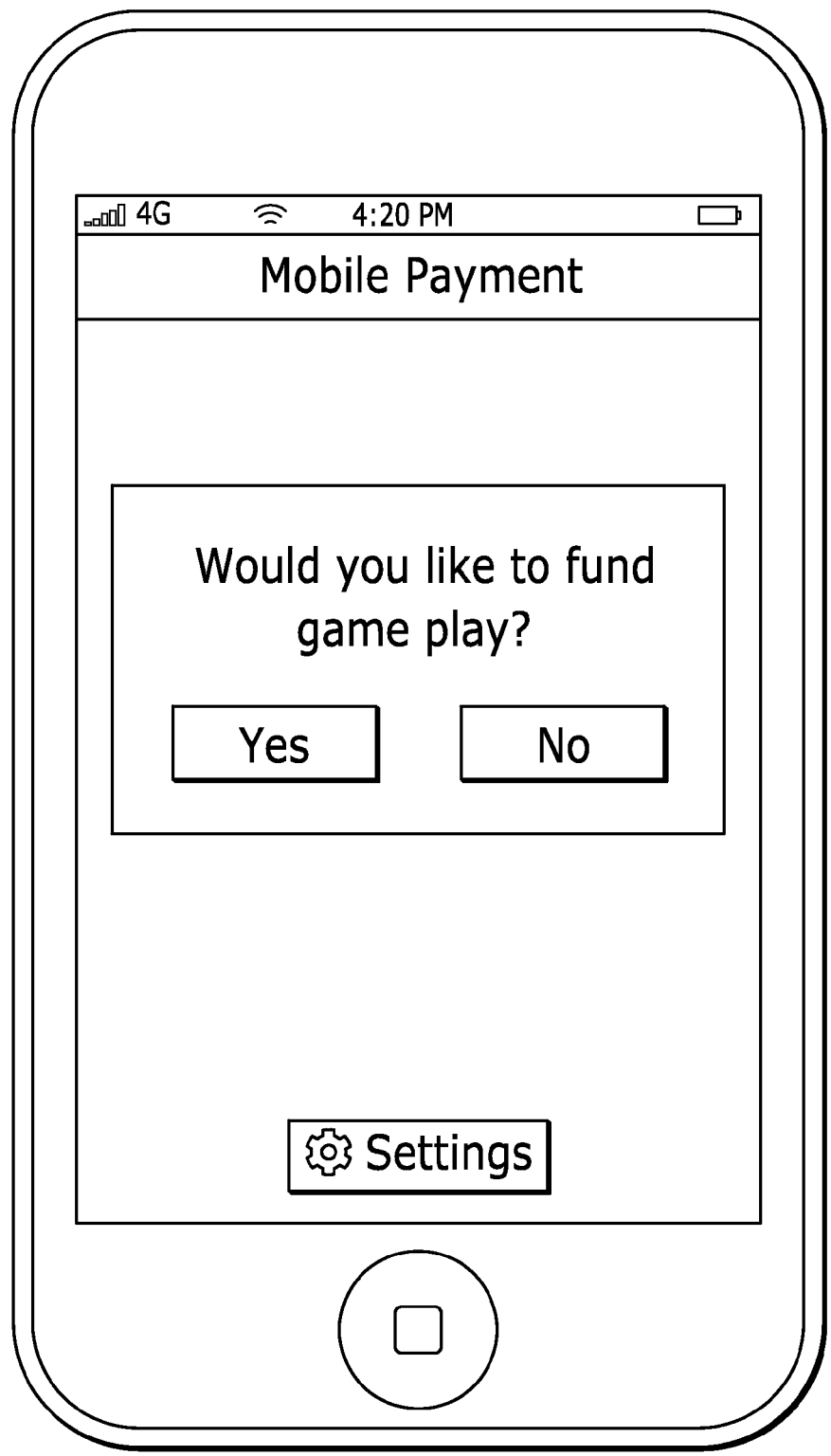
FIG. 66 illustrates a mobile phone display at initial connection for making a mobile payment.
Figure 67:
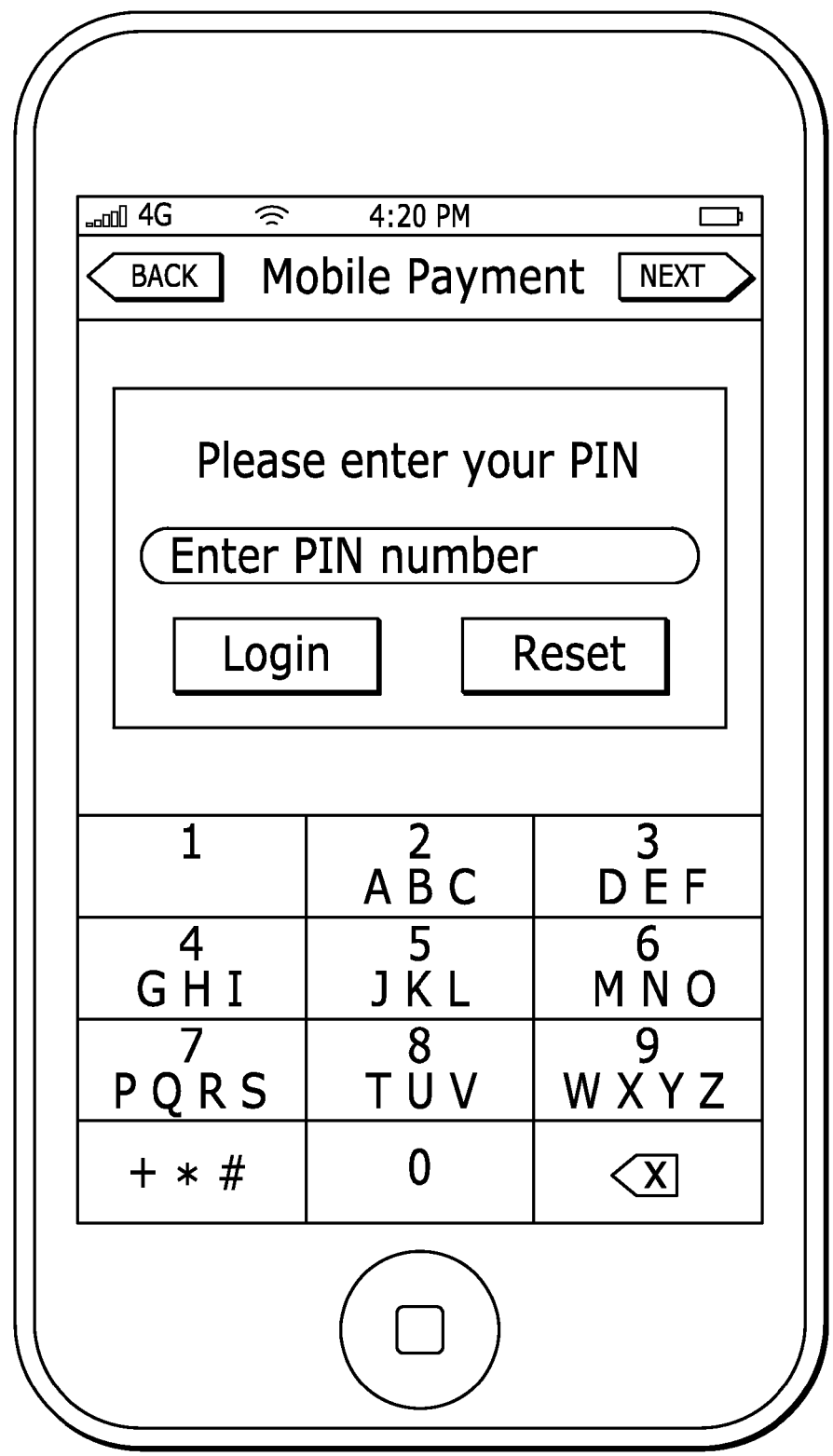
FIG. 67 illustrates a mobile phone display requesting a PIN be entered before making a mobile payment.

In this embodiment the push notification causes the mobile application to become active and the device address is registered with the system (step 1014) and is connected to the CMS (step 1016). By way of example only and not by way of limitation, the phone generates an audible or vibratory signal to the player, and displays a screen such as shown in FIG. 66, asking the player if they would like to fund game play. If the player chooses to fund game play on the EGM from the phone they are then optionally presented with an authentication screen, such as the sample screen shot shown in FIG. 67, at step 1018. In one embodiment, authentication may take place at the actual execution of transfer of funds described below. If the authentications is unsuccessful the system sends a message to the player that the transfer was unsuccessful at step 1019. Once authenticated, the mobile device retrieves the electronic wallet status from the casino hosted wallet server (E-wallet) at step 1020. If a player has existing funds in their E-wallet these are presented to the player with the option of transferring these funds directly to the EGM at step 1022. If the player elects to fund the gaming machine, then funds are transferred from the E-wallet to the gaming machine at step 1024. If the player has no funds in their E-wallet they may be presented with an option to transfer funds from an external source such as Paypal, Google Wallet or a bank account at step 1026. The amount to transfer may be chosen from a set of fixed amounts (as configured initially) or an arbitrary amount chosen instead. This option also may be provided if funds are available in the E-wallet. So if a player had, say, $12.13 in their E-wallet, they may elect to transfer this amount plus a further $20 from an external source.

If external funds are transferred, one embodiment may require authentication through the external funding source. Alternatively, such authentication credentials may be cached in the mobile application, providing a player so desires. The external funds, if sourced, are first transferred into the E-wallet and then along with any E-wallet value are passed to the CMS for transfer to the EGM. Once received at the CMS, the wallet value is transferred to the EGM. A legacy slot machine sees this as an AFT transfer from the CMS and knows nothing about the mobile phone transactions. It can be seen that this transaction is very simple for a player to navigate, and furthermore requires no extra infrastructure at the casino end beyond an internet gateway accessible by the mobile phone.

During game play, further transactions using the E-wallet may take place. Some examples are shown in FIG. 68. For brevity, these are not exhaustive and do not include, for example, harm minimization scenarios or excess fund removal. In the example shown, the CMS or iView monitors events from the gaming machine (EGM). These events being monitored include the transfer of funds or credits to the gaming machine or to the E-wallet, whether a mobile device is connected, whether a credit low limit or credit high limit set by the player is reached, or whether a gaming session has been terminated. If a transfer of funds is being made by the player to the gaming machine, the system adds the funds or credits to the gaming machine at step 1030. Also, as shown in FIG. 68, if a credit low limit is reached, the CMS or iView sends a request to the mobile device to transfer additional funds to the gaming machine at step 1032. If a gaming session is terminated, the CMS or iView may transfer the credits or funds from the gaming machine meter to the E-wallet at step 1034. It should be understood that all relevant meters including any existing credits may be transferred to the mobile device during a remote gaming session. At step 1036, a notification may be sent to the mobile device indicating that the session has terminated and funds have been transferred from the gaming machine. Further incoming or outgoing transfers may be manually initiated by the player by using the mobile application. In the case of outgoing transfers, the CMS may periodically or in real time update the mobile application with the current credit level on the EGM. If a player initiates a transfer of all credits off the EGM, the session is ended and the credits are transferred to the E-wallet either by the mobile application or CMS. At a later point, or immediately if rules are configured on the mobile device, some or all of these funds may be transferred to the player's preferred funding source.

If a low (or high) credit limit is reached, a push notification is sent to the mobile device requesting (or sending) funds. In the preferred implementation the mobile device need not ask for further authentication at this point, but may ask to confirm the amount of transfer. If the player presses 'cash out' or removes the player tracking card from the EGM, the credits are automatically transferred by the CMS or iView to the E-wallet. A push notification is sent to the mobile device so that the player is aware of this transfer. Furthermore, rules on the mobile application may then be acted upon to transfer some or all of these funds back to the funding source. All transactions may be repeated when a player goes to another EGM and inserts their player tracking card. Authentication may be optional at this point, as long as a timeout period has not been met. If a timeout period has been met reauthentication should be mandatory; in one embodiment the player must opt-in to automatic authentication. The default is for authentication at the beginning of each insertion of a player tracking card into an EGM. The purpose of this is to ensure that a stolen mobile phone cannot be used to fund an EGM.

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, gaming machine, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server, such as a gaming server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such as function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analysing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming casinos, arcades, portal based game sites, cellular phone devices, personal digital assistant devices, laptops, personal computers, home game consoles, bar top gaming devices, table gaming devices, surface computing devices, table gaming biometric touch screen, television gaming, or in-room gaming devices.

Those skilled in the art will readily recognize various modifications and changes that may be made to the claimed invention without following the example embodiments and applications illustrated and described herein, and without departing from the true spirit and scope of the claimed invention.

What is claimed is:

1. A system for enabling remote play of a game, said system comprising:
    a gaming machine located in a first area of a venue, the gaming machine hosts the game;
    a communication network; and
    a mobile device having a display, wherein the mobile device is distinct from the gaming machine and is operable to (1) associate with the gaming machine through the communication network, (2) receive game content from the gaming machine in a second area of the venue and not in the first area, and (3) present the game content to a mobile player on the display of the mobile device in the second area and not in the first area, and
    wherein the gaming machine is operable to (1) associate with the mobile device, (2) receive user input data from the mobile device, and (3) control the game while the game is being presented on the mobile device,
    wherein a sound is played by both the gaming machine and the mobile device that assists the mobile player in locating the gaming machine after remote play has ended.

2. The system of claim 1, wherein the communication network includes a first wireless access point proximate the first area and a second wireless access point proximate the second area, and the mobile device is operable to access the first and second wireless access points.

3. The system of claim 2, wherein the mobile device receives game content when connected to the second wireless access point in the second area.

4. The system of claim 2, wherein the mobile device is unable to receive game content when connected to the first wireless access point in the first area.

5. The system of claim 1, wherein the gaming machine is configured to receive an input from the mobile device in order for the gaming machine to associate with the mobile device, and the gaming machine controls the game content shown on the mobile device.

6. The system of claim 1, wherein the gaming machine or a server in communication with the gaming machine and mobile device identifies the location of the gaming terminal and controls one or more of the gaming terminal and mobile device to signal the location of the gamine machine associated with the mobile device.

7. The system of claim 1, wherein the mobile device is configured to include electronic wallet data representing funds available for gaming.

8. The system of claim 7, further comprising an apparatus for crediting and debiting to electronic wallet data.

9. The system of claim 7, further comprising a kiosk in communication with the communication network and the kiosk configured to communicate with the mobile device and electronic wallet data for crediting or debiting from the electronic wallet data.

10. A system for enabling remote play of a game, the system comprising:
a gaming machine located in a first area in a venue, the gaming machine including a game display to display outcomes for a wagering game, a processor to control the play of the wagering game;
a mobile device of a mobile player including a mobile video display, a mobile player interface, and a wireless transceiver;
a communications network in communication with the gaming machine and the mobile device, the communications network includes a first wireless access point located in the first area and a second wireless access point located in a second area of the venue;
a remote gaming server in communication with the gaming machine and mobile device over the communications network, the remote gaming server configured to (1) associate the gaming machine with the mobile device, (2) enable the mobile device to receive a first class of content from the gaming machine when the mobile device is connected to the first wireless access point in the first area, (3) enable the mobile device to receive streaming game content of the game hosted on the gaming machine when the mobile device is connected to the second wireless access point in the second area, and (4) enable the gaming machine to receive input from the mobile player interface of the mobile device,
wherein a sound is played by both the gaming machine and the mobile device that assists the mobile player in locating the gaming machine after remote play has ended.

11. The system of claim 10, wherein the remote gaming server prevents the mobile device from receiving streaming game content of the game hosted by the gaming machine when the mobile device is connected to the first wireless access point in the first area.

12. The system of claim 10, wherein the remote gaming server is configured to disable play of the game at the gaming machine during remote play of the game.

13. The system of claim 10, further comprising a data base for storing information concerning the remote play of the game.

14. The system of claim 10, wherein the mobile device is configured to access electronic wallet data representing funds available for gaming.

15. The system of claim 14, further comprising an apparatus for crediting and debiting to electronic wallet data.

16. The system of claim 14, further comprising a kiosk in communication with the communication network and the kiosk configured to communicate with the mobile device and electronic wallet data for crediting or debiting from the electronic wallet data.

17. The system of claim 10, wherein the remote gaming server identifies the location of the gaming machine and controls one or more of the gaming machine and mobile device to signal the location of the gaming machine associated with the mobile device.

18. A method for enabling a remote gaming session in a system that includes a gaming machine that presents a game, and a mobile device distinct from the gaming machine, both in communication with one another, the method comprising:
associating the mobile device of a mobile player with the gaming machine over a network including a first wireless access point in a first area and a second wireless access point in a second area;
determining if the mobile device is connected to the first wireless access point or the second wireless access point;
receiving non-gaming content at the mobile device from the gaming machine if the mobile device is connected to the first wireless access point;
enabling the mobile device to participate in a remote gaming session and receive gaming content from the gaming machine if the mobile device is connected to the second wireless access point; and
receiving input signals at the gaming machine from the mobile device when the mobile device is connected to the first wireless access point or the second wireless access point,
wherein a sound is played by both the gaming machine and the mobile device that assists the mobile player in locating the gaming machine after remote play has ended.

19. The method of claim 18, further comprising preventing the mobile device from receiving game content of the game presented by the gaming machine when the mobile device is connected to the first wireless access point.

20. The method of claim 18, further comprising disabling play of the game at the gaming machine during the remote gaming session.

* * * * *